(12) United States Patent
Andriolo et al.

(10) Patent No.: US 9,833,884 B2
(45) Date of Patent: Dec. 5, 2017

(54) POWER TOOL AND OPERATING METHOD FOR USE ON THE POWER TOOL

(71) Applicant: Positec Power Tools (Suzhou) Co., Ltd., Suzhou (CN)

(72) Inventors: Paolo Andriolo, Vicenza (IT); Shisong Zhang, Suzhou (CN); Hongfeng Zhong, Suzhou (CN); Xiaoli Pang, Suzhou (CN); Jingtao Xu, Suzhou (CN); Mingjian Xie, Suzhou (CN); Yichun Ma, Suzhou (CN); Wei Zhang, Suzhou (CN); Qinglin Wang, Suzhou (CN)

(73) Assignee: POSITEC POWER TOOLS (SUZHOU) CO., LTD, Suzhou, Jiangsu Province (CN)

( * ) Notice: Subject to any disclaimer, the term of this patent is extended or adjusted under 35 U.S.C. 154(b) by 732 days.

(21) Appl. No.: 14/330,368

(22) Filed: Jul. 14, 2014

(65) Prior Publication Data
US 2014/0329654 A1 Nov. 6, 2014

Related U.S. Application Data

(63) Continuation of application No. PCT/CN2013/000025, filed on Jan. 14, 2013.

(30) Foreign Application Priority Data

Jan. 13, 2012 (CN) .......................... 2012 1 0011330
Jan. 13, 2012 (CN) .......................... 2012 1 0011339
(Continued)

(51) Int. Cl.
*B23Q 3/157* (2006.01)
*B25F 1/04* (2006.01)
(Continued)

(52) U.S. Cl.
CPC ................ *B25B 21/00* (2013.01); *B25F 1/04* (2013.01); *B25F 5/001* (2013.01); *B25F 5/029* (2013.01);
(Continued)

(58) Field of Classification Search
CPC ......... Y10T 483/1798; Y10T 483/1827; Y10T 483/179; Y10T 483/1779; Y10T 483/1783;
(Continued)

(56) References Cited

U.S. PATENT DOCUMENTS 4,976,175 A 12/1990 Hung
5,065,498 A 11/1991 McKenzie
(Continued)

FOREIGN PATENT DOCUMENTS

CN 2748230 Y 12/2005
CN 2772736 Y 4/2006
(Continued)

OTHER PUBLICATIONS

Machine Translation of CN 201086280 Y, which CN '280 was published Jul. 2008.*
(Continued)

*Primary Examiner* — Erica E Cadugan
(74) *Attorney, Agent, or Firm* — Howard & Howard Attorneys PLLC

(57) ABSTRACT

A power tool, comprising: a housing; a motor being disposed in the housing for outputting rotary power; an output shaft having an accommodating hole in the axial direction for holding a tool bit; a transmission mechanism, being disposed between the motor and the output shaft for transmitting rotary power from the motor to the output shaft; a tool bit supporting being disposed in the housing and including several chambers disposed in parallel for holding the tool
(Continued)

bit; a connecting member being disposed in the housing and capable of moving axially between a working position where the connecting member passes through one of the chambers and to accommodate the tool bit in the chamber connect the output shaft, and a release position where the connecting member exits and separates from one of the several chambers; and an operating member is arranged on the housing for controlling the axial movement of the connecting member; the power tool further includes an automatic shifting means for adjusting the position of the tool bit supporting in response to the movement of the operating member, wherein the connecting member moves axially to a position that is separated from one of the several chambers, and the cartridge moves to a position where another chamber is axially corresponding to the output shaft under the action of the automatic shifting means.

32 Claims, 72 Drawing Sheets

(30) Foreign Application Priority Data

| Jan. 21, 2012 | (CN) | 2012 1 0019726 |
|---|---|---|
| Jan. 21, 2012 | (CN) | 2012 1 0019727 |
| Mar. 23, 2012 | (CN) | 2012 1 0079237 |
| Oct. 17, 2012 | (CN) | 2012 1 0394781 |
| Oct. 26, 2012 | (CN) | 2012 1 0419186 |
| Nov. 26, 2012 | (CN) | 2012 1 0486650 |
| Nov. 26, 2012 | (CN) | 2012 1 0486677 |
| Nov. 26, 2012 | (CN) | 2012 1 0488616 |
| Nov. 26, 2012 | (CN) | 2012 1 0488618 |
| Dec. 19, 2012 | (CN) | 2012 1 0553212 |
| Jan. 8, 2013 | (CN) | 2013 1 0006329 |

(51) Int. Cl.
 *B25B 21/00* (2006.01)
 *B25F 5/02* (2006.01)
 *B25F 5/00* (2006.01)
 *B23Q 3/155* (2006.01)

(52) U.S. Cl.
 CPC ...... *B23Q 3/15722* (2016.11); *B23Q 3/15766* (2013.01); *B23Q 2003/1553* (2016.11); *Y10T 483/10* (2015.01); *Y10T 483/1748* (2015.01); *Y10T 483/1798* (2015.01); *Y10T 483/1827* (2015.01)

(58) Field of Classification Search
 CPC ......... Y10T 483/1767; Y10T 483/1769; Y10T 483/1771; Y10T 408/37; Y10T 279/17008; B23Q 3/15766; B23Q 2003/1553
 USPC ............... 483/57, 61, 54, 49, 51, 44, 45, 46; 408/35; 279/14
 See application file for complete search history.

(56) References Cited

U.S. PATENT DOCUMENTS

| 5,346,453 | A | 9/1994 | Rivera-Bottzeck |
| 5,597,275 | A | 1/1997 | Hogan |
| 6,007,277 | A | 12/1999 | Olson et al. |
| 6,928,908 | B1 | 8/2005 | Yu |
| 7,237,458 | B2 | 7/2007 | Shiao |
| 7,367,757 | B2 | 5/2008 | Phillips |
| 8,007,424 | B2 | 8/2011 | Moser et al. |
| 9,421,681 | B2 * | 8/2016 | Zhang ............... B25F 5/029 |
| 2004/0013488 | A1 | 1/2004 | Schaub et al. |
| 2013/0337985 | A1 | 12/2013 | Nagy |

FOREIGN PATENT DOCUMENTS

| CN | 201055983 Y | 5/2008 |
| CN | 201086280 Y | 7/2008 |
| CN | 101563192 A | 10/2009 |
| CN | 101683734 A | 3/2010 |
| CN | 201960511 U | 9/2011 |
| DE | 10045617 A1 * | 4/2002 |
| DE | 102011087294 A1 * | 5/2013 |
| GB | 2212428 A | 7/1989 |
| WO | WO9956919 A1 | 11/1999 |
| WO | WO0029173 A1 | 5/2000 |
| WO | WO2008074536 A1 | 6/2008 |
| WO | WO2012065789 A1 | 5/2012 |

OTHER PUBLICATIONS

English language abstract and machine-assisted English language translation for CN2748230 extracted from the espacenet.com database on Jul. 16, 2014, 9 pages.
English language abstract and machine-assisted English language translation for CN2772736 extracted from the espacenet.com database on Jul. 16, 2014, 10 pages.
English language abstract and machine-assisted English language translation for CN101683734 extracted from the espacenet.com database on Jul. 16, 2014, 14 pages.
English language abstract and machine-assisted English language translation for CN201055983 extracted from the espacenet.com database on Jul. 16, 2014, 11 pages.
English language abstract and machine-assisted English language translation for CN201086280 extracted from the espacenet.com database on Jul. 16, 2014, 10 pages.
English language abstract and machine-assisted English language translation for CN201960511 extracted from the espacenet.com database on Jul. 16, 2014, 17 pages.
English language abstract and machine-assisted English language translation for WO9956919 extracted from the espacenet.com database on Jul. 16, 2014, 15 pages.
International Search Report for Application No. PCT/CN2013/000025 dated Apr. 25, 2013, 4 pages.

* cited by examiner

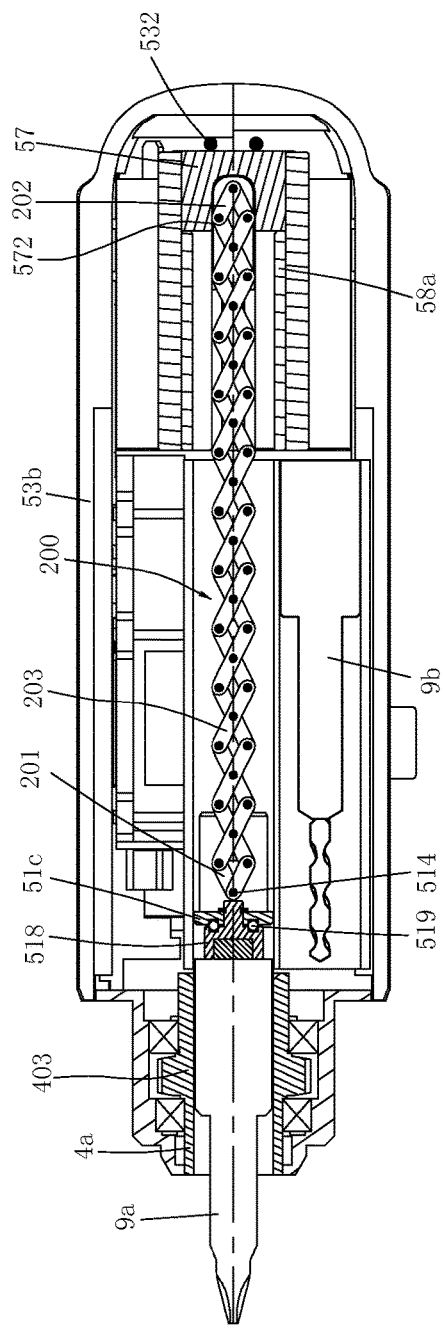
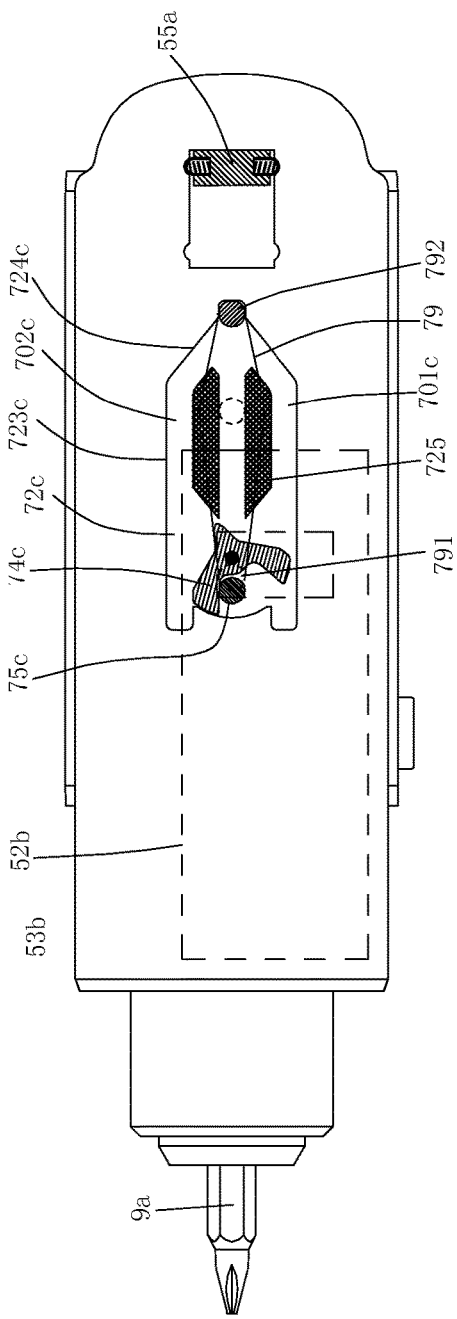
Fig. 57
Fig. 58

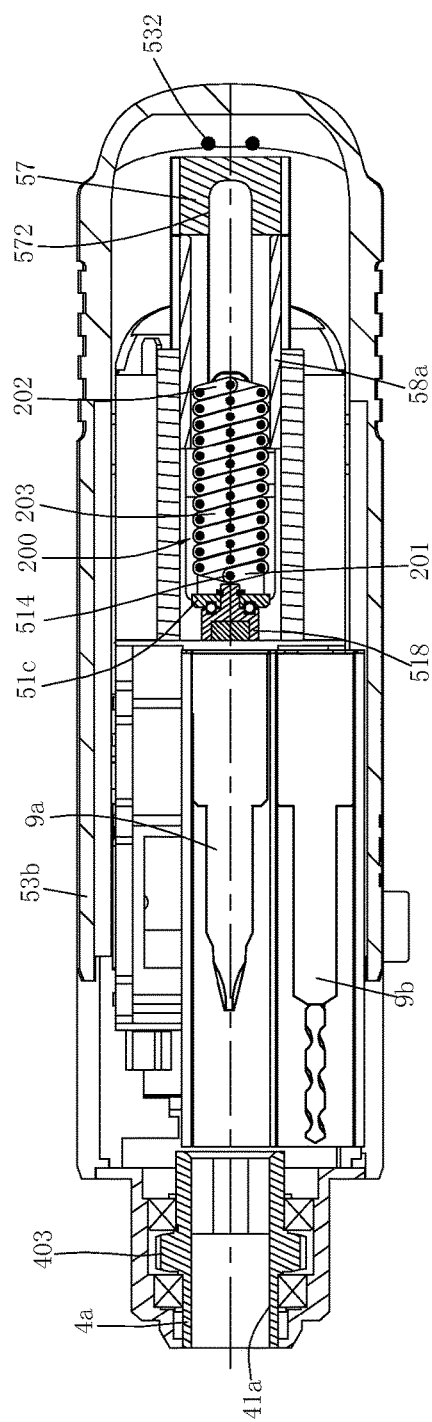
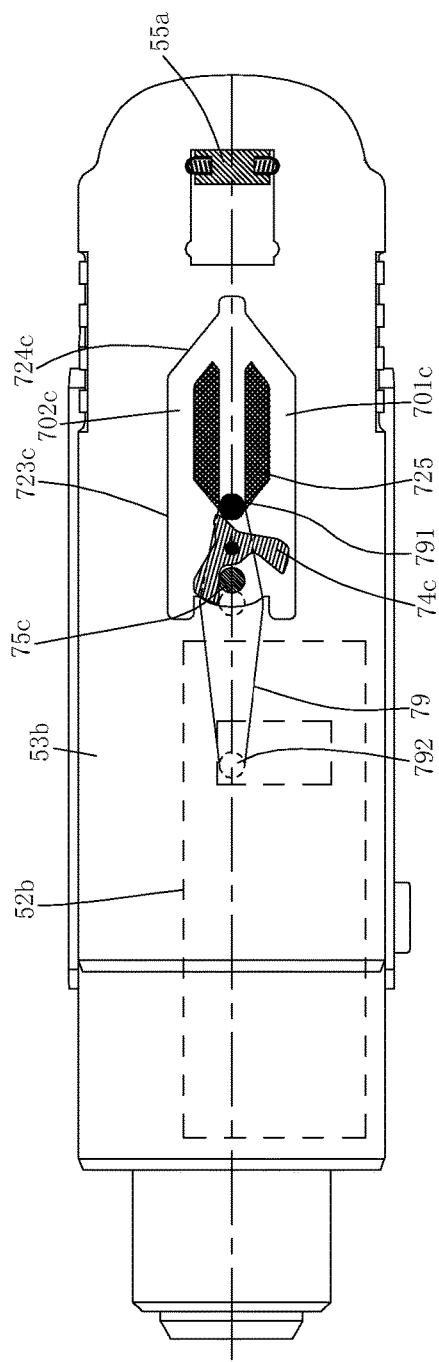
Fig. 63
Fig. 64

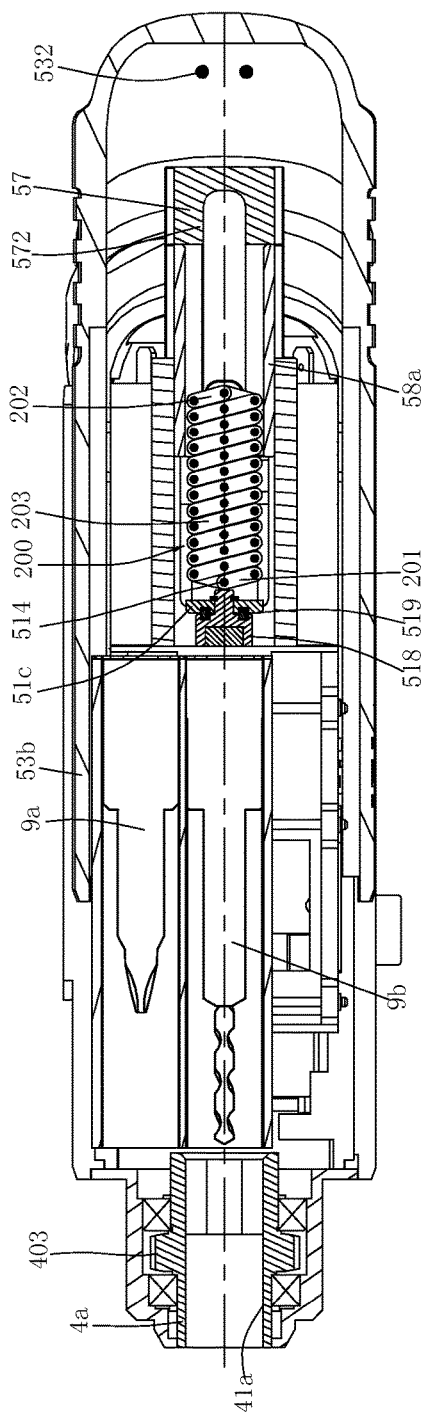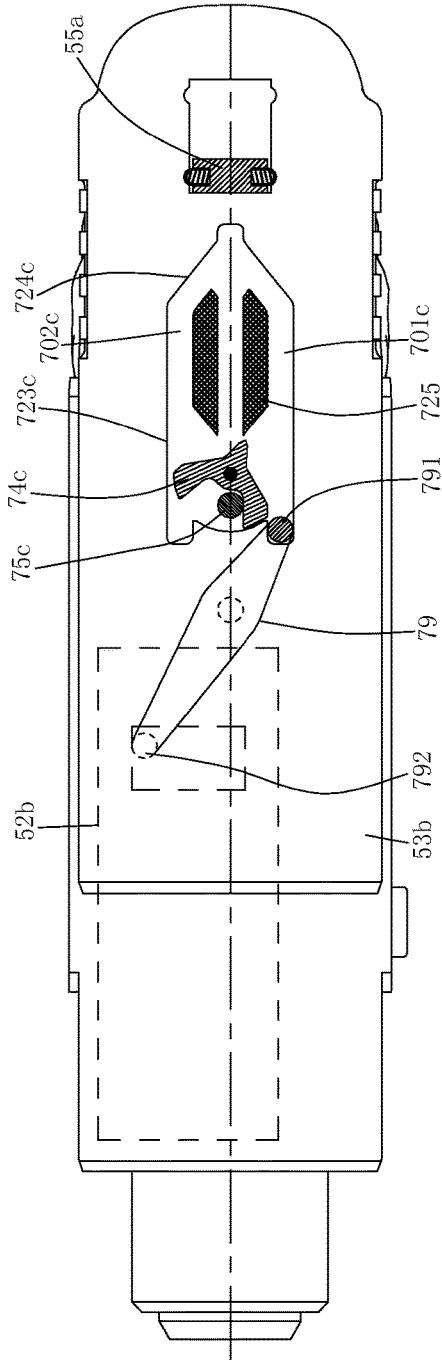
Fig. 66
Fig. 67

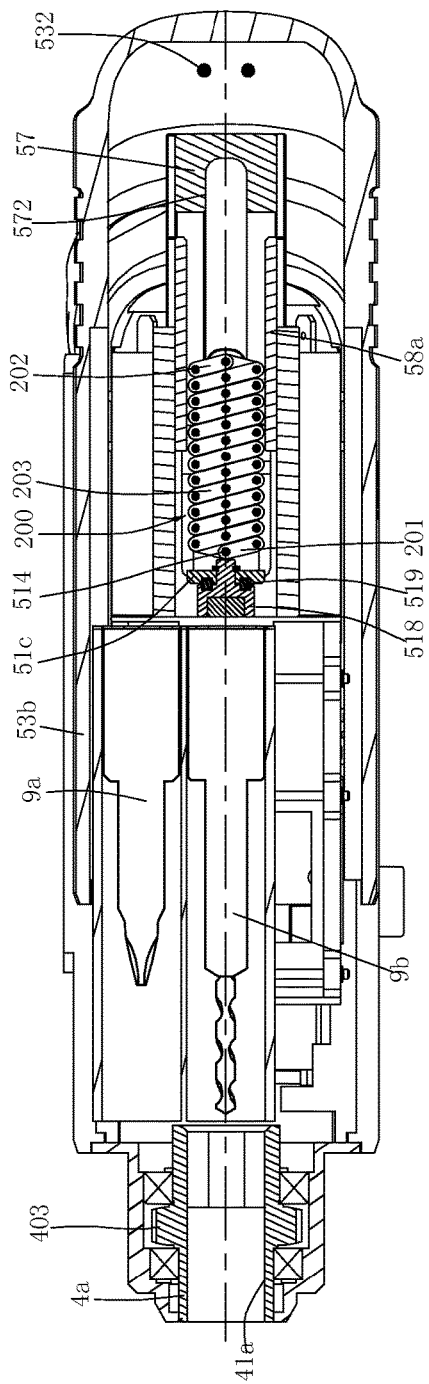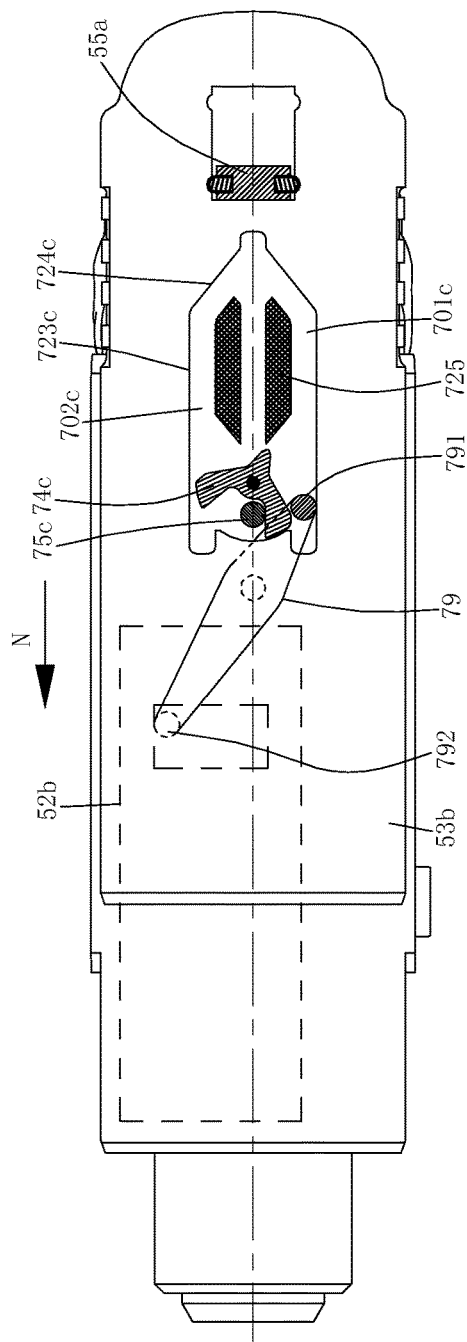
Fig. 69
Fig. 70

POWER TOOL AND OPERATING METHOD FOR USE ON THE POWER TOOL

The subject patent application is a continuation of International Patent Application No. PCT/CN2013/000025, filed on Jan. 14, 2013, which claims priority to and all the advantages of Chinese Patent Application Serial No. 201210011339.2, filed on Jan. 13, 2012, Chinese Patent Application Serial No. 201210011330.1, filed on Jan. 13, 2012, Chinese Patent Application Serial No. 201210019727.5, filed on Jan. 21, 2012, Chinese Patent Application Serial No. 201210019726.0 filed on Jan. 21, 2012, Chinese Patent Application Serial No. 201210079237.4 filed on Mar. 23, 2012, Chinese Patent Application Serial No. 201210394781.8 filed on Oct. 17, 2012, Chinese Patent Application Serial No. 201210419186.5 filed on Oct. 26, 2012, Chinese Patent Application Serial No. 201210486650.2 filed on Nov. 26, 2012, Chinese Patent Application Serial No. 201210486677.1 filed on Nov. 26, 2012, Chinese Patent Application Serial No. 201210488618.8 filed on Nov. 26, 2012, Chinese Patent Application Serial No. 201210488616.9 filed on Nov. 26, 2012, Chinese Patent Application Serial No. 201210553212.3 filed on Dec. 19, 2012, and Chinese Patent Application Serial No. 201310006329.4 filed on Jan. 8, 2013. The contents of International Patent Application No. PCT/CN2013/000025 and Chinese Patent Application Serial Nos. 201210011339.2, 201210011330.1, 201210019727.5, 201210019726.0, 201210079237.4, 201210394781.8, 201210419186.5, 201210486650.2, 201210486677.1, 201210488618.8, 201210488616.9, 201210553212.3, 201310006329.4 are incorporated herein by reference in their entirety.

BACKGROUND OF THE INVENTION

1. Field of the Invention

The present invention relates to a power tool and an operating method for the power tool, especially to a gun-drill type power tool capable of storing and rapidly changing the tool bits and an operating method for rapidly changing the tool bits for the power tool.

2. Description of Related Art

Gun-drill type power tools in the prior art generally comprise electric drills, electric screwdrivers and percussive drills.

An electric screwdriver is a commonly used electric tool for tightening screws onto workpieces. When screws of different sizes are required to be tightened in use, different screwdriver bits may be replaced according to the difference of screw sizes, namely, remove the originally installed screwdriver bit and install a screwdriver bit of another size.

An electric drill is used to drill holes in workpieces. During the operation, the chuck clamps the bit and maintains rotary movement.

Generally, the user is required to make different types of operations, such as tightening of screws and drilling of holes. In this way, the user is required to get ready various electric tools or various tool bits, and make continual replacement in operation. In particular, under the condition where pre-punched hole is required before tightening a screw, it is required to keep replacement between the drill bit and the screwdriver bit, causing great inconvenience to the operator, not only leading to the trouble of replacing the tool bit, but also easy to lose the tool bit removed and put aside. Some manual tools can realize storage and rapidly changing of the tool bit, but the operation needs a lot of efforts due to the innate defect of the manual tool, namely small torque, which may result in the disadvantages of operator inclined to tiredness, low efficiency and unsuitability for being used as a professional tool in industrial application.

A U.S. Pat. No. 7,367,757B2 discloses a double-headed electric drill, comprising: a chuck for installing the screwdriver bit, and a chuck for installing the drilling bit, wherein the two chucks are disposed at 90 degrees to each other approximately and can rotate around the same pivoting point, the screwdriver function can be achieved by rotating the chuck for installing the screwdriver bit through 90° to make the head correspond to the main shaft, and then connecting the chuck with the main shaft; to change the drill function, separate the chuck for installing the screwdriver bit from the main shaft, and rotate reversely through 90° to make the chuck for installing the drilling bit correspond to the main shaft, and then connect the chuck with the main shaft to realize the drill function. As a result, many defects emerge, for instance, the need of two chucks, high precision requirement for the connecting structure between the two chucks and the main shaft, difficult manufacturing, and complicated overall structure, big volume and high cost of the double-headed electric drill.

A CN utility model patent numbered CN201086280Y discloses a multi-head electric tool, comprising a main body of the electric tool, and a multi-head runner structure, wherein the multi-head runner structure further includes a multi-head cartridge can capable of accommodating a plurality of tool bits, the multi-head cartridge can be connected with the main body of the tool axially in a sliding manner, and can rotate to select the required bit when it slides away from the main body of the tool. Thus, the operation is troublesome for the procedure of moving the multi-head cartridge can to separate the bit sleeve from the cartridge and then rotating the cartridge can to select the bit.

A CN invention patent numbered CN101563192B discloses a machine tool for rotatably driving tool bits, wherein the machine tool has a motor and a transmission device on which a tool change magazine is arranged. Tool chambers for accommodating bits are disposed on the tool change magazine. An operating slide member can axially move forward to pass through one of the tool chambers and drive the bit in the tool chamber into the tool clamp, or axially move backward to drive the bit in the tool clamp back to the tool chamber through the magnet arranged in the front end. An actuating assembly intended for making axial limitation to the operating slide member includes a supporting lever axially bracing the operating slide member. To change the bit, pressing the button can relieve the operating slide member from the axial limitation resulted by the supporting lever. Afterwards, moving the operating slide member can allow the operating slide member with the bit to exit from the tool clamp, and drive the bit to return to the tool chamber. After the operating slide member exits from the tool chamber, rotate the tool change magazine to select another bit. To make the bit enter into the tool clamp or return to the tool chamber, it is required to directly push or pull the operating slide member, so the machine tool must be of a considerable length, which expands the volume of the machine tool. However, with a compact and small-sized structure, the hand-holding is convenient, but configuration is bound to be complicated, still being a laborious tool. Moreover, when the machine tool works, the operating slide member is pressed against the tail end of the tool clamp, wherein the tool clamp can rotate, but the operating slide member can't, thus leading to a high slide friction between the operating slide member and the tool clamp, not only affecting work efficiency, but also speeding up the tool's friction, and shortening the service life of the tool.

SUMMARY OF THE INVENTION

The objective of the present invention is to provide a power tool easy to operate to overcome the defects in the prior art.

Another objective of the present invention is to provide an operating method for the power tool with high work efficiency.

The technical solution put forward by the present invention to address the technical problems is as follows: a power tool, comprising: a housing; a motor being disposed in the housing for outputting rotary power; an output shaft having an accommodating hole in the axial direction for holding a tool bit; a transmission mechanism being disposed between the motor and the output shaft for transmitting rotary power from the motor to the output shaft; a tool bit supporting assembly being disposed in the housing for holding at least two tool bits; a connecting member being disposed in the housing and movable between a working position, where torque transmission from the motor to one of the at least two tool bits is valid, and a release position, where torque transmission from the motor to the tool bit is disenabled; and an operating member is arranged on the housing for controlling movement of the connecting member; wherein the power tool further includes an automatic shifting means for adjusting the position of the tool bit supporting assembly in response to the movement of the operating member, and the tool bit supporting assembly enable one of the at least two tool bits moving from one position to another under the action of the automatic shifting means.

An operating method for rapidly changing the tool bit of the power tool as described above, comprising the following steps: 1) control the operating member to drive the connecting member moving to the release position, and then control the operating member to drive the automatic shifting means to make the tool bit supporting assembly moving to the position where one of the at least two tool bits moves from one position to another.

Preferably, the connecting member is movable along the axial direction of the output shaft between the working position and the release position.

Preferably, the tool bit supporting assembly includes at least two chambers disposed in parallel for correspondingly holding the at least two tool bits, the connecting member passes through one of the at least two chambers at the working position and to accommodate the tool bit in the chamber and connect the output shaft, and the connecting member exits and separates from one of the at least two chambers at the release position.

Preferably, the connecting member moves to a position that is separated from one of the at least two chambers, the operating member drives the automatic shifting means in order to move the tool bit supporting assembly to a position that another chamber is axially corresponding to the output shaft, so that position of the at least two tool bits have been changed.

Preferably, the automatic shifting means includes a control assembly arranged between the operating member and the tool bit supporting assembly, the control assembly is movable from an initial position to a terminal position and drives the tool bit supporting assembly along the direction that the connecting member moves from the working position to the release position.

Preferably, the control assembly is connected with the operating member, the operating member controls the connecting member moving until it is at least partially overlapped with the chamber, and the control assembly moves from the terminal position to the initial position along the direction that the connecting member moves from the release position to the working position.

Preferably, the operating method further comprises: 2) control the operating member to drive the connecting member to return to the working position and the control assembly to return to the initial position.

Preferably, the control assembly is connected with the operating member, the operating member is operable to drive the control assembly moving after it controls the connecting member moving to the release position Preferably, the tool bit supporting assembly is rotatably supported in the housing and the control assembly is rotatable around an axis parallel to the output shaft.

Preferably, the automatic shifting means further includes a movement conversion assembly being connected with the operating member, the control assembly is driven to move by the operating member through the movement conversion assembly.

Preferably, the movement conversion assembly includes a swing plate being connected between the operating member and the control assembly, and the operating member linearly moves to drive the swing plate swinging around the central rotating line perpendicular to the movement direction of the operating member, and a sliding groove is arranged on the operating member, a sliding pin capable of moving in the sliding groove is provided on one end of the swing plate, and the other end of the swing plate is connected with the control assembly.

Preferably, at least two locating grooves corresponding to the at least two chambers are arranged on an end face of the tool bit supporting assembly, the control assembly includes a pawl engaging with one of the locating grooves, and the pawl is movable between a position engaging with one of the locating grooves and a position separating from the locating groove.

Preferably, the operating member is movable along the axial direction of the output shaft to drive the connecting member and the automatic shifting means.

Preferably, the automatic shifting means is connected between the operating member and the tool bit supporting assembly, the automatic shifting means is selectable to drive the tool bit supporting assembly moving or the tool bit supporting assembly being fixed relative to the housing.

Preferably, the automatic shifting means includes a movement conversion assembly being connected between the operating member and the tool bit supporting assembly, and the movement conversion assembly is used to convert the movement of the operating member to the movement of the tool bit supporting assembly.

Preferably, the movement conversion assembly includes a driving member being connected between the operating member and the tool bit supporting assembly, and the operating member is moved along the direction away from the output shaft and drives the driving member to move from the first position to the second position in order to drive the tool bit supporting assembly to move along the direction perpendicular to the axial direction of the output shaft.

Preferably, the tool bit supporting assembly includes at least two chambers being disposed in parallel for correspondingly holding the at least two tool bits, the connecting member passes through one of the at least two chambers at the working position and to accommodate the tool bit in the chamber and connect the output shaft, and the connecting member exits and separates from one of the at least two chambers at the release position, the driving member is connected with the operating member, the operating member moves along the direction toward the output shaft and controls the connecting member moving until it is at least partially overlapped with the chamber, the tool bit supporting assembly is fixed relative to the housing and the driving member is moved from the second position to the first position.

Preferably, the movement conversion assembly further includes a sliding groove arranged on the operating member, one end of the driving member is movably connected with the tool bit supporting assembly, the other end of the driving member is fixed with a sliding pin which moves along the sliding groove to drive the driving member to move.

Preferably, the driving member is configured to be a swing plate, the sliding pin is arranged at one end of the swing plate and moves along the sliding groove to drive the swing plate to rotate around the axis perpendicular to the axial direction of the output shaft.

Preferably, the sliding groove has two opposing oblique edges and two straight edges being connected with the oblique edges and parallel to the axial direction of the output shaft, wherein the angle between the two oblique edges is opposite to the output shaft.

Preferably, two rib plates parallel to the two straight edges are arranged in the sliding groove respectively and the sliding pin is movable in the track formed between the two rib plates and that formed between the two straight edges and the two rib plates.

Preferably, guide plate is arranged in the sliding groove, wherein the guide plate is rotatable around the axis perpendicular to the axial direction of the output shaft, the operating member is movable to make the sliding pin contacting with the guide plate, and the sliding pin generates a displacement which is perpendicular to the axial direction of the output shaft under the action of the guide plate.

Preferably, the guide plate is Y-shaped and arranged away from the oblique edges, and the Y-shaped single-head end can maintain in the position toward the oblique edges.

Preferably, a stop post arranged in the sliding groove is located between the two head ends of the guide plate, and can be pressed against one of the two head ends so as to limit the rotation of the guide plate.

Preferably, the stop post is provided with a magnet, and the guide plate can maintain in the position pressed against the stop post under the action of the magnet.

Preferably, the automatic shifting means includes a movement track selection means being connected to the operating member, and the operating member moves axially along the axial direction of the output shaft to make the tool bit supporting assembly moving cyclically between two positions through the movement track selection means.

Preferably, a first sliding groove and a second sliding groove communicating with each other are arranged on the operating member, the automatic shifting means further includes a sliding pin for driving the tool bit supporting assembly to move, the sliding pin is cyclic movable in the first sliding groove and the second sliding groove under the action of the movement track selection means.

Preferably, the movement track selection means includes a guide plate arranged between the first sliding groove and the second sliding groove, the sliding pin is capable of contacting the guide plate along with the movement of the operating member, the guide plate is capable of changing the movement direction of the sliding pin along with the movement of the sliding pin and the sliding pin moving cyclic in the first sliding groove and the second sliding groove.

Preferably, the power tool further comprises a travel amplification assembly, the operating member drives the travel amplification assembly moving the connecting member so that the movement travel of the connecting member is greater than that of the operating member.

Preferably, during the movement of the operating member along the connecting member, there are at least two travels, wherein, the operating member moves relative to the housing together with the connecting member in the first travel; the connecting members is fixed relative to the housing and the operating member moves relative to the housing in the second travel.

Preferably, a push block is arranged on the operating member, the push block operably moves between two positions, wherein in the first position, the push block allows the connecting part to move; in the second position, the push block limits the connecting part to move.

Preferably, the automatic shifting means includes a movement conversion assembly connected between the operating member and the tool bit supporting assembly, the operating member moves along the axial direction of the output shaft to drive the automatic shifting means, and the movement conversion assembly is for converting the linear movement of the operating member to a rotary movement or a linear movement of the tool bit supporting assembly.

Preferably, the tool bit supporting assembly is movable along a direction perpendicular to the axial direction of the output shaft or rotatable around an axis parallel to the axial direction of the output shaft.

Preferably, the at least two tool bits includes at least one screwdriver bit and at least one drill bit, the operating member is selectable to drive the connecting member to allocate the drill bit in a accommodating position in the tool bit supporting assembly and the screwdriver bit in a working position in the accommodating hole, or allocate the screwdriver bit be in the accommodating position and the drill bit in the working position, the connecting member is movable to drive one of the screwdriver bit and the drill bit to the accommodating position, and the tool bit supporting assembly moves to a position that the other one of the screwdriver bit and the drill bit is axially corresponding to the output shaft under the action of the automatic shifting means.

Preferably, an operating method of the power tool, comprising the following steps: 1) operating the operating member to drive the connecting member to allocate one of the screwdriver bit and the drill bit in the accommodating position; 2) operating the operating member to drive the connecting member to allocate the other one of the screwdriver bit and the drill bit to the working position.

Preferably, a supporting plate arranged between the tool bit supporting assembly and the control assembly, said supporting plate is fixed relative to the housing, wherein the supporting plate is provided with a first stop portion and a second stop portion, the control assembly contacts the first stop portion when moving to the terminal position, and contacts the second stop portion when moving to the initial position.

Preferably, the tool bit supporting assembly is rotatably supported in the housing, and the control assembly can move along the direction perpendicular to the axial direction of the connecting member.

Preferably, the control assembly includes a ratchet wheel and at least one pawl engaged with the ratchet wheel, wherein said ratchet wheel is arranged at one end of the tool bit supporting assembly and fixed relative to the circumference of the tool bit supporting assembly, and said pawl moves along the direction perpendicular to the axial direction of the connecting member to drive the ratchet wheel to make unidirectional rotation.

Preferably, the pawl can move between the position engaged with the ratchet wheel and the position separated from the ratchet wheel.

Preferably, the movement conversion assembly further includes a first gear connected with the swing plate and a second gear engaged with the first gear, wherein the second gear is connected with the control assembly and drives the control assembly to rotate.

Preferably, the first gear and the second gear are sector gears.

Preferably, any one of the several locating grooves has a first side and a second side along the circumference of the cartridge, wherein the first side is at a right angle to the end face of the cartridge, and the second side is at an acute angle to the end face of the cartridge.

Preferably, any one of the several locating grooves communicates with the circumference of the cartridge along the radial direction of the cartridge.

Preferably, the cartridge is removably arranged in the housing.

Another technical solution put forward by the present invention to address the technical problems is as follows: a power tool, comprising: a housing; a motor being disposed in the housing for outputting rotary power; an output shaft having an accommodating hole in the axial direction for holding a tool bit; a transmission mechanism being disposed between the motor and the output shaft for transmitting rotary power from the motor to the output shaft; a cartridge being disposed in the housing and including several chambers disposed in parallel for holding the tool bits; a connecting member being disposed in the housing and capable of making axial movement between a working position where the connecting member passes through one of the chambers and to accommodate the tool bit in one chamber connect the output shaft, and a release position where the connecting member exits and separates from one of the several chambers; an operating member is arranged on the housing for controlling the axial movement of the connecting member. The power tool further includes an automatic shifting means for adjusting the position of the cartridge in response to the movement of the operating member cartridge, wherein the automatic shifting means includes an energy storage unit fitting into the cartridge, the connecting member moves in axial direction to a position that is separated from one of the several chambers, and then the energy of the energy storage unit is released to drive the cartridge to move to a position where another chamber is axially corresponding to the output shaft.

Preferably, the automatic shifting means includes a control assembly arranged between the operating member and the cartridge, wherein the energy storage unit is connected with the control assembly, the control assembly moves from an initial position to a terminal position and drives the cartridge along the direction that the connecting member moves from the working position to the release position.

Preferably, the control assembly is connected with the operating member, the operating member controls the connecting member to make axial movement until it is at least partially overlapped with the chamber, and the control assembly moves from the terminal position to the initial position along the direction that the connecting member moves from the release position to the working position and the energy of the energy storage unit is stored.

Preferably, the cartridge is rotatably supported in the housing, and the control assembly is rotatable around an axis parallel to the connecting member.

Preferably, the energy storage unit is a torsion spring arranged around the rotating axis of the control assembly, wherein one end of the torsion spring is fixed relative to the control assembly, and the other end is fixed relative to the housing.

Preferably, the cartridge is rotatably supported in the housing, and the control assembly can move along the direction perpendicular to the axial direction of the connecting member.

Preferably, the control assembly includes a ratchet wheel and at least one pawl engaged with the ratchet wheel, wherein the ratchet wheel is arranged at one end of the cartridge and fixed relative to the circumference of the cartridge, and the pawl moves along the direction perpendicular to the axial direction of the connecting member to drive the ratchet wheel to make unidirectional rotation.

Preferably, the pawl can move between a position engaged with the ratchet wheel and a position separated from the ratchet wheel.

Preferably, the automatic shifting means further includes a movement conversion assembly connected with the operating member, and the energy storage unit drives the control assembly to move by the movement conversion assembly.

Preferably, the movement conversion assembly includes a swing plate connected between the operating member and the control assembly, and the energy of the energy storage unit is released to drive the swing plate to swing around the central rotating line perpendicular to the axial direction of the connecting member.

Preferably, the energy storage unit is a torsion spring arranged around the central rotating line of the swing plate, wherein one end of the torsion spring is fixed relative to the swing plate, and the other end is fixed relative to the housing.

Preferably, a sliding groove is arranged on the operating member, a sliding pin capable of moving in the sliding groove is provided on one end of the swing plate and the other end of the swing plate is connected with the control assembly.

Preferably, the movement conversion assembly further includes a first gear connected with the swing plate and a second gear engaged with the first gear, wherein the second gear is connected with the control assembly and drives the control assembly to rotate.

Preferably, the energy storage unit is a torsion spring arranged around the central rotating line of the first gear, wherein one end of the torsion spring is fixed relative to the first gear, and the other end is fixed relative to the housing.

Another technical solution put forward by the present invention to address the technical problems is as follows: a power tool, comprising: a housing; a motor being disposed in the housing for outputting rotary power; an output shaft having an accommodating hole in the axial direction for holding a tool bit; a transmission mechanism being disposed between the motor and the output shaft for transmitting rotary power from the motor to the output shaft; a tool bit supporting assembly, at least part arranged in the housing, having several chambers arranged in parallel for supporting the tool bit, and capable of being adjusted to the position where at least one chamber axially corresponds to the accommodating hole along the direction at an angle with the axial direction of the output shaft; a connecting member being disposed in the housing and capable of moving axially between a working position where the connecting member passes through one of the several chambers and to accommodate the tool bit in the chamber connect the output shaft, and a release position where the connecting member exits and separates from the chamber; an operating member arranged on the housing for controlling the axial movement of the connecting member. The power tool further includes an automatic shifting means for adjusting the position of the too bit supporting assembly in response to the movement of the operating member, the connecting member moves axially to a position that is separated from one of the several chambers, and the tool bit supporting assembly moves to a position where another chamber is axially corresponding to the accommodating hole under the action of the automatic shifting means.

Preferably, the automatic shifting means includes a movement conversion assembly being connected between the operating member and the tool bit supporting assembly, and the movement conversion assembly is used to convert the linear movement of the operating member along the axial direction of the output shaft to the linear movement of the tool bit supporting assembly.

Preferably, the movement conversion assembly includes a sliding groove arranged on the operating member and a sliding pin fixed relative to the tool bit supporting assembly, and the sliding pin can move along the sliding groove.

Preferably, the sliding groove has two opposing oblique edges and two straight edges connected with the oblique edges and parallel to the axial direction of the output shaft, wherein the angle included by the two oblique edges is toward the output shaft.

Preferably, two rib plates parallel to the two straight edges are arranged in the sliding groove respectively, and the sliding pin can move in the track formed by the two straight edges and the two rib plates.

Preferably, a guide plate is arranged in the sliding groove, wherein the guide plate can rotate around the axis perpendicular to the axial direction of the output shaft, the movement of the operating member makes the sliding pin contact the guide plate, and the sliding pin generates displacement perpendicular to the linear movement direction of the operating member under the action of the guide plate.

Preferably, the guide plate is Y-shaped and arranged in the vicinity of the oblique edges, and the Y-shaped single-head end can maintain in the position toward the oblique edges.

Preferably, a stop post arranged in the sliding groove is located between the two head ends of the guide plate, and can be pressed against one of the two head ends so as to limit the rotation of the guide plate.

Preferably, the stop post is provided with a magnet, and the guide plate can maintain in the position pressed against the stop post under the action of the magnet.

Comparing with the prior art, the beneficial effects of the present invention are as follows: the tool bits of the power tool according to the present invention can be selected without manual operation, automatic rapid change of the tool bits can be realized by operating the connecting member to make it move forward and backward, improving work efficiency.

Another objective of the present invention is to provide a compact handheld tool to overcome the defects in the prior art.

The technical solution put forward by the present invention to address the technical problems is as follows: a handheld tool, comprising: a housing; an output shaft having an accommodating hole in the axial direction for holding a tool bit; a tool bit supporting assembly, at least part arranged in the housing, having several chambers arranged in parallel for supporting the tool bit, and capable of being adjusted to the position where at least one chamber axially corresponds to the accommodating hole; a connecting member being disposed in the housing and capable of driving the tool bit to the working position in the accommodating hole or the accommodating position in the tool bit supporting assembly; an operating member is arranged on the housing for controlling the movement of the connecting member, wherein a gear transmission assembly, arranged between the operating member and the connecting member, includes at least one gear which has a rotating axis perpendicular to the vertical plane, the operating member operably drives the at least one gear to move, and the at least one gear further drives the connecting member to make linear movement along the axial direction of the output shaft.

Preferably, the gear transmission assembly includes only one gear which makes axial movement along the output shaft while rotating around the rotating axis.

Preferably, the gear transmission assembly further includes a first rack unit fixed relative to the housing and a second rack unit arranged on the connecting member, the first rack unit and the second rack unit extend along the axial direction of the output shaft, and the gear meshes between the first rack unit and the second rack unit.

Preferably, the first rack unit and the second rack unit have different meshing surfaces with the gear along the width direction of the gearing face of the gear.

Preferably, the first rack unit includes two racks symmetrically arranged relative to the axis of the output shaft.

Preferably, the connecting part includes two arms arranged in parallel, the second rack unit is arranged on the inside of one arm, a guide groove is arranged between the two racks, and the other arm is slidably arranged in the guide groove.

Preferably, the rotating axis of the gear intersects the axis of the output shaft.

Preferably, the gear transmission assembly includes at least two gears, the rotating shafts of the at least two gears are fixed on the housing and the rotating axes of the at least two gears are parallel to each other.

Preferably, the at least two gears are configured to be a speed-increasing gear train.

Preferably, the gear transmission assembly further includes a first rack connected on the operating member and a second rack arranged on the connecting member, the first rack and the second rack extend along the axial direction of the output shaft, the gear train are connected between the first rack and the second rack, the operating member operably drives the first rack to make linear movement, the first rack drives the gear train to rotate, and the gear train drives the connecting member to make linear movement by the second rack.

Preferably, the gear train includes a first gear meshing with the first rack, a big gear rotating synchronously with the first gear, a second gear meshing with the big gear, and a third gear meshing with and rotating synchronously with the second gear, wherein the number of the teeth of the big gear are greater than that of the second gear.

Preferably, the axis of the output shaft is between the first rack and the second rack.

Preferably, a supporting rib plate is arranged on the operating member and intended for supporting one end of the second rack away from the output shaft.

Preferably, the operating member makes linear movement and drives the at least one gear to move.

Preferably, the travel of the linear movement of the connecting member is greater than that of the operating member.

Preferably, the handheld tool further comprises: a motor being disposed in the housing for outputting rotary power; a transmission mechanism being disposed between the motor and the output shaft for transmitting rotary power from the motor to the output shaft. Preferably, the at least one gear includes only one gear which makes axial movement along the output shaft while rotating around the rotating axis.

Comparing with the prior art, the beneficial effects of the present invention are as follows: the handheld tool according to the present invention has a gear transmission assembly arranged between the operating member and the connecting member, which decreases the movement travel of the operating member; and the gears are arranged in such a way that the rotating axis is perpendicular to the vertical plane, which decreases the size along the width direction of the handheld tool, thus getting a small-sized tool with a compact internal structure and easy to carry.

Another technical solution put forward by the present invention to address the technical problems is as follows: a handheld tool, comprising: a housing; an output shaft having an accommodating hole in the axial direction for holding a tool bit; a tool bit supporting assembly, at least part arranged in the housing, having several chambers arranged in parallel for supporting the tool bit, and capable of being adjusted to the position where at least one chamber axially corresponds to the accommodating hole; a connecting member being disposed in the housing and capable of driving the tool bit to the working position in the accommodating hole or the accommodating position in the tool bit supporting assembly; an operating member is arranged on the housing for controlling the movement of the connecting member, wherein a link assembly is arranged between the housing and the connecting member so that the operating member operably makes the link assembly extend or contract to drive the connecting member to make axial direction along the output shaft.

Preferably, the linear movement of the operating member along the axial direction of the output shaft drives the link assembly and the movement travel of the connecting member is greater than that of the operating member.

Preferably, the movement travel of the connecting member is less than or equal to that of the operating member by 12 times.

Preferably, the link assembly includes at least one group of links, each group of links includes at least two links equal in length and cross-disposed, and the middle where the at least two links cross and overlap are pivoted.

Preferably, the link assembly further includes a first group of semi-links and a second group of semi-links are connected on both end of the at least one group of links respectively, the number of the semi-links in each group of semi-links is equal to that of the links in each group of links, one end of the semi-links in the first group is pivoted with one end of the links of the at least one groups, the other end of the semi-links in the first group is connected on the connecting member, one end of the semi-links in the second group is pivoted with the other end of the links of the at least one groups and the other end of the semi-links in the second group is connected on the housing.

Preferably, each group of links comprises three links equal in length, wherein two links are fixed together and parallel to each other and the remaining link is arranged between the two links.

Preferably, the link assembly comprises several groups of links and the groups of links are pivoted together at the end of links.

Preferably, the links of each group are connected through a pivoting pin, the pivoting pin is perpendicular to the axial direction of the output shaft and capable of making axial movement along the output shaft with the extension or contraction of the link assembly, a positioning groove is arranged along the axial direction of the output shaft on the housing and intended for limiting the radial movement of the at least one pivoting pin, which are stuck in the positioning groove, along the output shaft.

Preferably, the links of each group are connected through a pivoting pin, the pivoting pin is perpendicular to the axial direction of the output shaft and capable of making axial movement along the output shaft with the extension or contraction of the link assembly, a limit groove is arranged along the axial direction of the output shaft on the connecting member and intended for limiting the radial movement of the at least one pivoting pin, which are stuck in the limit groove, along the output shaft.

Preferably, the links of each group are connected through a pivoting pin, wherein a positioning step is arranged on one pivoting pin, a push block is arranged on the operating member, a long groove is arranged along the axial direction of the output shaft on the push block and the positioning step is supported at the edge of the long groove along the radial direction of the output shaft so that the operating member can drive the pin pivot to make axial movement along the output shaft through the push block.

Preferably, the length of the long groove along the axial direction of the output shaft is greater than the diameter of the pin pivot and the pin pivot is stuck in the long groove and is capable of making axial movement along the output shaft.

Preferably, the link assembly extends or contracts in the plane perpendicular to the vertical direction.

Preferably, a lock groove is arranged on the operating member, wherein in the working position, the lock groove accommodates at least part of the link assembly to limit the contraction of the link assembly; in the accommodating position, the lock groove is separated from the link assembly.

Preferably, a locking piece is arranged on the operating member which can drive the locking piece to make axial movement along the output shaft, and the lock groove is arranged on the locking piece.

Preferably, the lock groove is a U-shaped groove.

Preferably, guide wheels are arranged on the connecting member and capable of contacting the inner wall of the chamber and the rotating axis of the guide wheels is perpendicular to the axial direction of the output shaft.

Preferably, a limit groove is arranged along the axial direction of the output shaft on the connecting member and at least part of the guide wheels is accommodated in the limit groove.

Preferably, at least one pair of guide wheels is symmetrically arranged along the horizontal.

Another technical solution put forward by the present invention to address the technical problems is as follows: a handheld tool, comprising: a housing; an output shaft having an accommodating hole in the axial direction for holding a tool bit; a tool bit supporting assembly, at least part arranged in the housing, having several chambers arranged in parallel for supporting the tool bit, and capable of being adjusted to the position where at least one chamber axially corresponds to the accommodating hole; a connecting member being disposed in the housing and capable of driving the tool bit to the working position in the accommodating hole or the accommodating position in the tool bit supporting assembly; an operating member is arranged on the housing for controlling the movement of the connecting member, wherein a driving member is connected between the operating member and the connecting member, the operating member is capable of controlling the driving member to make linear movement along the axial direction of the output shaft, the linear movement of the driving member is converted to be the linear movement of the connecting member along the axial direction of the output shaft and the movement travel of the connecting member is greater than that of the driving member.

Preferably, a flexible member is connected between the housing and the connecting member, and the driving member drives the connecting member to make linear movement through the flexible member.

Preferably, the connecting member has a front portion close to the output shaft and a back portion away from the output shaft, one end of the flexible member is connected with the back portion of the connecting member and capable of driving the connecting member to move towards the output shaft; the other end of the flexible member is connected with the front portion of the connecting member and capable of driving the connecting member to move away from the output shaft.

Preferably, the flexible member includes two flexible ropes at least, wherein one end of the first flexible rope is connected with the back portion of the connecting member and wound over the driving member along the first direction, the other end of the first flexible rope is fixed on the housing; one end of the second flexible rope is connected with the front portion of the connecting member and wound over the driving member along the direction opposite to the first direction and the other end of the second flexible rope is fixed on the housing.

Preferably, the flexible member includes at least one flexible rope, one end of the flexible rope is connected with the back portion of the connecting member and wound over the driving member along the first direction, the other end is connected with the front portion of the connecting member and wound over the driving member along the direction opposite to the first direction, the middle of the flexible rope is wound over the fixing member arranged on the housing along the first direction and wound round the fixing pin arranged on the housing, the fixing pin and one end of the flexible rope are on one side of the driving member relative to the vertical direction, and the fixing member and the other end of the flexible rope are on the other side of the driving member relative to the vertical direction.

Preferably, the end of the flexible member connected with the front portion of the connecting member is between one fourth and a half of the length of the connecting member Preferably, at least one raceway is arranged on the driving member and corresponds with the flexible member.

Preferably, two raceways are arranged and spaced along the direction perpendicular to the axial direction of the output shaft.

Preferably, a tensioning assembly, intended for tensioning the flexible member relative to the driving member, is arranged between the flexible member and the connecting member.

Preferably, the tensioning assembly includes a spring member which is arranged between one end of the flexible member and the connecting member and/or between the other end of the flexible member and the connecting member.

Preferably, an adjusting member, capable of moving relative to the connecting member to adjust the position of the flexible member relative to the connecting member, is arranged between the flexible member and the connecting member.

Preferably, the front portion of the connecting member is provided with an adjusting block which is capable of moving relative to the connecting member, the other end of the flexible member is stuck on the adjusting block, the adjusting member is arranged between the adjusting block and the connecting member and intended for adjusting the position of the flexible member of relative to the connecting member by adjusting the position of the adjusting block relative to the connecting member.

Preferably, the driving member has a rotating axis perpendicular to the axial direction of the output shaft and is capable of rotating relative to the operating member around its rotating axis.

Preferably, the movement travel of the connecting member is greater than 5 cm.

Comparing with the prior art, the beneficial effects of the present invention are as follows: the handheld tool according to the present invention has a travel amplification assembly arranged between the operating member and the connecting member, which decreases the movement travel of the operating member and the size in the width direction of the handheld tool, thus getting a small-sized tool with a compact internal structure and easy to carry.

Another objective of the present invention is to provide a long-life handheld tool to overcome the defects in the prior art.

The technical solution put forward by the present invention to address the technical problems is as follows: a handheld tool, comprising: a housing; an output shaft is supported on the housing, having an accommodating hole in the axial direction for holding a tool bit; a tool bit supporting assembly, at least part arranged in the housing, having several chambers arranged in parallel for supporting the tool bit, and capable of being adjusted to the position where at least one chamber axially corresponds to the accommodating hole; a connecting member is arranged in the housing and capable of driving the tool bit to the working position in the accommodating hole or the accommodating position in the tool bit supporting assembly; a supporting means is arranged at the end of the connecting member close to the output shaft and capable of abutting up against or being separating from the tool bit, including several rolling members which are capable of rotating relative to the connecting member under the action of the rotation of the tool bit when the supporting means abuts against and is pressed by the tool bit.

Preferably, the supporting means includes a supporting member rotably arranged on the connecting member and capable of abutting up against or being separating from the tool bit, and the rolling members are arranged between the connecting member and the supporting member.

Preferably, the supporting means includes end-face bearings arranged between the connecting member and the supporting member.

Preferably, at least one of the end face of the connecting member relative to the supporting member and the end face of the supporting member relative to the connecting member are provided with a ring groove arranged around the axis of the output shaft, and the rolling members is partially accommodated in the ring groove.

Preferably, a wear resistant washer is arranged between the rolling member and the connecting member and/or the rolling member and the supporting member.

Preferably, the end of the supporting member capable of abutting up against the tool bit is provided with a magnet.

Preferably, guide wheels are arranged on the connecting member and capable of contacting the tool bit supporting assembly along the radial direction of the output shaft, and the rotating axis of the guide wheels is perpendicular to the axial direction of the output shaft.

Preferably, a limit groove is arranged along the axial direction of the output shaft on the connecting member and at least part of the guide wheels is accommodated in the limit groove.

Preferably, at least one pair of guide wheels are symmetrically arranged along the horizontal.

Comparing with the prior art, the beneficial effects of the present invention are as follows: the handheld tool according to the present invention has a supporting member arranged on the connecting member and capable of abutting up against the tool bit, which reduces the friction between the tool bit and the connecting member and the resistance of the tool bit rotation, thus prolonging the life of the tool and improving its work efficiency.

Another objective of the present invention is to provide a power tool with reliable operation.

The technical solution put forward by the present invention to address the technical problems is as follows: a power tool, comprising: a housing; a motor being disposed in the housing for outputting rotary power; an output shaft having an accommodating hole in the axial direction for holding a tool bit; a transmission mechanism being disposed between the motor and the output shaft for transmitting rotary power from the motor to the output shaft; a cartridge being disposed in the housing and including several chambers disposed in parallel for holding the tool bit; a connecting member being disposed in the housing and capable of making axial movement between a working position where the connecting member passes through one of the at least two chambers at the working position and to accommodate the tool bit in the chamber and connect the output shaft, and the release position where the connecting member exits and separates from one of the several chambers; an operating member is arranged on the housing for controlling the axial movement of the connecting member; an automatic shifting means for adjusting the position of the cartridge in response to the movement of the operating member, wherein the automatic shifting means includes a control assembly arranged between the operating member and the cartridge, wherein, the control assembly capable of engaging with or separating from the cartridge, operably moves from an initial position to a terminal position under operation and drives the cartridge to moves to the position of another chamber of the several chambers axially corresponding to the accommodating hole after the operating member drives the connecting member to separate from one of the several chambers; the power tool further comprises a stop assembly arranged in the housing and intended for limiting the separation of the control assembly from the cartridge when the control assembly moves to the terminal position.

Preferably, the power tool further comprises a transmission case intended for accommodating the transmission mechanism and arranged in the housing, and the stop assembly is fixed on the transmission case.

Preferably, a spring member is arranged on the transmission case and intended for relieving the control assembly from the limitation resulted by the stop assembly by pressing the control assembly in a biasing manner along the movement direction of the control assembly from the terminal position to the initial position.

Preferably, a transmission case includes a supporting plate fixed between the cartridge and the control assembly, the supporting plate is provided with a first stop portion and a second stop portion, the control assembly abuts against the first stop portion when moving to the terminal position and butts up against the second stop portion when moving to the initial position, and the spring member is arranged on one of the first stop portion and the second stop portion.

Preferably, the control assembly is connected with the operating member, the operating member controls the connecting member to make axial movement until at least partially overlap with one of the several chambers, the cartridge is fixed relative to the housing, and the control assembly is separated from the cartridge and moves from the terminal position to the initial position.

Preferably, the automatic shifting means further includes a movement conversion assembly being connected with the operating member which drives the control assembly to move through the movement conversion assembly.

Preferably, the movement conversion assembly includes a swing plate connected between the operating member and the control assembly, and the operating member makes linear movement to drive the swing plate to swing around the central rotating line perpendicular to the movement direction of the operating member.

Preferably, a sliding groove is arranged along the axial direction of the output shaft on the operating member, wherein one end of the swing plate is provided with a sliding pin capable of moving in the sliding groove and the other end of the swing plate is connected with the control assembly and capable of driving the control assembly.

Preferably, the sliding groove includes a conversion portion and a position relinquishing portion, wherein the sliding pin slides in the conversion portion to make the swing plate move relative to the housing and drive the control assembly to move from the initial position to the terminal position or from the terminal position to the initial position; the control assembly makes the sliding pin move in the position relinquishing portion through the swing plate under the action of the spring member, and the width of the position relinquishing portion along the direction perpendicular to the axial direction of the output shaft is greater than the diameter of the sliding pin.

Preferably, the sliding groove includes a first straight edge and a second straight edge arranged in parallel as well as a shifting edge connected with one end of the first straight edge and disposed at a certain angle with the first straight edge and a resetting edge connected with the other end of the first straight edge and on end of the second straight edge, wherein the inclination direction of the shifting edge and the resetting edge are the same, the first straight edge, the second straight edge, the shifting edge and the resetting edge form the conversion portion, the first straight edge and the second straight edge are intended for guiding the sliding pin to move axially along the output shaft in the sliding groove, the shifting edge is intended for guiding the sliding pin to move relative the housing and drive the control assembly to move from the initial position to the terminal position, and the resetting edge is intended for guiding the sliding pin to move relative to the housing and drive the control assembly to move from the terminal position to the initial position.

Preferably, the inclination angle of the shifting edge relative to the first straight edge is greater than that of the resetting edge relative to the first straight edge.

Preferably, the sliding groove further includes a connecting portion arranged between the conversion portion and the position relinquishing, wherein the width of the connecting portion along the direction perpendicular to the axial direction of the output shaft is equal to the diameter of the sliding pin.

Comparing with the prior art, the beneficial effects of the present invention are as follows: the tool bits of the power tool according to the present invention can be selected without manually operating the cartridge, automatic rapid change of the tool bits can be realized by operating the connecting member to make it leave the cartridge, automatic rapid change of the tool bits results in no over rotation, improving work efficiency and providing accurate and reliable shifting of tool bits.

Another objective of the present invention is to provide a power tool easy to operate.

Another technical solution put forward by the present invention to address the technical problems is as follows: a handheld tool, comprising: a housing; an output shaft having an accommodating hole in the axial direction for holding a tool bit; a tool bit supporting assembly, at least part arranged in the housing, having several chambers arranged in parallel and intended for supporting the tool bit, and capable of being adjusted to the position where one of the chambers corresponds to the accommodating hole; a connecting member is arranged in the housing and capable of making axial movement between a working position where the connecting member passes through one of the at least two chambers at the working position and to accommodate the tool bit in the chamber and connect the output shaft, and a release position where the connecting member exits and separates from one of the several chambers; an operating member is arranged on the housing for controlling the axial movement of the connecting member; an automatic shifting means for adjusting the position of the tool bit supporting assembly in response to the movement of the operating member and intended; the handheld tool further comprises a mode selection means which operably puts the automatic shifting means into one of the following modes: the order adjustment mode, the automatic shifting means drives the tool bit supporting assembly to move along one direction and make different chambers correspond to the accommodating hole; the reciprocation adjustment mode, the automatic shifting means drives the tool bit supporting assembly to make reciprocating motion between the positions where two of the several chambers corresponds to the accommodating hole respectively.

Preferably, the mode selection means includes a mode selection button arranged on the operating member and capable of rotating relative to the operating member to select different operation modes.

Preferably, one of the mode selection button and the operating member is provided with at least two grooves, and the other one of the mode selection button and the operating member is provided with a positioning member which is capable of selecting and engaging with different grooves so that the mode selection button is maintained in the position corresponding to different modes.

Preferably, the tool bit supporting assembly has a rotating axis parallel to the axial direction of the output shaft, and the order adjustment mode includes a first order adjustment mode in which the tool bit supporting assembly rotates around the rotating axis in a clockwise direction and a second order adjustment mode in which the tool bit supporting assembly rotates around the rotating axis in a counterclockwise direction.

Preferably, the automatic shifting means includes a movement track selection means connected on the operating member, the mode selection means is connected with the movement track selection means and capable of limiting or allowing the movement of the movement track selection means so as to switch the automatic shifting means between the order adjustment mode and the reciprocation adjustment mode.

Preferably, a sliding groove is arranged on the operating member, the automatic shifting means further includes a sliding pin intended for driving the tool bit supporting assembly to move, the sliding pin is capable of moving along a first track or a second track in the sliding groove, and specifically, in the order adjustment mode, the sliding pin selects one track from the first track and the second track and moves along the track selected under the guiding action of the movement track selection means; in the reciprocation adjustment mode, the sliding pin moves along the first track and the second track in turn under the guiding action of the movement track selection means.

Preferably, the movement track selection means includes a guide plate arranged in the sliding groove and pivoted on the operating member, and the mode selection means includes a limit member matching the guide plate, and specifically, in the order adjustment mode, the limit member limits the guide plate; in the reciprocation adjustment mode, the limit member allows the guide plate to rotate.

Preferably, the mode selection means includes a mode selection button pivoted on the operating member and the limit member is arranged deviated from the rotating axis of the mode selection button.

Another technical solution put forward by the present invention to address the technical problems is as follows: a handheld tool, comprising: a housing; a output shaft having an accommodating hole in the axial direction for holding a tool bit; a tool bit supporting assembly, at least part arranged in the housing, having several chambers arranged in parallel for supporting the tool bit, and capable of being adjusted to the position where one of the chambers corresponds to the accommodating hole; a connecting member is arranged in the housing and capable of making axial movement between a working position where the connecting member passes through one of the at least two chambers at the working position and to accommodate the tool bit in the chamber and connect the output shaft, and a release position where the connecting member exits and separates from one of the several chambers; an operating member is, arranged on the housing for controlling the axial movement of the connecting member; an automatic shifting means for adjusting the position of the tool bit supporting assembly in response to the movement of the operating member and intended; the handheld tool further comprises a mold selection means which operably puts the automatic shifting means into one of the following modes: the forward adjustment mode, the automatic shifting means drives the tool bit supporting assembly to move along the first direction and make different chambers correspond to the accommodating hole; the backward adjustment mode, the automatic shifting means drives the tool bit supporting assembly to move along the direction opposite to the first direction and make different chambers correspond to the accommodating hole.

Preferably, the mode selection means includes a mode selection button arranged on the operating member and capable of rotating relative to the operating member to select different operation modes.

Preferably, one of the mode selection button and the operating member is provided with at least two grooves, and the other one of the mode selection button and the operating member is provided with a positioning member which is capable of selecting and engaging with different grooves so that the mode selection button is maintained in the position corresponding to different modes.

Preferably, the tool bit supporting assembly has a rotating axis perpendicular to the axial direction of the output shaft and is capable of rotating around its rotating axis in a clockwise direction or counterclockwise direction.

Preferably, the automatic shifting means includes a movement track selection means connected on the operating member, the mode selection means is connected with the movement track selection means and capable of limiting the movement track selection means to move along one direction of two opposite movement directions so as to switch the automatic shifting means between the forward adjustment mode and the backward adjustment mode.

Preferably, a sliding groove is arranged on the operating member, the automatic shifting means further includes a sliding pin intended for driving the tool bit supporting assembly to move, the sliding pin is capable of moving along a first track or a second track in the sliding groove, and specifically, in the forward adjustment mode, the sliding pin slides along the first track under the action of the movement track selection means; in the backward adjustment mode, the sliding pin slides along the second track under the action of the movement track selection means.

Preferably, the movement track selection means includes a guide plate arranged in the sliding groove and pivoted on the operating member, and the mode selection means includes a limit member matching the guide plate, and specifically, in the forward adjustment mode, the limit member limits the rotation of the guide plate which guides the sliding pin to slide along the first track; in the backward adjustment mode, the limit member limits the rotation of the guide plate which guides the sliding pin to slide along the second track.

Preferably, the mode selection means includes a mode selection button pivoted on the operating member and the limit member is arranged deviated from the rotating axis of the mode selection button.

Comparing with the prior art, the beneficial effects of the present invention are as follows: the tool bits of the handheld tool according to the present invention can be selected without manually operating the tool bit, automatic rapid change of the tool bits can be realized by operating the connecting member to make it leave the tool bit supporting assembly, and the operation mode selection means solves the problem of a single automatic shifting direction which provides users with more choices. Users can select different shifting modes based on their needs, including forward, backward and reciprocation mode, increasing work efficiency and providing accurate and reliable shifting of tool bits.

Another objective of the present invention is to provide a handheld power tool with a simple structure and easy to operate to overcome the defects in the prior art.

The technical solution put forward by the present invention to address the technical problems is as follows: a handheld power tool, comprising: a housing; a motor being disposed in the housing for outputting rotary power; an output shaft having an accommodating hole in the axial direction for holding a tool bit; a transmission mechanism being disposed between the motor and the output shaft for transmitting rotary power from the motor to the output shaft; a tool bit supporting assembly being disposed in the housing and having several chambers arranged in parallel for supporting the tool bit; a connecting member being disposed in the housing and capable of driving the tool bit to the working position in the accommodating hole or the accommodating position in the tool bit supporting assembly; the tool bit includes at least one screwdriver bit and at least one drill bit; the handheld power tool further comprises an operating assembly which can select to drive the connecting member to allocate the drill bit be in the accommodating position and the screwdriver bit in the working position or allocate the screwdriver bit be in the accommodating position and the drill bit in the working position.

Preferably, the diameter of the accommodating hole is between 5 mm and 15 mm.

Preferably, one end of the connecting member is connected with the transmission assembly in the manner of transmissible torque, and the other end of the connecting member can be connected with the output shaft and drive the output shaft to rotate.

Preferably, the output shaft is connected with the transmission assembly in such a way that torque can be transmitted between them and the transmission assembly drives the output shaft to rotate.

Preferably, two chambers are arranged in parallel along the direction perpendicular to the axial direction of the output shaft.

Preferably, the operating assembly includes an operating member for controlling the axial movement of the connecting member and an automatic shifting means for adjusting the position of the tool bit supporting assembly in response to the movement of the operating member, wherein the connecting member moves in axial direction to drive one of the screwdriver bit or drill bit to the accommodating position, and the tool bit supporting assembly moves to the position where the other one of the screwdriver bit or drill bit axially corresponds to the output shaft under the action of the automatic shifting means.

Preferably, one end of the connecting member is provided with a magnet through which the connecting member makes the tool bit return to the accommodating position.

Preferably, the connecting member is capable of making axial movement to drive the tool bit to move between the working position and the accommodating position, the operating assembly further includes an operating member for controlling the axial movement of the connecting member and at least part of the operating member is exposed from the housing.

Preferably, a resetting spring member is arranged between the operating member and the housing, and the operating member has the tendency to control the connecting member to make the tool bit move toward the working position under the action of the resetting spring member.

Preferably, a resetting spring member is arranged between the connecting member and the housing, and the connecting member has the tendency to make the tool bit move toward the working position under the action of the resetting spring member.

Preferably, the handheld power tool further comprises a limit assembly arranged between the housing and the connecting member, the connecting member makes one of the tool bits be in the working position, the limit assembly limits the movement of the connecting member away from the tool bit, and the operating member operably relieves the connecting member from the axial movement limitation resulted by the connecting member.

Preferably, the handheld power tool further comprises a limit assembly arranged between the housing and the connecting member and an operating button matching the limit assembly, the connecting member makes one of the tool bits be in the working position, the limit assembly limits the movement of the connecting member away from the tool bit, and the operating button operably relieves the connecting member from the axial movement limitation resulted by the connecting member.

Preferably, the handle of the at least one screwdriver bit and the at least one drill bit has the same shape.

Preferably, the cross section of the handle of the at least one screwdriver bit and the at least one drill bit is a polygon.

Preferably, the cross section of the handle of the at least one screwdriver bit and the at least one drill bit is a regular hexagon.

Preferably, the output shaft has a back end close to the tool bit supporting assembly and an opposite front end, and the tool bit is capable of being operably removed from the working position from the front end.

Preferably, a magnet is arranged parallel to the length direction of the tool bit in the middle of the tool bit supporting assembly.

Preferably, the operating member is configured as lid-shaped, the operating member moves along the axial direction of the connecting member to cover or expose part of the tool bit supporting assembly or the tool bit.

Preferably, the operating assembly includes an operating member for controlling the axial movement of the connecting member and an automatic shifting means for adjusting the position of the tool bit in response to the movement of the operating member, wherein the connecting member moves in axial direction to drive one of the screwdriver bit or drill bit to the accommodating position and the other one of the screwdriver bit or drill bit to the position where it axially corresponds to the output shaft under the action of the automatic shifting means.

Preferably, the screwdriver bit or drill bit is capable of moving along the direction perpendicular to the axial direction of the connecting member.

Preferably, the screwdriver bit or drill bit is capable of moving around the axis parallel to the axial direction of the connecting member.

A operating method of a handheld power tool, wherein the handheld power tool comprises: a housing; a motor being disposed in the housing for outputting rotary power; an output shaft having an accommodating hole in the axial direction for holding a tool bit; a transmission mechanism being disposed between the motor and the output shaft for transmitting rotary power from the motor to the output shaft; a tool bit supporting assembly being disposed in the housing and having several chambers arranged in parallel for supporting the tool bit; a connecting member being disposed in the housing and capable of driving the tool bit to the working position in the accommodating hole or the accommodating position in the tool bit supporting assembly; the tool bit includes at least one screwdriver bit and at least one drill bit; the handheld power tool further comprises an operating assembly which can select to drive the connecting member to allocate the drill bit be in the accommodating position and the screwdriver bit in the working position or allocate the screwdriver bit be in the accommodating position and the drill bit in the working position; the operating method includes the following steps: 1) operate the operating assembly to drive the connecting member to allocate one of the screwdriver bit or drill bit be in the accommodating position; 2) operate the operating assembly to drive the connecting to allocate the other one of the screwdriver bit or drill bit to the working position.

Preferably, before Step 1), it also includes the step of loading the tool bits.

Preferably, the step of loading tool bits from with the output shaft includes substeps: load the other one of the screwdriver bit or drill bit in the output shaft and operate the operating assembly to drive the connecting member make the other one of the screwdriver bit or drill bit be in the accommodating position; load one of the screwdriver bit or drill bit in the output shaft.

Preferably, before Step 1), load the tool bit supporting assembly, loaded with the at least one screwdriver bits and the at least one drill bits, in the housing.

Preferably, after Step 2), remove the other one of the screwdriver bit and drill bit from the output shaft, and load one of the screwdriver bit or drill bit to be changed in the output shaft.

Preferably, after Step 2), operate the operating assembly to drive the connecting member make the other one of the screwdriver bit and drill bit be in the accommodating position; operate the operating assembly to drive the connecting member make one of the screwdriver bit and drill bit be in the working position.

Preferably, the operating assembly includes an operating member controlling the axial movement of the connecting member, and in Step 1), pull the operating member along the direction of from the output shaft to the motor to drive the connecting member make one of the screwdriver bit and drill bit be in the accommodating position.

Preferably, the operating assembly includes an operating member controlling the axial movement of the connecting member, and in Step 2), push the operating member along the direction of from the motor to the output shaft to drive the connecting member make the other one of the screwdriver bit and drill bit be in the working position.

Preferably, the operating assembly includes an operating member controlling the axial movement of the connecting member, wherein a resetting spring member is arranged between the operating member and the housing or the connecting member and the housing, and in Step 2), when the operating member is released, the connecting member makes the other one of the screwdriver bit and drill bit be in the working position.

Preferably, the handheld power tool further comprises a limit assembly arranged between the housing and the connecting member, wherein the connecting member makes one of the tool bits be in the working position and the limit assembly limits the movement of the connecting member away from the tool bit; before Step 1), pull the operating member along the direction of from the output shaft to the motor to relieve the connecting member from the axial movement limitation resulted by the limit assembly.

Preferably, the operating assembly further includes an automatic shifting means for adjusting the position of the tool bit in response to the movement of the operating member, wherein before Step 1) and Step 2), pull the operating member along the direction of from the output shaft to the motor and/or push the operating member from the direction of from the motor to the output shaft to drive the other one of the screwdriver bit or drill bit to move to the position where the screwdriver bit or drill bit axially corresponds to the output shaft under the action of the automatic shifting means.

Preferably, the operating assembly further includes an automatic shifting means for adjusting the position of the tool bit supporting assembly in response to the movement of the operating member, wherein before Step 1) and Step 2), pull the operating member along the direction of from the output shaft to the motor and/or push the operating member from the direction of from the motor to the output shaft to drive the tool bit supporting assembly to move to the position where the other one of the screwdriver bit or drill bit axially corresponds to the output shaft under the action of the automatic shifting means.

Preferably, the operating assembly is lid-shaped and is capable of covering part of the tool bit supporting assembly, wherein before Step 1) and after Step 2), pull the operating member along the direction of from the output shaft to the motor to expose part of the tool bit supporting assembly, and turn the tool bit supporting assembly to make the other one of the screwdriver bit or drill bit axially correspond to the output shaft.

Preferably, the operating assembly is lid-shaped and is capable of covering part of the tool bit, wherein before Step 1) and after Step 2), pull the operating member along the direction of from the output shaft to the motor to expose part of the tool bit, and turn the tool bit to make the other one of the screwdriver bit or drill bit axially correspond to the output shaft.

Preferably, the handheld power tool further comprises a limit assembly arranged between the housing and the connecting member, the operating member includes an operating button matching the limit assembly, wherein the connecting member makes one of the tool bits in the working position and the limit assembly limits the movement of the connecting member away from the tool bit; before Step 1), push the operating button along the direction perpendicular to the movement direction of the tool bit to relieve the connecting member from the axial movement limitation resulted by the limit assembly.

Comparing with the prior art, the beneficial effects of the present invention are as follows: the handheld power tool according to the present invention has a simple structure which makes rapid change of electric drills and screwdrivers come true and is easy to operate, thus work efficiency is improved.

BRIEF DESCRIPTION OF THE DRAWINGS

FIG. 57 is a sectional view of the power tool in FIG. 55 along the section line G-G.

FIG. 58 is a sectional view of the power tool in FIG. 55 along the section line H-H.

FIG. 63 is a sectional view of the power tool in FIG. 62 along the section line O-O.

FIG. 64 is a sectional view of the power tool in FIG. 62 along the section line P-P.

FIG. 66 is a sectional view of the power tool in FIG. 65 along the section line Q-Q.

FIG. 67 is a sectional view of the power tool in FIG. 65 along the section line R-R.

FIG. 69 is a sectional view of the power tool in FIG. 68 along the section line T-T.

FIG. 70 is a sectional view of the power tool in FIG. 68 along the section line U-U.

DETAILED DESCRIPTION OF THE INVENTION

Figure 1:
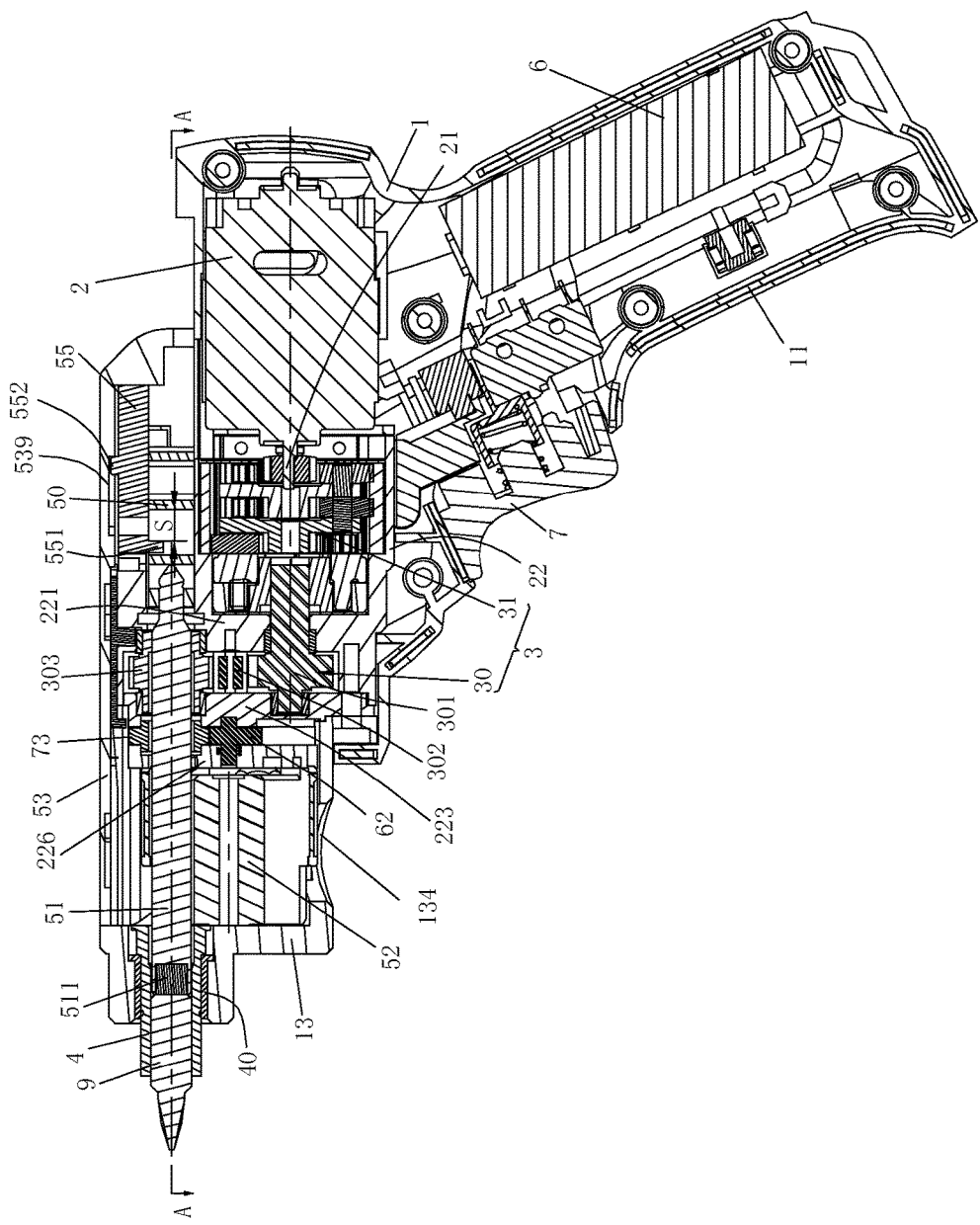
FIG. 1 is a sectional view of the power tool in the preferred embodiment I according to the present invention when it is in working state.
Figure 2:
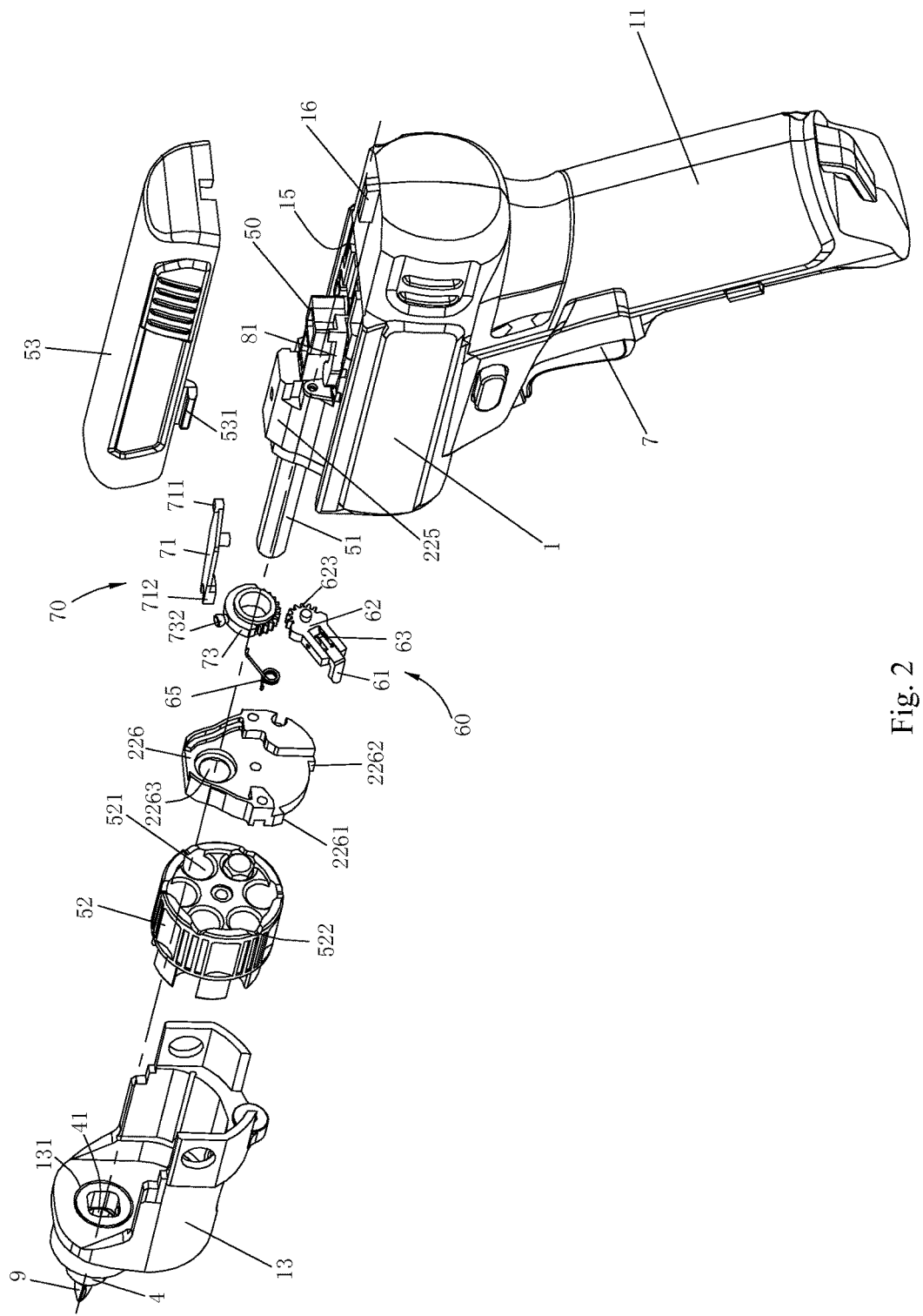
FIG. 2 is an exploded perspective view of part of the power tool in FIG. 1.
Figure 3:
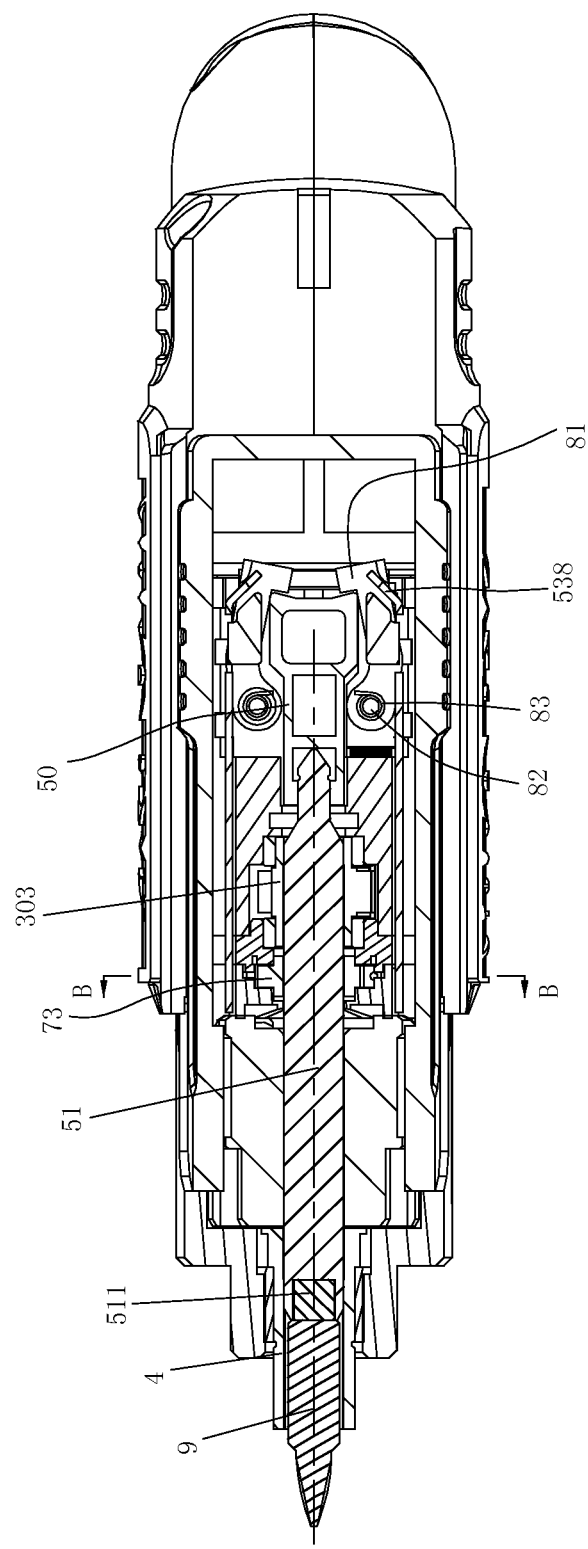
FIG. 3 is a sectional view of the power tool in FIG. 1 along the section line A-A.
Figure 4:
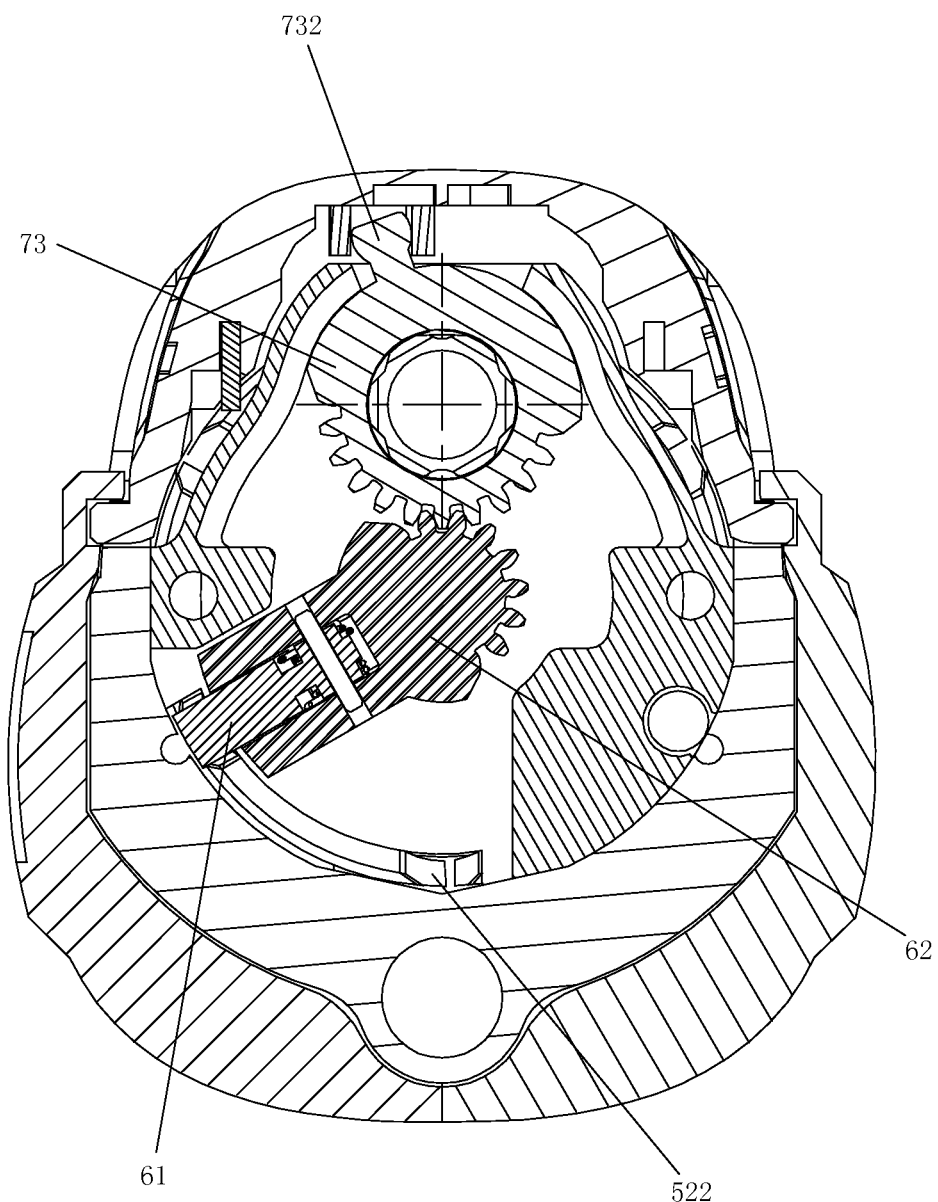
FIG. 4 is a sectional view of the power tool in FIG. 3 along the section line B-B.
Figure 5:
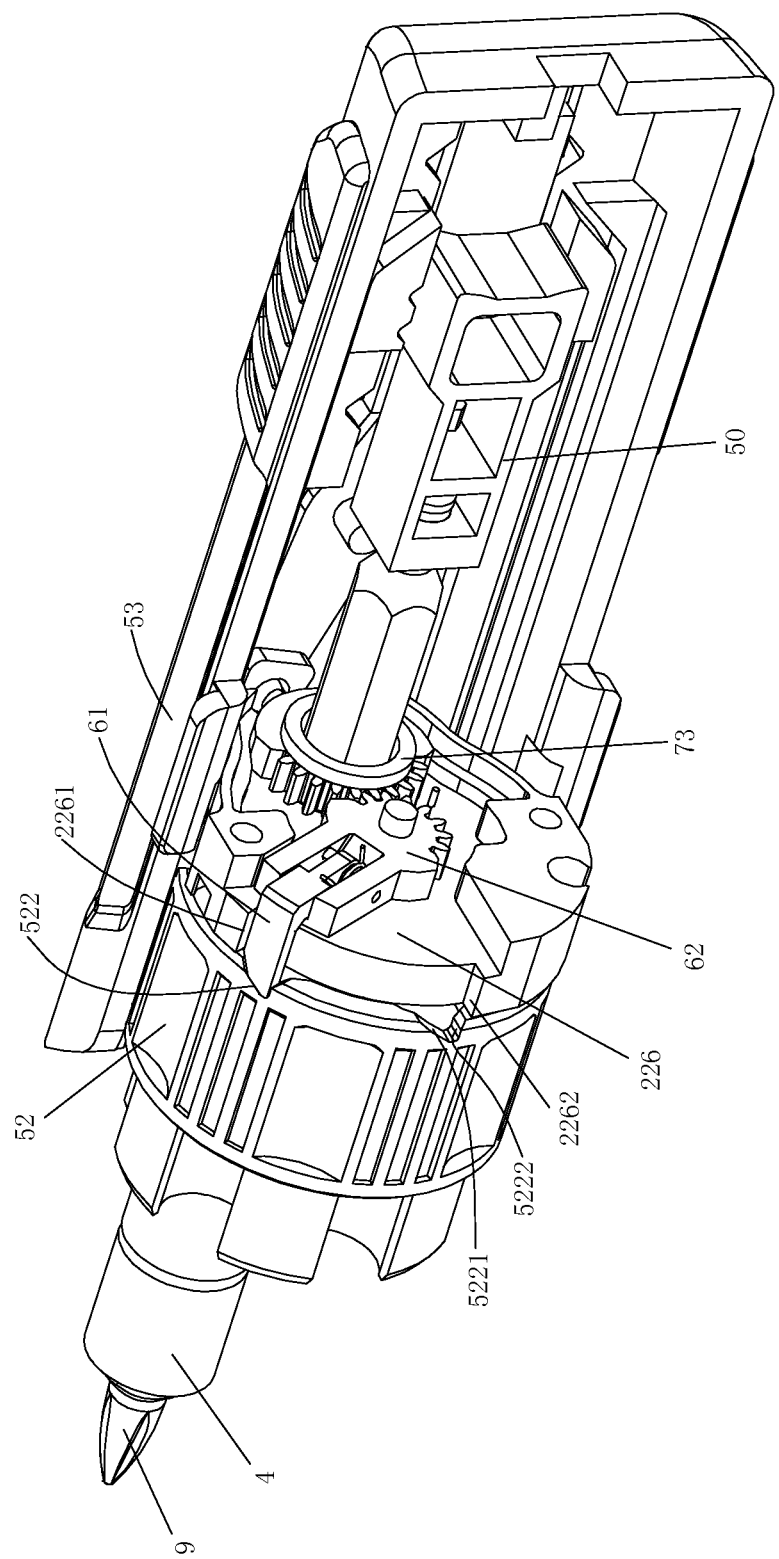
FIG. 5 is a perspective view of the power tool according to the present invention when it is in working state.
Figure 6:
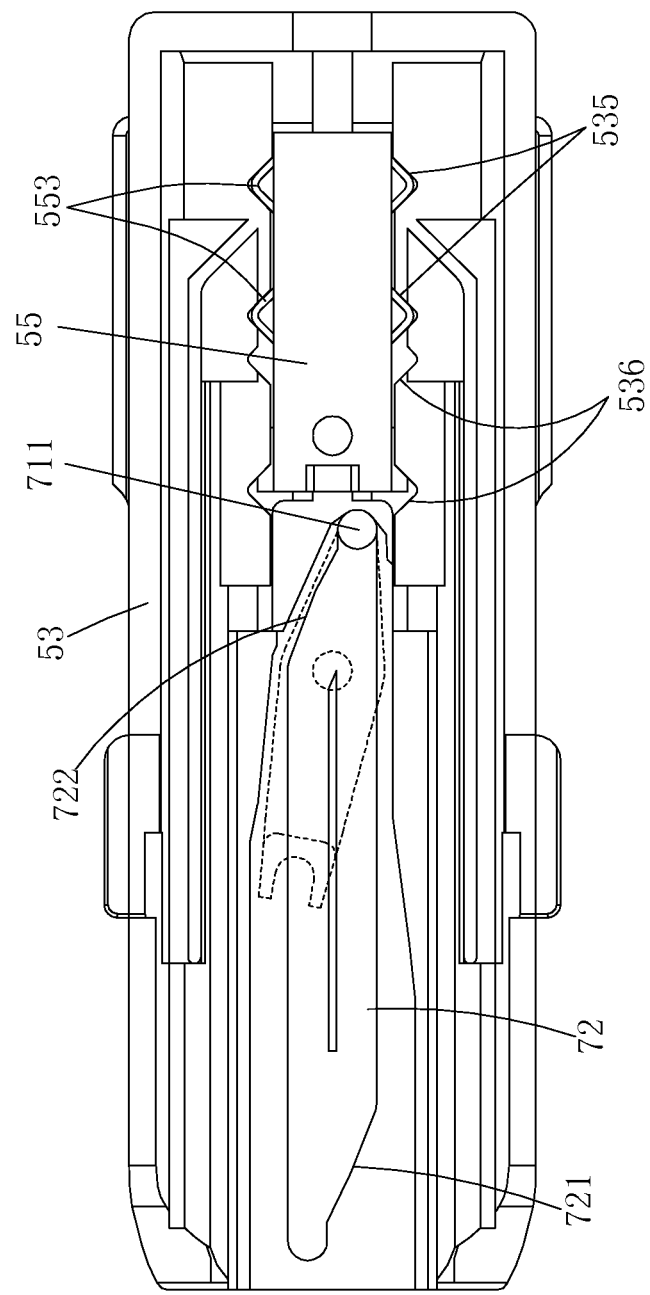
FIG. 6 is a bottom view of the sliding lid part when the power tool according to the present invention is in working state.

In the preferred Embodiment I of the present invention power tool, the power tool is a handheld power screwdriver which can be divided into pneumatic screwdrivers, hydraulic screwdrivers and electric screwdrivers by power source. Electric screwdrivers can be further divided into direct-current (DC) ones and alternating-current (AC) ones. The embodiment takes DC screwdrivers for detailed description.

As shown in FIG. 1 to FIG. 16 is the first embodiment according to the present invention. The DC electric screwdriver comprises a housing 1, a motor 2, a battery 6, a transmission mechanism 3, a connecting member 51, a tool bit supporting assembly and an output shaft 4. The housing 1, formed by assembling two symmetrical semi-housings together with screws (not shown in the figures), has a horizontal component and a handle 11 arranged at an obtuse angle with the horizontal component. The present invention prefers to adopt an angle between 100 degrees to 130 degrees, which provide users with a comfortable experience when they hold the handle 11 to operate the tool. A button switch 7 is arranged at the upper part of the handle 11, the battery 6 is encased in the back of the handle 11 of the housing 1, and the transmission mechanism 3 is accommodated and fixed in the horizontal component of the housing 1. As a preferred embodiment, the battery 6 can be a lithium-ion battery. It should be noted that, said lithium ion battery is a chargeable battery with lithium as the material of the negative terminal, and based on different materials of the positive terminal, can form a lot of systems such as a "Li—Mn" battery and a "LFP" battery. In the embodiment, the lithium-ion battery is a lithium-ion battery with a 3.6V (volt) rated voltage. Certainly, the battery 6 can also be a battery of other types well known by those skilled in the field such as a Ni—Cd or Ni-MH battery.

The transmission mechanism 3 includes a planetary gear speed-reduction assembly 31 driven by the motor 2 and a pinion assembly 30 from back to front (regard the right of the figure as the back), wherein the pinion assembly 30 is connected with the connecting member 51 and transmits the rotary movement of the motor 2 to the output shaft 4 through the connecting member 51. Wherein, the tool bit supporting assembly is used to store different tool bits. The tool bit said herein mainly refers to a cross-head screwdriver bit, a slotted screwdriver bit, drill bit, etc. commonly used by the electric screwdriver. Tool bits can be rapidly changed by operating the connecting member to make axial movement through or leave from the tool bit supporting assembly when the electric screwdriver is used to tighten or loosen different screws.

The motor in the preferred embodiment according to the present invention is an electric motor 2 with an electric motor shaft 21 extending forward and out of the electric motor housing. The electric motor 2 is fixed in the housing 1, a gearbox 22 is fixed in the housing 1 and in front of the electric motor 2, and the gearbox 22 is used to accommodate the planetary gear speed-reduction assembly 31 and the pinion assembly 30. A division plate 221 is arranged between the planetary gear speed-reduction assembly 31 and the pinion assembly 30 to separate the two assemblies. A gearbox cover plate 223 is arranged between the gearbox 22 and the cartridge 52, thus separating the transmission assembly 3 and the cartridge 52, i.e. the transmission assembly 3 and the cartridge 52 are separate from each other. The pinion assembly 30 includes a first gear 301 connected with the planetary gear speed-reduction assembly 31 in such a way that torque can be transmitted, a third gear 303 connected with the connecting member 51 and a second gear 302 engaging with the first gear 301 and the third gear 303 in such as way that the second gear 302 transmits the rotation of the first gear 301 to the third gear 303, wherein both ends of each gear are supported with a bush. The center of the division plate 221 is arranged with a hole for the shaft of the first gear 301 to pass and the end face of the division plate 221 is arranged with a recess for installing the shaft bush, wherein the rear shaft bush supporting the pinion assembly 30 is fixed on the division plate 221, the front shaft bush is fixed on the gearbox cover plate 223 and the gearbox cover plate 223 is fixed on the gearbox with screws, snaps, etc. in this way the pinion assembly 30 and planetary gear speed-reduction assembly 31 can be separated and sealed, which can not only prevent intrusion of dusts, powders, etc. into the inside of the transmission assembly 3, but also prevent leak of the lubricating oil. In addition, three gears are provided just for forming a more compact internal space so as not to affect the beauty of the appearance. Certainly, based on needs, two gears can be provided, one of which is connected with the planetary gear speed-reduction assembly 31 and the other is connected with the connecting member 51. In addition, the transmission assembly 3 is not limited to the forms above, and the transmission assembly 3 can include the planetary gear speed-reduction assembly 31 only, or the pinion gear assembly 30 only, or other rotary movement transmission assembly such as a ratchet assembly and a worm gear assembly. Wherein, the planetary gear speed-reduction assembly 31 has a three-stage speed-reduction system, the electric motor shaft 21 extends and engages the planetary gear speed-reduction assembly 31, the planetary gear speed-reduction assembly 31 transmits the rotary movement to the pinion assembly 30, the pinion assembly 30 drives the connecting member 51 to rotate, and the connecting member 51 drives the output shaft 4 to rotate. In this way, when the electric motor 2 runs, movement is transmitted by the planetary gear speed-reduction assembly 31 and the pinion assembly 30, and finally output by the output shaft 4. Thus it can be seen that the transmission chain of the embodiment is electric motor—transmission mechanism—connecting member—output shaft, i.e. the connecting member serves as part of the transmission chain. In addition, the speed-reduction assembly includes a three-stage planetary speed-reduction or two-stage parallel shaft speed-reduction system to obtain desired output speed. In other embodiments, depending on desired output speed, the speed-reduction assembly can include a two-stage planetary speed-reduction system only or other speed-reduction systems.

The preferred tool bit supporting assembly according to the present invention is the cartridge 52, and a sliding lid 53, slidably connected on the housing 1, is capable of driving the connecting member 51 to make axial movement. The housing 1 includes a front housing 13 arranged at its front end, part of the cartridge 52 is accommodating in the front housing 13 and the rest is covered by the sliding lid 53 and exposed as the sliding lid 53 moves. The preferred cartridge 52 according to the present invention is cylindrical, easy to rotate and occupy little space. Certainly, it can also be configured to be square, triangular, etc. When the electronic screwdriver works, the sliding lid 53 abuts against the front housing 13, thus both the cartridge 52 and the connecting member 51 are sealed. In the position on the gearbox cover plate 223 corresponding to the connecting member 51, a hole is arranged for the connecting member 51 to pass. An arch member 225, arranged around the axis of the connecting member and extends out of the connecting member, can be made integral to or arranged separate from the gearbox 22. The provision of the arch member 225 can seal part of the connecting member 51 so that the connecting member will be not exposed when the tool bit 9 is changed for the electric screwdriver, i.e. the sliding lid 53 moves to the backmost end, thus preventing intrusion of dusts, powders, etc. into the inside of the tool. In addition, the gearbox cover plate 223 extends to the end face of the arch member 225, thus sealing the transmission mechanism 3 completely along the axial direction. During work, the sliding lid 53 can seal the cartridge 52 so as to prevent intrusion of dusts. Move away the sliding lid 53 to expose the cartridge 52 and select a tool bit from different tool bits for changing.

The cartridge 52 is rotatably supported between the gearbox cover plate 223 and the output shaft 4. Multiple tool bit chambers 521 are distributed along the circumference of the cartridge 52, that is to say, tool bits have multiple accommodating spaces, and arranged in parallel along the rotating axis of the cartridge 52. At least one of the tool bit chambers 521 contains a drill bit, thus the working position of the drill bit in the accommodating hole 41 of the output shaft 4 can be adjusted by adjusting the position of the cartridge 52. The preferred number of the tool bit chambers 521 according to the present invention is two or more (but is an even number), thus drill bits and screwdriver bits can be arranged in an alternate manner and drill bits and screwdrivers can be changed in the shortest time.

Figure 9:
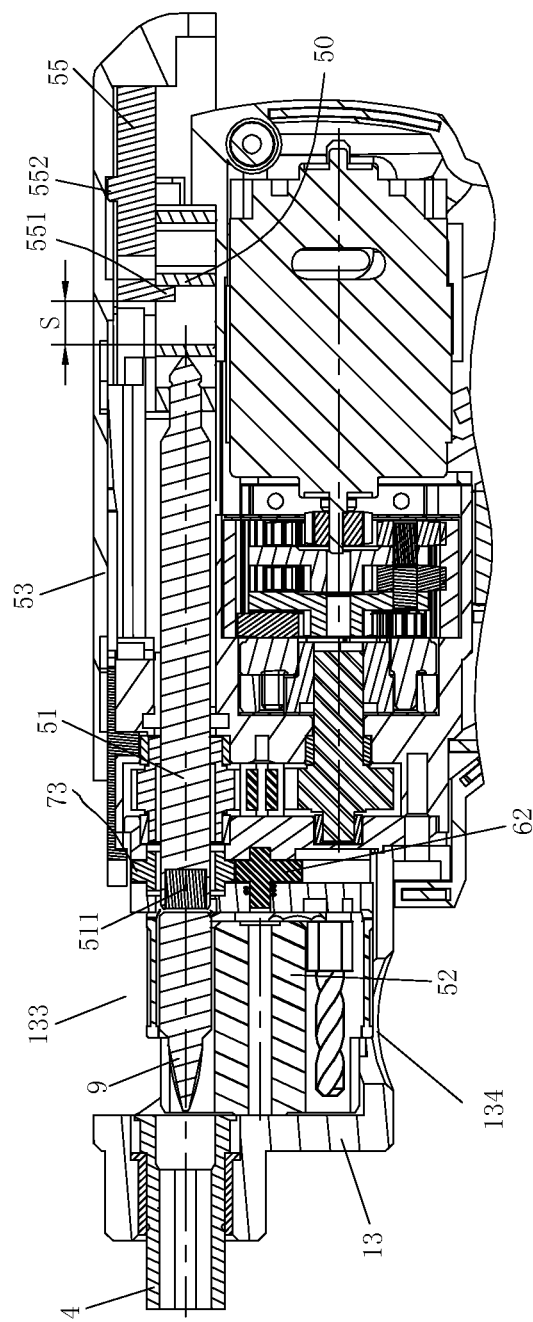
FIG. 9 is a sectional view when the connecting member of the power tool according to the present invention is in relieved state.

Part of the tool bit chambers 521 are sealed and part of the outer circumference is open along the axial direction of the cartridge 52, thus operators can see the head shape of the tool bit 9 from the open part and select the tool bit 9 needed rapidly. Certainly, what those skilled in the field easily think of are the tool bit chambers 521 may be fully-sealed, what requires to be done is to make marks on the corresponding position, or making a transparent cartridge 52, for easy identification. In addition, elastic positioning can be provided between the cartridge 52 and the gearbox cover plate 223, i.e. a positioning groove 522 is arranged in the position corresponding to the tool bit 9 on the end face of the cartridge 52 facing the gearbox cover plate 223. The positioning groove 522 corresponds to the chamber 521 and a steel cap or a clip subject to the pressing of springs is arranged on the gearbox cover plate 223 so that a sound which prompts fall in the positioning groove will be given when the cartridge 52 passes the steel cap or clip of one tool bit 9, thus over-rotation of the cartridge 52 and missing the connecting member 51 can be avoided when operators select a tool bit 9. As shown in FIG. 9, the center of the cartridge 52 is provided with a magnet 524 which is arranged in parallel with the length direction of the tool bit and used to maintain the tool bit in the tool bit chamber 521. Even if the cartridge 52 is removed from the housing 1, the tool bit will not fall from the cartridge 52. The top of the front housing 13 is arranged with an open part 133 and the bottom of the front housing 13 is arranged with a radial hole 134 radially opposite to the open part 133. When the cartridge 52 needs to be changed, move the sliding lid 53 towards the electric motor 2, the main shaft 51 will move until it separates from the cartridge 52 as the sliding lid 53 moves, reach your hands into the radial hole 134 and push it up to remove the cartridge 52 from the open part 133, and load the cartridge with different tool bits into the housing from the open part 133, then the tool is ready for use. What are described above is selecting different tool bits by way of rotation of the cartridge 52. Certainly, linear movement of the cartridge also work, for example, tool bits are arranged one after another along the radial direction of the cartridge, and in this case, push the cartridge in radial direction to select tool bits. In addition, the cartridge 52 in the preferred embodiment according to the present invention is fixed along axial direction so that it drives the tool bit into the output shaft through the connecting member 51. Certainly, it is also feasible to fix the connecting member along axial direction. In this case, move the cartridge in axial direction and then turn it or move it in radial direction to rapidly select and change tool bits without taking tool bits down.

The output shaft 4 is in the form of a sleeve, and generally arranged with a hexagonal hole which can contain a tool bit 9 with a section fitting the hole. The connecting member 51 according to the present invention is a hexagonal part as well, the third gear 303 with a hexagonal hole fits the connecting member 51 and transmits the rotary power to the connecting member 51, thus after being inserted in the output shaft 4, the connecting member 51 can drive the output shaft 4 to rotate, and then the output shaft 4 drives the tool bit 9 to rotate. Therefore, standard tool bits 9 can be used and there is no need to open a hole on the connecting member 51 to accommodate the tool bit 9, thus avoiding that the diameter of the connecting member is too great and increases the weight and volume of the device. The output shaft 4 is supported in the axial hole 131 of the front housing 13 through one shaft bush 40. The shaft bush 40 provides radial support for the output shaft 4. Certainly, the radial support for the output shaft 4 can also be realized by bearings. In this case, it is the output shaft that drives the tool bit 9 directly to rotate, shortening the distance of torque transmission and improving operational reliability of the tool. What is described above is the method that the connecting member drives the tool bit to rotate through the output shaft. However, Those skilled in the field easily think of other alternative transmission methods, for example, the connecting member drives the tool bit directly, i.e. the connecting member is connected with the tool bit in such a way that torque can be transmitted, or the output shaft is driven directly by gears and the connecting member is just used to push the tool bit out and drive the tool bit back to the cartridge.

The front end of the connecting member 51 is arranged with a magnet 511 which is used to attract the tool bit 9. After tool bits 9 are selected, operate the sliding lid 53 to drive the connecting member 51 to pass through the chamber 521 accommodating the tool bit 9. The tool bit 9 is attracted by the magnet 511 on the connecting member 51 and pushed out of the chamber 521 by the connecting member 51 into the output shaft 4. When the tool works, the connecting member 51 drives the output shaft to rotate, and the output shaft 4 drives the tool bit 9 to rotate.

When operating the electric screwdriver, press the tool bit 9 against screws or workpieces in axial direction, which will generate a backward axial force to the tool bit 9 and cause the connecting member 51 to move backward. A fixing block 50 is arranged in axial direction on the connecting member 51 according to the present invention and the back end of the connecting member 51 is rotatably propped against the fixing block 50. A limit assembly is arranged at the back end of the connecting member 51 close to the limit block 81 to prevent the connecting member 51 from moving back. The limit assembly includes a pivotable limit block 81 and a torsion spring 83 exerting a biasing force to the limit block 81 along the pivoting direction of the limit block 81. Wherein one end of the limit block 81 hooks the fixing block 50, the other end is fitted on the gearbox 22 or the housing through a hinge pin, the axis of the hinge pin 82 is perpendicular to that of the connecting member 51 and the limit block 81 can rotate in a certain angle range around the hinge pin 82. One end of the torsion spring 83 is fixed on the limit block 81, the other end is pressed against the gearbox 22 or the housing 1 in such a way that the spring 83 keeps the limit block being pressed against the fixing block. Preferably, two limit assemblies 8 of this kind are provided and disposed symmetrical along the axis of the connecting member 51 to maintain force balance and provide more reliable axial limitation for the connecting member 51.

The sliding lid 53 can drive the connecting member 51 to move through connection with the fixing block 50. When the connecting member 51 is required to move, slide the sliding lid 53 to relieve the connecting member 51 from the limitation. The fixing block 50 has a hollow square, and the inside of the sliding lid 53 is arranged with an engaging block 55 which has a first projection portion 551 reaching in the hollow part of the fixing block 50. When the electric screwdriver works, the projection is S (the distance) axially apart from the back side of the hollow part of the fixing block 50, after the sliding lid 53 slides backwards, i.e. slides towards the electric motor 2, by S (distance), the first projection portion 551 abuts against the back side of the hollow part of the fixing block 50 in axial direction so that the sliding lid 53 drives the fixing block 50 and then the connecting member 51 to make backward axial movement; when the electric screwdriver is in the state that tool bits can be changed, the first projection portion 551 is S (distance) axially apart from the front side of the hollow part of the fixing block 50, when the sliding lid 53 slides forward, i.e. slides towards the output shaft 4, by S (distance), the first projection portion 551 abuts against the front side of the hollow part of the fixing block 50 in axial direction so that the sliding lid 53 drives the fixing block 50 and then the connecting member 51 to make forward axial movement. Inside of the sliding lid is provided with an unlocking part 538 matching the limit block 81. When the sliding lid 53 moves backward, the unlocking part 538 contacts one side of the limit block 81, and the limit block 81 overcomes the action of the torsion spring 83 and rotates around the hinge pin 82 driven by the unlocking part 538 until it disengages from the fixing block 50 and the fixing block 50 is unlocked, thus the limit block 81 is in the position where the connecting member 51 can make axial movement. Then the connecting member 51 continue making axial movement until the limit block 81 is stuck to both ends of the fixing block 50, at the moment tool bits can be changed. Thus it can be seen that before the sliding lid 53 drives the connecting member 51 to move, it slides S (distance) first, the purpose is to relieve the connecting member 51 from the axial movement limitation resulted by the limit block 81; therefore, S (distance) shall be such that the movement of the sliding lid 53 capable of relieving the connecting member 51 from the axial movement limitation resulted by the limit block 81. After tool bits are changed, the sliding lid 53 moves forward and brings the connecting member 51 and the fixing block 50 to move forward, the unlocking part 538 contacts the side of the limit block 81 again and separates from it as the sliding lid 53 moves forward, and the limit block 81 returns to the position where it axially abuts against the fixing block 50 under the action of the torsion spring 83. Then when the electric screwdriver works, the front end of the connecting member 51 reaches in the output shaft 4 and the fixing block 50 arranged at the back end of the connecting member 51 is axially limited, thus the axial movement of the connecting member 51 is limited, i.e. the connecting member 51 cannot move backwards, so that the operation of the electric screwdriver is more reliable.

Certainly, there are many methods for the sliding lid 53 to drive the connecting member 51, for example, arrange a ring groove around the circumference of the connecting member 51, and the sliding lid 53 is connected with the connecting member 51 by reaching a pin or steel ring in the ring groove, thus neither affecting the rotation of the connecting member nor affecting the movement of the connecting member 51 driven by the sliding lid 53. In any case, the principles are the same: the sliding lid slides an idle travel first, i.e. the sliding lid 53 moves relative to the housing 1, but the connecting member 51 keeps still relative to the housing 1, and then the sliding lid 53 drives the connecting member 51 to move.

Furthermore, those skilled in the field easily think of that the relief of the axial movement locking of the connecting member 51 resulted by the limit block 81 can be fulfilled by other methods other than movement of the sliding lid 53, for example, arrange a knob on the outside of the housing 1 and connect it with the limit block 81 so as to drive the limit block 81 to overcome the action of the spring and rotate or move by turning the knob; or arrange a toggle or a button on the outside of the housing 1 and connect it with the limit block 81 so as to drive the limit block 81 to overcome the action of the spring and rotate or move by pushing the toggle or pressing the button; etc. These methods can fulfill the relief of the axial movement locking of the connecting member 51 resulted by the limit block 81.

In addition, a spring member can be arranged between the sliding lid 53 and the housing 1 or the gearbox 22 in such a way that the sliding lid 53 will be stuck by the buckle on the housing 1 when it moves back to the end and will return to the work-state position automatically under elastic force when it is released.

A guide rail 531 is arranged at the edge of the sliding lid 53, a guide groove 15 is arranged on corresponding housing 1, and the sliding lid 53 is installed in the guide groove 15 through the guide rail 531 and capable of sliding along axial direction relative to the housing 1. Certainly, a guide groove is arranged on the sliding lid 53 and a guide rail is arranged on the housing 1 for the sliding lid to move.

What is described above is the embodiment which needs operators to select tool bits manually. When the tool bit 9 needs to be changed, operate the sliding lid 53 to drive the connecting member 51 to make axial movement towards the electric motor 2, the magnet 511 at the end of the connecting member 51 attracts the drill bit or the screwdriver bit accommodated in the output shaft 4 back to the accommodating position, turn the cartridge 52 or the tool bit 9 manually until the screwdriver bit or drill bit to be selected axially corresponds to the output shaft 4, and then operate the sliding lid 53 to drive the connecting member 51 to make axial movement towards the output shaft 4, thus the screwdriver bit or drill bit will be pushed to the working position in the output shaft 4 by the connecting member 51. Before changing tool bits, tool bits can be store in advance in many ways, for example, load tool bits from the output shaft 4, i.e. to load screwdriver bits or drill bits from the front end of the output shaft 4, the connecting member 51 moves and brings them to the accommodating position, and after rotating an accommodating position, the connecting member 51 returns to the original position, and so on; alternatively, load a cartridge with screwdriver bits and drill bits in the DC electric drill directly. Certainly, tool bits can be changed whenever necessary during use, for example, remove screwdriver bits or drill bits from the output shaft 4 and then load screwdriver bits and drill bits to be changed in the output shaft 4; or remove the cartridge 52 directly and load a cartridge with screwdriver bits and drill bits to be changed. Thus it can be seen that the sliding lid 53 drives the connecting member 51 to reciprocate once, tool bits will be changed once.

The DC electric screwdriver in the preferred embodiment of the electric power tool according to the present invention is arranged with an automatic shifting means for shifting tool bits automatically, that is to say, operate the sliding lid 53 to drive the connecting member 51 to leave the chamber 521 and relieve the cartridge 52's movement limitation, and the cartridge 52 automatically moves to the position where the chamber of the next tool bit axially corresponds to the output shaft 4 under the action of the automatic shifting means, therefore operators can select tool bits without turning the cartridge 52 manually.

As shown in FIG. 1 to FIG. 16, the automatic shifting means includes a control assembly 60 intended for driving the cartridge 52 to move, the control assembly 60 includes a pawl 61 movably connected with the cartridge 52 and a support base 62 for installing the pawl 61, wherein one end of the pawl 61 is rotatably installed on the support base 62 and the other end is stuck in the positioning groove 522 of the cartridge 52, a torsion spring 63 is arranged between the pawl 61 and the support base 62, the pawl 61 is stuck in the positioning groove 522 under the biasing force of the torsion spring 63. And the support base 62 is rotatably supported on the gearbox cover plate 223. In this way, as the support base 62 drives the pawl 61 to rotate, the pawl 61 can drive the cartridge 52 to rotate together. To enable the support base 62 to provide reliable support, a supporting plate 226 is arranged between the cartridge 52 and the control assembly 60, the pawl 61 is configured to have an L-shape and is capable of crossing over the supporting plate 226 and being stuck in the positioning groove 522, and one end of the rotating shaft of the support base 62 can be supported on the gearbox cover plate 223 and the other end is supported on the supporting plate 226. A through hole 2263, intended for the connecting member 51 to pass, is arranged in the position corresponding to the connecting member 51 on the supporting plate 226 and, which does not affect the axial movement of the connecting member 51.

In the embodiment, the movement of the cartridge 52 is driven by the rotation of the control assembly 60, the first method for driving the control assembly 60 to rotate is stored-energy drive, and the automatic shifting means further includes an energy-storage unit connected with the control assembly 60, wherein when the connecting member 51 moves to the working position, the energy of the energy-storage unit is stored, while when the connecting member 51 moves to the release position, the energy of the energy-storage unit is released to drive the control assembly 60 to bring the cartridge 52 to move. A preferred energy-storage unit is a torsion spring 65 which is arranged between the control assembly 60 and the supporting plate 226, one end of the torsion spring 65 is fixed on the supporting plate 226 and the other end is connected on the support base 62 of the control assembly 60, wherein when the connecting member 51 is in the working position, the torsion spring 65 is in compression state, but once the connecting member 51 leaves the chamber 521 of the cartridge 52, the control assembly 60 can drive the cartridge 52 to rotate under the action of the torsion spring 65.

The second method for driving the control assembly 60 to rotate is cam drive, i.e. the control assembly 60 is connected with the sliding lid 53, after the sliding lid 53 controls the connecting member 51 to move to the release position, the sliding lid 53 operably drives the control assembly 60 to bring the cartridge 52 to move. Preferably, the rotation of the control assembly 60 is driven by the movement of the sliding lid 53, i.e. after bringing the connecting member 51 to leave the chamber 521 of the cartridge 52, the sliding lid 53 continues moving relative to the housing 1 while bringing the control assembly 60 to rotate, i.e. convert the linear movement of the sliding lid 53 into the rotary movement of the control assembly 60 through a steering assembly. Commonly used steering assemblies are the following types: pinion and rack type, worm crank pin type, recirculating ball—rack and sector type, recirculating ball crank pin type, worm guide wheel type, cam type, crank link type, etc.

The preferred steering assembly in the automatic shifting means is the movement conversion assembly 70 connected between the control assembly 60 and the sliding lid 53, and the movement conversion assembly 70 is intended for converting the linear movement of the sliding lid 53 into the rotary movement of the control assembly 60. The movement conversion assembly 70 includes a swing plate 71 pivoting relative to the housing 1, and the middle of the swing plate 71 is arranged with a rotating shaft which can be installed on the arch part 225 of the gearbox 22. One end of the swing plate 71 relative to the rotating shaft is provided with a sliding pin 711 and the other end is arranged with a shift fork 712. Inside of the top of the sliding lid 53 is arranged with a sliding groove 72 matching the sliding pin 711. The sliding groove 72 is configured to be roughly a parallelogram along the horizontal, two straight edges are parallel to the axial direction of the connecting member 51, two oblique edges form the shifting edges 721 and the resetting edges 722 of the sliding groove 72, the sliding pin 711 slides along the edge of the sliding groove 72 as the sliding lid 53 moves, and every time it passes the shifting edge 721 or the resetting edge 722, the swing plate 71 forms one end of the shift fork 712 and swings once around the rotating shaft. The shift fork 712 of the swing plate 71 is connected with the support base 62 of the control assembly 60 directly so that the linear movement of the sliding lid 53 is converted into the rotation of the control assembly 60.

Furthermore, a gear assembly can be arranged between the swing plate 71 and the control assembly 60 to transmit rotary movement. The shift fork 712 of the swing plate 71 is connected with a first drive gear 73 which can be supported between the gearbox cover plate 223 and the supporting plate 226 and has a radially-convex handle 732 connected with the shift fork 712, a second drive gear 623 is arranged on the support base 62 of the control assembly 60, the first drive gear 73 engages the second gear 623 to convert the swing of the shift fork 712 around the rotating shaft to the rotation of the first drive gear 73 and then to the second drive gear 623, thus the support base 62 drives the pawl 61 to rotate. Because the control assembly 60 only needs driving the cartridge 52 to rotate one tool bit, for example to arranged six tool bits, the cartridge will rotate 60 degrees, the first drive gear 73 and the second drive gear 623 do not need rotating 360 degrees and the rotation is set depending on the rotation angle of the cartridge 52 only, therefore, the first drive gear 73 and the second drive gear 623 can be configured to be sector gears, so that the teeth part of the first drive gear 73 and the convex handle 732 can be arranged radially opposite each other, and the gear of the second drive gear 623 and the convex handle 732 can also be radially opposite each other, making the structure more compact and saving materials.

Certainly, the control assembly 60 can be driven by stored energy in other forms, for example, arranged a torsion spring between the control assembly 71 and the supporting plate 22, one end of the torsion spring is fixed on the gearbox 22 and the other end is connected on the swing plate 71, wherein when the connecting member 51 is in the working position, the torsion spring is in compression state, but once the connecting member 51 leaves the chamber 521 of the cartridge 52, the swing plate 71 drives the first drive gear 73 to rotate and then drives the support base 62 to rotate under the action of the torsion spring. Alternatively, a torsion spring is arranged between the first drive gear 73 and the supporting plate 226 (or the gearbox cover plate 223), one end of the torsion is fixed on the first drive gear 73 and the other end is connected on the supporting plate 226 (or the gearbox cover plate 223), thus the control assembly 60 can be driven by stored energy. Therefore, those skilled in the field easily think of that any provision of a torsion spring at the pivot of the drive parts can realize the stored-energy drive of the control assembly 60.

In addition, the sliding lid 53 can bring the movement conversion assembly 70 to drive the control assembly 60 to rotate only after it controls the connecting member 51 to move to the release position and continues moving, here the sliding lid 53 can continue bringing the connecting member 51 to move, thus a limit assembly, such as a steel stop or a clip, is needed between the cartridge 52 and the supporting plate 226 so as to prevent the tool bit 9 from being brought out of the chamber 521 by the connecting member 51. A stop 16 is arranged on the preferred housing 1 according to the present invention, the sliding lid 53 is provided with a first engaging recess 535 and a second engaging recess 536 at a certain interval along the axial direction of the connecting member 51, the resilient strip 553, arranged on the engaging block 553, is stuck in the first engaging recess 535 or the second engaging recess 536 and is capable of passing the first engaging recess 535 or the second engaging recess 536 after deforming, thus the engaging block 55 is capable of moving relative to the sliding lid 53. A stop 16 is arranged on the housing 1 and the fixing block 50 of the connecting member 51 abuts against the stop 16 when the connecting member 51 makes axial movement, thus the movement of the connecting member 51 is limited. Besides, a limit recess 539 is arranged on the sliding lid 53 and the engaging block 55 has a second projection portion 552 stuck in the limit recess 539 so that forward and backward movement of the sliding lid 53 relative to the engaging block 55 will be limited by the limit recess 539 so as to prevent over-movement of the sliding lid 53. That is to say, the sliding lid 53a moves an idle travel, thus the connecting member 51a moves the shortest distance and the tool has a compact structure. That is, the sliding lid drives the connecting member and moves with it relative to the housing, the connecting member is fixed relative to the housing while the sliding lid moves relative to the housing.

In the methods for the control assembly 60 being driven by stored energy, the energy of the energy storage unit will be released as long as the connecting member 51 leaves the accommodating chamber 521 of the cartridge 52, i.e. it is only required that the sliding lid 53 drives the connecting member 51 to the release position, so the sliding lid does not have to continue moving. Furthermore, change of tool bits is completed as the energy of the energy storage unit is released, therefore the sliding groove 72 on the sliding lid 53 does not have to have shifting edges 721, i.e. the sliding groove 72 can be configured to be a trapezoid with straight edges.

What are described above is that the control assembly 60 drives the cartridge 52 to rotate by stored-energy drive and operating the sliding lid, resetting of the control assembly 60 will be described hereinafter. Move the sliding lid 53 to drive the connecting member 51 to return to the working position from the release position, the connecting member 51 goes into the next chamber 521, the sliding pin 711 makes the swing plate 71 rotate around its rotating shaft under the guide of the resetting edge 722 of the sliding groove 72, the swing plate 71 drives the first drive gear 73 to rotate through the shift fork 712, the first drive gear 73 drives the support base 62 to rotate, because the connecting member 51 is stuck in the cartridge 52, the rotation of the cartridge 52 is limited, the support base 62 drives the pawl 61 to overcome the action of the torsion spring 63 and leave the positioning groove 522, and the pawl 61 rotates with the support base 62 and falls in the next positioning groove 522 under the action of the torsion spring 63, thus the rotation of the control assembly 60 relative to the cartridge 52 is realized To prevent over-movement of the control assembly 60, a first stop portion 2261 can be arranged on the supporting plate 226 corresponding to the terminal position that the control assembly 60 drives the cartridge 52 to rotate, and a second stop portion 2262 is arranged on the supporting plate 226 corresponding to the initial position that the control assembly 60 drives the cartridge 52 to rotate, the movement of the control assembly 60 is limited by the first stop portion 2261 and the second stop portion 2262, thus ensuring that another tool bit corresponds to the output shaft 4 when the control assembly 60 drives the cartridge 52 to rotate to the terminal position and the pawl 61 will not pass the positioning groove 522 when the control assembly 60 rotates relative to the cartridge 52 to the initial position.

To enable the pawl 61 to drive the cartridge 52 reliably and exit from the positioning groove 522 easily, the first side face 5221 and the second side face 5222 in the positioning groove 522 along the circumferential direction of the cartridge 52 are configured to have different inclination angles. Preferably, the first side face 5221 is at a right angle with the end face of the cartridge 52 so that the pawl 61 is capable of driving the cartridge 52 to rotate reliably; the second side face 5222 is at an acute angle with the end face of the cartridge 52 so that the pawl 61 is capable of exiting from the positioning groove 522 easily when resetting. Meanwhile, the pawl 61 can also be configured to be a shape matching the positioning groove 522. When the pawl 61 drives the cartridge 52 to the terminal position, the pawl 61 is at the bottom of the cartridge 52, thus the cartridge 52 can be easily removed from the housing 1 to change a spare cartridge, expanding the functions of the tool.

The rapid change of the tool bits of the DC electric screwdriver in the Embodiment I above will be illustrated in details hereinafter.

Figure 7:
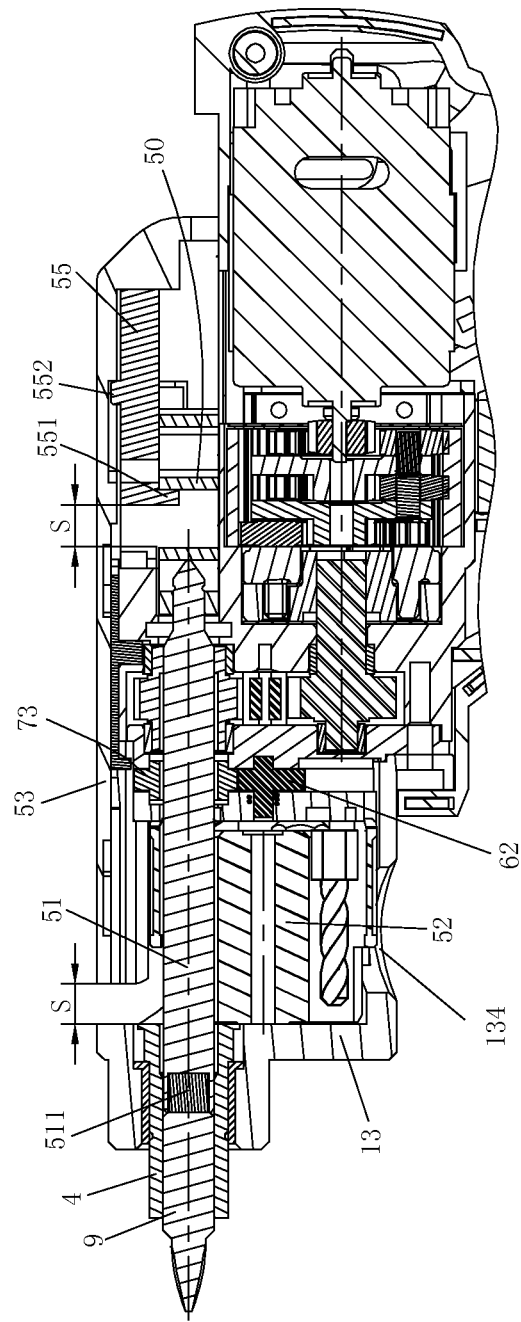
FIG. 7 is a sectional view when the connecting member of the power tool according to the present invention is relieved.
Figure 8:
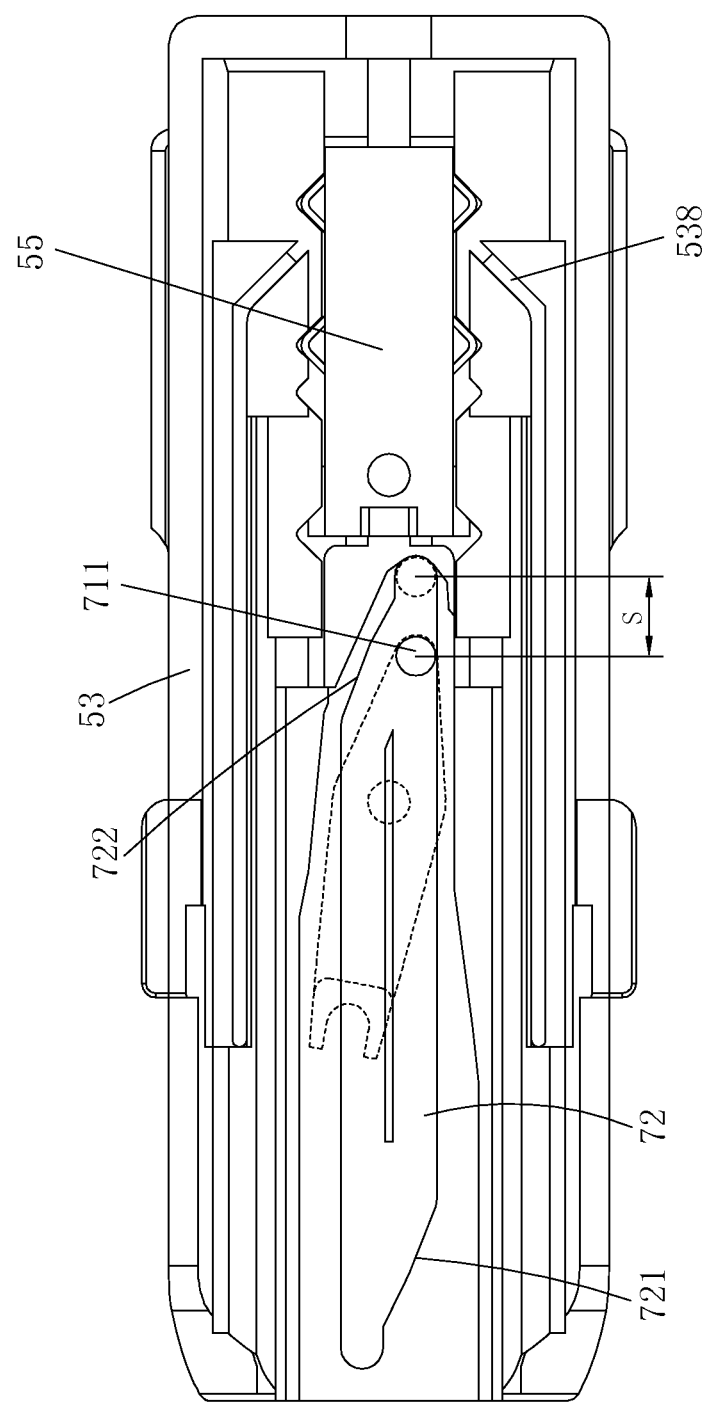
FIG. 8 is a bottom view of the sliding lid part when the connecting member of the power tool according to the present invention is relieved.

As shown in FIG. 1 to FIG. 6, the electric screwdriver is in working state, and at this time, it can be used to tighten screws after the button switch 7 is pressed. As shown in FIG. 7 to FIG. 8, when the tool requires changing another type of tool bits 9, operate the sliding lid 53 to move S (distance) towards the electric motor 2, the sliding lid 53 relieves the connecting member 51 from the locking resulted by the limit block 81 through the unlocking part 538, the sliding pin 711 slides along the straight edges of the sliding groove 72, the engaging block 55 on the sliding lid 53 contacts the fixing block 50 on the connecting member 51, then the sliding lid 53 can drive the connecting member 51 to move with it.

Figure 10:
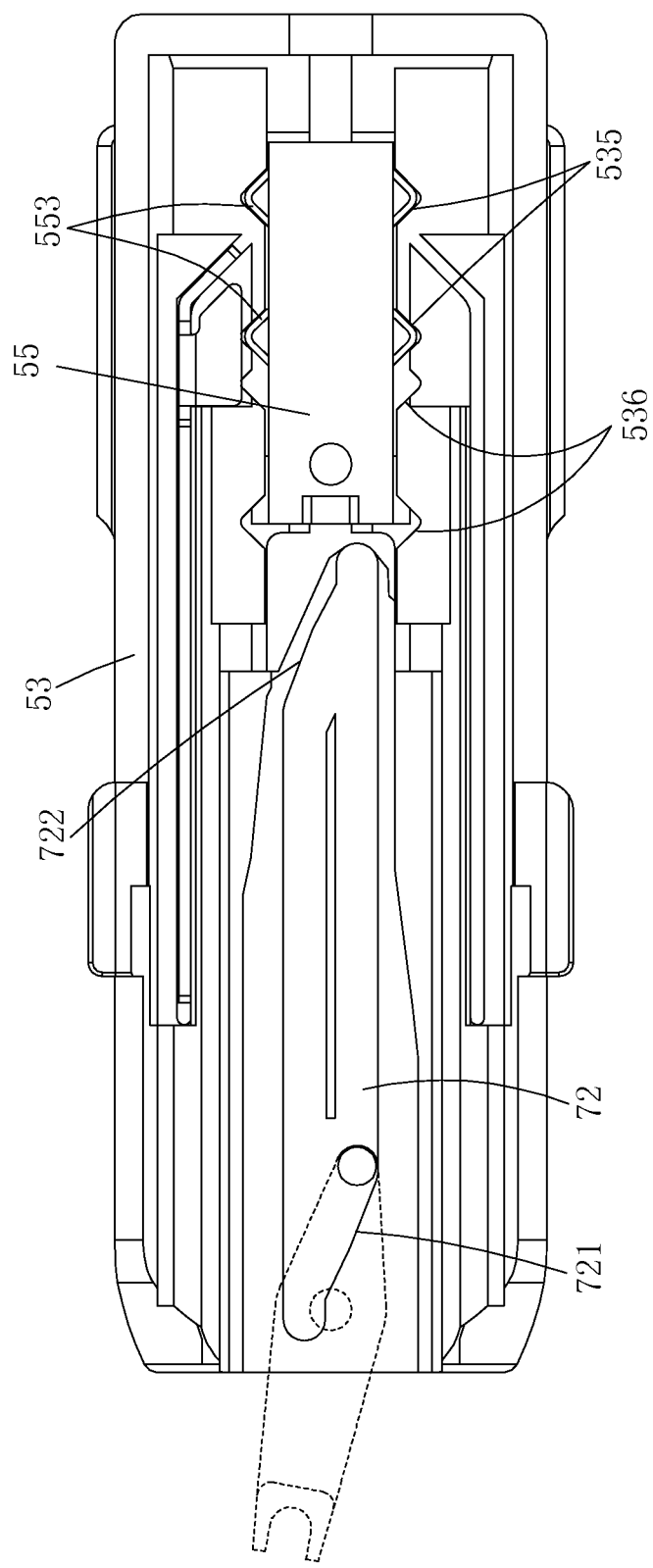
FIG. 10 is a bottom view of the sliding lid part when the connecting member of the power tool according to the present invention is in relieved state.
Figure 11:
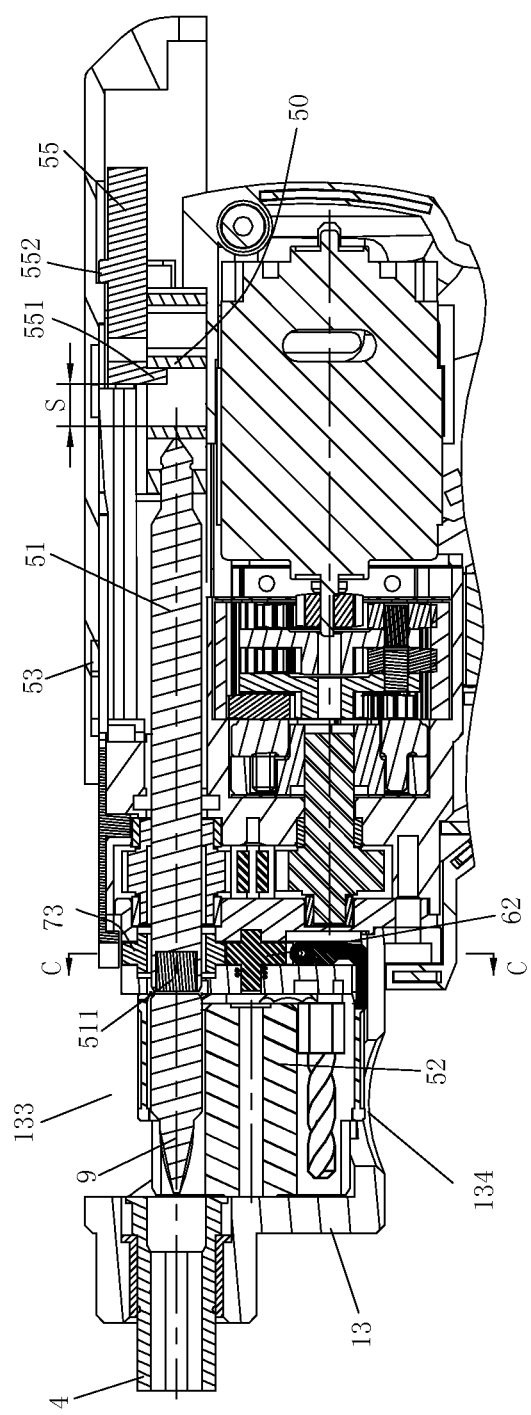
FIG. 11 is a sectional view after the position of the cartridge of the power tool according to the present invention is adjusted.
Figure 12:
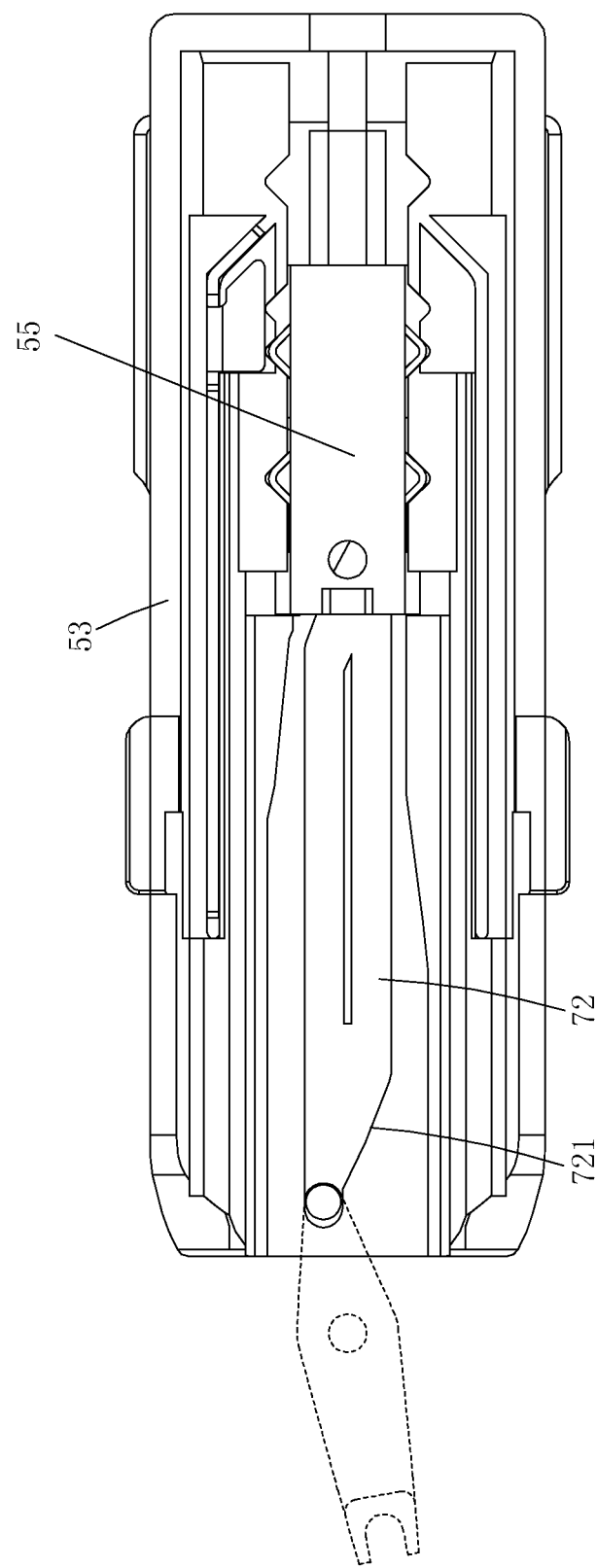
FIG. 12 is a bottom view of the sliding lid part after the position of the cartridge of the power tool according to the present invention is adjusted.
Figure 13:
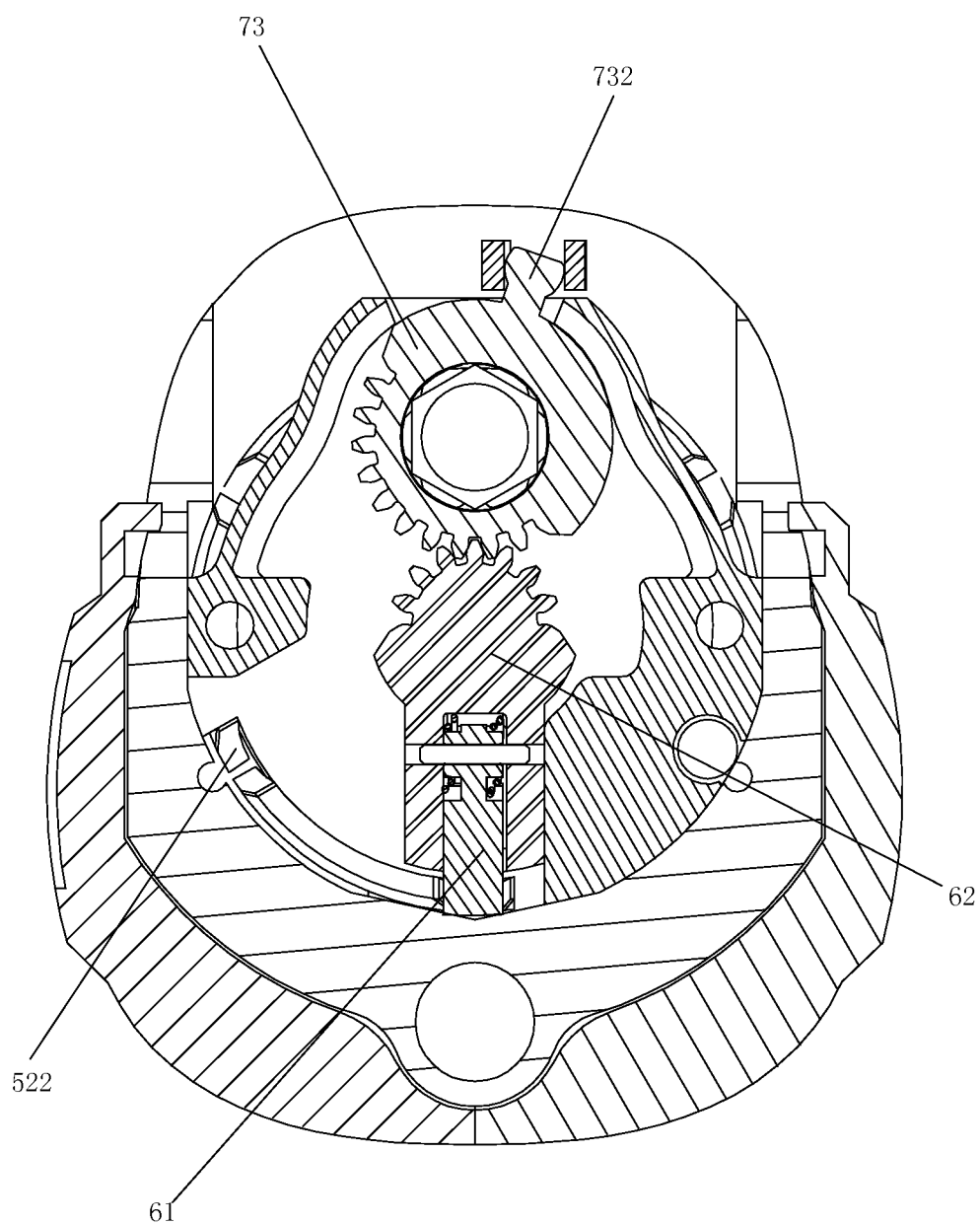
FIG. 13 is a sectional view of the power tool in FIG. 11 along the section line C-C.
Figure 14:
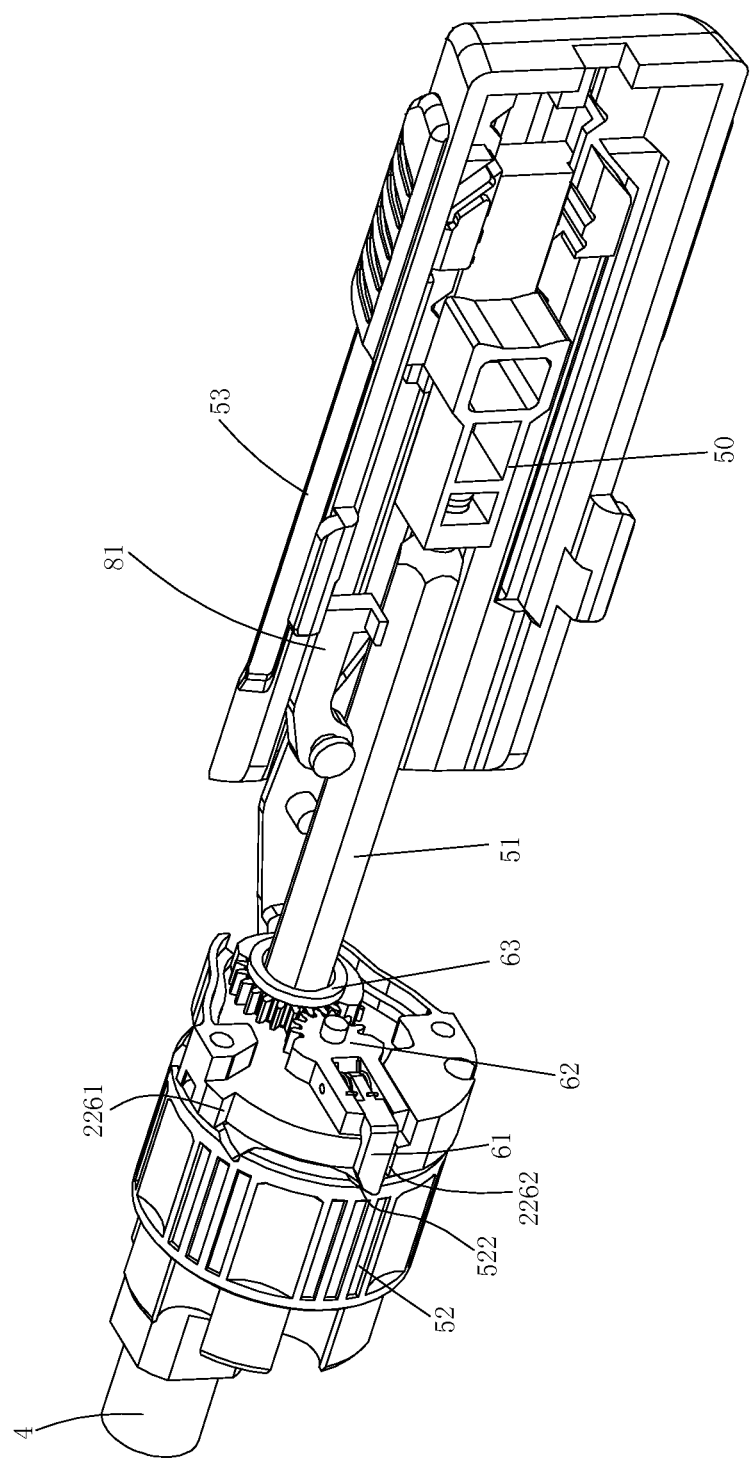
FIG. 14 is a perspective view after the position of the cartridge of the power tool according to the present invention is adjusted.

Then, as shown in FIG. 9 to FIG. 10, the sliding lid 53 drives the connecting member 51 to move in the same direction with it through the engaging block 55 to the release position where the connecting member 51 is separated from the chamber 521, the connecting member 51 drives the tool bit 9 back to the chamber 521 through the magnet 511 and the sliding pin 711 slides to the critical position of the shifting edge 721 along the straight edge of the sliding groove 72. As shown in FIG. 11 to FIG. 14, move the sliding lid 53 further towards the electric motor 2, the connecting member 51 is limited by the stop 16 so that it cannot continue moving, the engaging block 55 overcomes the action of the resilient strip 553 and passes over the first engaging recess 535 until the strip 553 falls in the second engaging recess 536, the second projection portion 552 on the engaging block 55 is limited by the limit groove 539 on the sliding lid 53, so the sliding lid 53 is limited from continuing axial movement, while the sliding pin 711 slides along the shifting edge 721 of the sliding groove 72 and makes the guide plate 71 rotate a certain degrees around its rotating shaft under the guide of the shifting edge 721; meanwhile, the shift fork 712 of the swing plate 71 drives the first drive gear 73 to rotate, the first drive gear 73 drives the second drive gear 623 as the support 62 base to rotate, thus the support 62 base drives the pawl 61 to rotate, the pawl 61 drives the cartridge 52 to rotate a certain degrees, another tool bit is brought to the position corresponding to the output shaft 4 with the rotation of the cartridge 52, thus rapid change of tool bits is completed, and operators can easily judge that the cartridge 52 has completed changing tool bits successfully through the sound that the resilient strip 553 on the engaging block 55 falls in the second engaging recess 536.

Figure 15:
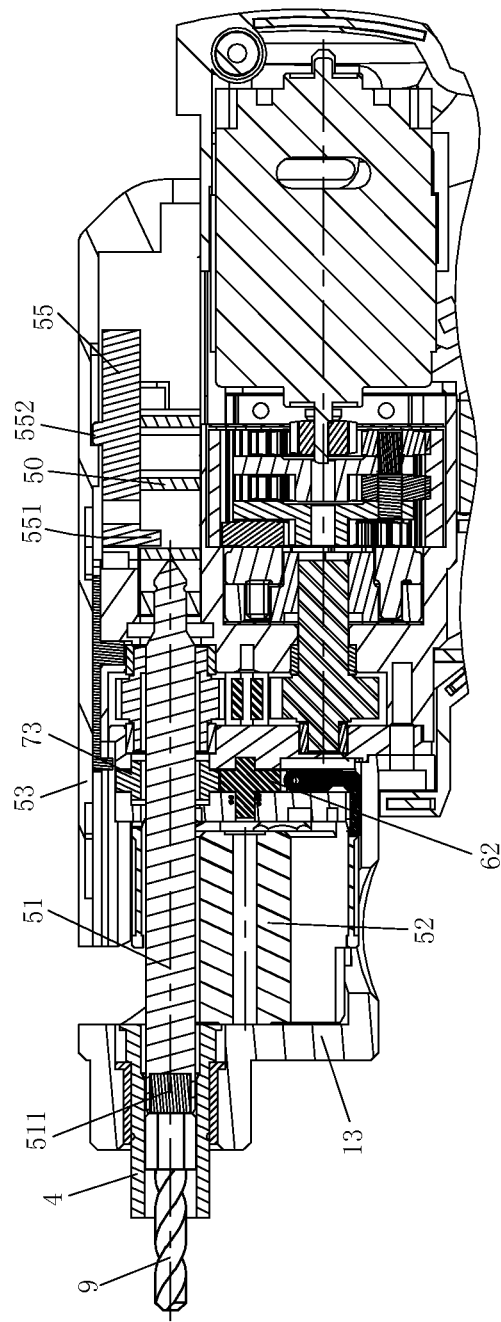
FIG. 15 is a sectional view when the connecting member of the power tool according to the present invention returns to the working position from the released state and before the control assembly resets.
Figure 16:
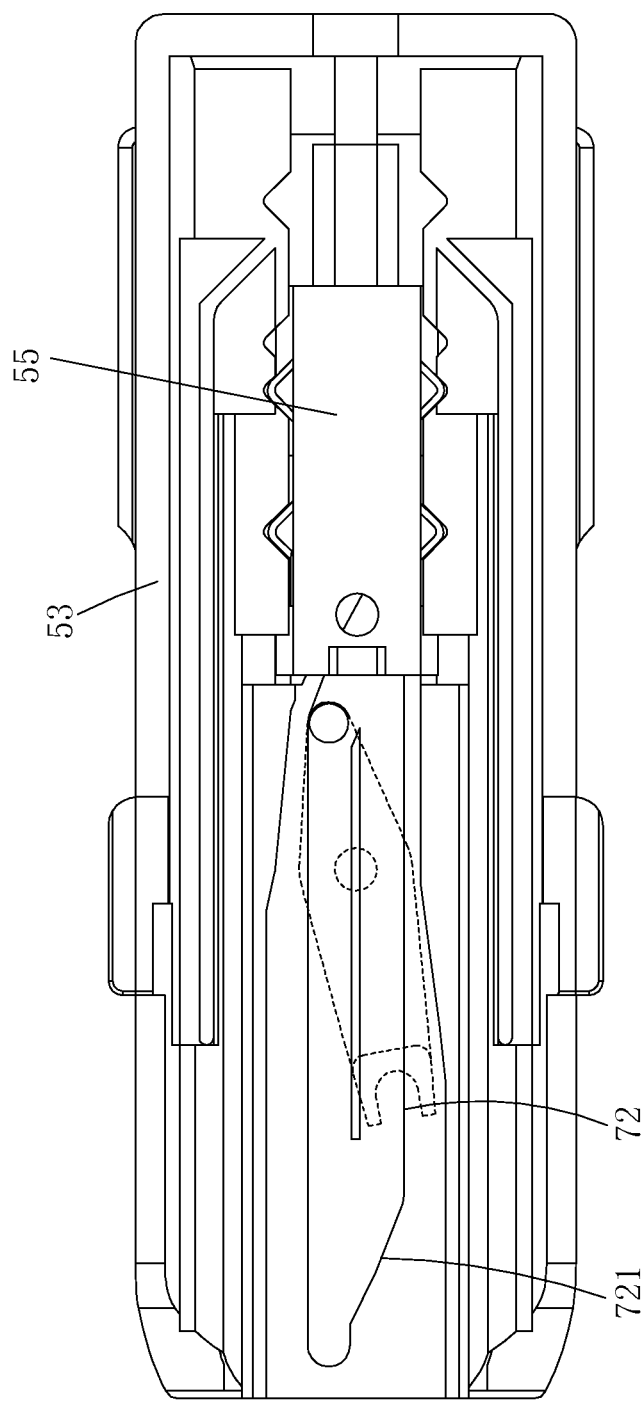
FIG. 16 is a bottom view of the sliding lid part when the connecting member of the power tool according to the present invention returns to the working position from the released state and before the control assembly resets.

As shown in FIG. 15 to FIG. 16, move the sliding lid 53 towards the output shaft 4 to reset, the sliding lid 53 brings the connecting member 51 to move towards the output shaft 4, the end of the connecting member 51 provided with the magnet 511 contacts the tail of another tool bit 9 to be automatically changed and attracts the tool bit, the connecting member 51 drives the tool bit 9 to go into the output shaft 4 until the tool bit 9 exposes itself from the front end of the output shaft 4, and the fixing block 50 on the connecting member 51 is stuck on the arch part 225, then the sliding pin 711 slides along the sliding groove 72 to the critical point of the straight edge and the resetting edge 722. Continue moving the sliding lid 53 towards the output shaft 4, the resilient trip 553 on the engaging block 55 overcomes the elastic force and passes over the second engaging recess 536 until the resilient strip 553 falls in the first engaging groove 535, while the sliding pin 711 slides along the resetting edge 722 of the sliding groove 72 and makes the swing plate 71 rotate a certain degrees around its rotating shaft under the guide of the resetting edge 722; meanwhile, the shift fork 712 of the swing plate 71 drives the first drive gear 73 to rotate, the first drive gear 73 drives the second drive gear 623 as the support base 62 to rotate, thus the support base 62 drives the pawl 61 to rotate, while the cartridge 52 cannot rotate for the connecting member 51 passes through it at this time; therefore, therefore the pawl 61 rotates a certain degrees relative to the cartridge 52 and falls in another positioning groove 522, the sliding lid 53 returns to the position abutting up against the front housing 13 and the electric screwdriver returns to the working station as shown in FIG. 1, thus resetting of the control assembly 60 is completed. If the tool bit selected above is not what the operator needs, repeat the steps above until the output shaft 4 exposes the tool bits needed. Or move the sliding lid 53 to expose the cartridge 52, and rotate the cartridge 52 manually to select the tool bits needed.

The tool bit changing process is simple and rapid, significantly improving operators' work efficiency.

Figure 17:
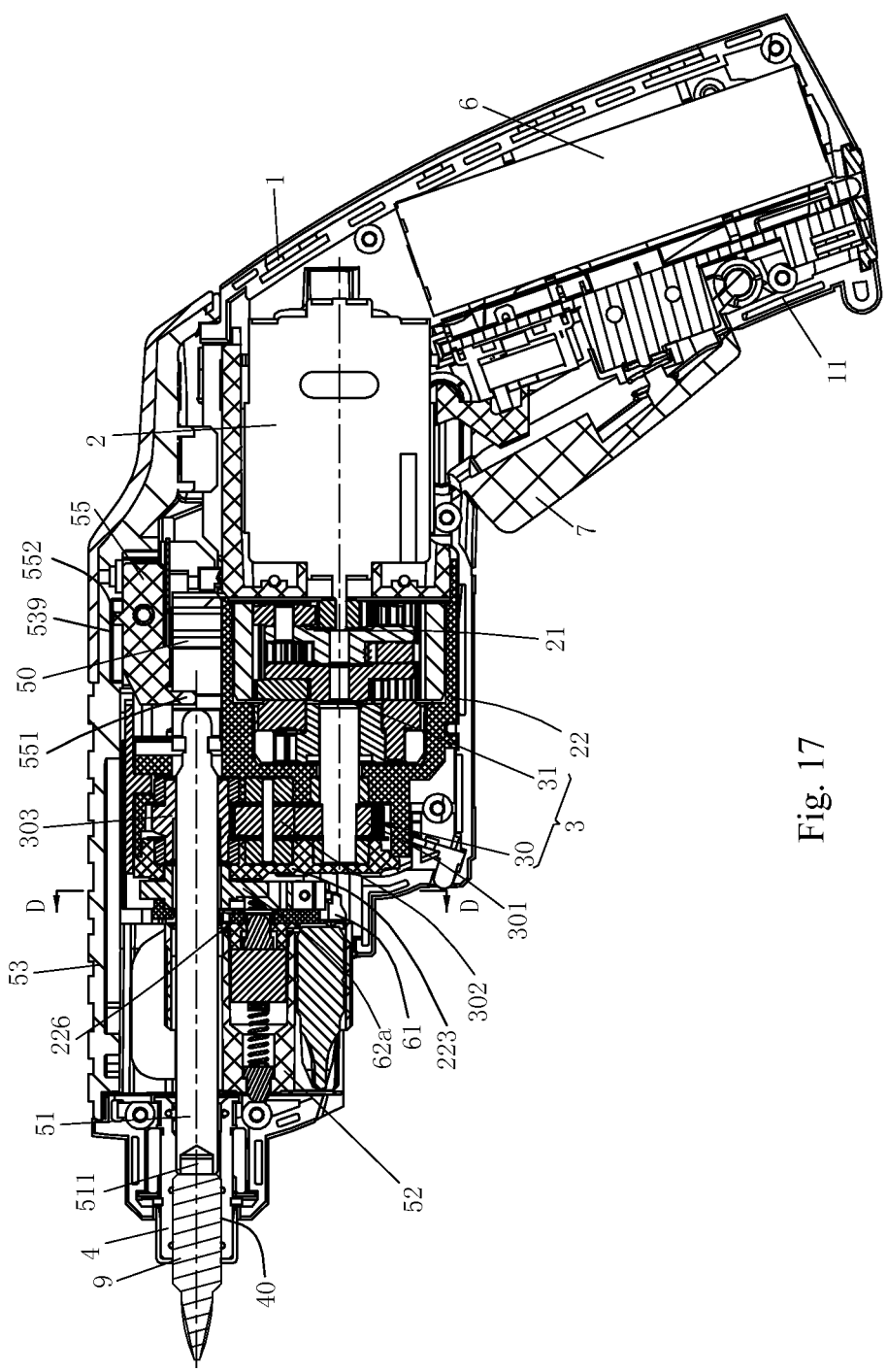
FIG. 17 is a sectional view of the power tool in the preferred embodiment II according to the present invention when it is in working state.
Figure 18:
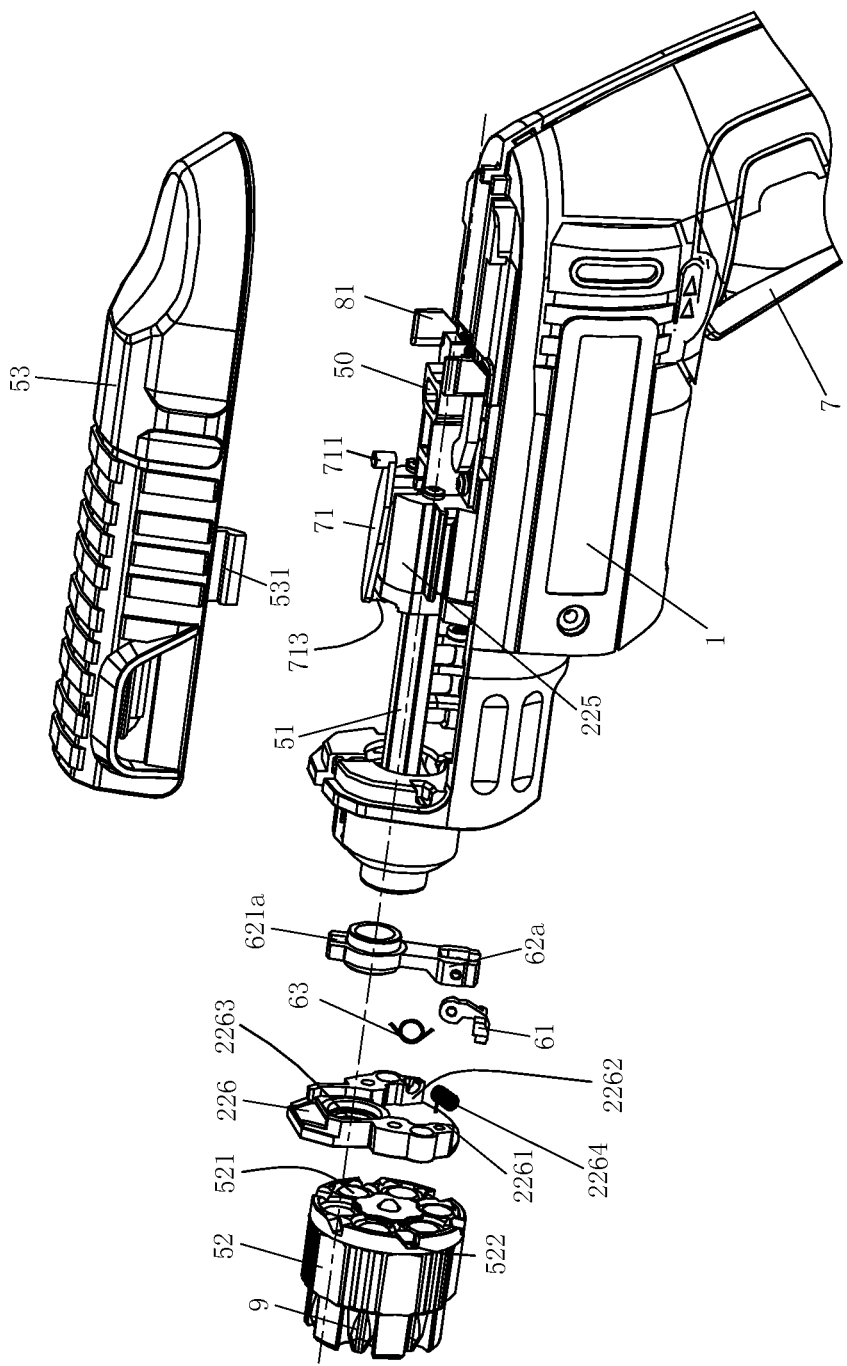
FIG. 18 is an exploded perspective view of part of the power tool in FIG. 17.
Figure 19:
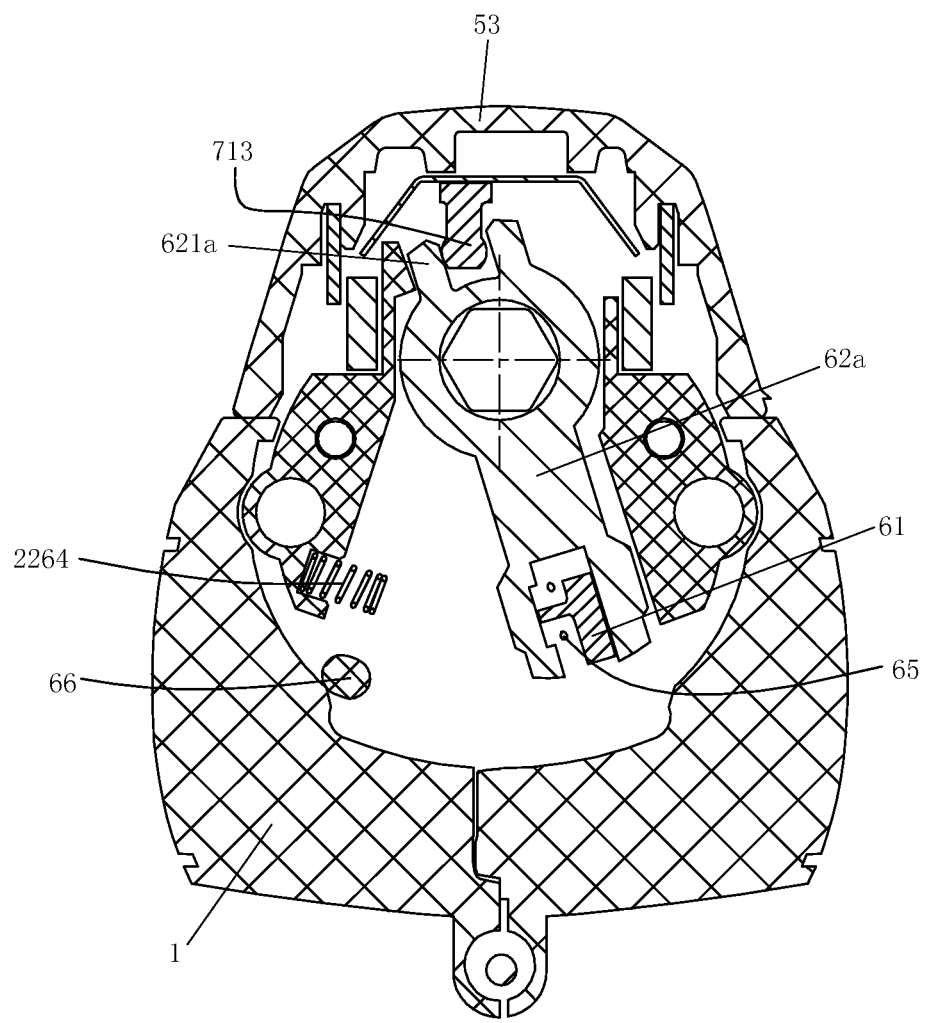
FIG. 19 is a sectional view of the power tool in FIG. 17 along the section line D-D.

As shown in FIG. 17 to FIG. 24 is Embodiment II of the automatic shifting means of the power tool according to the present invention. The structure and functions of the parts with the same number as those of the preferred Embodiment I, so details will not be given herein. As shown in FIG. 17 to FIG. 19, the support base 62a in the embodiment is provided with a shift fork 621a, the end of the corresponding swing plate 71 matching the support base 62a is provided with a shift pin 713, and the shift pin 713 engages the shift fork 621a so that the swing plate 71 can drive the support base 62a directly to rotate.

In the embodiment, the method for driving the support base 62a to rotate is the same as that in the Embodiment I, after driving the connecting member 51 to leave the chamber 521 of the cartridge 52, the sliding lid 53 continues moving relative to the housing 1, the sliding pin 711 of the swing plate 71 slides in the sliding groove 72d of the sliding lid 53 to make the swing plate 71 rotate around its rotating shaft, the shift pin 713 of the swing plate 71 drives the support base 62a to rotate, then the support base 62a drives the cartridge 52 to rotate a certain degrees through the pawl 61, so as to make another chamber 521 correspond to the output shaft 4.

No matter in the Embodiment I or Embodiment II, if operators move the sliding lid 53 at a high speed, the cartridge 52 is instantaneously driven to rotate. In this case, the cartridge 52 has very high rotation inertia and under the inertia, it drives the pawl 61 to be separated from the positioning groove 522, causing the cartridge 52 over-rotate, thus the position of the chamber cannot be ensured to correspond to the output shaft, causing the tool cannot be used. To address the problems above, in the embodiment, preventing the cartridge 52 from over-rotation is fulfilled by limiting the movement of the pawl 61 and making it cannot be separated from the positioning groove 522. Specifically, in combination with reference to FIG. 22, a stop post 66 can be provided on the gearbox cover plate 223, the pawl 61 rotates with the support base 62a, and when the pawl 61 drives the cartridge 52 to rotate to the position where the chamber 521 corresponds to the output shaft 4, the pawl 61 abuts against the stop post 66, thus the pawl 61 cannot move along the direction of being separated from the positioning groove 522 and cannot be separated from the positioning groove 522, so that the cartridge 52 is limited by the pawl 61 and cannot continue rotating.

Generally, after the sliding lid 53 resets, the support base 62a can be driven back to the initial position. Because both the fit between the pawl 61 and the positioning groove 52 as well as the fit between the cartridge 52 and the tool bit 9 are clearance fit, as long as the support base 62a rotates a very small angle under the drive of the sliding lid 53, the pawl 61 will be separated from the stop post 66, thus the pawl 61 can overcome the biasing force of the torsion spring 63 with the rotation of the support base 62a and be separated from the last positioning groove 522, and under the biasing fore of the torsion spring 63, engage the next positioning groove 522, so that the control assembly 60 returns from the terminal position to the initial position.

Furthermore, to ensure a more reliable resetting of the control assembly 60, a resetting assembly can be provided inside the electric screwdriver and used to provide the control assembly with a tendency of making the control assembly move towards to the terminal position. The resetting assembly is preferably the compression spring 2264 arranged on the first stop portion 2261 on the supporting plate 226 or the extension spring arranged on the second stop portion 2262; take the compression spring 2264 for example, a recess can be arranged on the first stop portion 2261 for containing the compression spring 2264, one end of the compression spring 2264 is fixed on the supporting plate 226 and the other end of the compression spring 2264 is a free end and used to press the support base 62a. When the pawl 61 abuts against the stop post 66, the sliding pin 711 on the swing plate 71 moves to the corner of the sliding groove 72d, causing the swing plate 71 unable to rotate, while the support base 62a will maintain in the position where it presses and deforms the compression spring 2264, once the sliding lid 53 begins to reset, the sliding pin 711 on the swing plate 71 will have movement space in the sliding groove 72, thus as long as the support base 62a rotates a very small angle under the action of the compression spring 2264, the pawl 61 will be separated from the stop post 66, the rotation of the support base 62a drives the swing plate 71 to rotate a very small angle, thus the sliding of the sliding pin 711 in the sliding groove 72d will not be affected. Certainly, those skilled in the field easily think of that there can be other forms of resetting assembly, for example, the torsion spring that is capable of driving the support base 62a to move to the initial position, the torsion spring that drives the swing plate 71 to move the support base 62a to the initial position, magnets arranged on the support 62a and on the first stop portion 2261 and two poles of which repel each other, etc.

Figure 20:
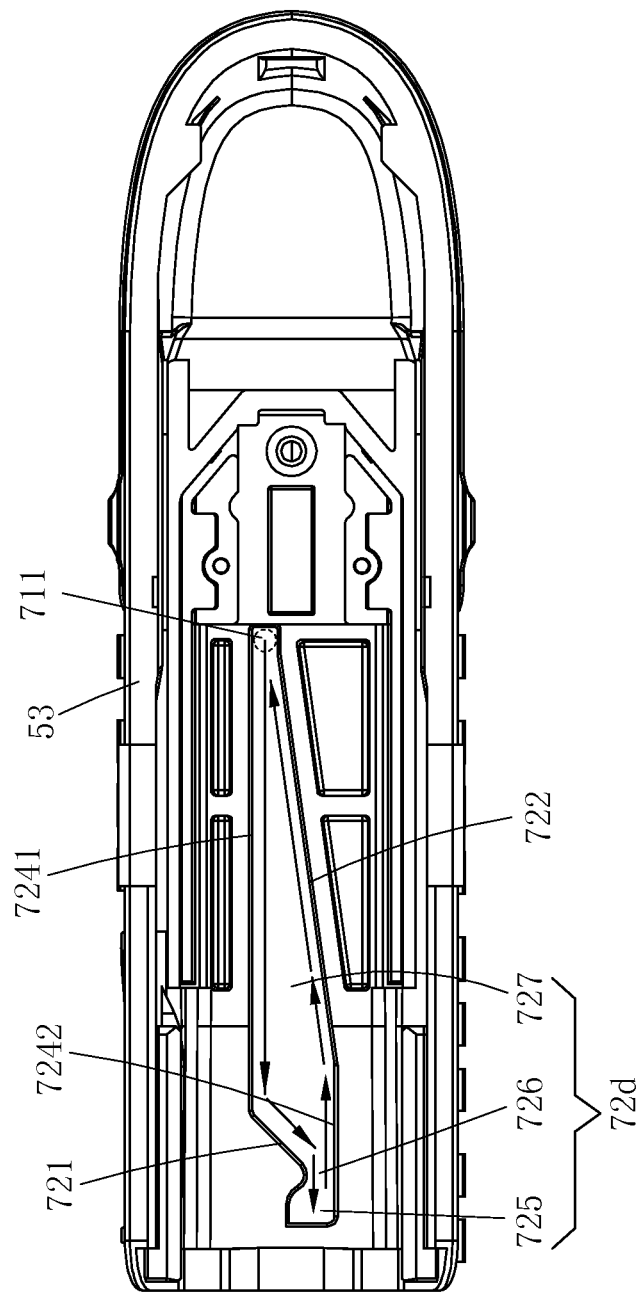
FIG. 20 is a bottom view of the sliding lid part of the power tool in FIG. 17.

As shown in FIG. 20, the sliding groove 72d in the embodiment is arranged along the horizontal direction as well and includes a conversion portion 727, a relinquishing portion 725, a connecting portion 726 located between the conversion portion 727 and the relinquishing portion 725, and the arrow in the figure shows the movement track of the sliding pin in the sliding groove 72d. Wherein the conversion portion 727 includes a first straight edge 7241, a second straight edge 7242, a shifting edge 721 and a resetting edge 722, the first straight edge 7241 and the second straight edge 7242 are parallel to the axial direction of the output shaft 4, the shifting edge 721 is arranged at a certain angle with the first straight edge 7241, the inclination direction of the shifting edge 721 and the resetting edge 722 are the same, the inclination angle of the shifting edge 721 relative to the first straight edge 7241 is greater than that of the resetting edge 722 relative to the first straight edge 7241, the inclination degree herein refers to the acute included angle formed by the shifting edge 721 or the resetting edge 722 and the first straight edge 7241, the inclination angle of the preferred shifting angle according to the present invention is between 30 degrees and 60 degrees, the inclination angle of the resetting edge 722 is between 5 degrees and the 20 degrees, so that it can be ensured that the cartridge 52 is rapidly driven to rotate and the control assembly 60 is smoothly reset, thus operators can operate the sliding lid 53 with less force, reducing labor intensity.

Figure 21:
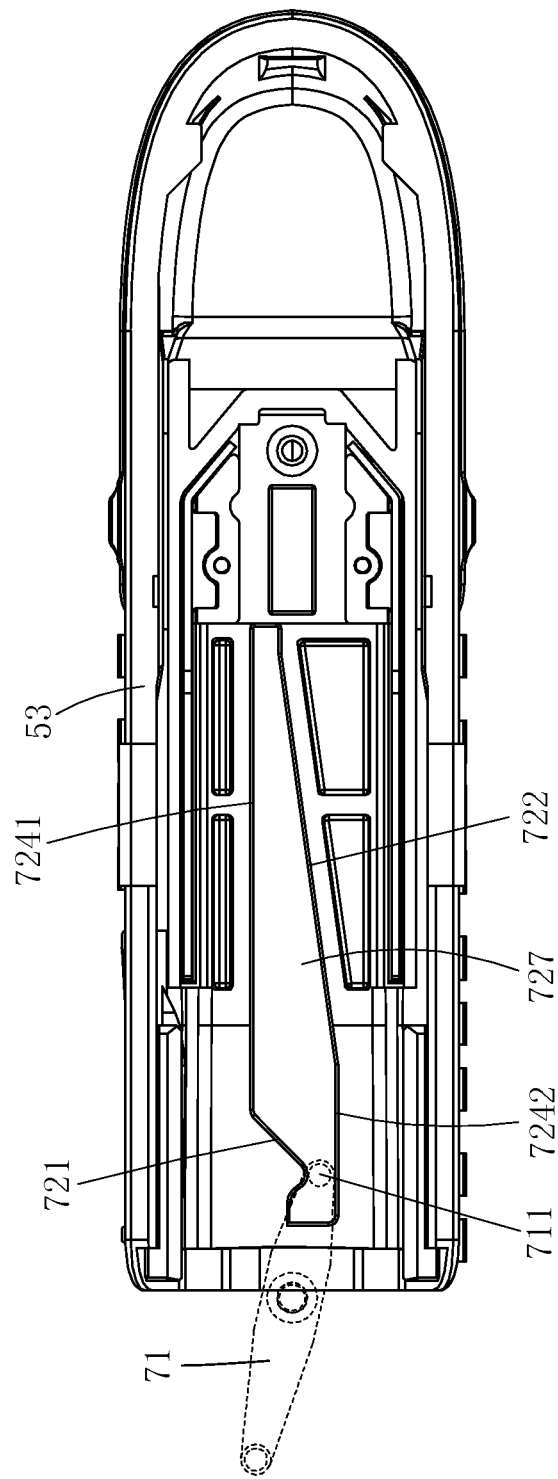
FIG. 21 is a schematic diagram of the sliding pin in the sliding groove when the cartridge of the power tool in FIG. 17 is driven to the position where the next chamber axially corresponds to the output shaft, and the cartridge cannot be turned manually at this time.
Figure 22:
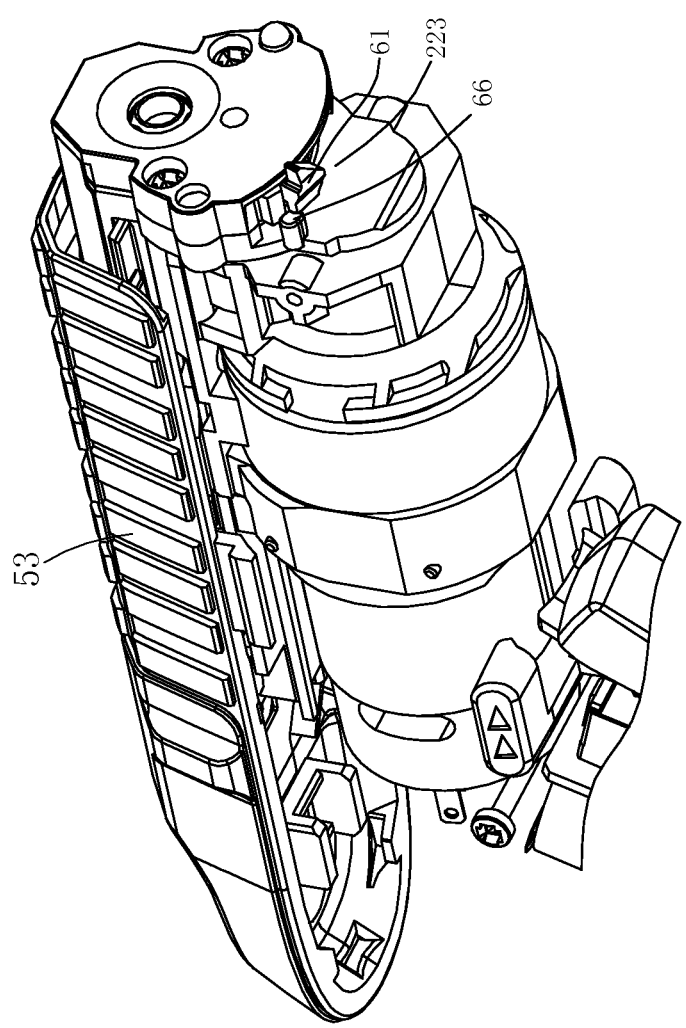
FIG. 22 is a schematic view of the position of the pawl corresponding to the position of the sliding pin of the power tool in FIG. 21.
Figure 23:
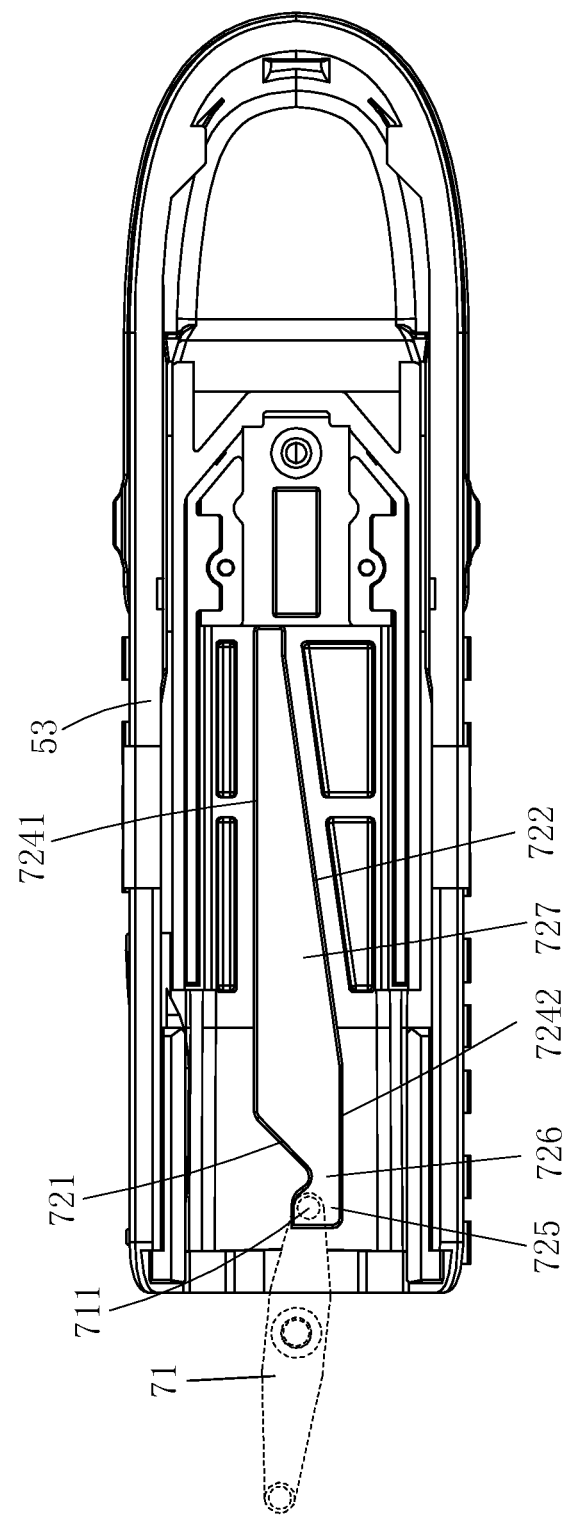
FIG. 23 is a schematic diagram of the sliding pin in the sliding groove when the cartridge of the power tool in FIG. 17 is driven to the position where the next chamber axially corresponds to the output shaft, and the cartridge can be turned manually at this time.
Figure 24:
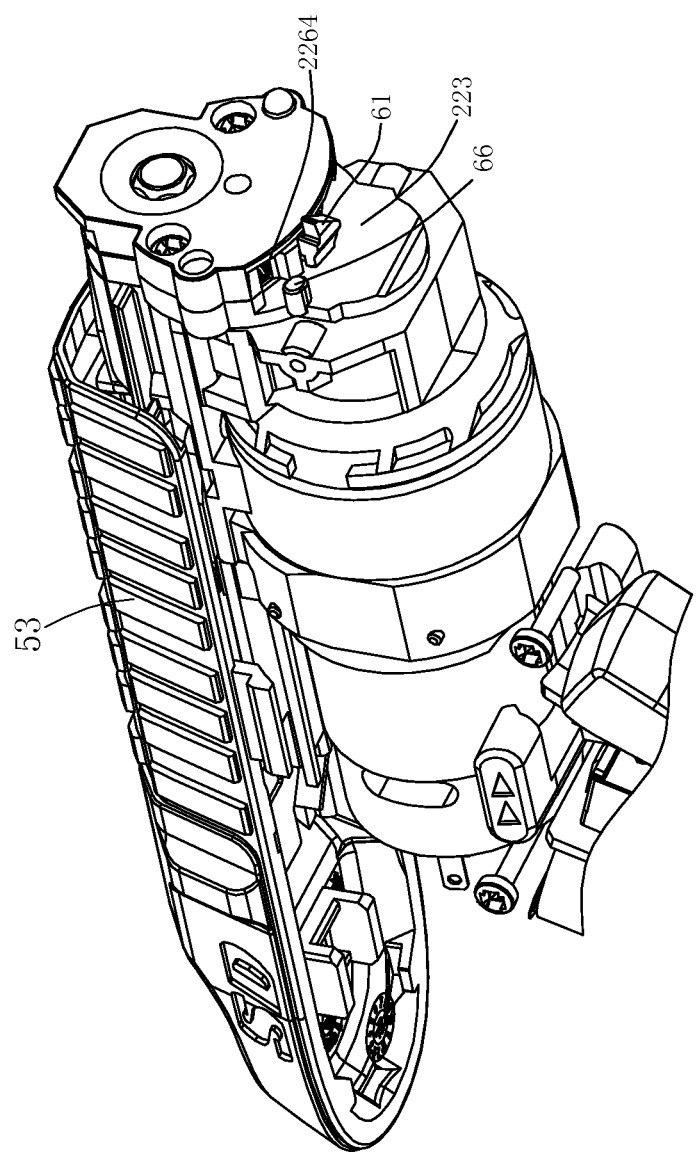
FIG. 24 is a schematic view of the position of the pawl corresponding to the position of the sliding pin of the power tool in FIG. 23.
Figure 25:
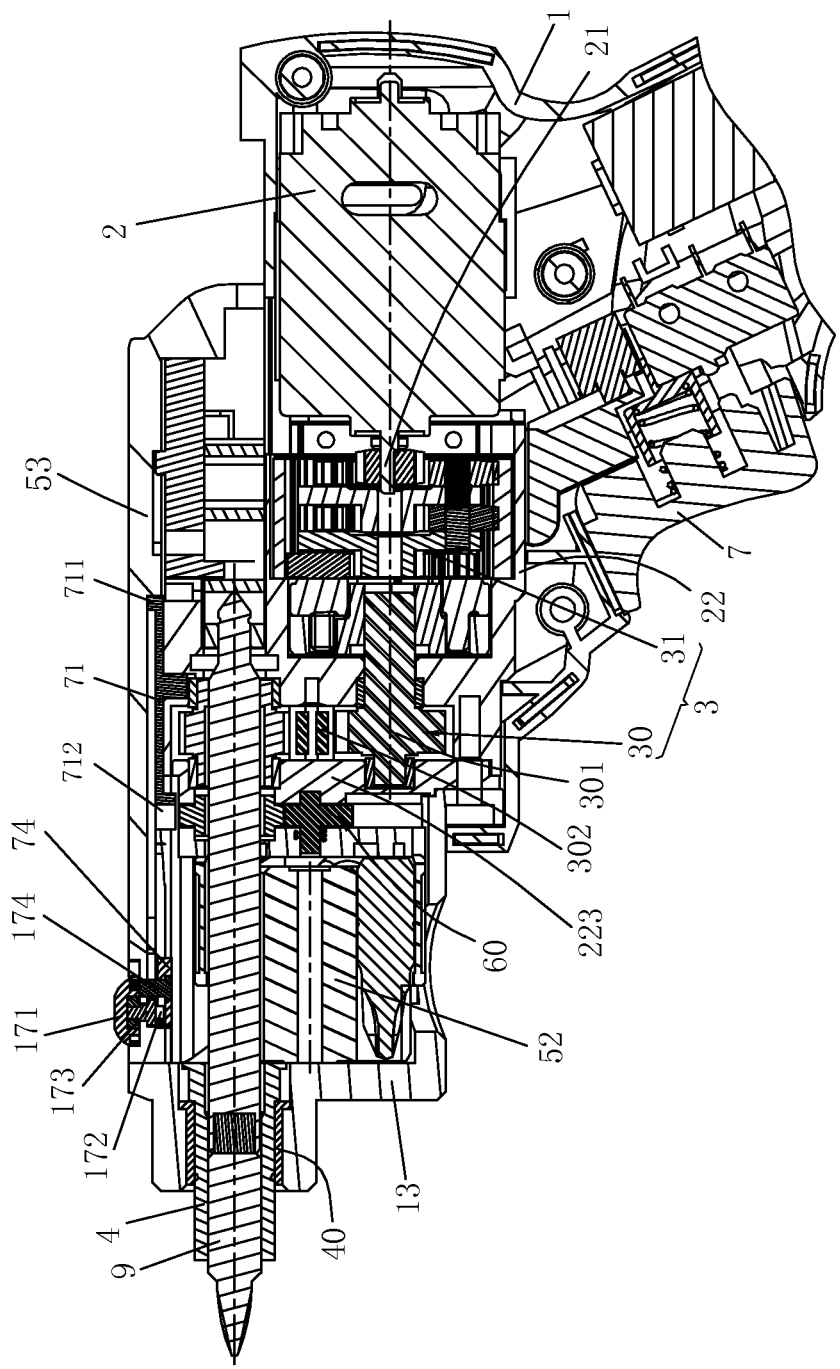
FIG. 25 is a sectional view of the handheld tool in the preferred embodiment III according to the present invention when it is in working state.

The pawl 61 abutting up against the stop post 66 can prevent the over-rotation of the cartridge 52, but if operators cannot select tool bits by toggling the cartridge 52 manually at this time, because the pawl 61 cannot be separated from the positioning groove 522 to turn the cartridge 52. To address the problem, the shape of the sliding groove 72d is further improved in the embodiment. As shown in FIG. 21 to FIG. 22, the conversion portion 727 and the relinquishing portion 725 of the sliding groove 72d communicate, the communication herein refers to the sliding pin 711 can smoothly move from the conversion portion 727 into the relinquishing portion 725, the connecting portion 726 is located between the conversion portion 727 and the relinquishing portion 725, the width of the connecting portion 726 along the direction perpendicular to the axial direction of the output shaft 4 is roughly equal to the diameter of the sliding pin 711, the "roughly equal to" herein refers to that the swing plate 71 has a very small rotation clearance when the sliding pin 711 is in the connecting portion 726, that is to say, the support base 62a cannot be separated from the stop post 66 under the action of the compression spring 2264, then when moving the sliding lid 53 to make the sliding pin 711 move to the connection portion 726 between the conversion portion 727 and the relinquishing portion 725, the support base 62a is driven by the swing plate 71 to move to the position where another chamber 521 of the cartridge 52 is made corresponding to the output shaft 4 and the pawl 61 is maintained in the position where it abuts against the stop post 66, and the cartridge 52 cannot continue rotating. As shown in FIG. 23 to FIG. 24, the width of the relinquishing portion 725 along the direction perpendicular to the axial direction of the output shaft is greater than the diameter of the sliding pin 711, thus the sliding pin 711 has movement space in the relinquishing portion 725 so that the swing plate 71 can rotate around its pivot. Continue moving the sliding lid 53 a very small distance, the sliding pin 711 goes into the relinquishing portion 725, since the sliding pin 711 can move in the relinquishing portion 725 relative to the housing 1, the support base 62a can move towards its initial position under the biasing force of the compression spring 2264 and separate the pawl 61 from the stop post 66, thus when turning the cartridge 52 manually, the pawl 61 can be separated from the positioning groove 522 of the cartridge 52 under the action of the torsion spring 63, and the cartridge 52 begins to rotate. Since the movement of the sliding pin 711 from the conversion portion 727 into the relinquishing portion 725 is realized by operating the sliding lid 53 to move it towards the electric motor 2. The process only requires operating the sliding lid 53 and the shifting process is coherent, so operators will not feel any unsmoothness in operation.

The shifting process of the tool bits in the embodiment above is similar to that in the Embodiment I, therefore details will not be given herein.

As shown in FIG. 25 to FIG. 35 is a handheld tool in the preferred Embodiment III according to the present invention. The structure and functions of the parts with the same number as those of the preferred Embodiment I, so details will not be given herein. As shown in FIG. 25 to FIG. 28, in the embodiment, the automatic shifting means includes a movement conversion assembly arranged between the cartridge 52 and the sliding lid 53 and a control assembly 60 intended for driving the cartridge 52 to move, wherein the movement conversion assembly is used to convert the linear movement of the sliding lid 53 to the rotary movement of the control assembly 60 and the linear movement of the sliding lid 53 drives the cartridge 52 to rotate through the movement conversion assembly. The movement conversion assembly herein includes a sliding groove 72e arranged on the sliding lid 53 and a swing plate 71 pivoted on the housing 1, wherein one end of the swing plate 71 opposite the rotating shaft is provided with a sliding pin 711 and the other end forms a shift fork 712. The shift fork 712 is connected with the control assembly 60, and the sliding pin 711 is arranged in and capable of sliding in the sliding groove 72e. The sliding groove 72e has two straight edges 723 arranged along the axial direction of the output shaft 4 and two oblique edges 724 connected with the two straight edges respectively, wherein the intersection of the two oblique edges 724 forms an oblique angle portion outward relative to the two straight edges 723 and faces the electric motor 2, two partition plates 725 are arranged in the middle of the sliding groove 72e and roughly parallel to the straight edges 723, the distance between the two partition plates 725 is roughly equal to the diameter of the sliding pin 711, the sliding pin 711 can move in the track formed by the two partition plates 725, the distances between the two partition plates 725 and the corresponding two straight edges 723 are also roughly equal to the diameter of the sliding pin 711, the sliding pin 711 can also move in the tracks formed by the partition plate 725 and the corresponding straight edge 723, and the two partition plates 725 divide the sliding groove 72e into a first sliding groove 701, a second sliding groove 702 and the middle sliding groove 703 formed by the two partition plates 725. The sliding lid 53 is pivoted with a guide plate 74 which is arranged in the sliding groove 72e and away from the oblique edge 724. The guide plate 74 is roughly Y-shaped and the single-head end faces toward the oblique edge 724, thus when the sliding lid 711 slides in the middle sliding groove 703 to abut up against the guide plate 74, the guide plate 74 can guide the sliding pin 711 into the first sliding groove 701 or the second sliding groove 702. Certainly, those skilled in the field easily think of that the guide plate 74 can have many shapes, such as triangle, rhombus, heart-shaped, falcate, etc., provided that the sliding pin 711b is making linear movement when contacting the guide plate 74 and can go into the preselected track under the guide of the guide plate 74.

In the embodiment, the handheld tool further includes a mode selection means, the position of the guide plate 74 can be controlled by operating the mode selection means so that the sliding pin 711 can be controlled to move along the forward movement track formed by the first sliding groove 701 and the middle groove 703 all the time or move along the backward movement track formed by the second sliding groove 702 and the middle sliding groove 703 all the time or move along the forward movement track and the backward movement track alternately. Thus the guide plate 74 forms a movement track selection means. The sliding pin 711 can have different movement tracks through the guide plate 74, that is to say, the guide plate 74 performs the function of changing the movement direction of the sliding pin.

Specifically, the operation mode selection means includes a mode selection button 171 rotatably installed on the sliding lid 53, one end of the mode selection button 171 exposes itself out of the sliding lid 53 and part of the end forms a operation handle, the other end of the mode selection button 171 is connected with a flat square pin 173 provided with an eccentric pin 172, the flat square pin 173 passes the sliding lid 53 and installed together with the mode selection button 171, the Y-shaped guide plate 74 is installed in the sliding groove 72e with a pin 174, and the eccentric pin 172 is between the double-head ends of the Y-shaped guide plate 74, thus when the mode selection button 171 is turned, the flat square pin 173 will be driven to turn and put the eccentric pin 172 in different positions relative to the Y-shaped guide plate 74. Three positioning grooves 1711 are arranged on the mode selection button 171 and distributed at a certain interval along the circumferential direction of the model selection button 171, a positioning clip 175 is installed on the sliding lid 53, the turning of the mode selection button 171 makes different positioning grooves 1711 engage the positioning clip 175 so that the mode selection button 171 can maintain in three fixed positions relative to the sliding lid 53; and the eccentric pin 172 also has three different positions relative to the Y-shaped guide plate 74 as the mode selection button 171 turns, i.e. the eccentric pin 172 is located at two sides of the vertical plane passing the axis of the output shaft, and when abutting up against one head of the double-edge ends of the Y-shaped guide plate 74, the eccentric pin 172 limits the Y-shaped guide plate 74 from rotating in clockwise or counter-clockwise direction; when intersecting the vertical plane passing the axis of the output shaft, the eccentric pin 172 is located between the dual-edge ends of the Y-shaped guide plate 74 and allows the Y-shaped plate 74 to rotate in clockwise or counterclockwise direction. The above is a mode of turning operation of the mode selection button 171. Those skilled in the field easily think of that the forward-backward movement or left-right movement can also realize the position of the Y-shaped guide plate 74 and the movement of the cartridge 52 can also be linear movement.

The process of electing the movement mode of the cartridge 52 by operating the mode selection button 171 will be illustrated in details hereinafter.

Figure 26:
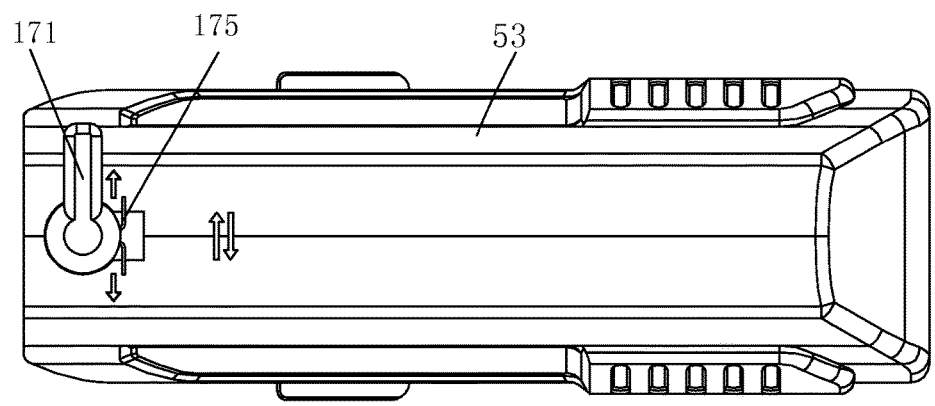
FIG. 26 is a bottom view of the sliding lid of the handheld tool in FIG. 25.
Figure 27:
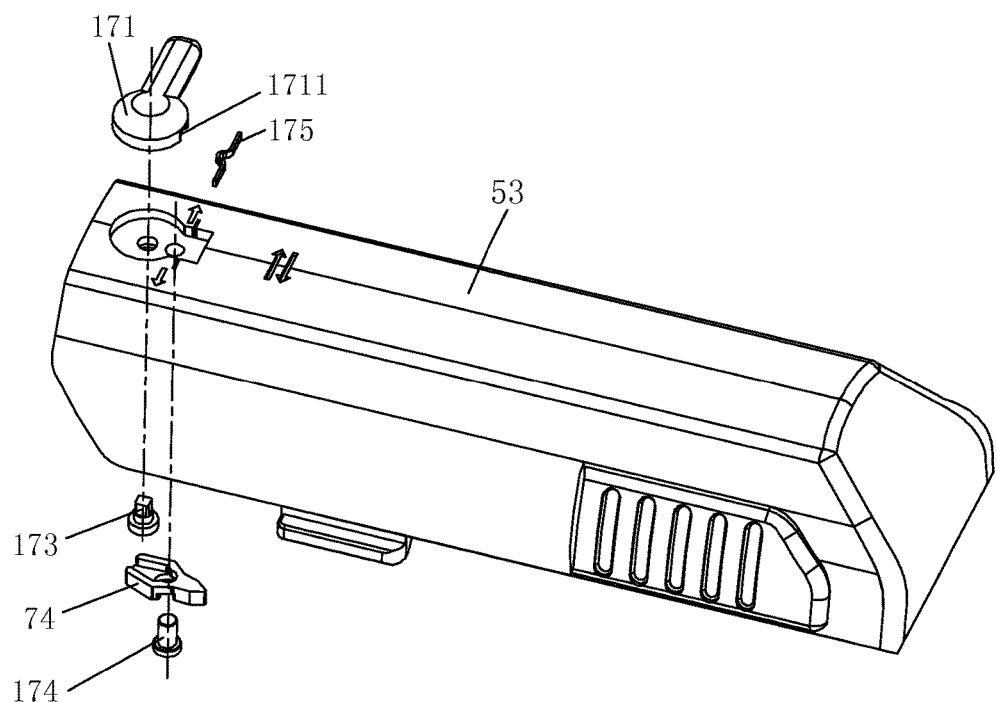
FIG. 27 is an exploded perspective view of part of the handheld tool in FIG. 26.
Figure 28:
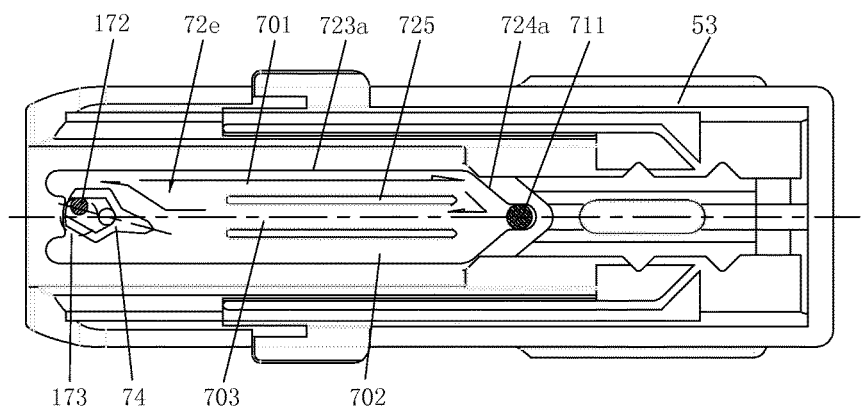
FIG. 28 is a bottom view of the sliding lid of the handheld tool in FIG. 25, wherein the mode selection button is at the forward adjustment mode.
Figure 29:
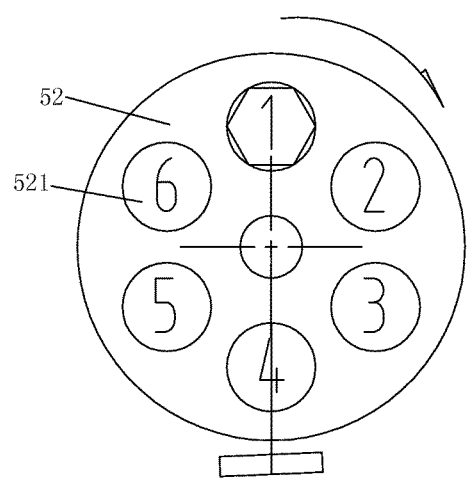
FIG. 29 is a schematic view of the cartridge of the handheld tool in FIG. 25 in the forward adjustment mode.

As shown in FIG. 26 and FIG. 28, turn the mode selection button 171 to make the operation handle correspond to the arrow on the right side (seen along the direction of from the motor to the output shaft) of the sliding lid 53, the eccentric pin 172 also moves to the right side of the sliding lid 53 with the mode selection button 171, thus the single-head end of the Y-shaped guide plate 74 faces the second sliding groove 702 and the eccentric pin 172 abuts against one edge (at the right side) of the dual-edge ends of the Y-shaped guide plate 74 so that the Y-shaped guide plate 74 cannot rotate towards the left, then pull the sliding lid 53, the sliding pin 711 makes linear movement relative to the sliding lid 53 along the middle sliding groove 703 until the sliding pin 711 abuts against the Y-shaped guide plate 74, the single-head end of the Y-shaped guide plate 74 faces the second sliding groove 702, therefore when continuing pulling the sliding lid 53, the sliding pin 711 will move to the first sliding groove 701 under the guide of the Y-shaped guide plate 74, the sliding pin 711 generates radial placement relative to the output shaft 4, the swing plate 71 is driven to rotate and drive the control assembly 60 to make the cartridge 52 rotate in clockwise direction (seen from the direction of from the output shaft to the motor) to the position where the next chamber 521 corresponds to the accommodating hole 41 of the output shaft 4; push back the sliding lid 53, and the sliding pin 711 makes linear movement relative to the sliding lid 53 along the first sliding groove 701 to the oblique angle portion formed by the intersection of the two oblique edges 724. Continue pulling and pushing back the sliding lid 53, i.e. the sliding lid 53 makes more than two reciprocations, the sliding pin 711 is still guided into the first sliding groove 701 by the Y-shaped guide plate 74 and the cartridge is driven to move as per the numerical order of chambers as shown in FIG. 29. The mode is the forward adjustment mode (clockwise adjustment mode) in the order adjustment mode.

Figure 30:
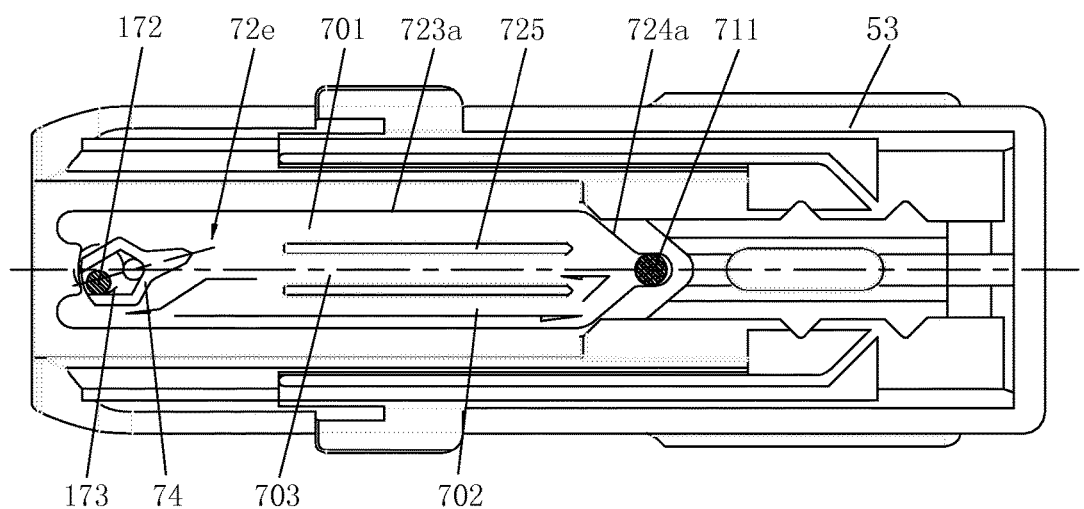
FIG. 30 is similar to FIG. 28, wherein the mode selection button is at the backward adjustment mode.
Figure 31:
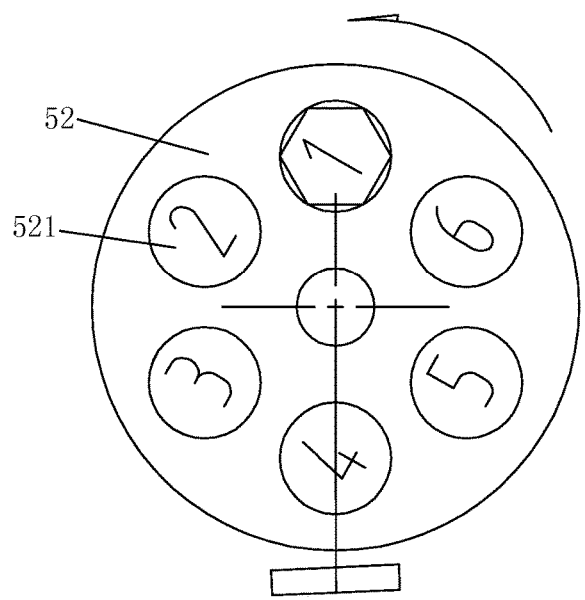
FIG. 31 is a schematic view of the cartridge of the handheld tool in FIG. 30 in the forward adjustment mode.

As shown in FIG. 30 and FIG. 31, turn the mode selection button 171 to make the operation handle correspond to the arrow on the left side (seen along the direction of from the motor to the output shaft) of the sliding lid 53, the eccentric pin 172 also moves to the left side of the sliding lid 53 with the mode selection button 171, thus the single-head end of the Y-shaped guide plate 74 faces the first sliding groove 701 and the eccentric pin 172 abuts against one edge (at the left side) of the dual-edge ends of the Y-shaped guide plate 74 so that the Y-shaped guide plate 74 cannot rotate towards the right, then pull the sliding lid 53, the sliding pin 711 makes linear movement relative to the sliding lid 53 along the middle sliding groove 703 until the sliding pin 711 abuts against the Y-shaped guide plate 74, the single-head end of the Y-shaped guide plate 74 faces the first sliding groove 701, therefore when continuing pulling the sliding lid 53, the sliding pin 711 will move to the second sliding groove 702 under the guide of the Y-shaped guide plate 74, the sliding pin 711 generates radial placement relative to the output shaft 4, the swing plate 71 is driven to rotate and drive the control assembly 60 to make the cartridge 52 rotate in counter-clockwise direction (seen from the direction of from the output shaft to the motor) to the position where the next chamber 521 corresponds to the accommodating hole 41 of the output shaft 4; push back the sliding lid 53, and the sliding pin 711 makes linear movement relative to the sliding lid 53 along the second sliding groove 702 to the oblique angle portion formed by the intersection of the two oblique edges 724. Continue pulling and pushing back the sliding lid 53, i.e. the sliding lid 53 makes more than two reciprocations, the sliding pin 711 is still guided into the second sliding groove 702 by the Y-shaped guide plate 74 and the cartridge 52 is driven to move as per the numerical order of chambers as shown in FIG. 31. The mode is the backward adjustment mode (counter-clockwise adjustment mode) in the order adjustment mode.

Figure 32:
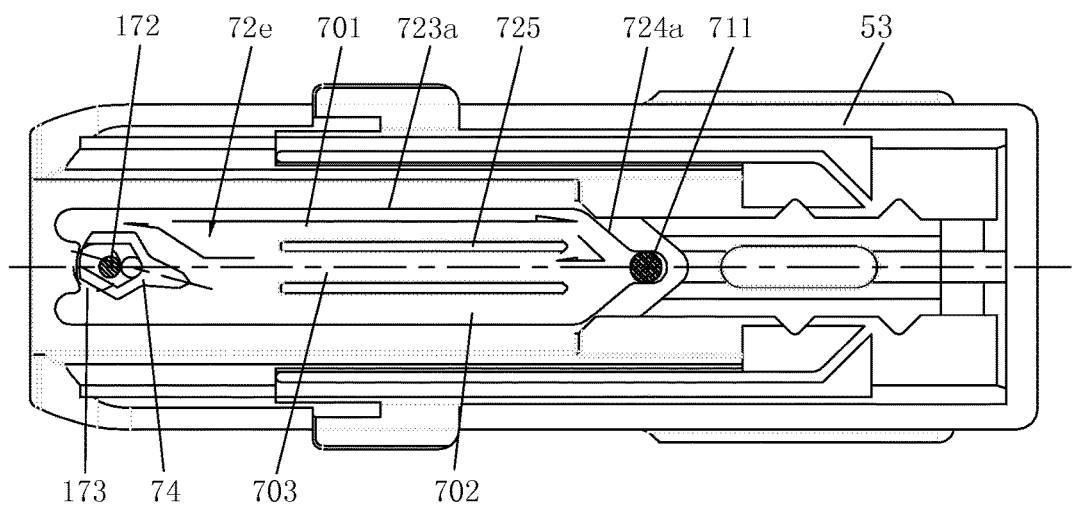
FIG. 32 is similar to FIG. 28, wherein the mode selection button is at the reciprocation adjustment mode, wherein the sliding pin slides to the first sliding groove first.
Figure 33:
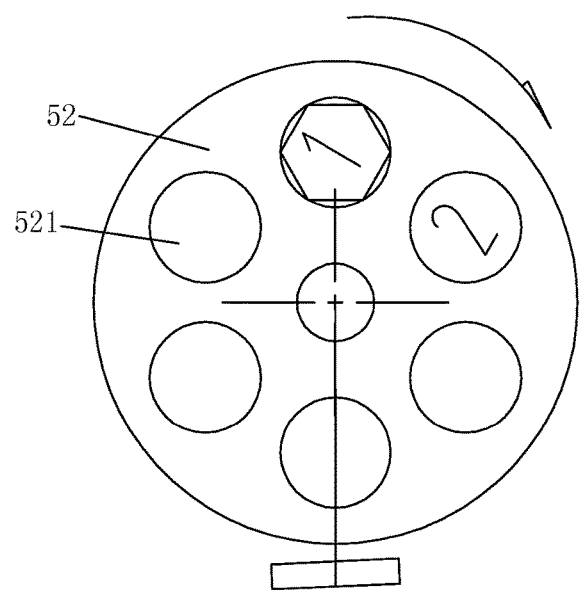
FIG. 33 is a schematic view of the cartridge of the handheld tool in FIG. 32 in the reciprocation adjustment mode, wherein the cartridge is driven along the forward direction to the position where the next chamber axially corresponds to the accommodating hole.
Figure 34:
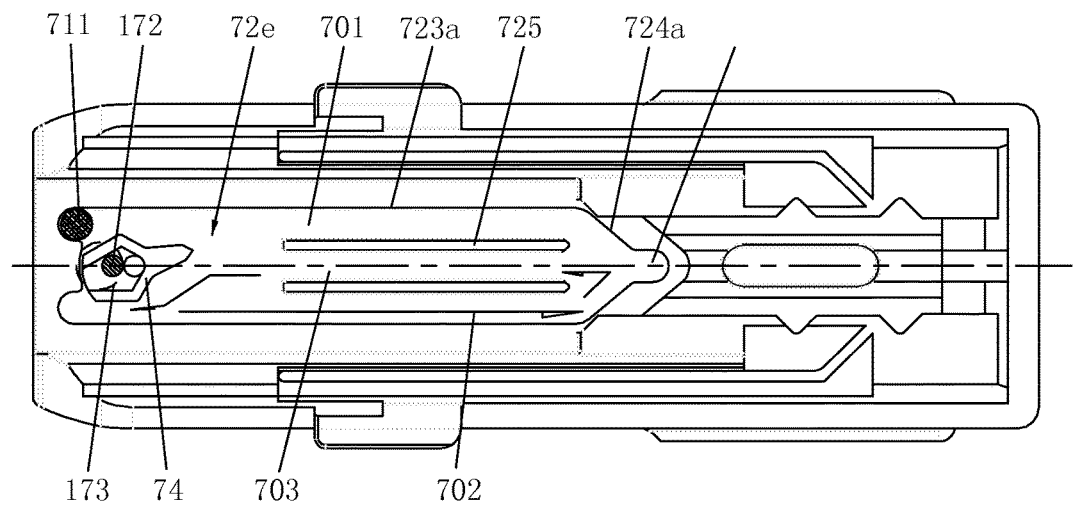
FIG. 34 is similar to FIG. 28, wherein the mode selection button is at the reciprocation adjustment mode, wherein the sliding pin then slides to the second sliding groove.
Figure 35:
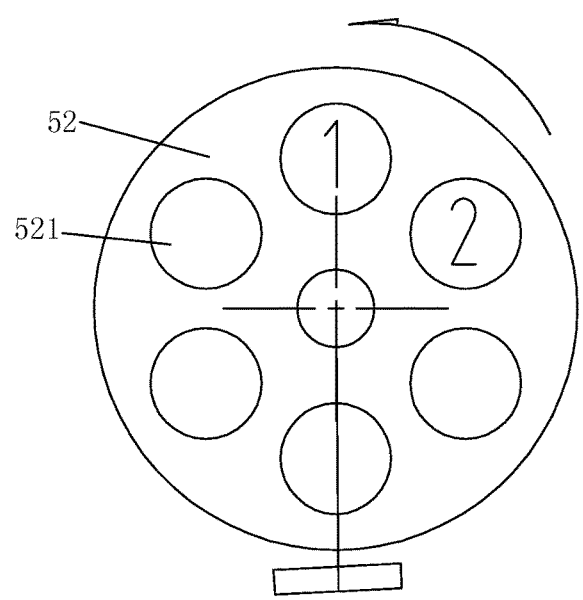
FIG. 35 is a schematic view of the cartridge of the handheld tool in FIG. 34 in the reciprocation adjustment mode, wherein the cartridge is driven along the backward direction to the position where the last chamber axially corresponds to the accommodating hole.

As shown in FIG. 32 and FIG. 33, turn the mode selection button 171 to make the operation handle correspond to the double-headed arrow in the middle of the sliding lid 53, the eccentric pin 172 also moves to the middle of the sliding lid 53 along the direction perpendicular to the axis of the output shaft with the mode selection button 171, the eccentric pin 172 is between the dual-edge ends of the Y-shaped guide plate 74 and the Y-shaped guide plate 74 can be configured so as to rotate only under the action of the external force, take the single-head end of the Y-shaped guide plate 74 for example, then pull the sliding lid 53, the sliding pin 711 makes linear movement relative to the sliding lid 53 along the middle sliding groove 703 until the sliding pin 711 abuts against the Y-shaped guide plate 74, the single-head end of the Y-shaped guide plate 74 faces the second sliding groove 702, therefore when continuing pulling the sliding lid 53, the sliding pin 711 will move to the first sliding groove 701 under the guide of the Y-shaped guide plate 74 and generate radial placement relative to the output shaft 4; meanwhile the Y-shaped guide plate 74 rotates to the position where the single-head end of the Y-shaped guide plate 74 faces the first sliding groove 701 under the action of the sliding pin 71's movement, as shown in FIG. 33, the swing plate 71 is driven to rotate and drive the control assembly 60 to make the cartridge 52 rotate in clockwise direction (seen from the direction of from the output shaft to the motor) to the position where the next chamber 521 corresponds to the accommodating hole 41 of the output shaft 4; as shown in FIG. 34, push back the sliding lid 53, and the sliding pin 711 makes linear movement relative to the sliding lid 53 along the first sliding groove 701 to the oblique angle portion formed by the intersection of the two oblique edges 724. Continue pulling and pushing back the sliding lid 53, the sliding pin 711 is guided into the second sliding groove 702 by the Y-shaped guide plate 74, then the cartridge 52 is driven in counter-clockwise direction (seen from the direction of from the output shaft to the motor) to the position where the last chamber 521 corresponds to the accommodating hole of the output shaft 4, as shown in FIG. 35. Continue pulling and pushing back the sliding lid 53, i.e. the sliding lid 53 makes more than two reciprocations, the sliding pin 711 moves in the first sliding groove 701 and the second sliding groove 702 alternately, and the corresponding cartridge 52 also is shifted alternately between the positions where two adjacent chambers correspond to the accommodating hole of the output shaft. The mode is the reciprocating adjustment mode.

The movement processes of the movement conversion assembly and the control assembly in the embodiment above are similar to those in the Embodiment I, therefore details will not be given herein.

Figure 36:
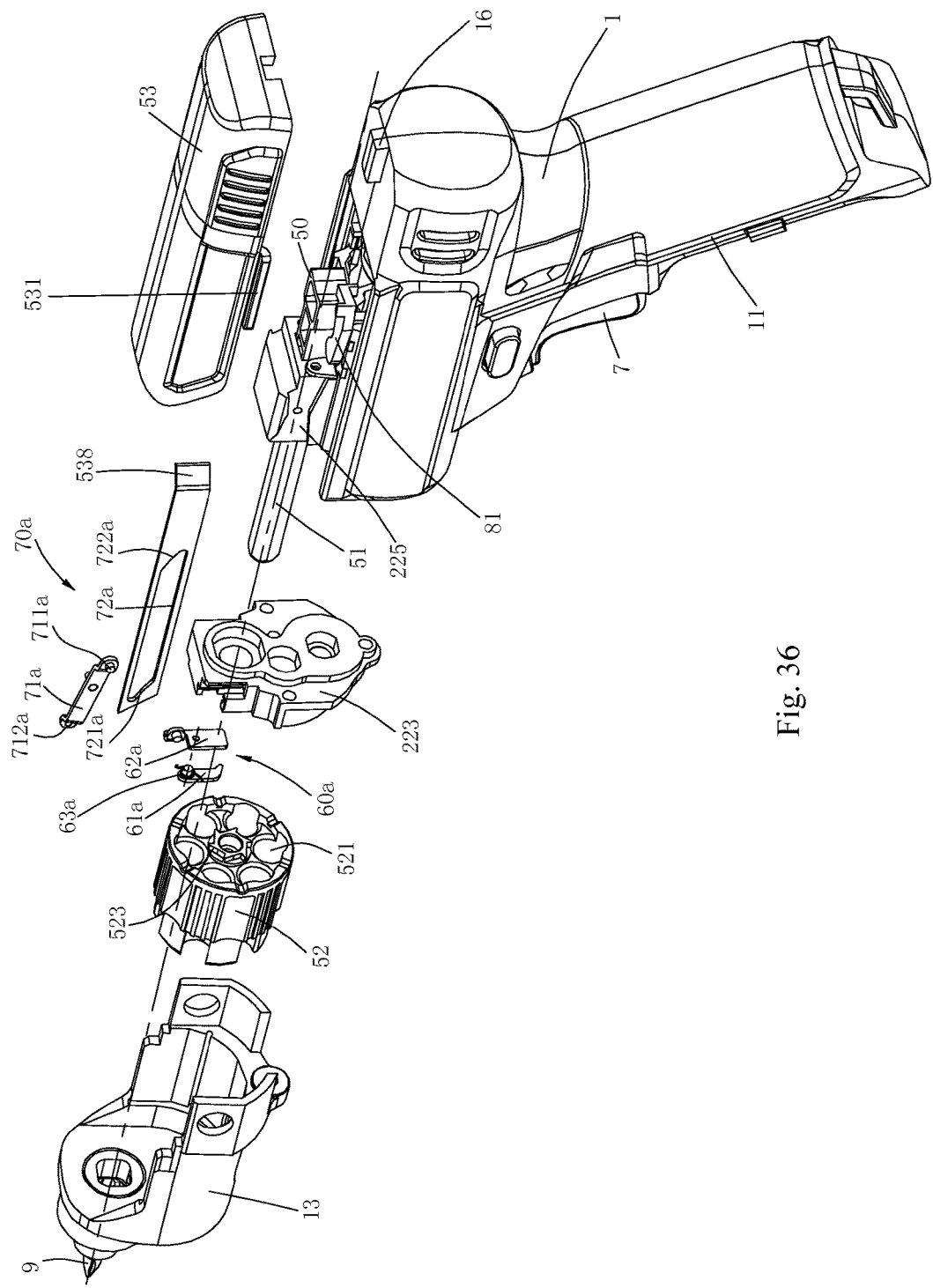
FIG. 36 is an exploded perspective view of part of the power tool in the preferred embodiment IV according to the present invention.
Figure 41:
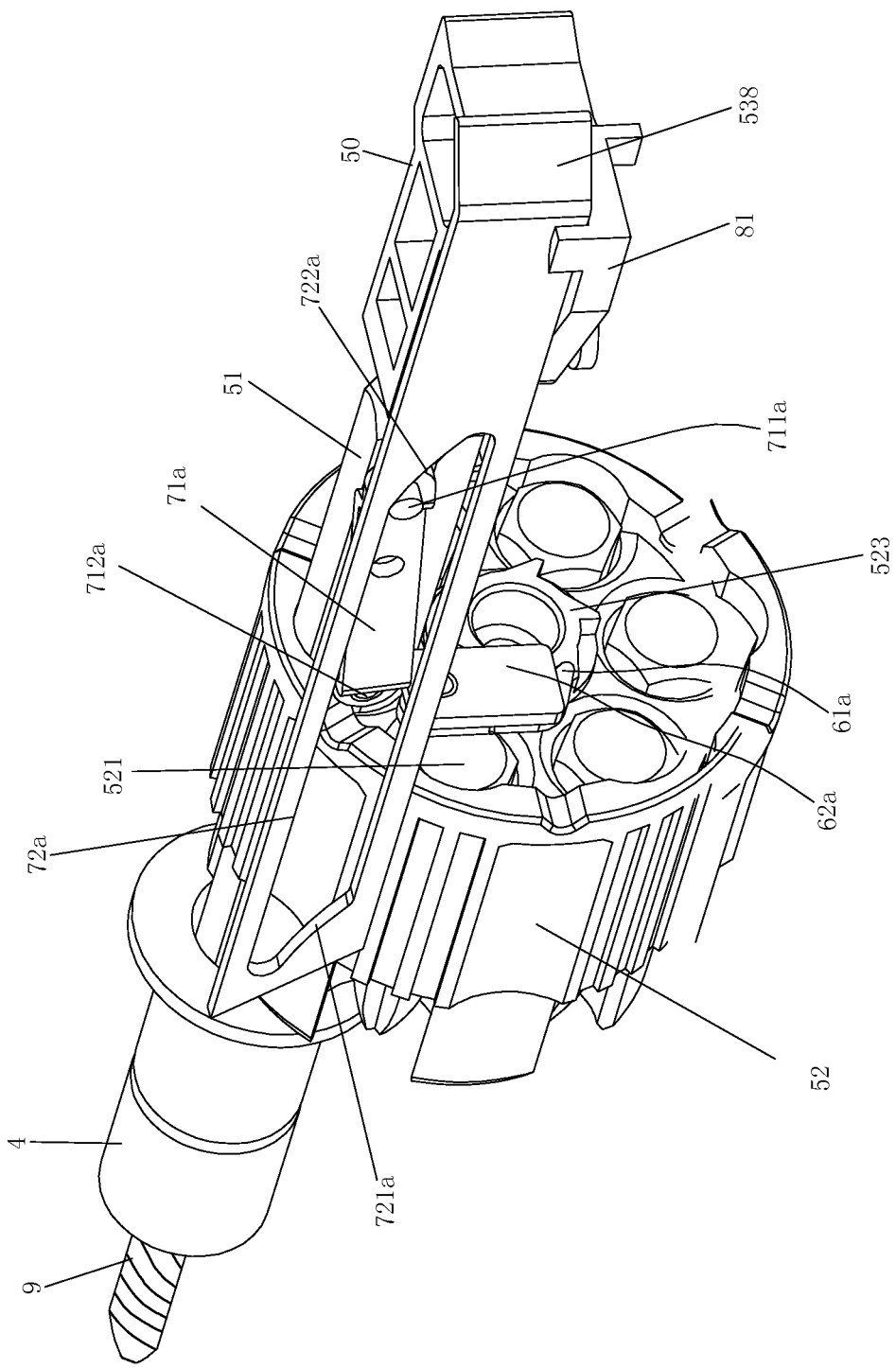
FIG. 41 is an exploded perspective view of part of the power tool in FIG. 36 when the connecting member of the power tool returns from the released state to the working position.

As shown in FIG. 36 and FIG. 41 is the power tool in the preferred Embodiment IV according to the present invention. In the embodiment, the power tool is preferably a DC electric screwdriver, wherein the automatic shifting means adopts a structure different from that in the Embodiment I, but other structures are the same as those in the Embodiment I.

Figure 37:
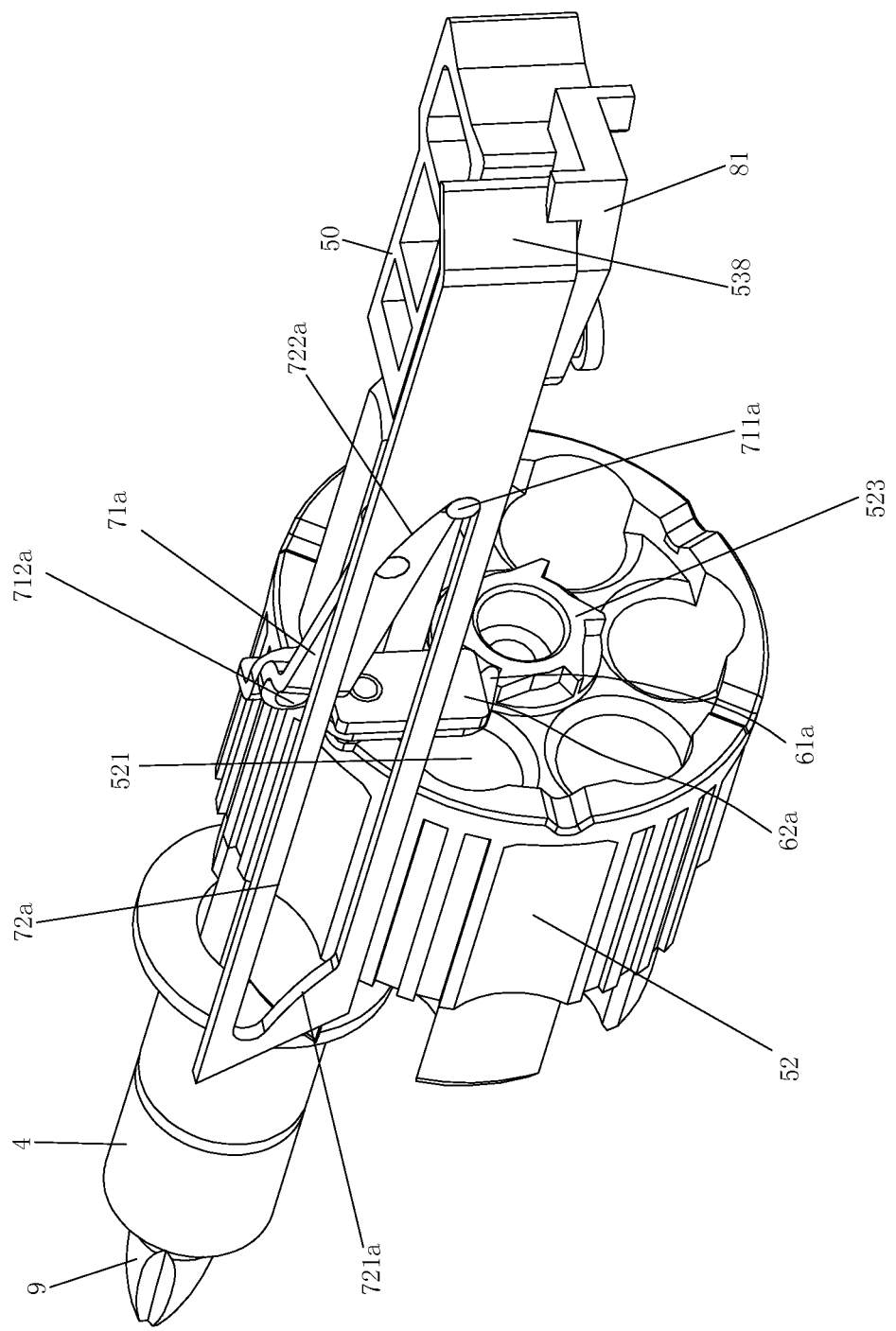
FIG. 37 is a perspective view of part of the power tool in FIG. 36 when it is in working state.
Figure 38:
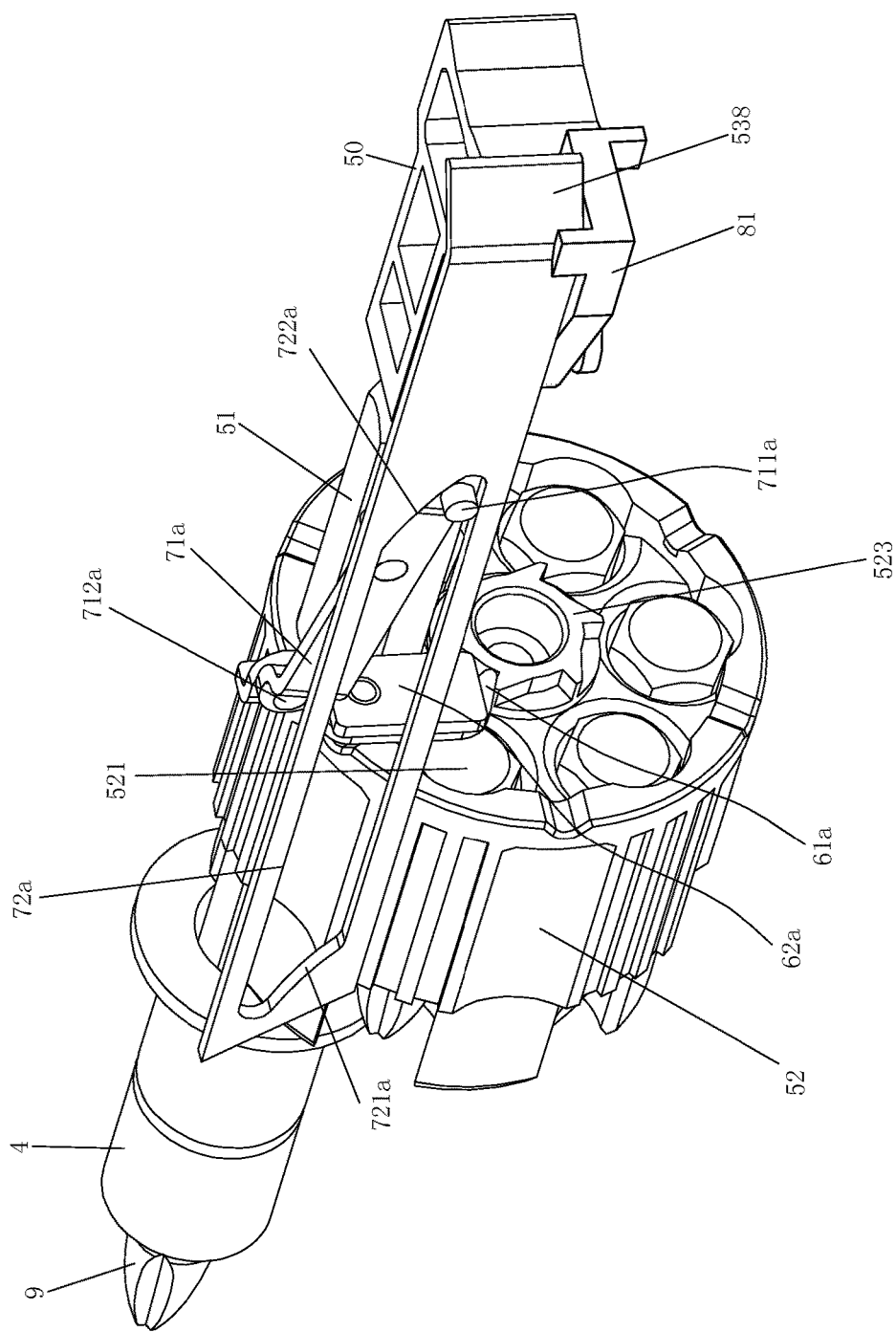
FIG. 38 is an exploded perspective view of part of the power tool in FIG. 36 when the connecting member of the power tool is relieved.

As shown in FIG. 36 to FIG. 38, the automatic shifting means includes a control assembly 60a intended for driving the cartridge 52 to move, the control assembly 60a includes a pawl 61a movably connected with the cartridge 52 and a support base 62a for installing the pawl 61a, wherein one end of the cartridge 52 is provided with a ratchet wheel 523 which is relative to the circumferential direction of the cartridge 52 and rotates concentrically with the cartridge 52, one end of the pawl 61a is rotatably installed on the support base 62a and the other end matches the ratchet wheel 523 of the cartridge 52 and the pawl 61a can rotate around the axis parallel to the rotating axis of the cartridge 52 so as to separate from or engage the ratchet wheel 523, a torsion spring 63a is arranged between the pawl 61a and the support base 62a, and the pawl 61a maintains engaging the ratchet wheel 523 under the biasing force of the torsion spring 63a. And the support base 62a is supported on the gearbox cover plate 223 and capable of moving along the direction perpendicular to the axial direction of the connecting member 51. In this way, as the support base 62a drives the pawl 61a to move, the pawl 61a can push the ratchet wheel 523 to rotate and then drive the cartridge 52 to rotate.

In the embodiment, the movement of the cartridge 52 is realized by driving the control assembly 60a to move, which is the same as that in the Embodiment I. The methods for driving the control assembly 60a to move include stored-energy drive and sliding lid operation drive. When stored-energy drive is adopted, the automatic shifting means further includes an energy-storage unit connected with the control assembly 60a, wherein when the connecting member 51 moves to the working position, the energy of the energy-storage unit is stored, while when the connecting member 51 moves to the release position, the energy of the energy-storage unit is released to drive the control assembly 60a to move and bring the cartridge 52 to move. A preferred energy-storage unit is a compression spring which is arranged between the control assembly 60a and the housing, one end of the compression spring is pressed against the support base 62a and the other end is pressed against the housing 1 or the gearbox end cover 223, wherein when the connecting member 51 is in the working position, the compression spring 65 is in compression state, but once the connecting member 51 leaves the chamber 521 of the cartridge 52, the control assembly 60a can drive the cartridge 52 to rotate under the action of the compression spring.

When the sliding lid drives the control assembly 60a to move, the control assembly is connected with the sliding lid 53, after the sliding lid 53 controls the connecting member 51 to move to the release position, the sliding lid 53 operably drives the control assembly 60a to move and bring the cartridge 52 to move. Preferably, the movement of the control assembly 60a is driven by the movement of the sliding lid 53, i.e. after bringing the connecting member 51 to leave the chamber 521 of the cartridge 52, the sliding lid 53 continues moving relative to the housing 1 while bringing the control assembly 60a to move, i.e. convert the linear movement of the sliding lid 53 into the movement of the control assembly 60a through a steering assembly.

The preferred steering assembly in the automatic shifting means is the movement conversion assembly 70a connected between the control assembly 60a and the sliding lid 53, and the movement conversion assembly 70a is intended for converting the linear movement of the sliding lid 53 into the movement of the control assembly 60a. The movement conversion assembly 70a includes a swing plate 71a pivoting relative to the housing 1, and the middle of the swing plate 71a is arranged with a rotating shaft which can be installed on the arch part 225 of the gearbox 22. One end of the swing plate 71a relative to the rotating shaft is provided with a sliding pin 711a and the other end forms an interlocking portion 712a. Inside of the sliding lid 53 is arranged with a sliding groove 72a matching the sliding pin 711a. The sliding groove 72 is configured to be roughly a parallelogram along the vertical direction, two straight edges are parallel to the axial direction of the connecting member 51, two oblique edges form the shifting edges 721a and the resetting edges 722a of the sliding groove 72a, the sliding pin 711a slides along the edge of the sliding groove 72a as the sliding lid 53 moves, and every time it passes the shifting edge 721a or the resetting edge 722a, the interlocking portion 712a of the swing plate 71a swings once around the rotating shaft. The interlocking portion 712a of the swing plate 71a is connected with the support base 62a of the control assembly 60a directly so that the linear movement of the sliding lid 53 is converted into the movement of the control assembly 60a.

When the control assembly 60a is reset, move the sliding lid to drive the connecting member 51 to return to the working position from the release position, the connecting member 51 enters into the next chamber 521, the sliding pin 711a makes the swing plate 71a rotate around its rotating shaft under the guide of the resetting edge 722a of the sliding groove 72a, the swing plate 71a drives the support base 62a to move through the interlocking portion 712a, but because the connecting member 51 is stuck in the cartridge 52 and the rotation of the cartridge 52 is limited, the support base 62a drives the pawl 61a to overcome the action of the torsion spring 63a and be separated from one of the teeth of the ratchet wheel 523, and the pawl 61a moves with the support base 62a and engages the next tooth under the action of the torsion spring 63a, thus the movement of the control assembly 60a relative to the cartridge 52 is realized.

The rapid change of the tool bits of the DC electric screwdriver in the Embodiment IV above will be illustrated in details hereinafter.

As shown in FIG. 36 to FIG. 37, the electric screwdriver is in working state, and at this time, it can be used to tighten screws after the button switch 7 is pressed. As shown in FIG. 38, when the tool requires changing another type of tool bits 9, operate the sliding lid 53 to move towards the electric motor 2, the sliding lid 53 relieves the connecting member 51 from the locking resulted by the limit block 81 through the unlocking part 538 and the sliding pin 711a slides along the straight edges of the sliding groove 72a.

Figure 39:
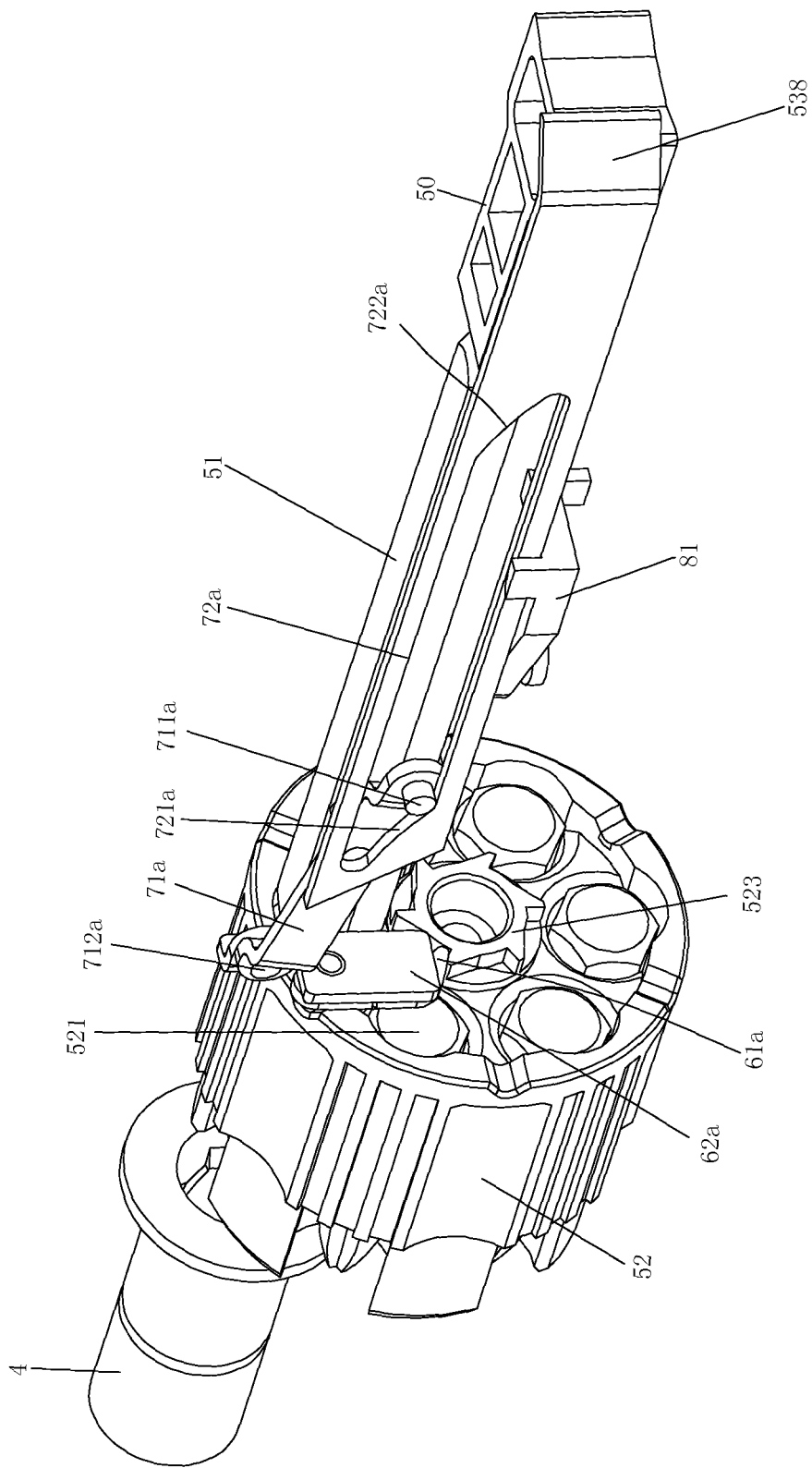
FIG. 39 is an exploded perspective view of part of the power tool in FIG. 36 when the connecting member of the power tool is in released state.
Figure 40:
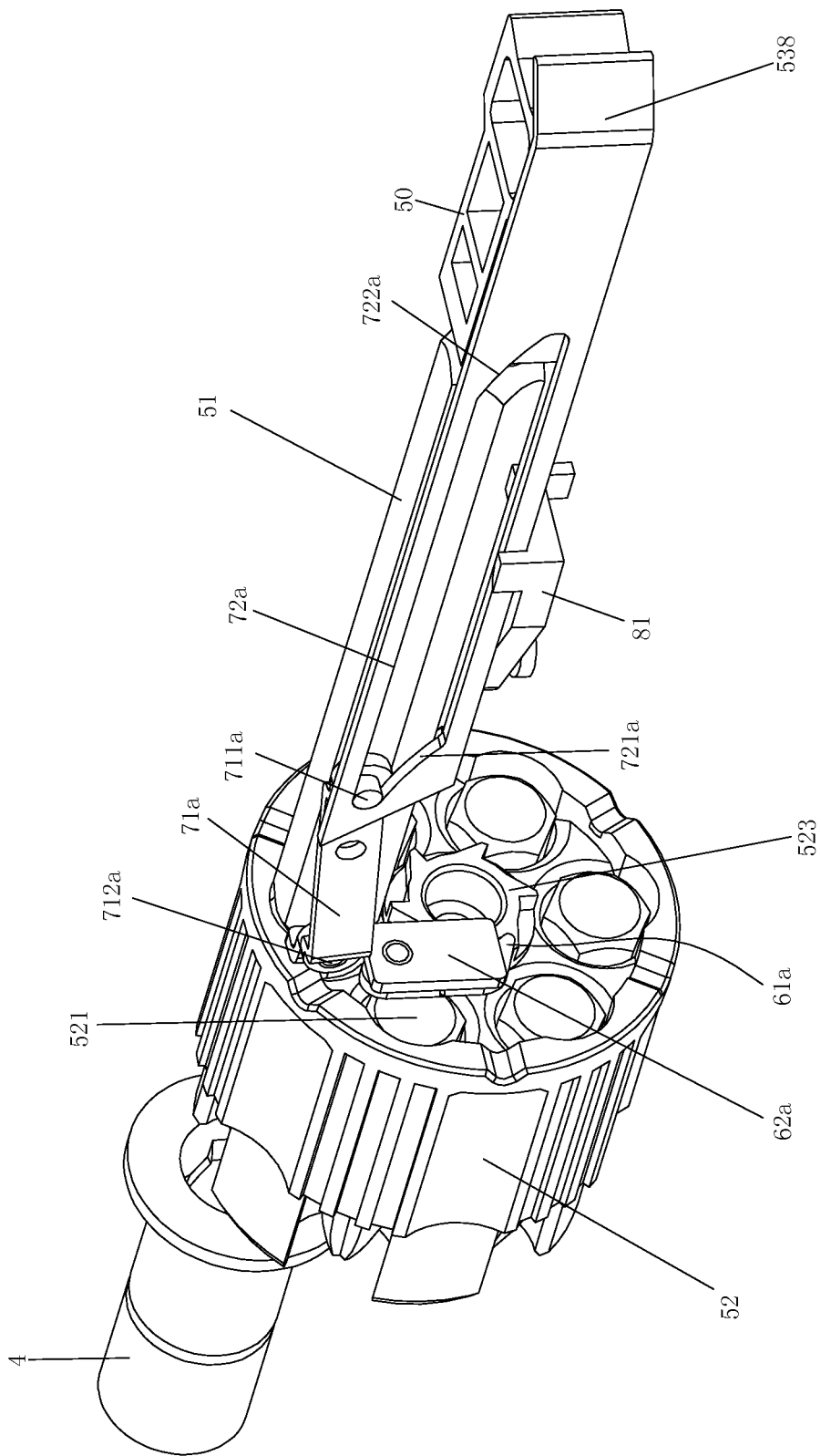
FIG. 40 is a perspective view after the cartridge of the power tool in FIG. 36 invention is driven to rotate.

Then, as shown in FIG. 39, the sliding lid 53 drives the connecting member 51 to move in the same direction with it to the release position where the connecting member 51 is separated from the tool bit, the connecting member 51 drives the tool bit 9 back to the chamber 521 through the magnet 511 and the sliding pin 711a slides to the critical position of the shifting edge 721a along the straight edge of the sliding groove 72a. As shown in FIG. 40, continue moving the sliding lid 53 towards the electric motor 2, the sliding pin 711a slides along the shifting edge 721a of the sliding groove 72a and makes the swing plate 71a rotate a certain angle around its rotating shaft under the guide of the shifting side 721a and at the same time the interlocking portion 712a of the swing plate 71a drives the support base 62a to move, thus the support base 62a drives the pawl 61a to move, the pawl 61a drives the cartridge 52 to rotate a certain angle, and another tool bit is brought to correspond to the output shaft 4 with the rotation of the cartridge 52, thus the rapid change of the tool bit is completed.

FIG. 41, move the sliding lid 53 towards the output shaft 4 to reset, the sliding lid 53 brings the connecting member 51 to move towards the output shaft 4, the end of the connecting member 51 provided with the magnet 511 contacts the tail of another tool bit 9 to be automatically changed and attracts the tool bit, and the connecting member 51 drives the tool bit 9 to go into the output shaft 4 until the tool bit 9 exposes itself from the front end of the output shaft 4. Continue moving the sliding lid 53 towards the output shaft 4, the sliding pin 711a slides along the resetting edge 722a of the sliding groove 72a and makes the swing plate 71a rotate at a certain angle around its rotating shaft under the guide of the shifting side 721a and at the same time the interlocking portion 712a of the swing plate 71a drives the support base 62a to move, thus the support base 62a drives the pawl 61a to move, but the cartridge 52 cannot rotate at this time because the connecting member 51 passes through it, therefore the pawl 61a passes one of the teeth of the ratchet wheel 523 on the cartridge and engages the next tooth, the sliding lid 53 returns to the position where it abuts against the front housing 13 and the electric screwdriver recovers its working state as shown in FIG. 37, thus the resetting of the control assembly 60a is completed. If the tool bit selected above is not what the operator needs, repeat the steps above until the output shaft 4 exposes the tool bits needed. Or move the sliding lid 53 to expose the cartridge 52, and rotate the cartridge 52 manually to select the tool bits needed.

The method that the sliding lid 53 drives the fixing block 50 on the connecting member 51 to move through the engaging block 55 in the operation process above is the same as that in the Embodiment I, so details will not be given herein.

As shown in FIG. 42 to FIG. 54, the power tool in the preferred Embodiment V according to the present invention is specifically a handheld multifunctional electric drill which can perform the functions of drills and screwdrivers. Electric drills have direct-current (DC) ones and alternating-current (AC) ones, but the embodiment takes DC multifunctional drills for detailed description. The structure and functions of the parts with the same number as those of the preferred Embodiment I, so details will not be given herein.

Figure 42:
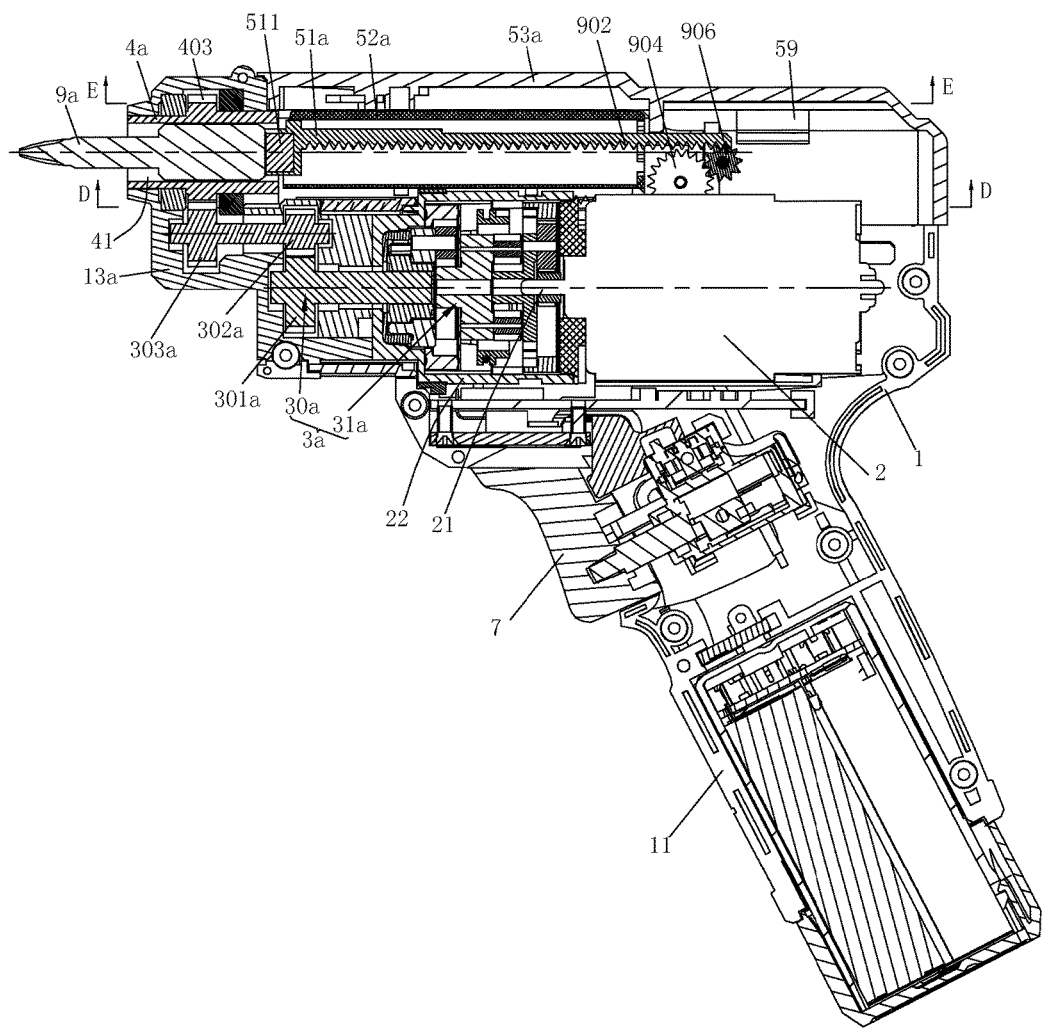
FIG. 42 is a sectional view of the power tool in the preferred embodiment V according to the present invention when it is in work state.
Figure 43:
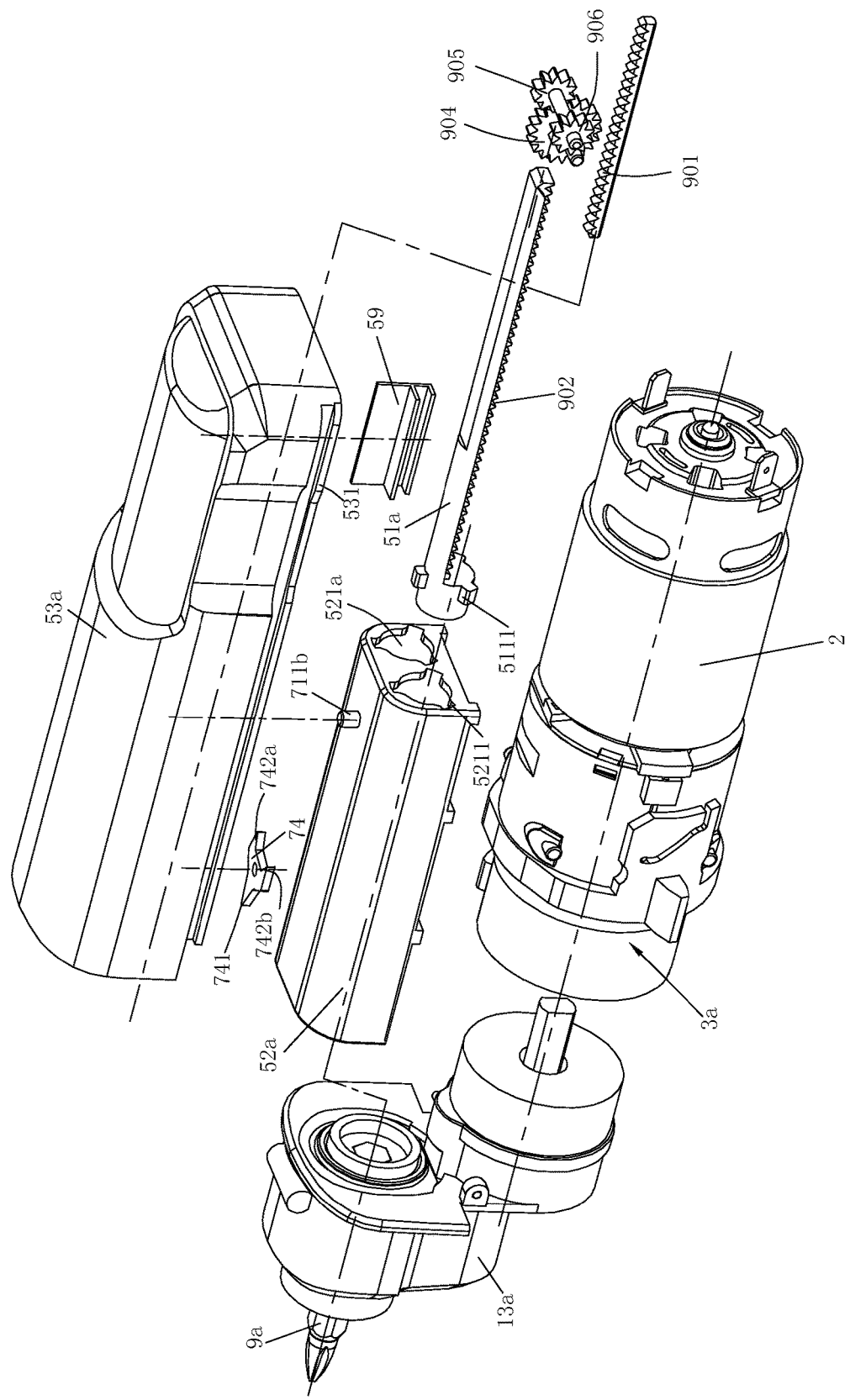
FIG. 43 is an exploded perspective view of part of the power tool in FIG. 42.

As shown in FIG. 42 and FIG. 43, the DC multifunctional drill comprises a housing 1, an electric motor 2, a battery 6, a transmission mechanism 3a, a connecting member 51a, a tool bit supporting assembly and an output shaft 4a. As a preferred embodiment, the battery 6 can be fixed inside the handle 11 or accommodated in a battery pack and installed on the housing 1. The battery 6 can be lithium-ion battery.

The transmission mechanism 3a includes a planetary gear speed-reduction assembly 31a driven by the electric motor 2 and a pinion assembly 30a from back to front (regard the right of the figure as the back), wherein the pinion assembly 30a is connected with the output shaft 4a and transmits the rotary movement of the electric motor 2 to the output shaft 4 through the output shaft 4a. The tool bit supporting assembly is used to store different tool bit. The tool bit said herein mainly refers to a cross-head screwdriver bit, a slotted screwdriver bit, drill bit, etc. commonly used by the DC multifunctional electric drill. Tool bits can be rapidly changed by operating the connecting member 51a to make axial movement through or leave from the tool bit supporting assembly so that the electric drill can be used to drill holes, tighten or loosen different screws.

The motor in the preferred embodiment according to the present invention is an electric motor 2 with an electric motor shaft 21 extending forward and out of the electric motor housing. The electric motor 2 is fixed in the housing 1, a gearbox 22 is fixed in the housing 1 and in front of the electric motor 2, the gearbox 22 is used to accommodate the planetary gear speed-reduction assembly 31a, the housing 1 includes a front housing 13a connected at its front end, the pinion assembly 30a is accommodated in the front housing 13a, and a division plate 221 is arranged between the planetary gear speed-reduction assembly 31a and the pinion assembly 30a to separate the two assemblies. The pinion assembly 30a includes a first gear 301a connected with the planetary gear speed-reduction assembly 31a, a second gear 302an engaging the first gear and a third gear 303a driven by and simultaneously moving together with the second gear 302a, wherein external teeth 403 are arranged along the circumferential direction of the output shaft 4a and the third gear 303a engages the external teeth 403 so as to drive the output shaft 4a to rotate. Wherein the planetary gear speed-reduction assembly 31a is provided with a speed-regulation device, i.e. the second stage gear ring is driven to make axial movement and engage different elements in the planetary gear speed-reduction assembly 31a by operating the speed switching button (not shown in the figure) arranged on the housing so that different speeds are output. The speed switching is familiar to those skilled in the field, so details will not be given herein.

In addition, provision of three gears for the pinion assembly 30a is just for forming a more compact internal space so as not to affect the beauty of the appearance. Certainly, based on needs, one gear or two gears can be provided. In addition, the transmission assembly 3a is not limited to the forms above, and the transmission assembly 3 can include the planetary gear speed-reduction assembly 31a only, or the pinion gear assembly 30a only, or other rotary movement transmission assembly such as a ratchet assembly and a worm gear assembly. Wherein the electric motor shaft 21 extends and engages the planetary gear speed-reduction assembly 31a, the planetary gear speed-reduction assembly 31a transmits the rotary movement to the pinion assembly 30a, and then the pinion assembly 30a drives the output shaft 4a to rotate. In this way, when the electric motor 2 runs, movement is transmitted by the planetary gear speed-reduction assembly 31a and the pinion assembly 30a, and finally output by the output shaft 4a. Thus it can be seen that the transmission chain of the embodiment is electric motor—transmission assembly—output shaft, i.e. the connecting member does not serve as part of the transmission chain. Certainly, those skilled in the field easily think of that the transmission chain of the embodiment is electric motor—transmission assembly—connecting member—output shaft, i.e. the connecting member serves as part of the transmission chain. In addition, the speed-reduction assembly includes a three-stage planetary speed-reduction or two-stage parallel shaft speed-reduction system to obtain desired output speed. In other embodiments, depending on desired output speed, the speed-reduction assembly can include a two-stage planetary speed-reduction system only or other speed-reduction systems.

The tool bit supporting assembly of the embodiment is preferably a roughly rectangular cuboid-shaped boxlike cartridge 52a, the length direction of the cartridge 52a is parallel to the axial direction of the output shaft 4a and two chambers 521a are disposed in parallel along the width direction of the cartridge 52a so that the accommodating chambers 521a are capable of accommodating very long tool bits such as drill bits and long screwdrivers. The cartridge 52a is fixed relative to the axial direction of the housing 1, the connecting member 51a makes axial movement relative to the housing 1 to drive the tool bit 9a accommodated in one of the chambers 521a into the output 4a, or the connecting member 51a attracts and brings the tool bit 9a back to the chamber 521a through the magnet 511 arranged at its front end, and the connecting member 51a herein is used to push out or pull back the tool bit 9a but does not serves as part of the transmission chain. The cartridge 52a, supported on the housing 1 and located above the transmission mechanism 3a, axially overlaps the whole planetary gear speed-reduction assembly 31a in the transmission mechanism 3a and axially overlaps the electric motor 2, thus making the complete machine more compact and saving space.

A sliding lid 53a, slidably connected on the housing 1, is capable of driving the connecting member 51 to make axial movement. The cartridge 52a is supported on the housing. When the electric drill works, the sliding lid 53a abuts against the front housing 13a, thus the cartridge 52a and the connecting member 51 can be sealed; when changing tool bits for the electric drill, the sliding lid 53a is separated from the front housing 13a and brings the tool bits back to the chambers 521a.

The cartridge 52a in the embodiment is used to accommodate long screwdriver bits or drill bits, for example two-inch screwdrivers, so the cartridge 52a is also very long, which means that the connecting member 51a needs to move a very long distance; when the connecting member 51a is separated from the chamber 521a and the sliding lid 53a moves to the back end of the electric motor 2, therefore the complete machine must be very long. For this purpose, a travel amplification assembly is arranged between the sliding lid 53a and the connecting member 51a in the embodiment, and the linear movement of the sliding lid 53a drives the travel amplification assembly to bring the connecting member 51a to move so that the movement travel of the connecting member 51a is greater than that of the sliding lid 53a, that is to say, the connecting member 51a can be separated from the chamber even through the movement distance of the sliding lid 53a is shorter than that of the connecting member 51a.

Figure 44:
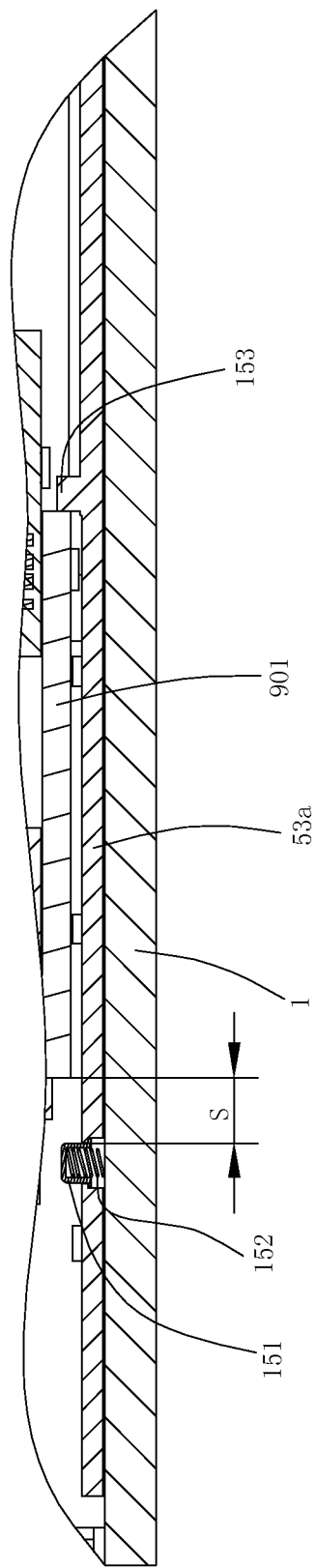
FIG. 44 is a sectional view of part of the power tool in FIG. 42 along the section line D-D.
Figure 45:
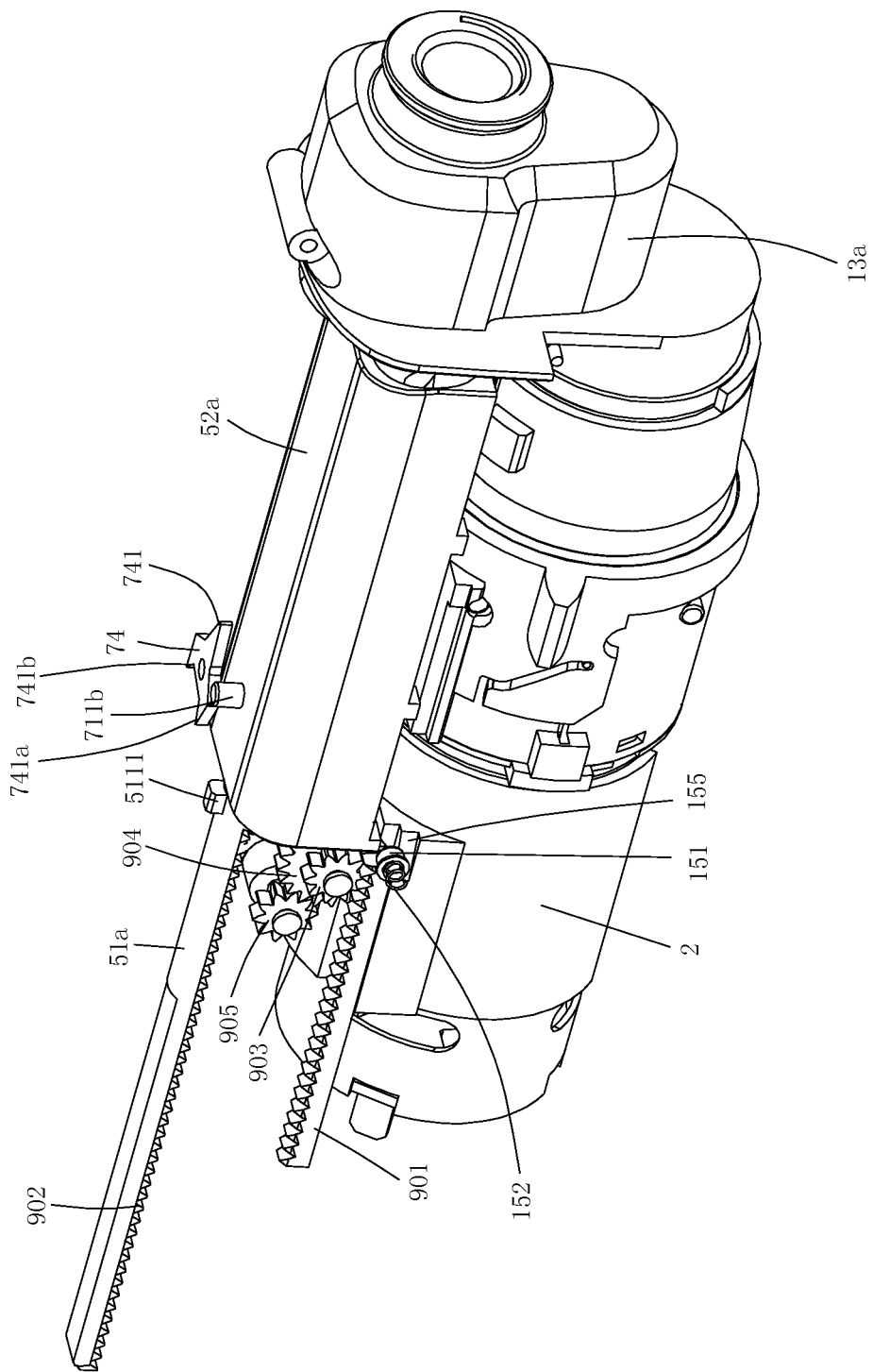
FIG. 45 is a perspective assembly drawing of the inner part of the power tool in FIG. 42, wherein the travel amplification assembly is shown in the first structure.

As shown in FIG. 43 to FIG. 45 is one structure of the travel amplification assembly. The travel amplification assembly includes a first rack 901, a second rack 902 and a speed-increasing gear train engaging the first rack 901 and the second rack 902, wherein the tooth surfaces of the first rack 901 and the second rack 902 are parallel to the horizontal plane, the speed-increasing gear train includes a first pinion 903 driven by the first rack 901, a bull gear 904 rotating synchronously with the first pinion 903, a second pinion 905 engaging the bull gear 904 and a third pinion 906 rotating synchronously with the second pinion 905 and engaging the second rack 902, wherein the connecting lid 53a is connected with and drives the first rack 901 to make linear movement, the second rack 902 is arranged on the connecting member 51a, since the speed of the first pinion 903 is the same as that of the bull gear 904 and the bull gear 904 has more teeth than the second pinion gear 905, thus the drive from the first gear 903 to the second gear 905 is speed-increasing drive so that the movement speed of the second rack 902 is increased in relation to that of the first rack 901. Preferably, the linear movement speed of the second rack 902 is twice that of the first rack 901, that is to say, the movement travel of the second rack 902 is twice that of the first rack 901. The complete machine is well configured with such a compact structure, and it can be ensured that the movement of the connecting member 51a will not be interfered by the sliding lid 53a.

Figure 46:
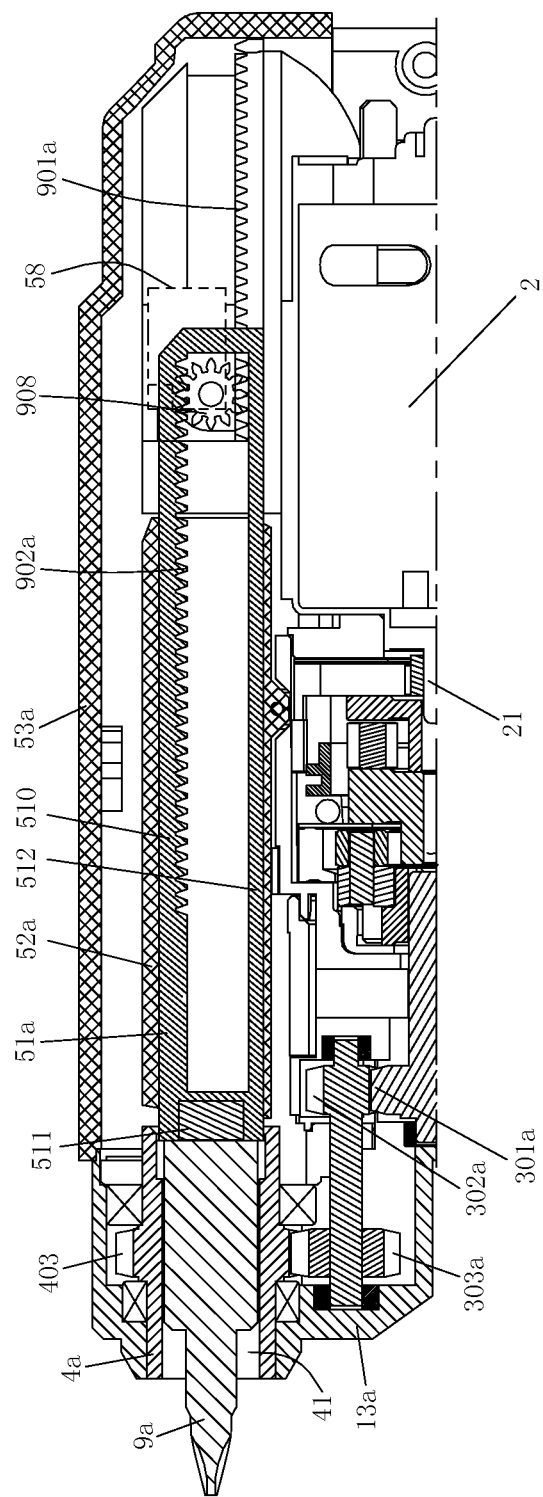
FIG. 46 is a schematic view of the second structure of the preferred travel amplification assembly according to the present invention.
Figure 47:
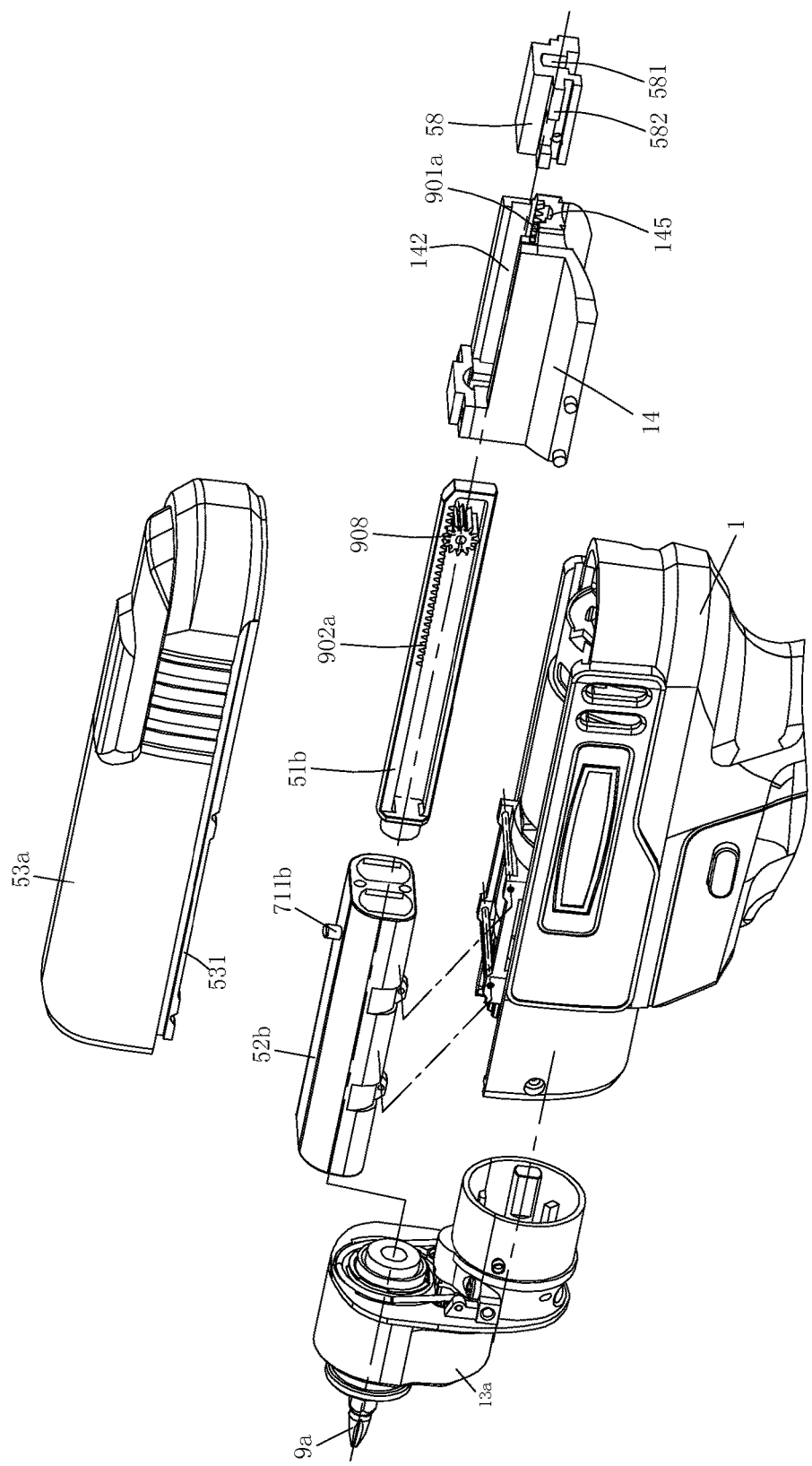
FIG. 47 is an exploded perspective view of part of the power tool in FIG. 46.

As shown in FIG. 46 and FIG. 47 is another structure of the travel amplification assembly. The travel amplification assembly includes a first rack 901a, a second rack 902a and a sliding gear 908 engaging the first rack 901a and the second rack 902a. The reason why it is the sliding gear 908 is that the gear 908 can make linear movement along the axial direction of the output shaft while rotating around the axis, the rotating axis of the gear 908 is also perpendicular to the vertical plane, therefore the tooth surfaces of the first rack 901a and the second rack 902a are perpendicular to the vertical plane as well to ensure that the racks and the gears are disposed according to height direction. The housing 1 includes a top cover 14 fixed on the upper part of the electric motor 2, wherein the first rack 901a is fixed on the top cover 14 and its tooth surface faces upward, the second rack 902a is fixed on the connecting member 51a and its tooth surface faces downward, the sliding gear 908 is located between the first rack 901a and the second rack 902a, and the two ends of the center rotation shaft of the sliding gear 908 are supported on a push block 58 in such as way that the sliding lid 53a is connected with the push block 58 and drives it to move and then drives the sliding gear 908 to move. The center of the push block 58 is provided with an avoidance groove 581, the avoidance groove 581 runs through the push block 58 along the length direction of the connecting member 51a, so that the connecting member 51a can be in part accommodated in the avoidance groove 581 and can slides along the avoidance groove 581. A guide rail 582 is arranged at the edge of the push block 58, a guide groove 142 is arranged on the corresponding top cover 1, and the push block 58 slides in the guide groove 142 through the guide rail 582 to drive the sliding gear 908 to move. The connecting member 51a, configured into a hollow quadrilateral, has a first arm 510 provided with the second rack 902a and the second arm 512 disposed opposite the first arm 510, wherein the first arm 510 can slide in the avoidance groove 581, a sliding guide groove 145 is arranged in the position on the top cover 14 corresponding to the second arm 512, the first rack 901a is disposed at two sides of the sliding guide groove 145, i.e. there are two first racks 901a, and the second arm 512, in part accommodated in the sliding guide groove 145, can move along the sliding guide groove 145, thus the avoidance groove 581 and the sliding guide groove 145 provides radial support and limit for the connecting member 51a and makes the arrangement of the first rack 901a, the second rack 902a and the sliding gear 908 more compact, and the first rack 901an engages different part of the sliding gear 908 from the second rack 902a along the width direction of the gearing face of the sliding gear 908, reducing the wear of the sliding gear 908 and prolonging the life of the tool.

The multifunctional electric drill of the embodiment is also arranged with an automatic shifting means for shifting tool bits automatically, that is to say, operate the sliding lid 53a to drive the connecting member 51a to leave the chamber 521a and relieve the cartridge 52a's movement limitation, and the cartridge 52a automatically moves to the position where the next chamber 521a axially corresponds to the output shaft 4a under the action of the automatic shifting means, therefore operators can select tool bits without turning the cartridge 52 manually.

Figure 48:
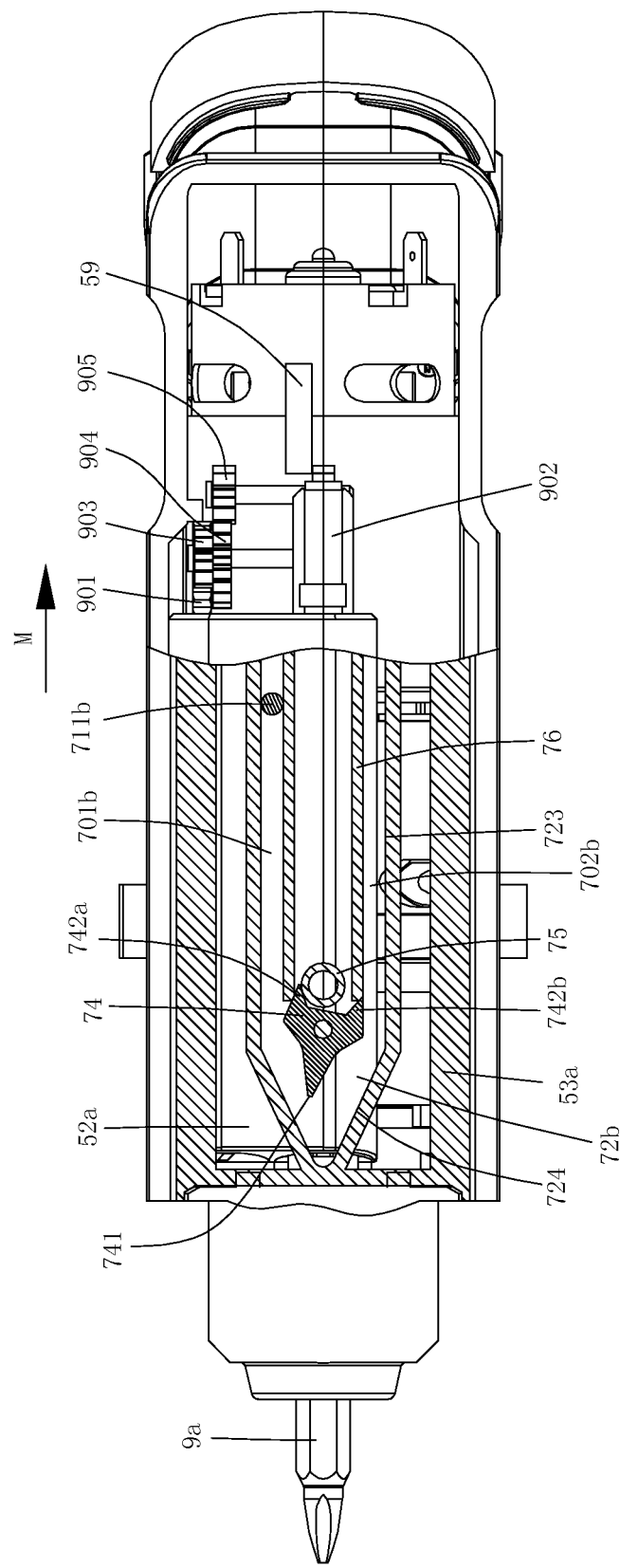
FIG. 48 is a sectional view of the power tool in FIG. 46 along the section line E-E.
Figure 49:
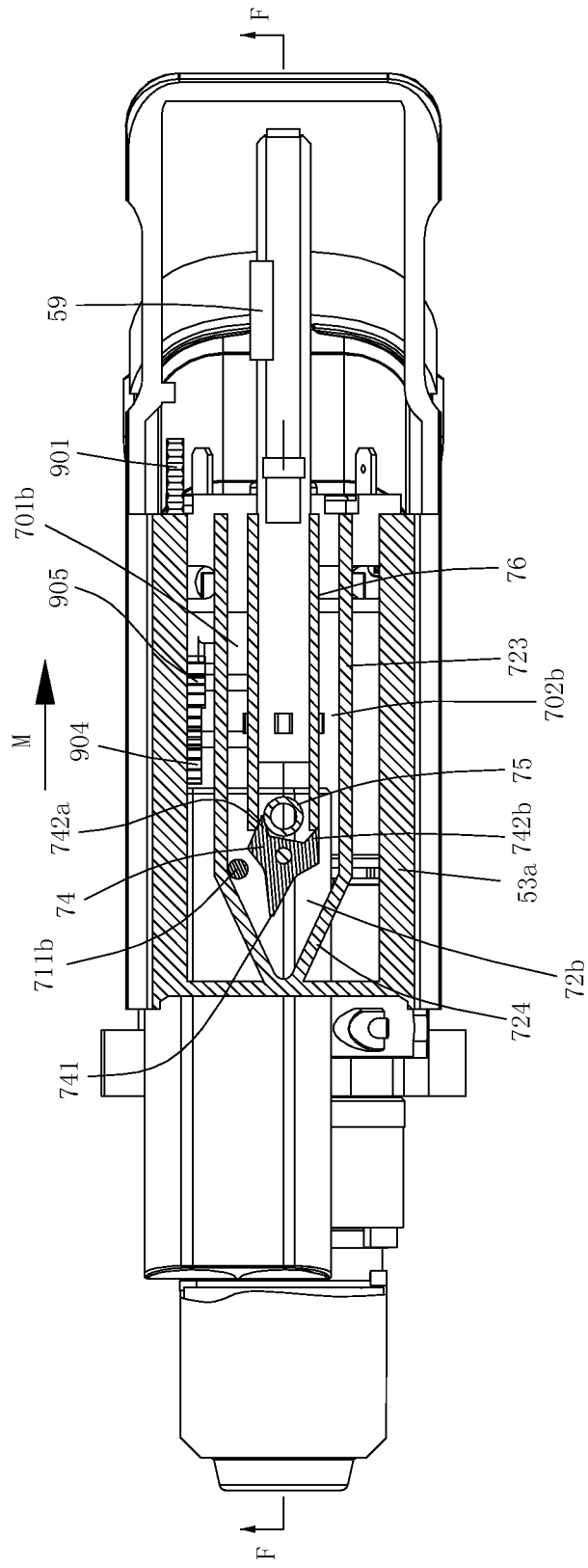
FIG. 49 is a sectional view of the connecting member of the power tool in FIG. 46 driving the tool bit to the cartridge.

As shown in FIG. 48, in the embodiment, the automatic shifting means includes a movement conversion assembly arranged between the cartridge 52a and the sliding lid 53a, the linear movement of the sliding lid 53a drives the cartridge 52a to translate along the direction having an angle with the axial direction of the output shaft 4a through the movement conversion assembly, and preferably, the translation direction is perpendicular to the axial direction of the output shaft 4a. The movement conversion assembly herein includes a sliding groove 72b arranged on the sliding lid 53a and a sliding pin 711b fixed relative to the cartridge 52a, the sliding groove 72b has two oblique edges 724 symmetrically disposed and two straight edges 723 connected with the two oblique edges 724 and parallel to the axial direction of the output shaft 4a, the sliding pin 711b is capable of sliding along the straight edges 723 and the oblique edges 724 in the sliding groove 72b with the movement of the sliding lid 53a, and the sliding pin 711b generates the movement perpendicular to the axial direction of the output shaft 4a relative to the housing 1 as it slides along the oblique edges 724, thus the sliding pin 711b drives the cartridge 52a to move along the direction perpendicular to the axial direction of the output shaft 4a. The sliding pin 711b can be made integral to the cartridge 52a, or a metal pin is fixed on the cartridge 52a so as to increase the strength of the sliding pin 711b. The movement conversion assembly in the embodiment is used to convert the linear movement of the sliding lid 53a to the linear movement of the cartridge 52a. In addition to the form of sliding groove matching the sliding pin, those skilled in the field easily think of that the form of rack matching a pair of bevel gears can also perform the movement conversion above.

In addition, to prevent the sliding pin 711b from being staggered relative to the sliding lid 53a in accidental falls, two rib plates 76 can be arranged between the two straight edges 723 of the sliding groove 72b and parallel to the straight edges 723, thus forming two parallel tracks and limiting the sliding pin 711b to slid between the straight edge 723 and the rib plate 76 only, wherein the area from the first straight edge 723 to the intersection portion of the two oblique edges 724 form a first sliding groove 701b, and the area from the second straight edge 723 to the intersection portion of the two oblique edges 724 form a second sliding groove 702b. In addition, to make the sliding pin 711b move along the preselected track reliably, a guide plate 74 is roughly arranged in the middle of the boundary of the two straight edges 723 and the two oblique edges 724. The guide plate 74 is capable of rotating around the axis perpendicular to the plane of the movement track of the sliding pin 711b. Preferably, the guide plate is Y-shaped, the top 741 of the Y-shaped plate is staggered relative to the axis of symmetry of the oblique edges 724, thus there will be a maximum component force for driving the guide plate to rotate when the sliding pin 711b contacts the guide plate 74 so that the guide plate 74 is more easily driven to the preselected track. Certainly, those skilled in the field easily think of that the guide plate 74 can have many shapes, such as triangle, rhombus, heart-shaped, falcate, etc., provided that the sliding pin 711b is making linear movement when contacting the guide plate 74 and goes into the preselected track under the guide of the guide plate 74. A stop post 75 is arranged in the sliding groove 72b and located at one end of Y's trails 742a and 742b of the guide plate 74. The stop post 75 is fixed on the sliding lid 53a, and the trails 742a and 742b can abut up against the stop post 75 so that the guide plate 74 is limited by the stop post 75 and can only rotate in a certain range, ensuring that the sliding pin 711b can smoothly go into the preselected track. What are described above is that the stop post is located between the two branches of Y. Certainly, provision of two stop posts outside the two branches can also limit the rotation range of the guide plate 74. In addition, a magnet arranged in the stop post 75 is used to attract the guide plate 74 and keep it in an angle so that Y's top 741 of the guide plate is staggered relative to the intersection portion of the two oblique edges 724 to prevent the sliding pin 711b from contacting Y' top 741 of the guide plate and being stopped. The guide plate 74 provides a two-way channel for the sliding pin 711b, i.e. the sliding pin 711b can move from a first end of the sliding groove 72b to a second end and move from the second end back to the first end so as to perform switching of the alternation between two tool bits. That is to say, the form of the sliding pin and sliding groove above is not limited to the plan of cartridge translation, and it also can be applied in the plan of the cartridge rotating between the two positions.

In the embodiment above, the sliding lid 53a controls the connecting member 51a to move until the connecting member 51a is separated from the chamber 521a, the sliding lid 53a needs to continue moving to drive the sliding pin 711b and then drive the cartridge 52a to move, so the movement distance of the connecting member 51a must be the same as that of the sliding lid 53a; in addition, since a travel amplification assembly is connected between the sliding lid 53a and the connecting member 51a, the movement distance of the connecting member 51a is greater than that of the sliding lid 53a. To prevent the connecting member from being pushed out of the sliding lid 53a, the sliding lid 53a must be very long.

As shown in FIG. 43 and FIG. 44, preferably, a rack push block 151 is arranged between the sliding lid 53a and the first rack 901 according to the present invention, the rack push block 151 is spaced S (distance) from the axial direction of the first rack 901 and can be used to relieve the connecting member 51a from the locking. The specific structure is the same as that in the embodiment above, so details will not be given.

One side of the rack push block 151 is provided with a compression spring 152, the other side can be stuck on the first rack 901, and the sliding lid 53a drives the first rack 901 to move through the rack push block 151. The housing 1 is set with a guide bevel 155. When the sliding lid 53a drives the rack push block 151 to move to the guide bevel 155, the rack guide block 151 overcomes the force of the compression spring 152 under the action of the guide bevel 155 and slides on the first rack 901 so that the sliding lid 53a cannot continue driving the first rack 901 to move and the connecting member 51a cannot continue moving. In this way, the sliding lid 53a controls the connecting member 51a to move until the connecting member 51a is separated from the chamber 521a, the sliding lid 53a continues moving and driving the cartridge 52 to move, but the connecting member 51a no longer moves with the sliding lid 53a, i.e. the connecting member 51a keeps still relative to the housing 1, that is to say the sliding lid 53a moves an idle travel, thus the movement distance of the connecting member 51a is minimum and the structure of the tool is compact. The theory of the idle travel of the sliding lid 53a is that as sliding lid moves a certain distance, but in the process, it cannot drive the connecting member to move together with it relative to the housing, that is to say, in an idle travel, the connecting member keeps still relative to the housing but the sliding lid moves relative to the housing. Those skilled in the field can make some changes to the structure of the idle travel of the sliding lid in the DC electric screwdriver in the preferred embodiment of the power tool for substitution based on the theory above, or through other means.

A backpush block 153 is arranged at the other side of the sliding lid 53a opposite the first rack 901. When operating the sliding lid 53a to reset, the backpush block 153 abuts against the first rack 901 so that the sliding lid 53a drives the first rack 901 to move together with it.

When the connecting member 51a with very long axial length in the embodiment pushes tool bits into the cartridge 52a, it is supported in the cartridge 52a, but when the connecting member 51a moves backward, its one end is supported on the second pinion 905 and the other end can be supported on a supporting rib plate 59 arranged on the sliding lid 53a to prevent the connecting member 51a from slanting. In addition, the end of the connecting member 51a provided with the magnet 511 is distributed with projections 5111 along the circumferential direction and the chamber 521a of the corresponding cartridge 52a is arranged with positioning grooves 5211 so that the connecting member 51a can pass through the chamber 521a smoothly and the positioning groove 5211 can also support the connecting member 51a to prevent it from slanting when moving.

The rapid change of the tool bits in the Embodiment will be illustrated in details hereinafter.

As shown in FIG. 42 and FIG. 48, the multifunctional electric drill is in working state. When the tool requires changing another type of tool bits 9b, operate the sliding lid 53a to move along the direction of the arrow M in the figure, the sliding lid 53a drives the first rack 901 to make linear movement through the rack push block 151, the first rack 901 drives the connecting member 51a to make axial movement through the first pinion 903, the bull gear 904, the second pinion 905, the third pinion 906 and the second rack 902, the connecting member 51a drives the tool bit 9a back to the chamber 521a through the magnet 511 at its front end, and the connecting member 51a is separated from the chamber 521a, then the sliding pin 711b makes linear movement along the first sliding groove 701b of the sliding groove 72b to the position as shown in the figure.

Figure 50:
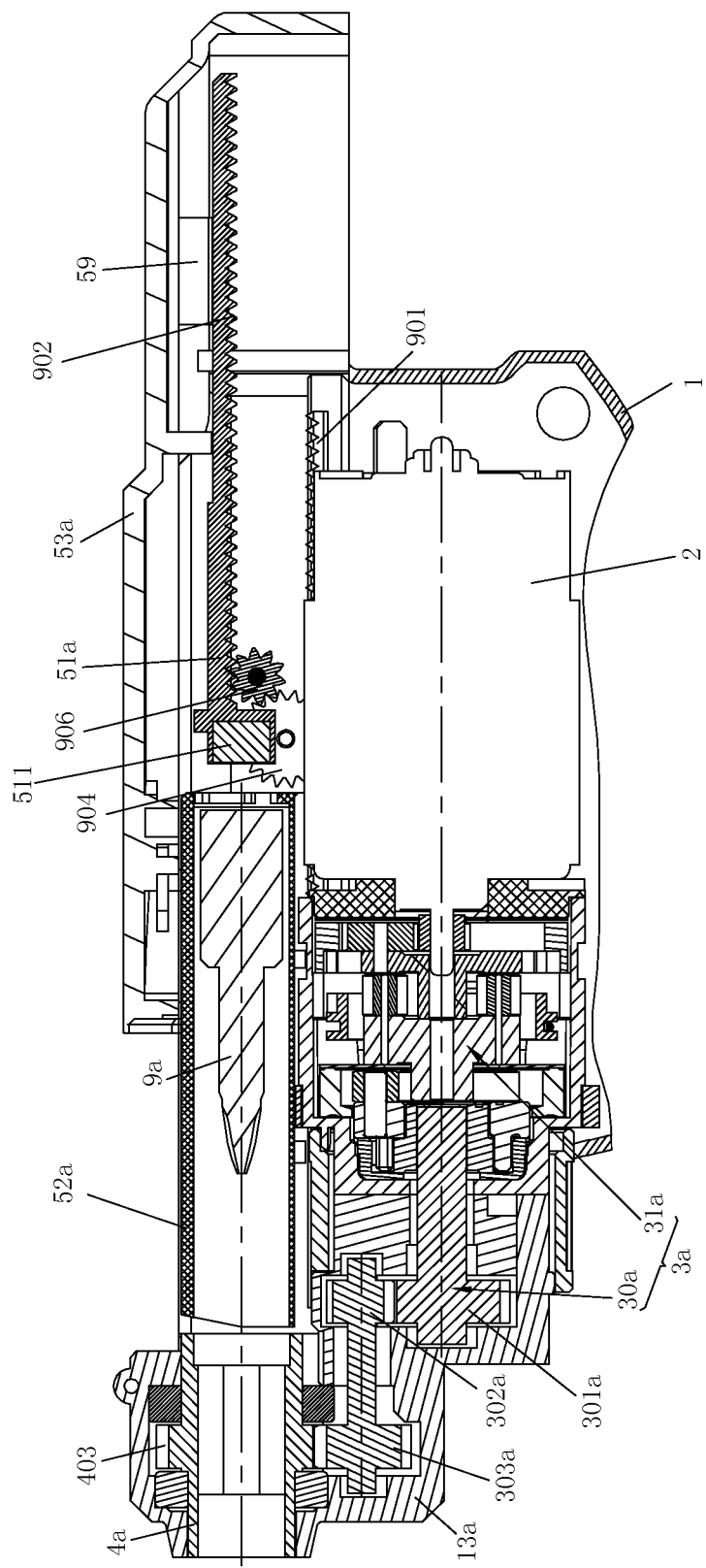
FIG. 50 is a sectional view of the power tool in FIG. 49 along the section line F-F.
Figure 51:
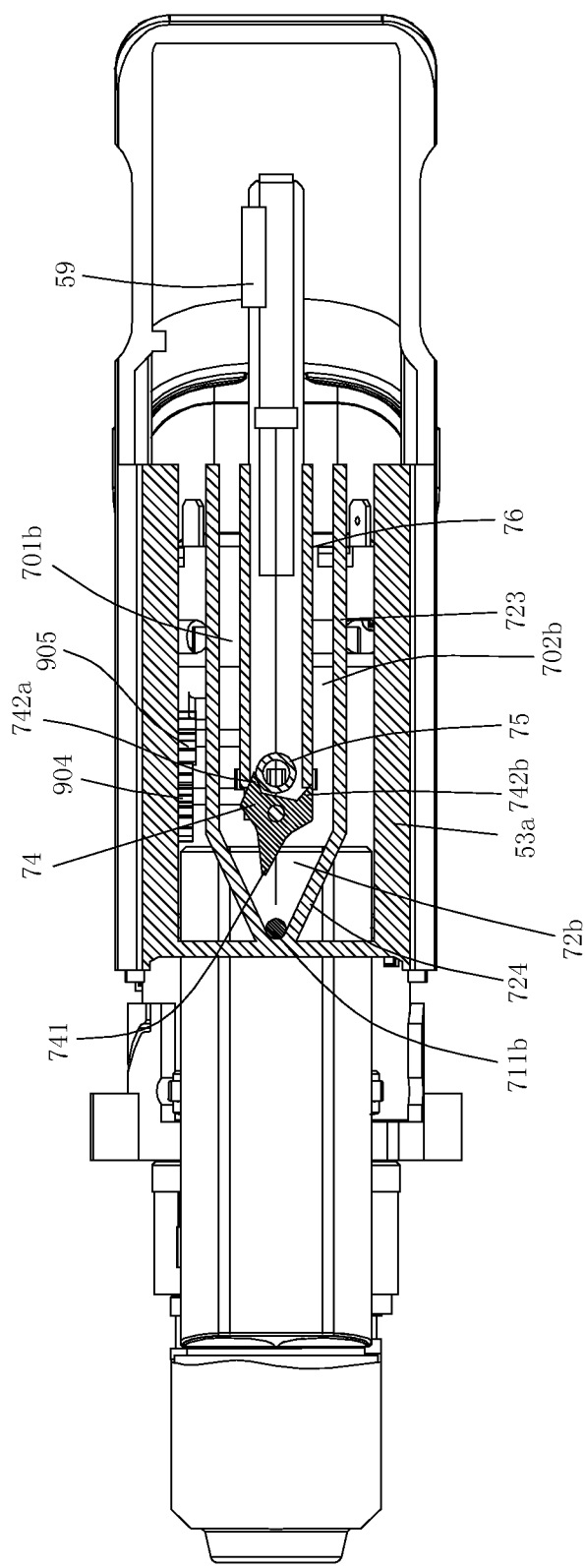
FIG. 51 is similar to FIG. 49, wherein the cartridge moves to the position where its center line corresponds to the output shaft.

Continue operating the sliding lid 53a to move along the direction of the arrow M in the figure, the rack push block 151 overcomes the force of the compression spring 152 under the action of the guide bevel 155 and slides on the first rack 901, the first rack 901 keeps still relative to the housing, therefore the connecting member 51a keeps still, the sliding pin 711b moves to the intersection top of the two oblique edges 724 of the sliding groove 72b along the oblique edge 724 of the sliding groove 72b, the sliding pin 711b cannot keep moving and limits the sliding lid 53a from keeping moving, while the cartridge 52a moves to the position where the center line of the cartridge 52a corresponds to the output shaft 4a along the axial direction of the output shaft 4a driven by the sliding pin 711b, i.e. the cartridge moves half way at this time, i.e. the position as shown in FIG. 50 and FIG. 51.

Figure 52:
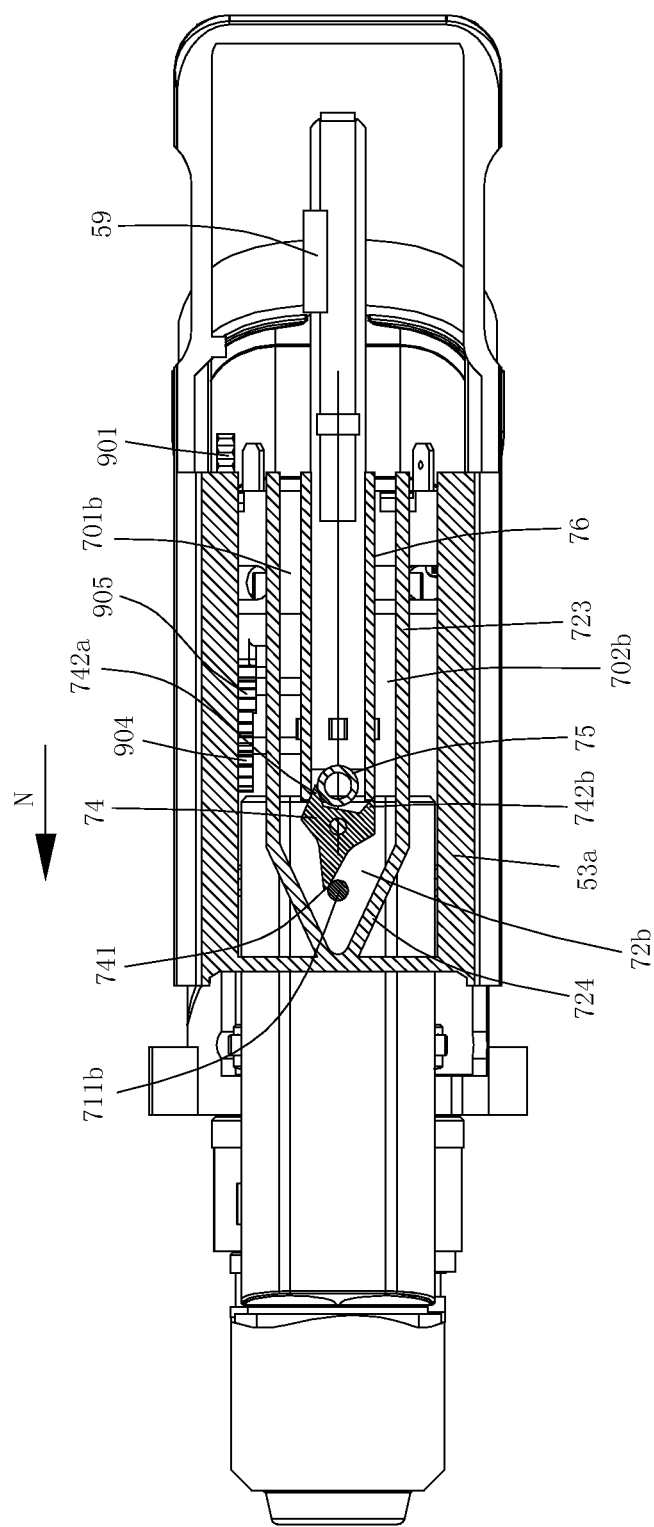
FIG. 52 is similar to FIG. 49, wherein the cartridge moves to the position where the sliding pin contacts the guide plate.
Figure 53:
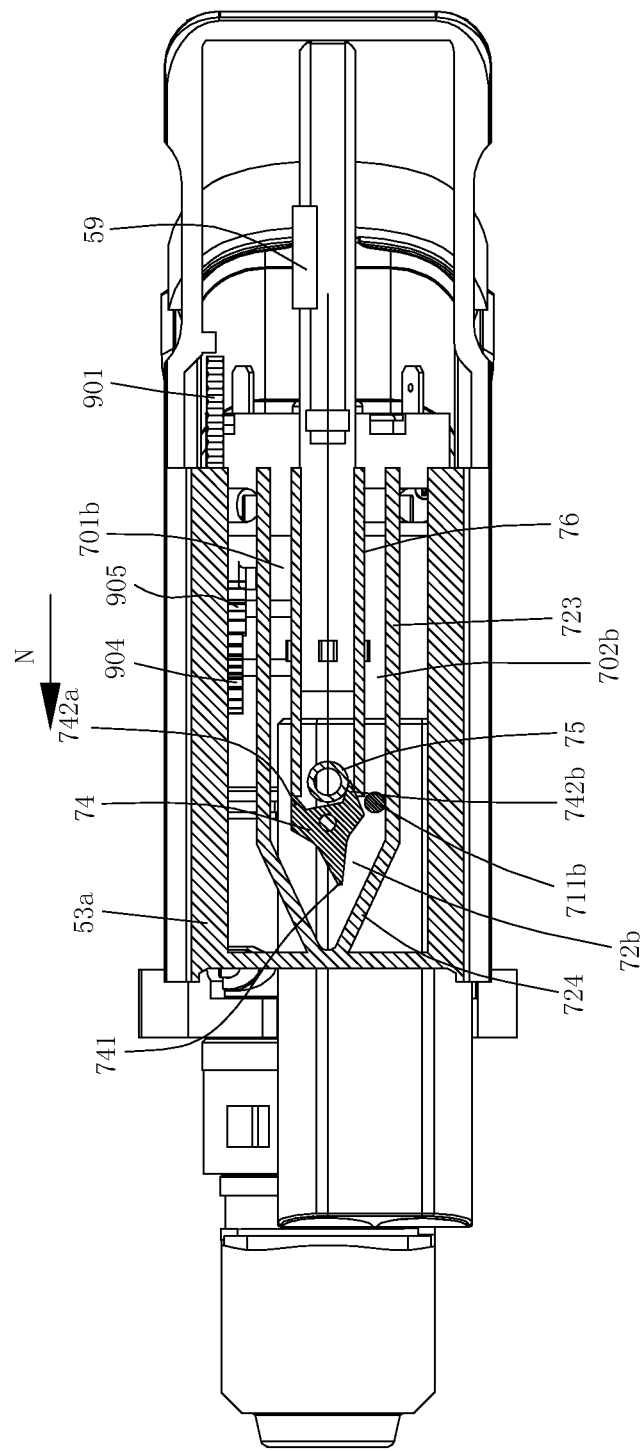
FIG. 53 is similar to FIG. 49, wherein the cartridge moves to the position where another chamber corresponds to the output shaft.

As shown in FIG. 52, move the sliding lid 53a along the direction of the arrow N in the figure, i.e. towards the end of the output shaft 4a, the rack push block 151 moves relative to the first rack 901, the connecting member 51a keeps still, the sliding pin 711b contacts the guide plate 74 and moves along one side of the guide plate 74 from the Y's top to the tail 742b, the sliding pin 711b drives the guide plate 74 to rotate, the guide plate 74 is limited by the stop post 75, the sliding pin 711b moves in the second sliding groove 702b under the action of the guide plate 74, the sliding lid 53a moves to the position where the backpush block 153 contacts the first rack 901, while the cartridge 52a moves to the position where another chamber 521a of the cartridge 52a for accommodating tool bit 9b along the direction perpendicular to the axial direction of the output shaft 4a under the drive of the sliding pin 711b, i.e. the position as shown in FIG. 53.

Figure 54:
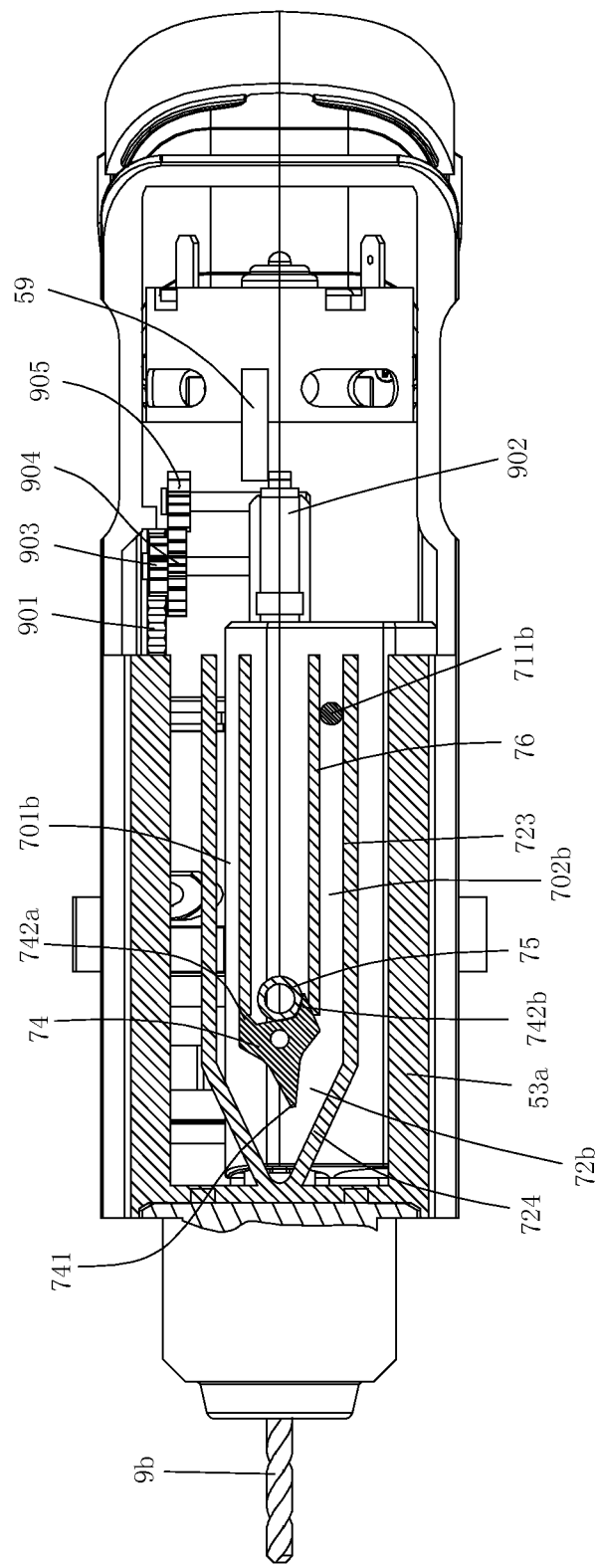
FIG. 54 is similar to FIG. 49, wherein the tool bit of the other chamber enters the output shaft and the sliding lid returns to the original position.

Continue operating the sliding lid 53a to move along the direction of the arrow N in the figure, the sliding pin 711b makes linear movement along the second sliding groove 702b, the sliding lid 53a drives the first rack 901 to make linear movement through the backpush block 153, the first rack 901 drives the connecting member 51a to make axial movement through the first pinion 903, the bull gear 904, the second pinion 905, the third pinion 906 and the second rack 902, and the connecting member 51a goes into another chamber 521a and drives the tool bit 9b in the chamber 521a into the output shaft 4a, i.e. the position as shown in FIG. 54.

Repeat the steps above, another tool bit 9a will be changed. That means the movement track of the sliding pin 711b in the sliding groove 72b is reciprocating, i.e. the sliding pin can move from the first sliding groove 701b to the second sliding groove 702b and can also move from the second sliding groove 702b back to the first sliding groove 701b, thus automatically shifting tool bits cyclically.

As shown in FIG. 55 to FIG. 82 is a DC multifunctional electric drill of the preferred Embodiment VI according to the present invention. The structure and functions of the parts with the same number as those of the preferred Embodiment V, so details will not be given herein. In the embodiment, the automatic shifting means includes a movement conversion assembly arranged between the cartridge 52a and the sliding lid 53b, the linear movement of the sliding lid 53b drives the cartridge 52a to translate along the direction having an angle with the axial direction of the output shaft 4a through the movement conversion assembly, and preferably, the translation direction is perpendicular to the axial direction of the output shaft 4a. The movement conversion assembly herein includes a sliding groove 72c arranged on the sliding lid 53b and a swing plate 79 pivoted on the top cover 14 of the housing 1, wherein each end of the swing plate 79 forms one pin, the first pin 791 is stuck in the square groove of the cartridge 52b and the second pin 792 is arranged in the sliding groove 72c and can slide in the sliding groove 72c. The sliding groove 72c has two straight edges 723c symmetrically arranged along the axial direction of the output shaft 4a and two oblique edges 724c connected with the two straight edges respectively, wherein the intersection of the two oblique edges 724c forms an oblique angle portion outward relative to the two straight edges 723c and faces the electric motor 2, two partition plates 725 are arranged in the middle of the sliding groove 72c and roughly parallel to the straight edges 723c, the distance between the two partition plates 725 is roughly equal to the diameter of the second pin 792, the second pin 792 can move in the track formed by the two partition plates 725, the distances between the two partition plates 725 and the corresponding two straight edges 723c are also roughly equal to the diameter of the second pin 792, the second pin 792 can also move in the tracks formed by the partition plate 725 and the corresponding straight edge 723c, and the two partition plates 725 divide the sliding groove 72c into a first sliding groove 701c and a second sliding groove 702c. The sliding lid 53b is pivoted with a guide plate 74c which is arranged in the sliding groove 72c and away from the oblique edge 724c. The guide plate 74c is roughly Y-shaped and the single-head end of the Y-shaped guide plate faces toward the oblique edge 724c. A stop post 75c is arranged in the sliding groove 72c and fixed on the sliding lid 53b. The stop post 75c is located in the middle of the dual-head ends of the Y-shaped guide plate 74c and the guide plate 74c can rotate around the axis perpendicular to the sliding groove 72c, thus the dual-head ends of the Y-shaped guide plate 74c can contact the stop post 75c alternatively so that the guide plate 74c is limited by the stop post 75c and can only rotate in a certain range, wherein when the guide plate 74c maintains in the position where it contacts the stop post 75c, the distance from the single-head end of the guide plate 74c to one guide plate is less than the diameter of the second pin 792 and the distance from the single-head end of the guide plate 74c to the other guide plate is less than the diameter of the second pin 792, thus it can be ensured that the second pin 792 can slide in the sliding groove 72c according to preselected tracks. The stop post 75c is provided with a magnet or the stop post itself is a magnet post and the guide plate 74c is made of magnetic materials. No matter which dual-head end of the guide plate 74c contacts the stop post 75c, it can maintain in the contact position, ensuring that the second pin 792 can go into the preselected track smoothly.

Figure 79:
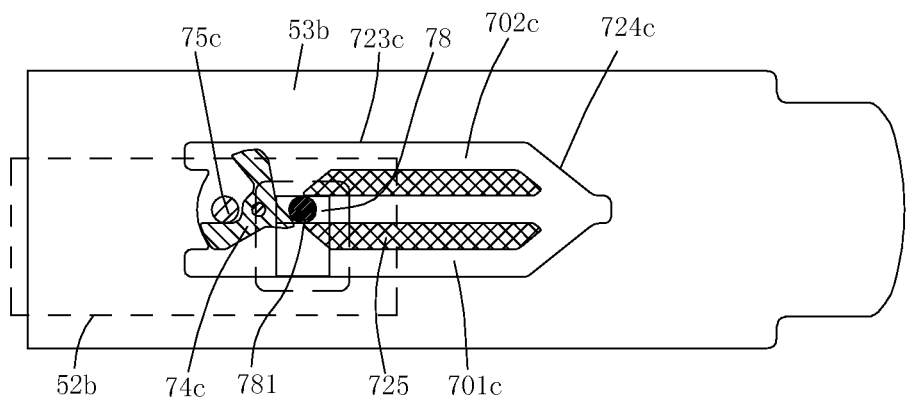
FIG. 79 is similar to FIG. 78, wherein the sliding lid comes to the position where the sliding pin contacts the guide plate.
Figure 80:
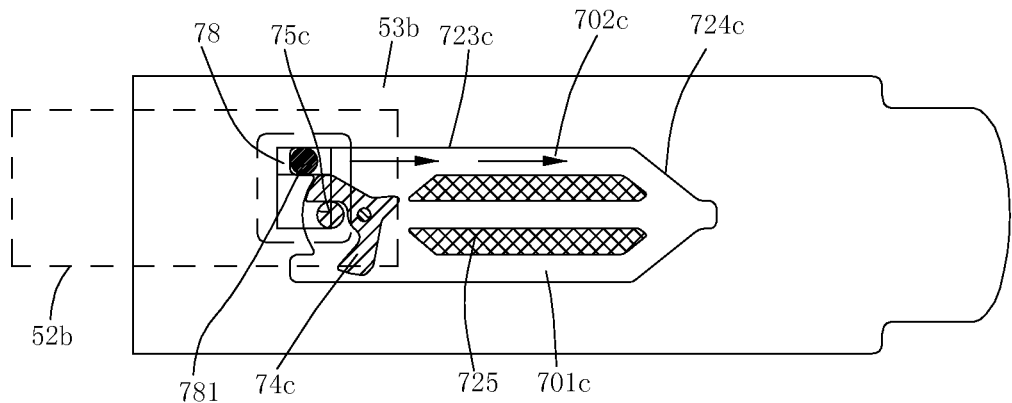
FIG. 80 is similar to FIG. 78, wherein the cartridge is driven to the position where another chamber corresponds to the output shaft.
Figure 81:
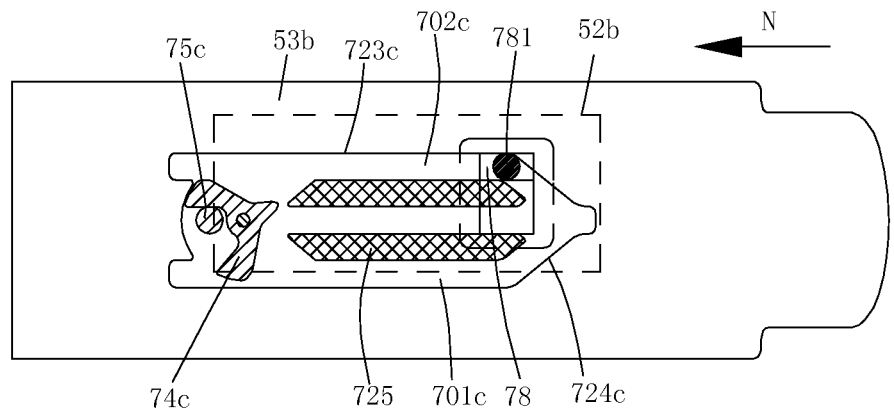
FIG. 81 is similar to FIG. 78, wherein the sliding lid returns to the original position and the sliding pin does not return to the initial position.
Figure 82:
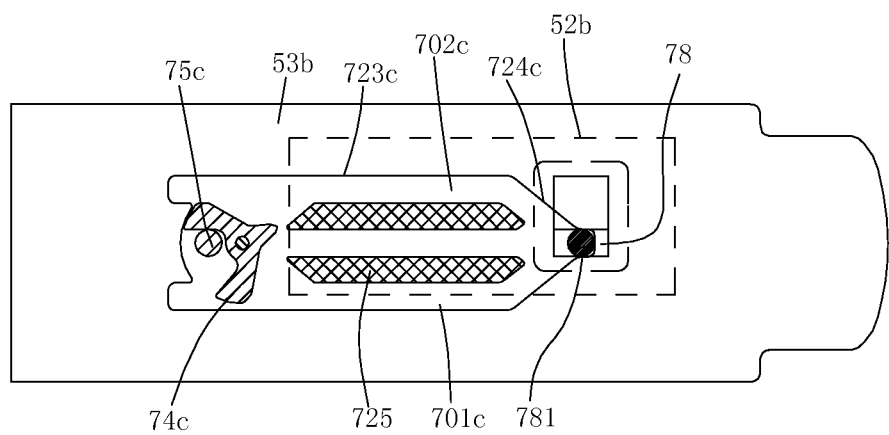
FIG. 82 is similar to FIG. 78, wherein the sliding pin returns to the initial position.

Provision of the swing plate 79 is to convert the linear movement of the sliding lid 53b to the linear movement of the cartridge 52b. Certainly, those skilled in the field can perform the conversion above through other ways. As shown in FIG. 78 to FIG. 82, the cartridge 52b is movably connected with a sliding block 78, a sliding pin 781 is fixed on the sliding block 78, one end of the sliding block 78 is slidably installed in the square groove on the cartridge 52b, and the sliding pin 781 can slide in the sliding groove. When the tool requires changing tool bits, operate the sliding lid 53b to move along the direction M, the sliding pin 781 moves in the sliding groove to the position where it contacts the guide plate 74c, as shown in FIG. 79, the sliding lid 53b continues moving, the sliding pin 781 generates a displacement perpendicular to the linear movement of the sliding lid 53b along the guide plate 74c, as shown in FIG. 80, in this way, the sliding pin 781 drives the cartridge 52b to the position where another chamber 521a axially corresponds to the output shaft through the sliding block 78. Operate the sliding lid 53b to reset along the direction N. Sliding pin 781 moves along the straight edge 723c in the sliding groove, as shown in FIG. 81. Continue operate the sliding lid 53b along the direction N, the sliding pin 781 returns to the initial position along the oblique edge 724*c*, as shown in FIG. 82. Repeat the steps above to change the last tool bit. Thus it can be seen that no matter the swing plate 79 or the sliding block 78, both performs the function of driving the cartridge 52*b* to move. Those skilled in the field can provide different structures for driving the cartridge 52*b* to move according to the present invention.

In addition, the guide plate 74*c* forms a movement track selection means which makes the cartridge 74*c* to cycle between the position where one chamber 521*a* axially corresponds to the output shaft and the position where another chamber axially corresponds to the output shaft. That is to say, the guide plate 74*c* not only performs the function of changing the movement direction of the sliding pin, but also makes the sliding pin be capable of cycling in the first sliding groove 701*c* and the second sliding groove 702*c*.

In the solution above, tool bits 9 are automatically shifted by operating the sliding lid 53*b* to make axial movement, that is, operate the sliding lid 53*b* to make the second pin 792 move in the sliding groove 72*c*, the connecting member 51*c* must be separated from the chamber 521*a* before the cartridge 52*a* moves, while the movement of the connecting member 51*c* is also realized by operating the sliding lid 53*b* to make axial movement; therefore, it is still needs operating the sliding lid 53*b* to make axial movement to complete automatic shifting after separation of the sliding member 51*c* and the chamber 521*a* by operating the sliding lid 53*b* to make axial movement; to prevent the connecting member 51*c* from continuing moving with the sliding lid 53*b*, the sliding lid 53*b* can be made slide an idle travel after the separation of the connecting member 51*c* and the chamber 521*a*, i.e. the sliding lid 53*b* continues making axial movement while the connecting member 51*c* holds still relative to the housing 1. There are many ways to realize the purpose, but in the embodiment, preferably, an engaging block 55*a* is arranged between the sliding lid 53*b* and the push block 58*a*, the push block 58*a* is connected on the engaging block 55*a*, the engaging block 55*a* is stuck in the limit groove 539*c* arranged on the sliding lid 53*b*, the engaging block 55*a* is connected with the sliding lid 53*b* along the axial direction through elastic positioning, and the engaging block 55*a* can move in the limit groove 539*c* under the spring force until being elastically positioned, thus another idle travel of the sliding lid 53*b* is realized.

Commonly-used screwdrivers are probably one inch (i.e. 2.54 cm) long, the shortest distance that the connecting member moves, i.e. to push the screwdriver bit out of the cartridge, is probably the length of the screwdriver, operating the sliding lid to move 3 cm or so will not cause effects on operation, but if the movement distance is too long, operators' efficiency will be affected, especially when operating the sliding lid to move over 5 cm. The cartridge 52*a* in the embodiment is used to accommodate long screwdriver bits or drill bits, for example two-inch screwdrivers, so the cartridge 52*a* is also very long, which means that the connecting member 51*a* needs to move a very long distance; when the connecting member 51*a* is separated from the chamber 521*a* and the sliding lid 53*b* moves to the back end of the electric motor 2, therefore the complete machine must be very long. For this purpose, a travel amplification assembly is arranged between the sliding lid 53*b* and the connecting member 51*a* in the embodiment, and the linear movement of the sliding lid 53*b* drives the travel amplification assembly to bring the connecting member 51*a* to move so that the movement travel of the connecting member 51*a* is greater than that of the sliding lid 53*b*, that is to say, the connecting member 51*a* can be separated from the chamber even through the movement distance of the sliding lid 53*b* is shorter than that of the connecting member 51*a*.

Figure 55:
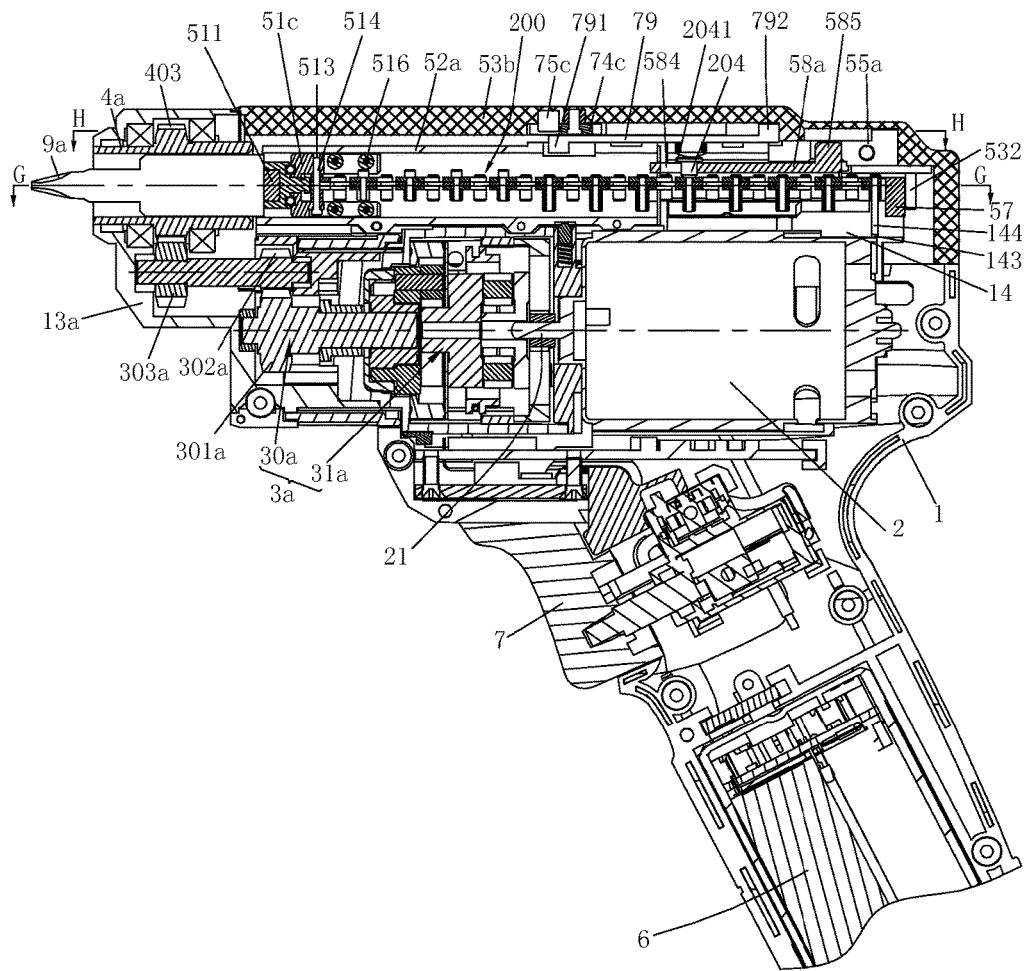
FIG. 55 is a sectional view of the power tool in the preferred embodiment VI according to the present invention when it is in working state.
Figure 56:
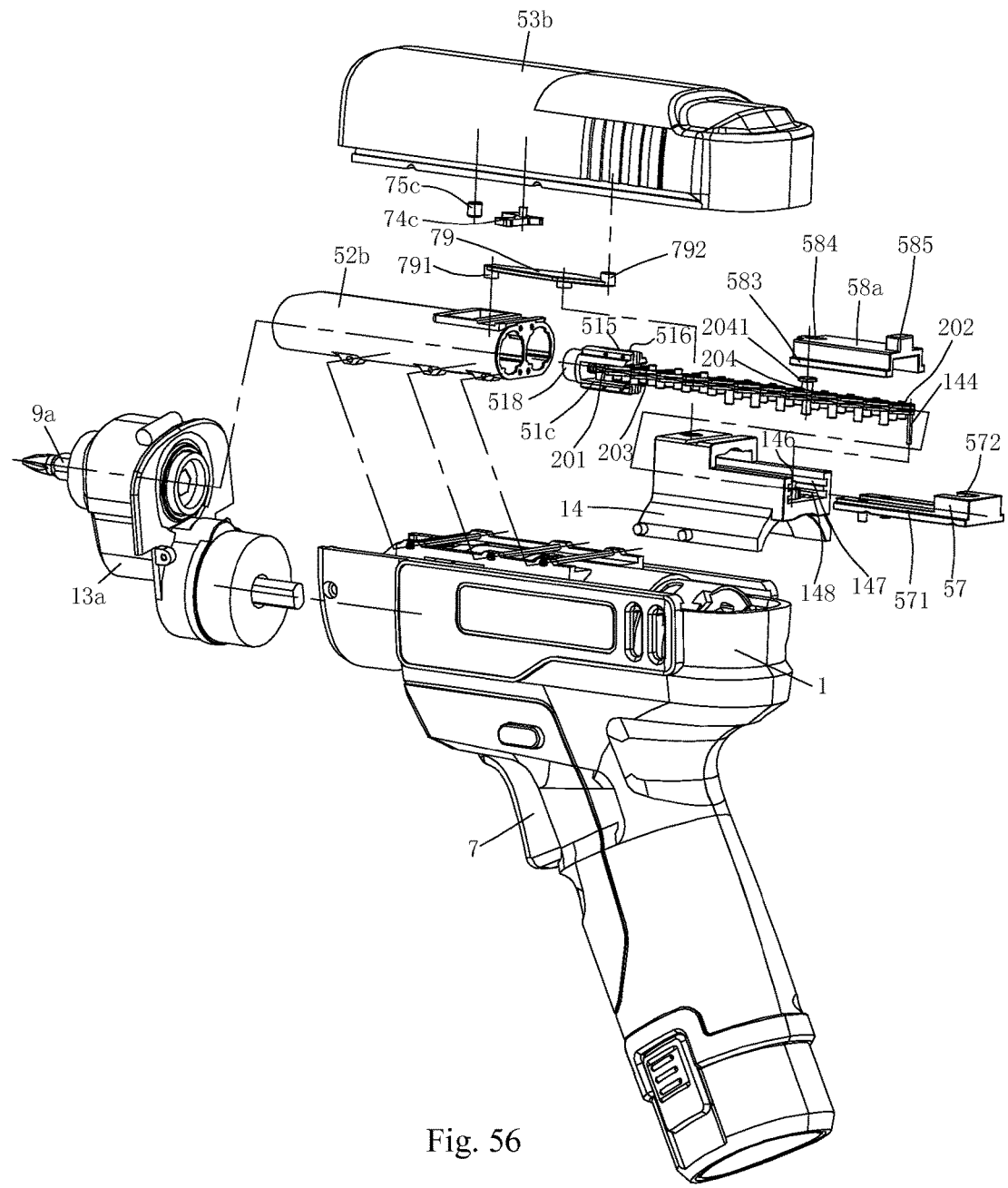
FIG. 56 is an exploded perspective view of part of the power tool in FIG. 55.

As shown in FIG. 55 to FIG. 57, in one embodiment provided by the present invention, the travel amplification assembly can be a link assembly 200 which includes a group of a first semi-link 201 pivoted with the connecting member 51*c*, a group of a second semi-link 202 pivoted with the housing 1 and at least one group of links 203 pivoted with the group of the first semi-links and the group of the second semi-links respectively and cross-disposed. A first pin hole 513 is arranged on the connecting member 51*c*, the first hinge pin 514 passes through one end of the first semi-link 201 and is stuck in the first pin hole 513, and the fit between the first semi-link 201 and the first hinge pin 514 is clearance fit so that the first semi-link 201 can rotate around the first hinge pin 514. Arrangement of the second semi-link 202 is the same as that of the first semi-link 201, so details will not be given. The housing 1 includes the top cover 14 fixed above the motor, a second pin hole 143 is arranged on the top cover, the second hinge pin 144 passes through one end of the second semi-link 202 and is stuck in the second pin hole 143, and the fit between the second semi-link 202 and the second hinge pin 144 is clearance fit so that the second semi-link 202 can rotate around the second hinge pin 144. Each group of cross-disposed links 203 includes at least two links 203 arranged around the same pivot, the number of the semi-links in each group of semi-links is equal to that of links in each group of cross-disposed links 203, one end of the link 203 in one group of cross-disposed links 203 is pivoted with the first semi-link 201, one end of the link 203 in the other group of cross-disposed links is pivoted with the second semi-link 202, and the links of each group of cross-disposed links are pivoted through link ends, thus the link assembly is extended and contracted by controlling the pivot at the intersection of links 203 to make axial movement along the output shaft. In the embodiment, each group of semi-links are preferably provided with three semi-links; likewise, each group of cross-disposed links 203 are preferably provided with three semi-links, two links are parallel to each other and fixed relative to each other, the remaining link is disposed between the two parallel links, and provision of three links is to increase the strength of the link assembly and make it not deform easily when extending and contracting.

The specific structure of the link assembly above is the preferred embodiment according to the present invention, but those skilled in the field can make proper changes according to the principle of the link assembly, for example, provision of two first semi-links 201, two semi-links 202 and links 203 can achieve the same effect. Certainly, the link assembly can also consist of links 203. The connection between the links 203 the connecting member 51*c* as well as the housing 1 can be sliding connection, the link assembly is extended or contracted by controlling the end of the links 203 to gather and separate or by controlling the pivot in the middle of the link assembly to move along the axial direction of the output shaft. In addition, the connecting member 51*c* moves along the axial direction of the output shaft 4*a* to push and pull tool bits, so the extending and contracting direction of the link assembly is parallel to the axial direction of the output shaft 4*a*, i.e. the plane of the link assembly is parallel to the axial direction of the output shaft; to obtain a more compact matching of the link assembly and other members, it is advisable that the link assembly is horizontally disposed, i.e. the plane of the link assembly is perpendicular to the vertical direction, so that the housing 1 has enough space to accommodate the volume increased in the width direction when the link assembly is contracted.

A push block 58a is provided between the link assembly and the sliding lid 53b, the end face of the push block 58a is roughly n-shaped, and the push block 58a has a certain length along the axial direction of the output shaft 4a, the inside of the push block 58a can be for the link assembly to pass, the two n-shaped edges of the push block 58a form positioning blocks 583, and the positioning blocks 583 can be stuck in the first guide groove 147 of the top cover 142 of the housing 1 to enable the push block 58a to move along the first guide groove 147. A long groove 584 is arranged on the top of the n of the push block 58a along the axial direction of the output shaft 4a, the long groove 584 is located at one end in the length direction of the push block 58a, the other end in the length direction of the push block 585 is provided with arranged with a projection portion 585, and the projection portion 585 can be connected with the sliding lid 53b so that the sliding lid 53b drives the push block 58a to move. A catch pin 204 is provided at the pivoting point in the middle of the two links 203 in the link assembly, the catch pin 204 passes through the long groove 584 and can move along the long groove 584, the upper end portion of the catch pin 204 is arranged with a positioning flange 2041, the diameter of the positioning flange 2041 is greater than the width of the long groove 584 so the positioning flange 2041 cannot pass through the long groove 584 and the catch pin 204 can be supported in the push block 58a, the catch pin 204 and the links 203 are fixed along the axial direction of the catch pin 204, i.e. the links 203 cannot move along the axial direction of the catch pin 204, thus the link assembly is supported on the push block 58a through the catch pin 204, ensuring that the link assembly does not deform when extending and contracting. The length of the push block 58a shall be such that the push block can connect the catch pin 204 and the sliding lid 53b together. The push block 58a and the sliding lid 53b can be directly or indirectly connected together provided that the sliding lid 53b can drive the push block 58a to move and then drive the connecting member 51c to move; or the sliding lid 53b is connected directly with the catch pin 204. Provision of the push block 58a is just for that the sliding lid 53b can have an idle travel relative to the connecting member 51c, i.e. to realize that the sliding lid 53b moves but the connecting member 53c does not move with it until the catch pin 204 abuts against the inner wall of the long groove 584 through the movement of the catch pin 204 in the long groove 584 on the push block 58a. The functions of the idle travel will be described in details later.

The link assembly is preferably provided with 11 groups of cross-disposed links 203, the 11 groups of cross-disposed links 203 just form 12 groups of four-link assemblies with the first semi-links 201 and the second semi-links 202, i.e. the link assembly forms 12 parallelograms when extending, and the link assembly is extended or contracted by operating the pivot in the middle of the cross-disposed links 203 to move along the axial direction. The members driving the link assembly to extend and contract (such as push block 58a and sliding lid 53b) can be connected with the pivot in the middle of the cross-disposed links 203 of any one group, thus the travel of the connecting member 53c can be amplified or reduced in relation to the sliding 53b. In the embodiment, the push block 58a connected with the pivoting catch pin 204 in the middle of the cross-disposed links 203 of the fourth group (calculated from the second hinge pin 144), operate the sliding lid 53b to make the catch pin 204 move to the second hinge pin 144, the sliding lid 53b moves synchronously with the catch pin 204, i.e. the catch pin 204 moves a distance which makes four parallelograms contract, while the connecting member 51c moves with the first hinge pin 514 and the first hinge pin 514 moves a distance which makes twelve parallelograms contract relative to the second hinge pin 144, thus the ratio of the movement travels of the sliding lid 53b and the connecting member 51c is 1:3 (the idle travel of the sliding lid is not included). Thus it can be seen that different movement travel ratios can be obtained by operating the pivoting hinge pin of different cross-disposed links 203 to make axial movement. The movement travel ratio of the sliding lid 53b to the connecting member 51c in the embodiment is between 1:12 to 11, thus it can be ensured that various members can be compactly and reliably con Certainly, and the movement of the link assembly will not be interfered by the chambers 521a those skilled in the field can set other travel movement ratios easily based on the principle above, for example, to increase the number of cross-disposed links 203.

When operating the electric drill, press the tool bit 9 against screws or workpieces in axial direction, which will generate a backward axial force to the tool bit 9, the axial force is transmitted to the connecting member 51 and causes the connecting member 51 to move backward. To avoid the problem, a locking piece 57 is arranged between the sliding lid 53b and the link assembly, a second guide groove 128 is arranged on the top cover 14 of the housing 1 and parallel to the first guide groove 147, the face of the output shaft 4a of the locking piece 57 is arranged with an extension portion 571, and the extension portion 571 is stuck in the second guide groove 128 and can slide along the second guide groove 128. A limit groove 572 is arranged on the locking piece 57, the width of the limit groove 572 is roughly equal to that of the link assembly in extending state, the length of the limit groove 572 must ensure that the second semi-link 202 in extending state can be completely accommodated, thus when the tool bit 9 is pressed against a workpiece, the link assembly tends to contract under the action of a force and it requires extending in its width direction, while the limit groove 572 limits the second semi-link 202 from moving towards the width of the link assembly, therefore the tool bit 9 cannot generate axial movement. Since the limit groove 572 is under the action of expansion force along the width direction of the link assembly, the locking piece 57 will not generate axial direction when the tool bit 9 presses against the workpiece, thus axial limitation can be performed to the tool bit 9 when the electric drill woks.

When the electric drill is in work state, the push block 58a abuts against the locking piece 57 in axial direction; when the tool requires changing tool bits, sliding lid 53b moves a distance S first, and at the same time the push block 58a drives the locking piece 57 to move a distance S as well, while the movement of the catch pin 204 in the long groove 584 makes the push block 58a cannot drive the catch pin 204 to move in this distance, the second semi-link 202 gradually moves away from the limit groove 572 with the movement of the locking piece 57 until the pivoting portion of the second semi-link 202 is separated from the limit groove 572, thus the locking of the link assembly' contraction resulted by the limit groove 572 is relieved so that the connecting member 51c can move away from the output shaft 4a with the contraction of the assembly. Thus it can be seen that the idle travel of the sliding lid 53b is to relieve the tool bit 9's axial limitation so that tool bits can be changed. In addition, the sliding lid 53b is fixed with a locking pin 532, the locking piece 57 axially abuts and is connected with the locking pin 532. After tool bits are changed, the sliding lid 53b can drives the locking piece 57 to move towards the output shaft 4a through the locking pin 532 so that the locking piece 57 can return to the position where the limit groove 572 abuts against the link assembly.

In the preferred link assembly above, there is a large number of cross-disposed links 203. To prevent the link assembly from swinging in its width direction during extension and contraction, the movement of the pivoting hinge pin in the middle of link groups can be positioned, wherein both ends of the link assembly can be limited respectively. At the end of the link assembly connecting the connecting member 53c, a first narrow groove 515 is arranged along the output shaft 4a on the connecting member 53c, the width of the first narrow groove 515 is roughly equal to the diameter of the pivoting hinge pin in the middle of link groups, the length of the first narrow groove 515 must ensure that no matter what state the link assembly is in, extending or contracting, the pivoting hinge pin in the middle of at least one link group is stuck in the first narrow groove 515. At the end of the link assembly connecting the housing 1, a second narrow groove 146 is arranged on the top cover 4 of the housing 1 and disposed in the same straight line with the first narrow groove 515; likewise, the width of the second narrow groove 146 is roughly equal to the diameter of the pivoting hinge pin in the middle of link groups, the length of the second narrow groove 146 must ensure that no matter what state the link assembly is in, extending or contracting, the pivoting hinge pin in the middle of at least one link group is stuck in the second narrow groove 146. In this way, no matter that the link assembly is extended or contracted, the pivoting hinge pin in the middle of at least two link groups moves in the straight line where the first long groove 515 and the second long groove 146 are in, since two points determine a line, the link assembly can extend or contract along the output shaft 4a only, ensuring reliable movement of the link assembly.

When extending or contracting, the link assembly drives the connecting member 51c to move in the chamber 521a, there will be friction between the connecting member 51c and the inner wall of the chamber 521a, therefore it will be hard to make the link assembly move by operating the sliding lid 53b. For this purpose, a guide wheel 516 is arranged on the connecting member 51c in the embodiment, the guide wheel 516 can contact the inner wall of the chamber 521a and be rollably supported in the first narrow groove 515, and it does not interfere with the pivoting hinge pin in the middle of link groups, simplifying the structure of the connecting member 51c. Preferably, two guide wheels 16 of this kind are provided and disposed symmetrical along the vertical direction on the connecting member 51c to making the supporting of the connecting member 51c balance. In the embodiment, four guide wheels are preferably provided and disposed symmetrically along the vertical direction with two guide wheels at each side so that the axial movement of the connecting member 51c are more stable.

Figure 77:
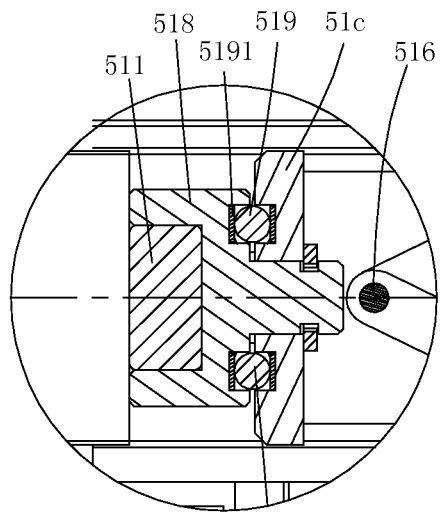
FIG. 77 is an exploded perspective view of Part a of the power tool in FIG. 75.
Figure 78:
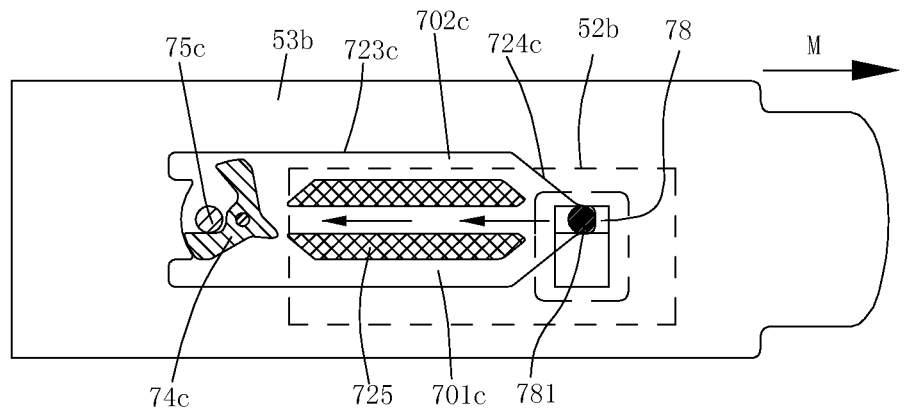
FIG. 78 is a schematic view of anther structure of the automatic shifting means of the power tool in FIG. 55, wherein the cartridge is in the position where one of the chambers corresponds to the output shaft.

In combination with FIG. 77, The end of the connecting member 51c contacting the tool bit 9 is provided with a support means, the support means assists in abutment up with or separation from tool bits, and when tool bits abut up against workpieces and rotate, it can convert the sliding friction between the tool bits and the connecting member 51c to rolling friction. Specifically, the support means includes a support member 518 and a rolling member 519, the support member 518 is rotatably supported on the connecting member 51c around the axis of the output shaft 4a and fixed relative to the connecting member 51c, and a magnet 511 can be arranged on the support member 518 so that it will not affect the connecting member 51c to drive the tool bit 9 back to the chamber 521a; the rolling member 519 is arranged between the support member 518 and the connecting member 51c, and used to bear the axial direction of tool bit 9 rotation when the electric drill works, the support member 518 can rotate with tool bits 9 under the friction generated when tool bits 9 rotates, the contact between the support member 518 and the connecting element 51c is rolling contact which reducing the friction between the support member 518 and the connecting member 51c, and the tool bit 9 is divided from the connecting member 51c by the support member 518 which can prevent tool bits 9 or the connecting member 51c from being damaged from friction, thus prolonging the life of the electric drill and tool bits 9. The rolling member 519 refers to rolling elements such as rollers, balls and needles. In addition, a wear resistant washer 5191 can be arranged between the rolling member 519 and the support member 518 and/or the rolling member 519 and the connecting member 51c, not only prevent wear of the support member and the connecting member, but also enabling timely change of the wear resistant washer 5191 depending on degree of wear and reducing use cost. In addition, the support means can also include end-face bearings (also called plane bearings), the tool bit abuts against the end-face bearings, or the rolling member 519 is rotatably installed on the connecting member, and the tool bit abuts against the rolling member 519, thus rolling support can be realized.

The rapid change of the tool bits of the DC electric drill in the preferred Embodiment VI according to the present invention will be illustrated in details with the link assembly as example hereinafter.

Figure 59:
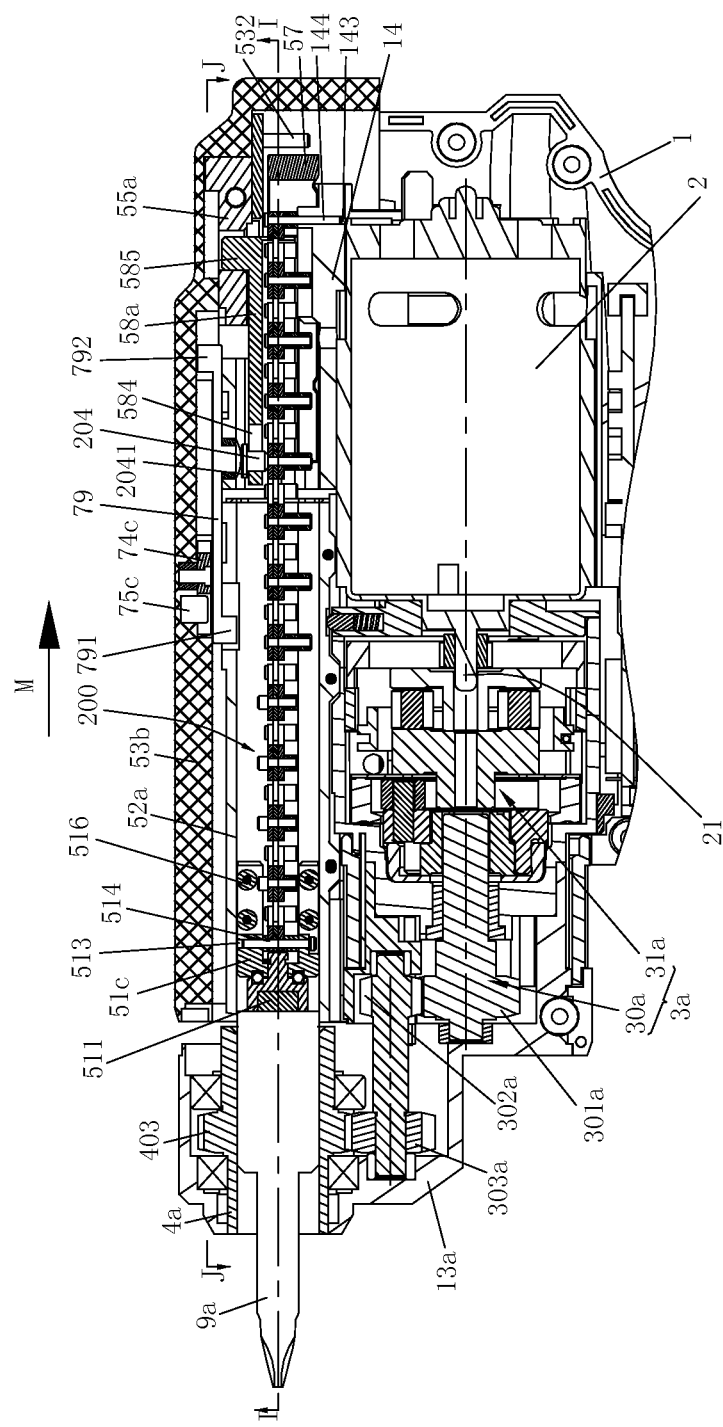
FIG. 59 is a sectional view when the connecting member of the power tool in FIG. 55 is relieved.
Figure 60:
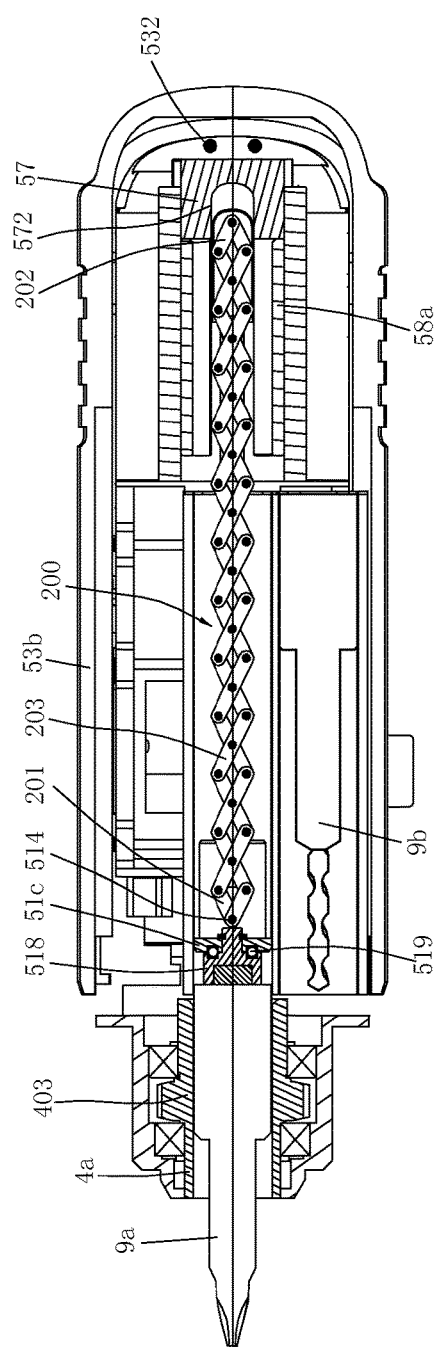
FIG. 60 is a sectional view of the power tool in FIG. 59 along the section line I-I.
Figure 61:
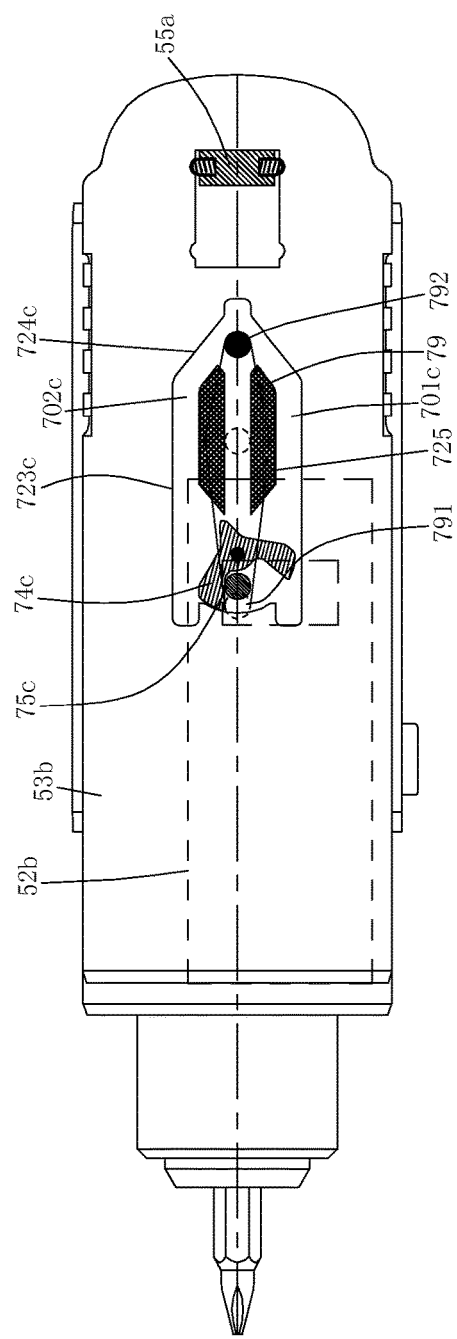
FIG. 61 is a sectional view of the power tool in FIG. 59 along the section line J-J.

As shown in FIG. 55, FIG. 57 and FIG. 58, the DC multifunctional electric drill is in working state. As shown in FIG. 59 to FIG. 61, when the tool requires changing another type of tool bits 9b, operate the sliding lid 53b to move S (distance) along the direction of the arrow M in the figure, the sliding lid 53b drives the push block 58a to move through the engaging block 55a, the catch pin 204 abuts against the front side of the long groove 584 with the movement of the push block 58a, the push block 58a drives the locking piece 57 to move S (distance) as well, and the pivotal connection portion of the second semi-link 202 and the cross-disposed links 203 is separated from the limit groove 572 on the locking piece 57, thus the limitation of the link assembly contraction is relieved and the second pin 792 of the swing plate 79 moves in the sliding groove 53c with the sliding of the sliding lid 53b to the position as shown in the figure.

Figure 62:
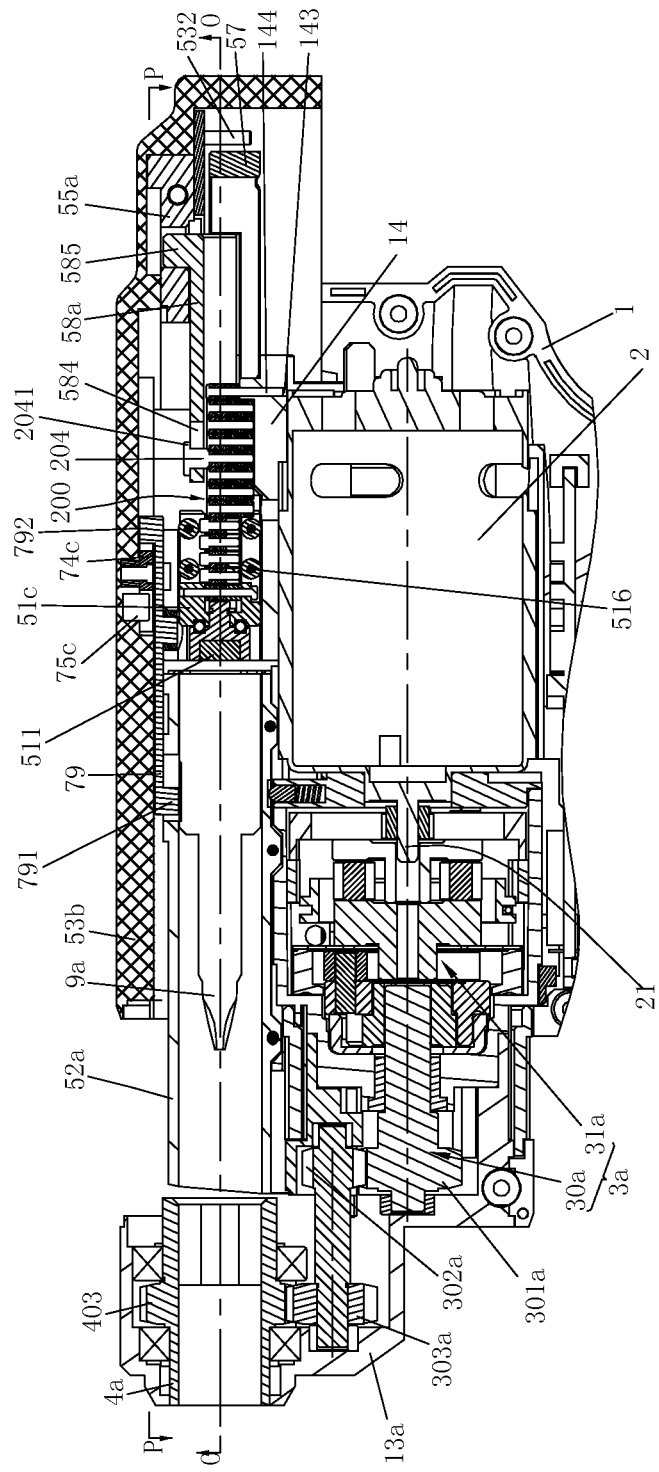
FIG. 62 is a sectional view of the power tool in FIG. 55, wherein the tool bit returns to the chamber and the connecting member is separated from the chamber.

As shown in FIG. 62 to FIG. 64, continue operating the sliding lid 53b to move along the direction of the arrow M, the sliding lid 53b continues driving the push block 58a to move through the engaging block 55a, the push block 58a drives the link assembly to contract through the catch pin 204 until the link assembly contracts fully, the connecting member 51c drives the tool bit 9a in the output shaft 4a to move into the chamber 521a with the contraction of the link assembly, the connecting member 51c is separated from the chamber 521a, and the second pin 792 of the swing plate 79 moves to the position close to the single-head end of the guide plate 74 with the sliding of the sliding lid 53b, i.e. the position as shown in FIG. 64.

Figure 65:
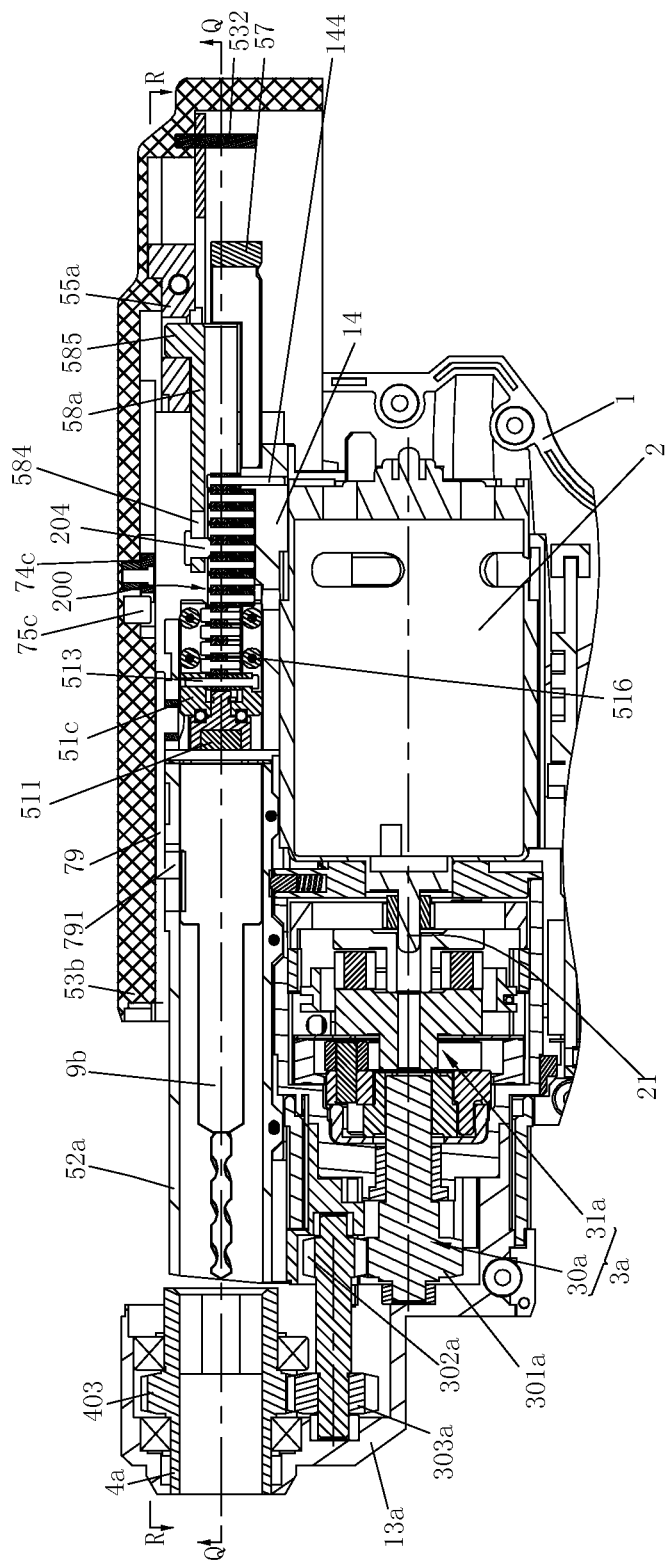
FIG. 65 is a sectional view of the power tool in FIG. 55, wherein the tool bit returns to the chamber and the connecting member is separated from the chamber.

As shown in FIG. 65 and FIG. 67, continue operating the sliding lid 53b to move along the direction of the arrow M in the figure, the engaging block 55a overcomes the spring force and moves in the limit groove 539c until it abuts against the front side of the limit groove 539c and is elastically-positioned again, the second pin 792 of the swing plate 79 contacts the single-head end of the guide plate 74c, the acting force of the second pin 792 makes the guide plate 74c overcome the magnetic attraction of the stop post 75c and rotate until the other side of the dual-head end is attracted by the stop post 75c, and the second pin 792 moves along the edge of the guide plate 74c with the rotation of the guide plate 74c and generates the movement perpendicular to the movement direction of the sliding lid 53b, making the swing plate 79 rotate around its pivot, and the first pin 791 drives the cartridge 52a to move the position where another chamber 521a corresponds to the accommodating hole 41a of the output shaft 4a, i.e. the position as shown in FIG. 66 and FIG. 67.

Figure 68:
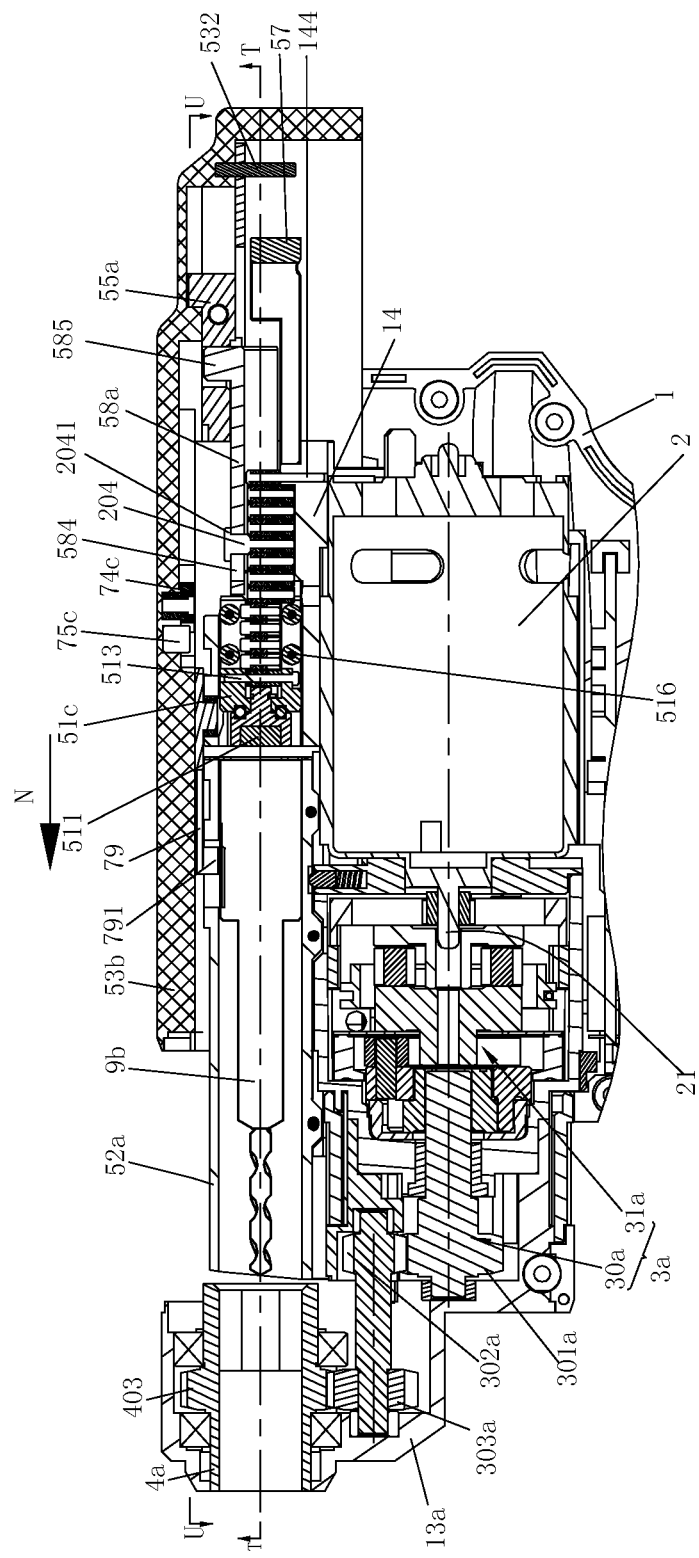
FIG. 68 is a sectional view of the power tool in FIG. 55, wherein the cartridge moves to the position where another chamber corresponds to the output shaft.

As shown in FIG. 68 to FIG. 70, operate the sliding lid 53b to reset along the direction of the arrow N, the sliding lid 53b drives the push block 58a to move through the engaging block 55a, the catch pin 204 abuts against the back side of the long groove 584 with the movement of the push block 58a, and the second pin 792 moves to the position as shown in FIG. 70 along the straight edge 723c of the sliding groove 72c with the movement of the sliding lid 53b.

Figure 71:
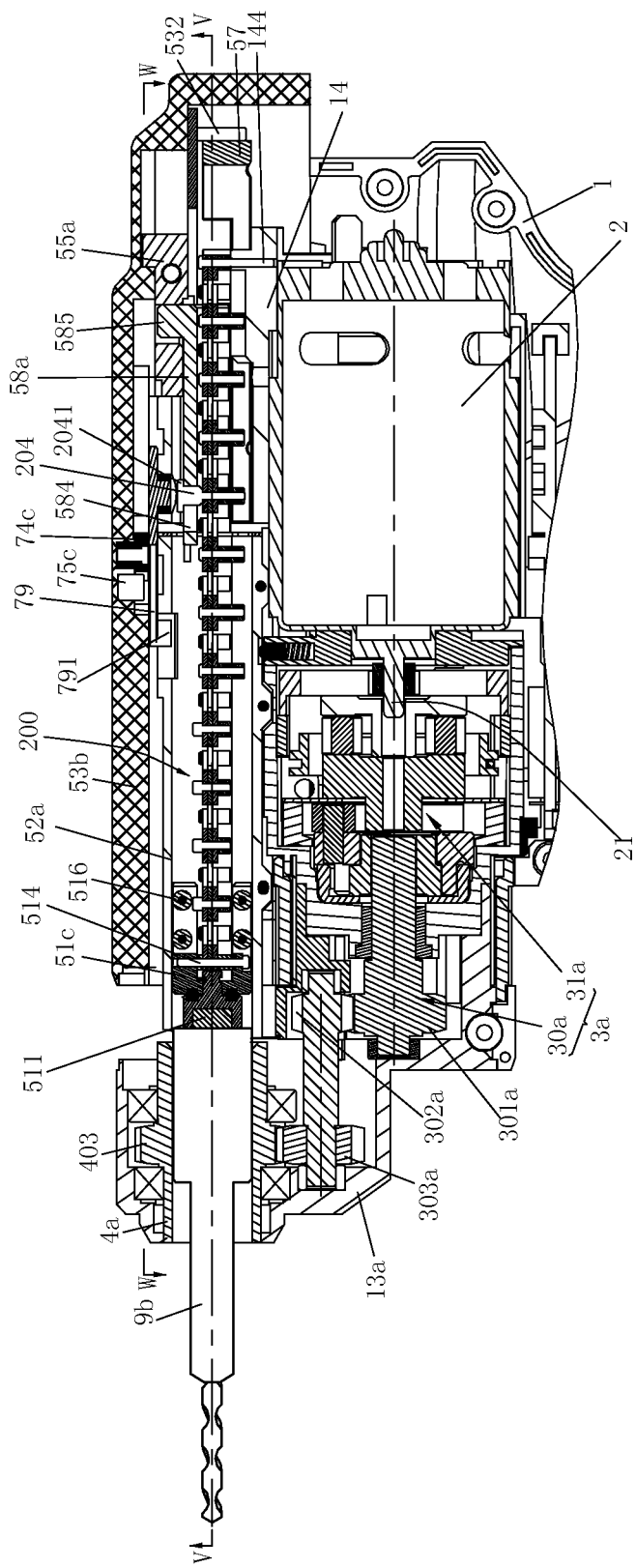
FIG. 71 is a sectional view of the power tool in FIG. 55, wherein the tool bit in the chamber holder is pushed into the output shaft.
Figure 72:
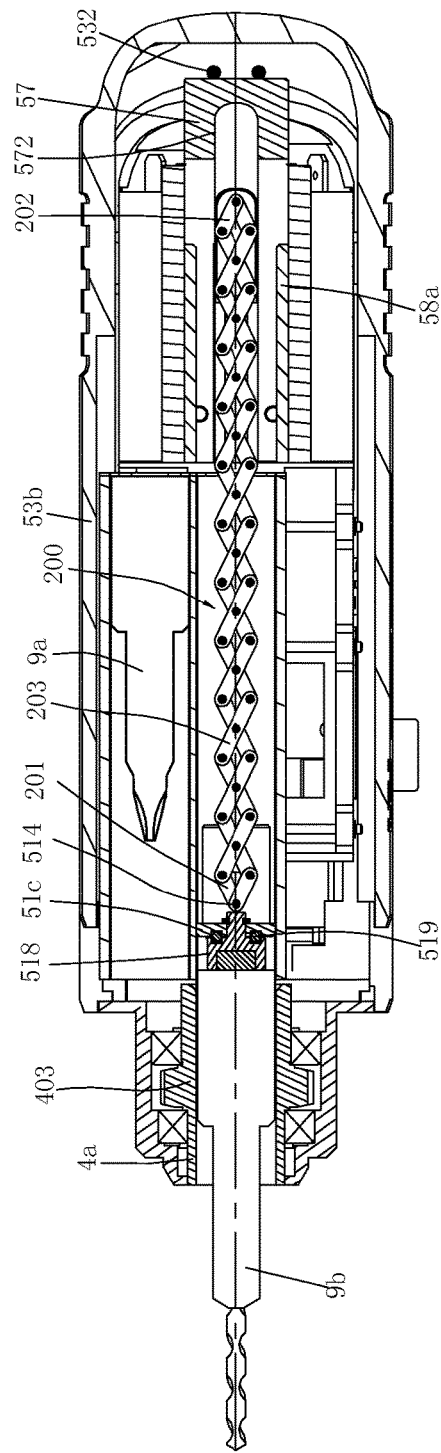
FIG. 72 is a sectional view of the power tool in FIG. 71 along the section line V-V.
Figure 73:
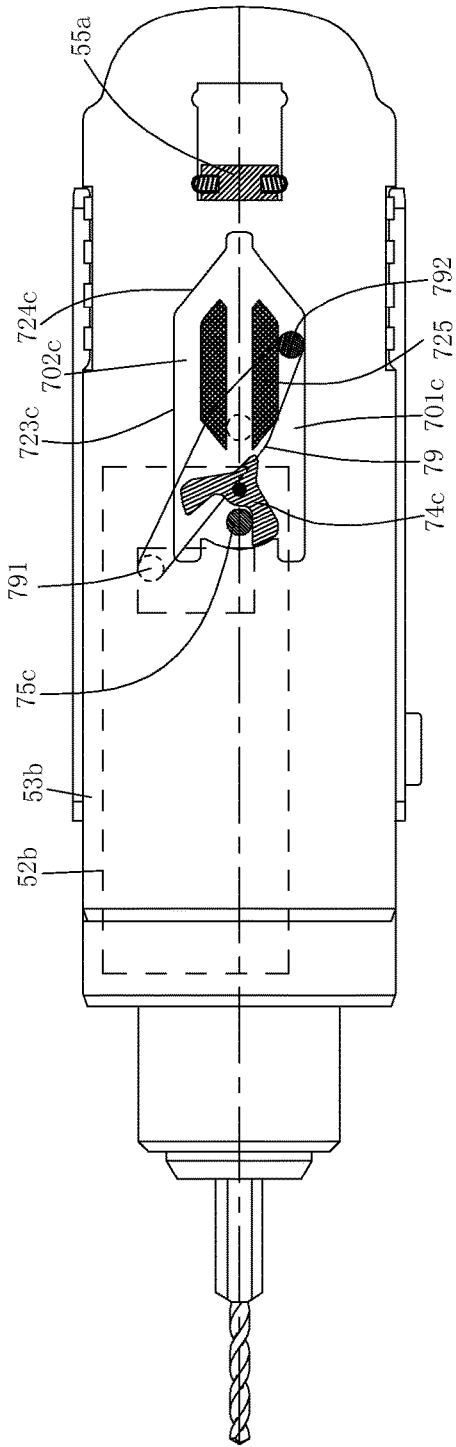
FIG. 73 is a sectional view of the power tool in FIG. 71 along the section line W-W.

As shown in FIG. 71 to FIG. 73, continue operating the sliding lid 53b to reset along the direction of the arrow N, the sliding lid 53b drives the push block 58a to move through the engaging block 55a, the push block 58a drives the catch pin 204 to make the link assembly extend, the connecting member 51c goes into another chamber 521a and drives the tool bit in it into the output shaft 4a, and the second pin 792 moves to the position as shown in FIG. 73 along the straight edge 723c of the sliding groove 72c with the movement of the sliding lid 53b.

Figure 74:
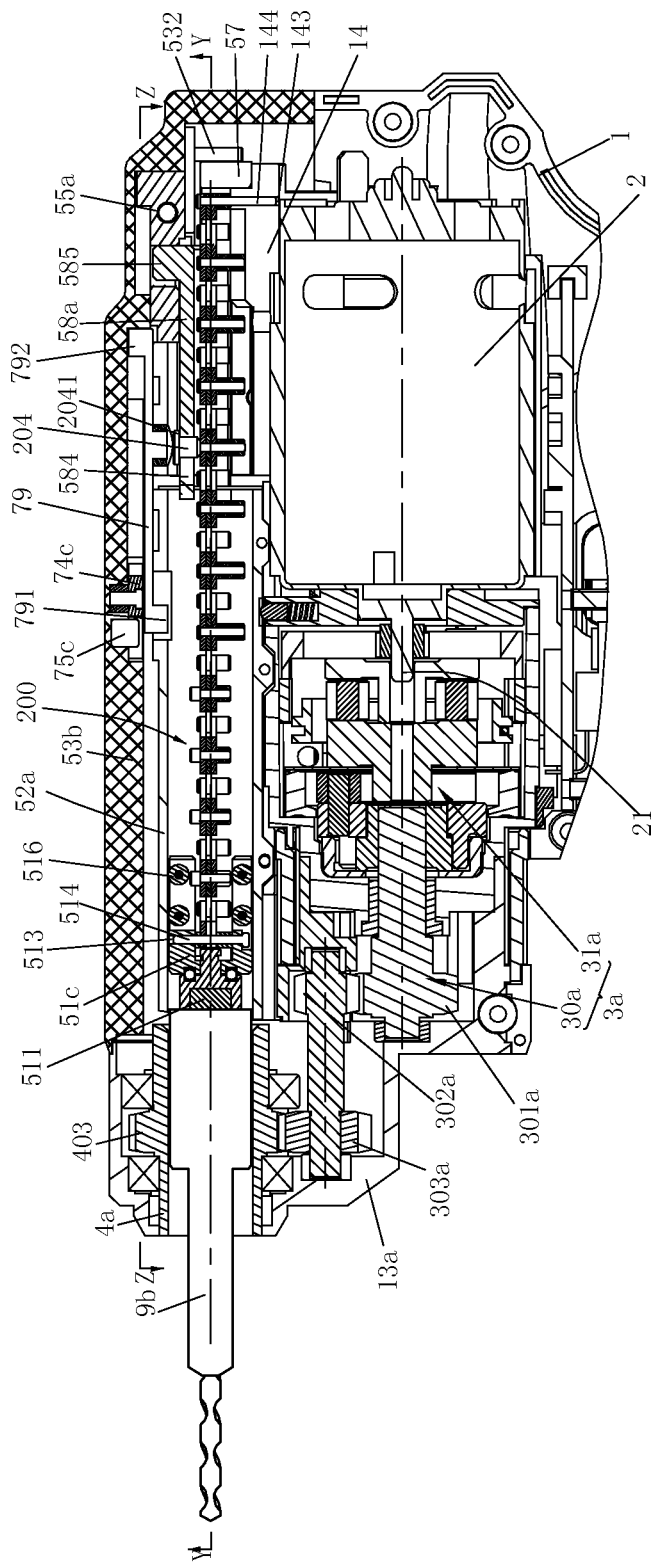
FIG. 74 is a sectional view of the power tool in FIG. 55, wherein the automatic shifting means returns to the original position and the connecting member is locked in axial direction.
Figure 75:
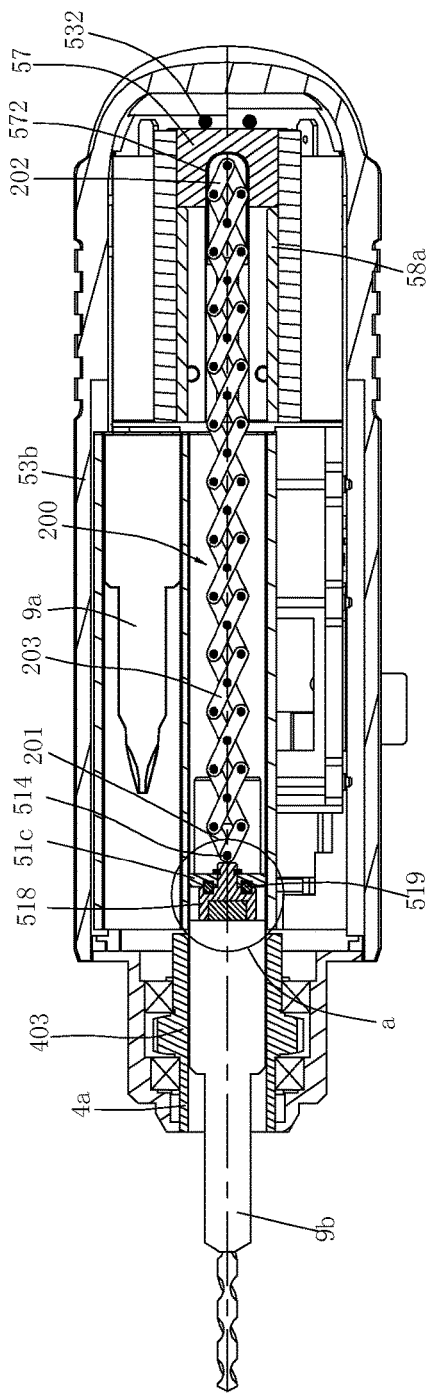
FIG. 75 is a sectional view of the power tool in FIG. 74 along the section line Y-Y.
Figure 76:
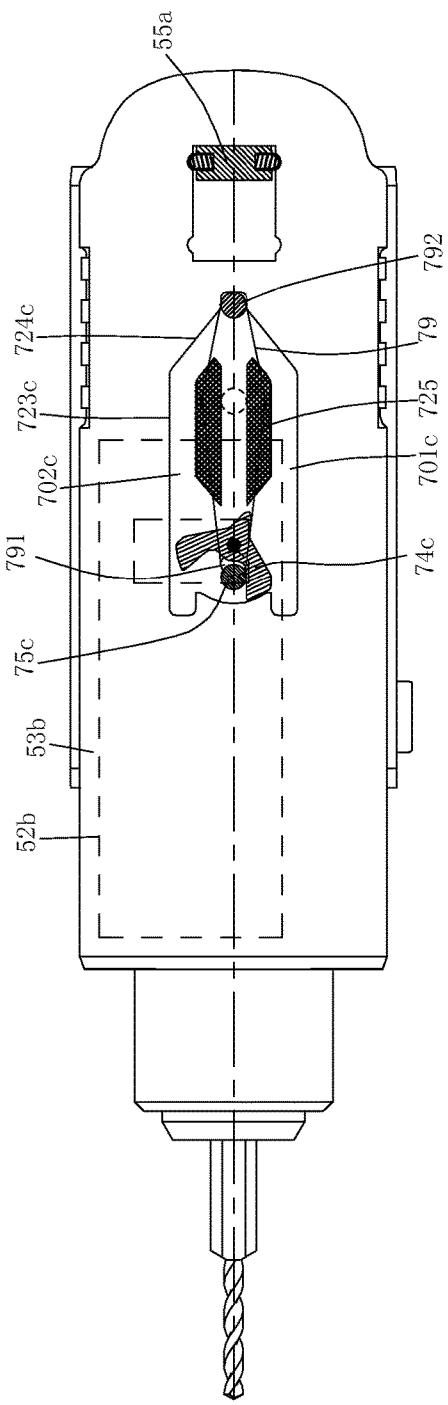
FIG. 76 is a sectional view of the power tool in FIG. 74 along the section line Z-Z.

As shown in FIG. 74 to FIG. 76, continue operating the sliding lid 53b to move along the direction of the arrow N, the engaging block 55a overcomes the spring force and moves in the limit groove 539c until the engaging block 55a abuts against the back side of the limit groove 539c and is elastically-positioned again, the locking pin 532 of the sliding lid 53b axially abuts again the locking piece 57, and the sliding lid 53b drives the locking piece 57 to move towards the output shaft 4a through the locking pin 532, so that the locking piece 57 will return to the position where the limit groove 572 overlaps the link assembly 200. The second pin 792 of the swing plate 79 slides along the oblique edge 724c of the sliding groove 72c and generates the movement perpendicular to the movement direction of the sliding lid 53, making the swing plate rotate around its pivot, while the cartridge cannot move under the limitation of the connecting member and the link assembly, and the first pin 791 slides in the square groove on the cartridge to the other side, i.e. the position as shown in FIG. 76.

Repeat the steps above, another tool bit 9a will be changed. That means the movement track of the second pin in the sliding groove 72b is reciprocating, i.e. the second pin can move from the track formed by two partition plates to the first sliding groove 701c and then move from the track formed by two partition plates to the second sliding groove 702c, thus automatically shifting tool bits cyclically.

As shown in FIG. 83 to FIG. 90, in the Embodiment VII provided by the present invention, the travel amplification means preferably a movably pulley assembly, i.e. to amplify the travel of the connecting member based on the principle that the power arm is twice the resistance arm in a movable pulley assembly. Specifically, a movable pulley 210 is arranged between the sliding lid 53b and the connecting member 51d, the movable pulley 210 can be used as the driving member for the sliding lid 53b to bring the connecting member 51d to move, the movable pulley 210 is installed on the push block 58b and an idle stroke can be set between the push block 58b and the sliding lid 53b. Certainly, if the relieving of the movement of the connecting member 51d is realized through other ways, for example through a button, an idle travel may not be set between the push block 58b and the sliding lid 53b, or the movable pulley can be driven directly by the sliding lid to move in a straight line. Two flexible cords are wound around the movable pulley 210, and the flexible cord refers to ropes, belts, lines, wires, etc. wherein one end of the first flexible cord 211 is fixed on the housing 1 and the other end is fixed at the rear (preferably end) of the connecting member 51d away from the output shaft 4a, thus the connecting member 51d can be short as possible and the tool has a more compact overall structure. Fixing method can be pressing tightly with screws, passing the hole on the housing 1 or the connecting member 51d and knotting, the first flexible cord 211 is wounded around the movable pulley 210 in counterclockwise direction from the end fixed on the connecting member 51d, wherein "wound" herein refers to that the contact angle of the flexible cord with the movable pulley 210 is less than 360 degrees, and when the sliding lid 53b drives the movable pulley 210 to move towards the output shaft 4a, the movable pulley 210 drives the connecting member 51d to move towards the output shaft 4a through the first flexible cord 211, and the distance that the connecting member 51d moves in a straight line is twice that that the movable pulley 210 moves in a straight line 210. One end of the second flexible cord 212 is fixed on the housing, the other end is fixed at the front part of the connecting member 51d close to the output shaft 4a, preferably, the end of the second flexible cord 212 fixed on the connecting member 51d is located between one fourth to a half of the length of the connecting member 51d, that is because when the multi-functional electric drill is in the working position, the movable pulley 210 is at the end of the connecting member 51d away from the output shaft 4a, the connecting member 51d only needs moving a half of the length of the connecting member 51d, then the connecting member 51d will move a distance that is equal to its entire length; therefore, the second flexible cord 212 does not have to be fixed to the end of the connecting member 51d close to the output shaft 4a, thus reducing the length of the flexible cord and cost. The second flexible cord 210 is wounded around the movable pulley 210 in clockwise direction from the end fixed on the connecting member 51d, when the sliding lid 53b drives the movable pulley 210 to move away from the output shaft 4a, the movable pulley 210 drives the connecting member 51d to move with its back towards the output shaft 4a through the second flexible cord 212, and the distance that the connecting member 51d moves in a straight line is twice that that the movable pulley 210 moves in a straight line 210.

Figure 83:
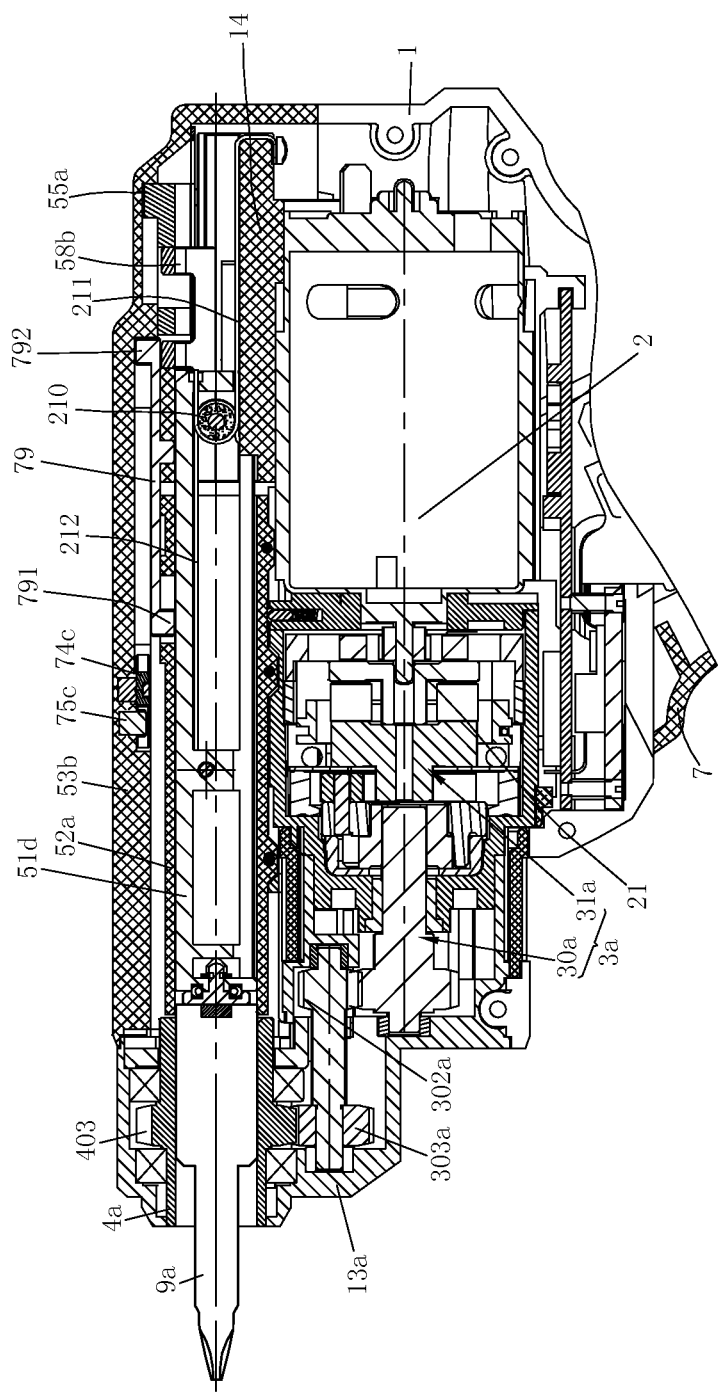
FIG. 83 is a sectional view of the power tool in the preferred embodiment VII according to the present invention when it is in working state.
Figure 84:
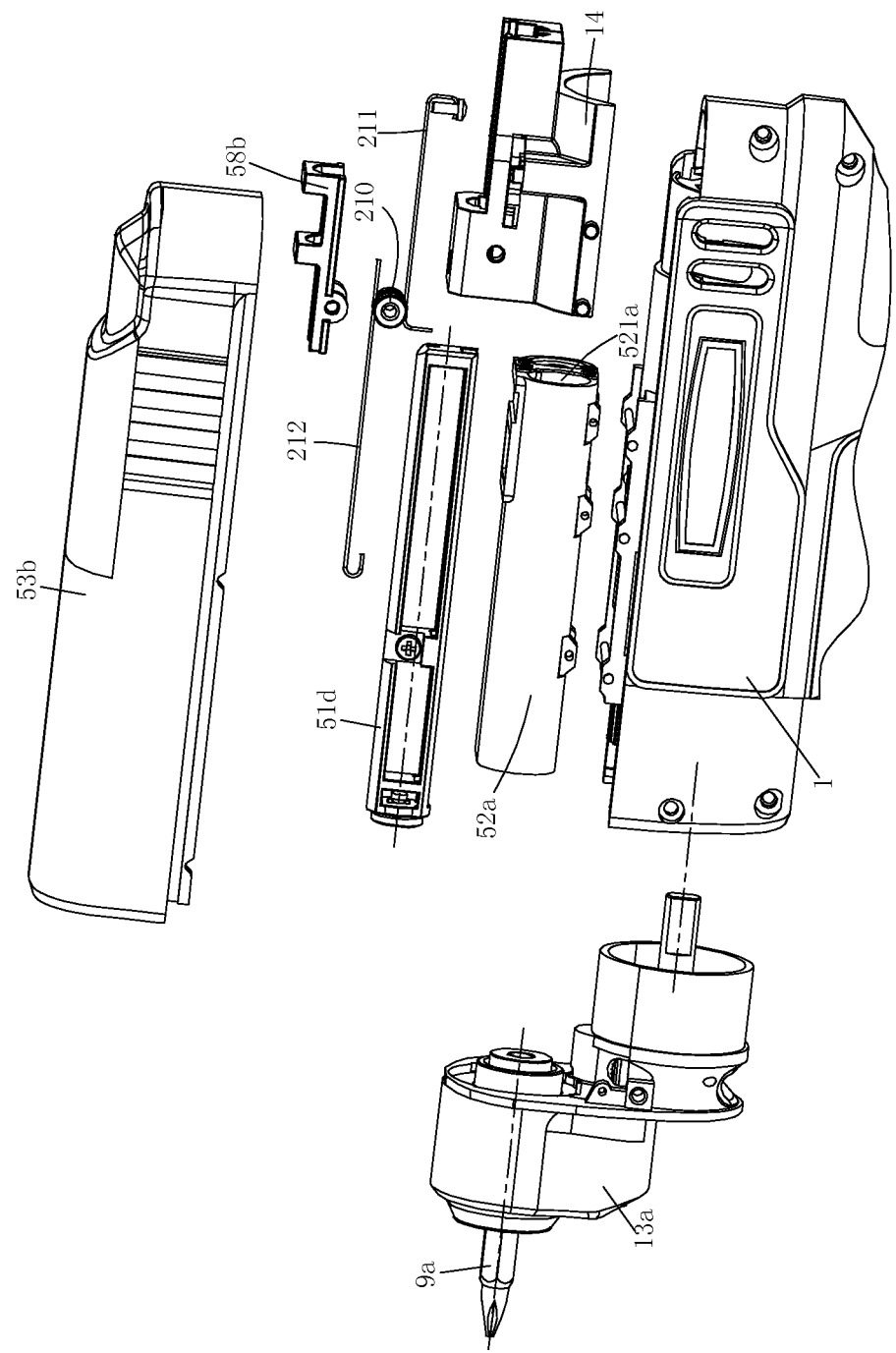
FIG. 84 is an exploded perspective view of part of the power tool in FIG. 83.
Figure 85:
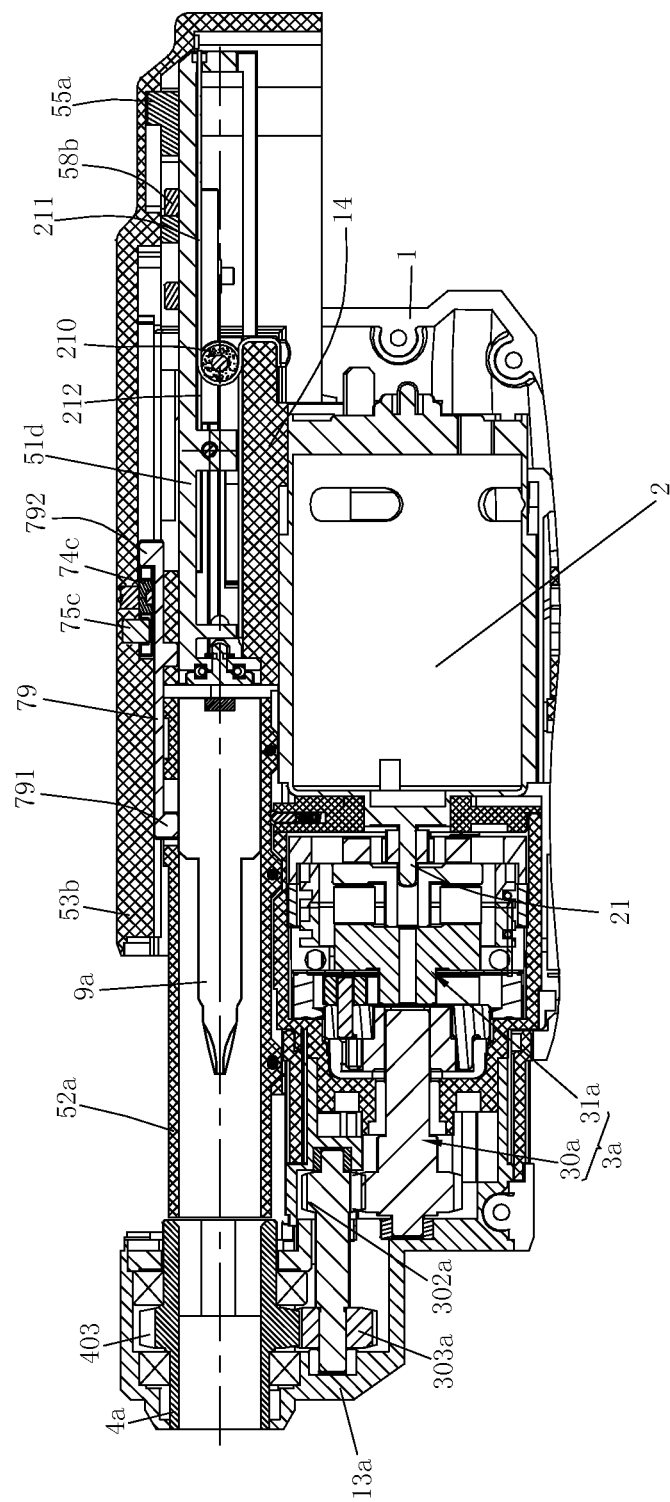
FIG. 85 is a sectional view of the power tool in FIG. 83, wherein the tool bit returns to the chamber and the connecting member is separated from the chamber.
Figure 86:
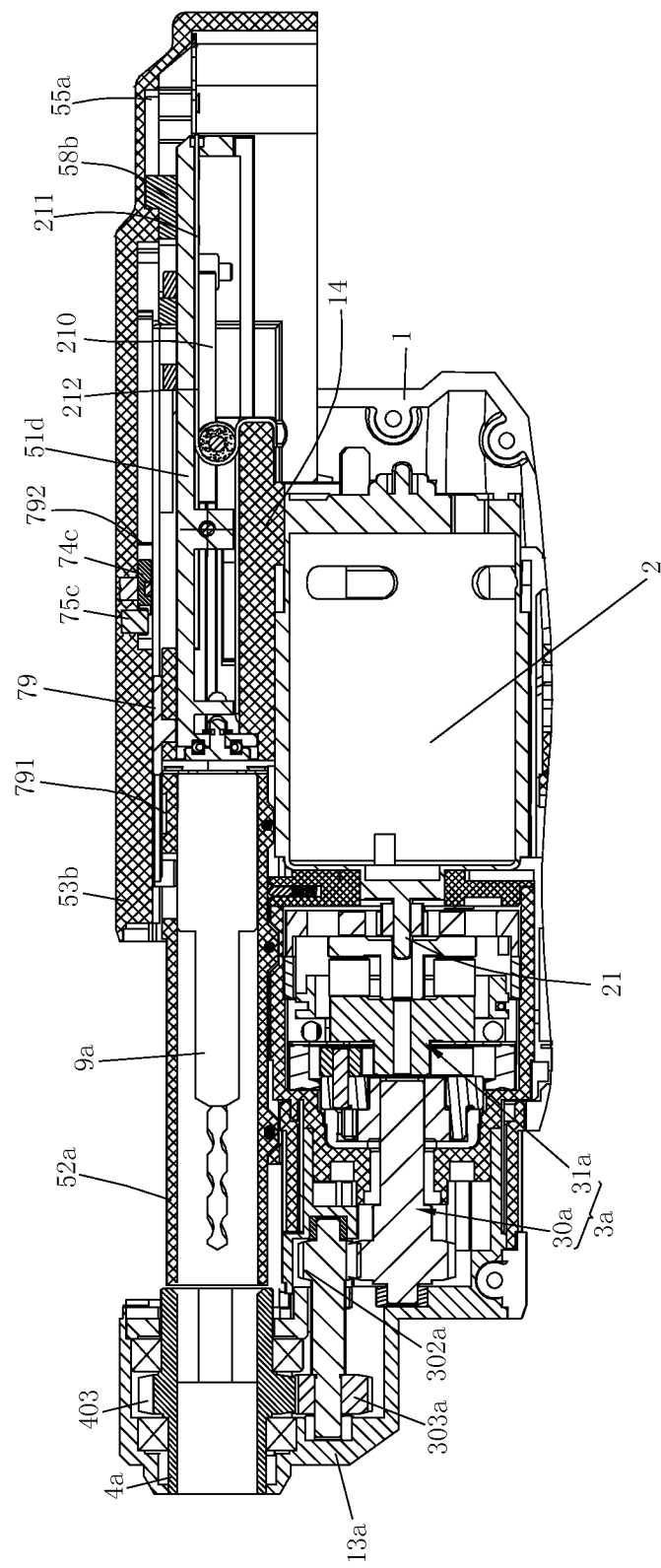
FIG. 86 is a sectional view of the power tool in FIG. 83, wherein the cartridge comes to the position where the tool bit of the chamber corresponds to the output shaft.
Figure 87:
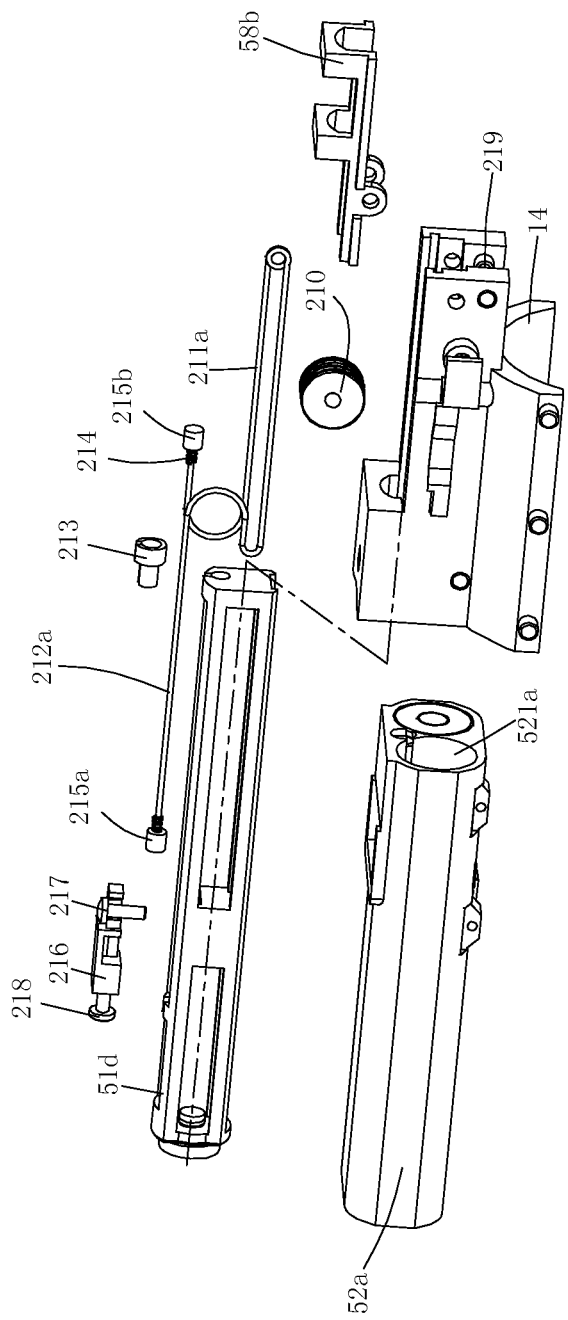
FIG. 87 is an exploded perspective view of another embodiment of the movable pulley assembly of the preferred power tool according to the present invention.
Figure 88:
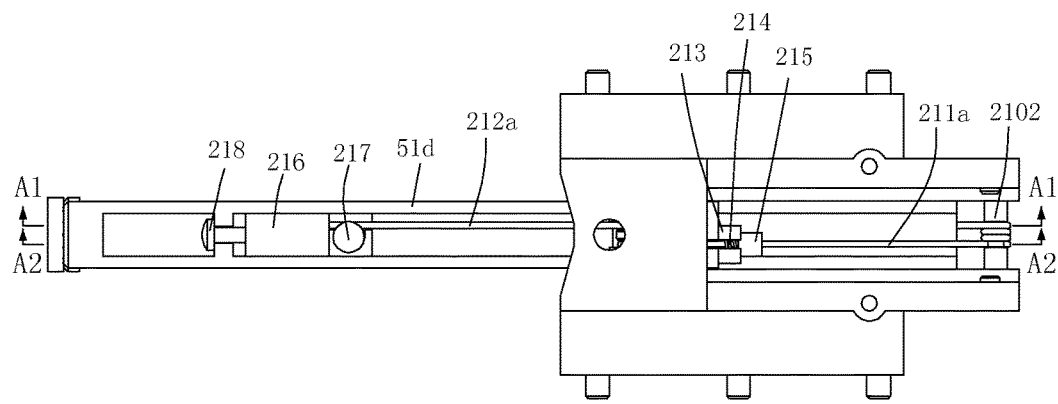
FIG. 88 is a top view of the movable pulley assembly in FIG. 87.
Figure 89:
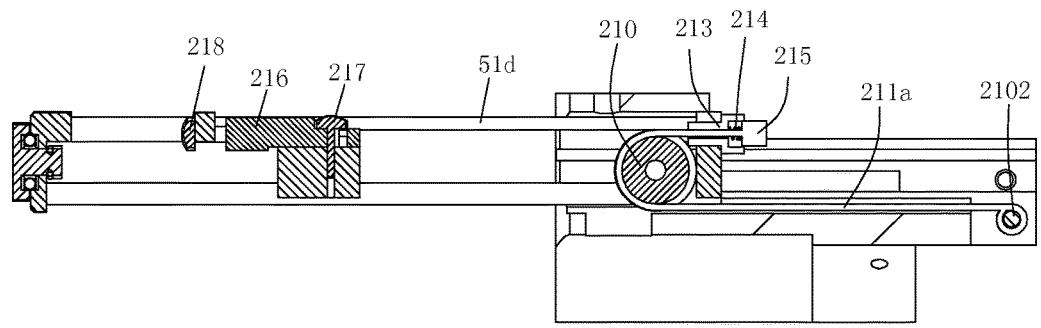
FIG. 89 is a sectional view of the movable pulley assembly in FIG. 88 along the section line A1-A1.
Figure 90:
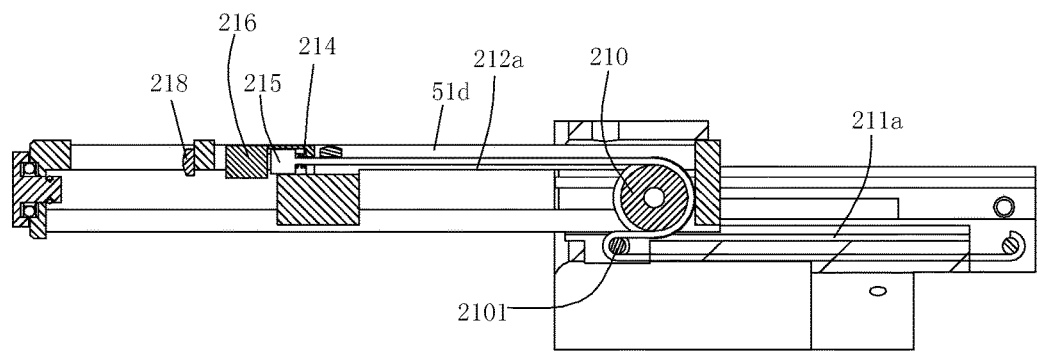
FIG. 90 is a sectional view of the movable pulley assembly in FIG. 88 along the section line A2-A2.

In specific operation, pull the sliding lid 53b backwards, the sliding lid 53b drives the push block 58b to move backwards after an idle travel through the engaging block 55a, the push block 58b drives the movable pulley 210 to move backwards as well, since the second flexible cord 212 is wound around the movable pulley 210, the second flexible cord 212 drives the connecting member 51d to move backwards with the movement of the sliding pulley 210 until the connecting member 51d drives the tool bit 9b back into and to exit from the chamber 521a, i.e. the position as shown in FIG. 85, then the connecting member 51d is limited and cannot move backwards; continue operating the sliding lid 53b to move backwards, and the cartridge 52a moves to the position where another chamber 521a corresponds to the output shaft 4a under the action of the automatic shifting means after the second idle travel between the sliding lid 53b and the engaging block 55a, i.e. the position as shown in FIG. 86; move the sliding lid 53b forwards, the sliding lid 53b drives the push block 58b to move forwards after an idle travel through the engaging block 55a, and the push block 58b drives the movable pulley 210 to move forwards as well, since the first flexible cord 211 is wound on the movable pulley 210, the first flexible cord 211 drives the connecting member 51d to move forwards with the movement of the movable pulley 210 until the connecting member 51d pushes the tool bit 9a in the chamber 521a into the output shaft 4a and exposes itself from the front end of the output shaft 4a, i.e. the position as shown in FIG. 83. The structure principle of the automatic shifting means is the same as that in the Embodiment I, so details will not be given herein.

As shown in FIG. 87 to FIG. 90 is another preferred embodiment of the movable pulley assembly, to make cord assembly more simple, the two cords can be substituted by one complete cord, the flexible cord is divided into the first flexible cord 211a and the second flexible cord 212a based on the position of its connection with the connecting member 51d, each end of the flexible cord is connected with the end of the connecting member 51d through fixed die-casting heads 215a and 215b, i.e. the ends of the flexible cord are fixed relative to each other through die-casting, the end of the flexible cord set with the die-casting head 215b is connected with the rear of the connecting member 51d and wound over the pulley 210 in counter-clockwise direction, the end of the flexible cord set with the die-casting head 215a is connected with the front part of the connecting member 51d and wound over the pulley 210 in clockwise direction, the middle of the flexible cord is wound over the fixing member 2101 arranged on the housing 1 in counter-clockwise clock direction and wound round the fixing pin 2102 arranged on the housing 1, wherein "wounded around" herein refers to the contact angle of the flexible cord and the fixing pin 2102 is greater than 360 degrees, preferably 720 degrees, i.e. wind two circles, thus the flexible cord can be locked by itself and the length of the flexible cord at each side of the movable pulley 210 can be easily adjusted. The fixing pin 2102 and the die-casting 215b are located at one side of the movable pulley 210 relative to the vertical direction, and the fixing member 2101 and the die-casting 215a are located at the other one side of the movable pulley 210 relative to the vertical direction. The fixing member 2101 and the fixing pin 2102 are equivalent to fixed pulleys for fixing the middle of the flexible cord, that is to say, both ends of the flexible cord set with the die-casting heads 215a and 215b have corresponding fixing section so as to amplify the travel in two directions.

The movable pulley assembly realizes travel amplification through folding of the flexible cord, that is to say, no matter the movable pulley 210 can rotate or not, travel can be amplified; certainly, to reduce the friction between the flexible cord and the movable pulley 210, the movable pulley is rotatably installed on the push block 58b and the friction between the flexible cord and the movable cord is rolling friction, which can prolong the life of the flexible cord. To prevent the flexible cord from disengaging from the movable pulley 210, races can be arranged on the movable pulley 210; two races can be arranged and disposed at an interval along the direction of the rotating axis of the movable pulley 210 to accommodate the first flexible cord 211, 211a and the second flexible cord 212, 212a.

Considering factors such as assembly precision and manufacturing error, the flexible cord may become loose relative to the movable pulley 210; to keep the flexible cord under tension relative to the movable pulley 210 all the time, a tension assembly can be arranged between the flexible cord and the connecting member 51d to tension the flexible cord relative to the movable pulley 210, and specifically, a spring member 214 can be arranged between the connecting member 51d and the end of the flexible cord to apply the die-casting heads 215a, 215b and the connecting member 51d with forces which can tension the flexible cord relative to the movable pulley 210, thus the flexible cord can be under tension all the time. Certainly, a spring element can be arranged at the end of the flexible cord connected with the fixing member 2101 or the fixing pin 2102 to tension the fixed end relative to the movable pulley 210. In the embodiment, the spring element 214 is preferably a compression spring and the compression spring is arranged between the connecting member 51d and the die-casting head 215. Certainly, the spring element 214 can be other means, such as a torsion spring and a clip.

In addition, to further eliminate the effects of assembly precision and manufacturing error, an adjusting screw 213 can be arranged on the connecting member 51d for the flexible cord to pass, and the adjusting screw 213 can move relative to the connecting member 51d to adjust the position of the die-casting heads 215a and 215b arranged at the end of the flexible cord relative to the connecting member 51d and further adjust the service length of the flexible cord. To save space, the die-casting head 215a can be stuck on an adjusting block 216 which is connected with the adjusting screw 218 and can only move in a certain range under the limitation of a screw 217 fixed on the connected member 51d. The adjusting screw 218 adjusts the position of the adjusting block 216 on the connecting member 51d through different tightening degrees to adjust the position of the flexible cord's die-casting head 215a relative to the connecting member 51d; the service length of the flexible cord can be adjusted in this way.

To make the structure of the multifunctional electric drill more compact, the rotating axis of the movable pulley 210 can be arranged perpendicular to the axis of the output shaft 4a which can save efforts when operating the sliding lid 51b as well. The movable pulley 210 can also be arranged unable to rotate relative to the sliding lid 53b, such as a pin and a rope which are fixed on the sliding lid 53b and can be wound over by the flexible cord. Based on the principle above, those skilled in the field can realize that the movement travel of the connecting member 51d is a natural number (equal to or greater than 2) times that of the movement travel of the movable pulley 210 by adding movable pulleys or fixed pulleys.

The definitions of various elements above are not limited to the specific structures or shapes mentioned in the embodiments. The ordinary technicians skilled in the field can make simple and well-known substitutions to them. For example, for the motor, the electric motor can be substituted by a petrol motor or a diesel motor or other types of motor; the sliding lid is used to drive the connecting member or drive the control assembly and its structure can have many types, such as a link and an end cover; in addition, in the embodiments above, the relative axial movement of the connecting member and the cartridge can be fixed by the connecting member, the cartridge can not only make axial movement but also rotate, and the connecting member can be disposed in the same axis as the motor, etc. In addition, there are no special requirements for the structure. Depending on its internal layout, the configuration may be changed, such as addition of new elements or reduction of unnecessary elements.

The invention claimed is:

1. A power tool, comprising:
a housing;
a motor being disposed in the housing for outputting rotary power;
an output shaft having an accommodating hole for holding a tool bit, a longitudinal axis of the accommodating hole extending in an axial direction of the output shaft;
a transmission mechanism being disposed between the motor and the output shaft for transmitting rotary power from the motor to the output shaft;
a tool bit supporting assembly being disposed in the housing for holding at least two tool bits;
a connecting member being disposed in the housing and movable between a working position where torque transmission from the motor to one of the at least two tool bits, which one tool bit is held by the accommodating hole, is enabled and a release position where torque transmission from the motor to any of the at least two tool bits is disenabled; and
an operating member is arranged on the housing for controlling movement of the connecting member;
wherein the power tool further includes an automatic shifting means for adjusting a position of the tool bit supporting assembly in response to movement of the operating member, and wherein the tool bit supporting assembly enables one of the at least two tool bits, which one tool bit is held by the tool bit supporting assembly, to move from one position to another under action of the automatic shifting means.

2. The power tool according to claim 1, wherein the automatic shifting means includes a control assembly arranged between the operating member and the tool bit supporting assembly, the control assembly is movable from an initial position to a terminal position and drives the tool bit supporting assembly.

3. The power tool according to claim 2, wherein the control assembly is connected with the operating member, the operating member controls movement of the connecting member until the connecting member is at least partially overlapped with a chamber, and the control assembly moves from the terminal position to the initial position.

4. The power tool according to claim 2, wherein the control assembly is connected with the operating member, and the operating member is operable to drive movement of the control assembly.

5. The power tool according to claim 2, wherein the tool bit supporting assembly is rotatably supported in the housing and the control assembly is rotatable around an axis parallel to the longitudinal axis of the output shaft.

6. The power tool according to claim 2, wherein the automatic shifting means further includes a movement conversion assembly being connected with the operating member, and wherein the control assembly is driven to move by the operating member via the movement conversion assembly.

7. The power tool according to claim 6, wherein the movement conversion assembly includes a swing plate being connected between the operating member and the control assembly, and the operating member linearly moves along a movement direction to drive the swing plate swinging around a central rotating line perpendicular to the movement direction of the operating member, and a sliding groove is arranged on the operating member, a sliding pin capable of moving in the sliding groove is provided on one end of the swing plate, and the other end of the swing plate is connected with the control assembly.

8. The power tool according to claim 2, wherein at least two locating grooves corresponding to at least two chambers are arranged on an end face of the tool bit supporting assembly, the control assembly includes a pawl engaging with one of the locating grooves, and the pawl is movable between a position engaging with one of the locating grooves and a position separating from the one locating groove.

9. An operating method for the power tool according to claim 1, comprising the following steps:
controlling the operating member to drive the connecting member to move to the release position, and then controlling the operating member to drive the automatic shifting means to make the tool bit supporting assembly move such that the one of the at least two tool bits, which one tool bit is held by the tool bit supporting assembly, moves from one position to another.

10. The operating method according to claim 9,
wherein the tool bit supporting assembly includes at least two chambers each having a respective longitudinal axis being disposed in parallel to one another for correspondingly holding a respective one of the at least two tool bits, the connecting member passes through one of the at least two chambers when the connecting member is at the working position, and
wherein to accommodate one of the tool bits in the chamber, the connecting member exits and separates from the one of the at least two chambers when the connecting member is at the release position,
wherein the automatic shifting means includes a control assembly arranged between the operating member and the tool bit supporting assembly, the control assembly is movable from an initial position to a terminal position and drives the tool bit supporting assembly,
the operating member controls movement of the connecting member until the connecting member is at least partially overlapped with the one chamber, and
the control assembly moves from the terminal position to the initial position,
wherein the operating method further comprises:
controlling the operating member to drive the connecting member to return to the working position and the control assembly to return to the initial position.

11. The power tool according to claim 1, wherein the connecting member is movable along the axial direction of the output shaft between the working position and the release position.

12. The power tool according to claim 1, wherein the tool bit supporting assembly includes at least two chambers each having a respective longitudinal axis disposed in parallel to one another, each of the at least two chambers for correspondingly holding a respective one of the at least two tool bits, the connecting member passes through one of the at least two chambers when the connecting member is at the working position, and wherein to accommodate one of the tool bits in the one chamber, the connecting member exits and separates from the one of the at least two chambers when the connecting member is at the release position.

13. The power tool according to claim 12, wherein the connecting member moves so as to be separated from the one of the at least two chambers, the operating member drives the automatic shifting means in order to move the tool bit supporting assembly to a position such that another one of the chambers has the respective longitudinal axis thereof in alignment with the longitudinal axis of the output shaft, so that positions of the at least two tool bits have been changed.

14. The power tool according to claim 1, wherein the operating member is movable along the axial direction of the output shaft to drive the connecting member and the automatic shifting means.

15. The power tool according to claim 1, wherein the automatic shifting means is connected between the operating member and the tool bit supporting assembly.

16. The power tool according to claim 1, wherein the automatic shifting means includes a movement conversion assembly being connected between the operating member and the tool bit supporting assembly, and the movement conversion assembly is used to convert the movement of the operating member to the movement of the tool bit supporting assembly.

17. The power tool according to claim 16, wherein the movement conversion assembly includes a driving member being connected between the operating member and the tool bit supporting assembly, and the operating member is moved along a movement direction and drives the driving member to move from a first position to a second position in order to drive the tool bit supporting assembly to move along a direction perpendicular to the axial direction of the output shaft.

18. The power tool according to claim 17, wherein the tool bit supporting assembly includes at least two chambers each having a respective longitudinal axis being disposed in parallel to one another, each of the at least two chambers for correspondingly holding a respective one of the at least two tool bits, the connecting member passes through one of the at least two chambers when the connecting member is at the working position, and
wherein to accommodate one of the tool bits in the one chamber, the connecting member exits and separates from the one of the at least two chambers when the connecting member is at the release position,
the driving member is connected with the operating member,
the operating member moves along the movement direction and controls movement of the connecting member until the connecting member is at least partially overlapped with the one chamber,
when the connecting member is at least partially overlapped with the one chamber, the tool bit supporting assembly is fixed relative to the housing, and
the driving member is moved from the second position to the first position.

19. The power tool according to claim 17, wherein the movement conversion assembly further includes a sliding groove arranged on the operating member, one end of the driving member is movably connected with the tool bit supporting assembly, the other end of the driving member is fixed with a sliding pin which moves along the sliding groove to drive the driving member to move.

20. The power tool according to claim 19, wherein the driving member is configured to be a swing plate, the sliding pin is arranged at one end of the swing plate and moves along the sliding groove to drive the swing plate to rotate around an axis perpendicular to the axial direction of the output shaft.

21. The power tool according to claim 19, wherein the sliding groove has two opposing oblique edges oblique with respect to the axial direction of the output shaft, and has two straight edges being connected with the oblique edges and parallel to the axial direction of the output shaft.

22. The power tool according to claim 17, wherein the movement conversion assembly further includes a sliding groove arranged on the operating member, the sliding groove having two opposing oblique edges oblique with respect to the axial direction of the output shaft and having two straight edges being connected with the oblique edges and parallel to the axial direction of the output shaft, wherein the driving member comprises a sliding pin, and wherein two rib plates parallel to the two straight edges are arranged in the sliding groove respectively and the sliding pin is movable in the track formed between the two rib plates and the two straight edges.

23. The power tool according to claim 22, wherein a guide plate is arranged in the sliding groove, wherein the guide plate is rotatable around an axis perpendicular to the axial direction of the output shaft, the operating member is movable to make the sliding pin contact the guide plate, and the sliding pin generates a displacement which is perpendicular to the axial direction of the output shaft under the action of the guide plate.

24. The power tool according to claim 1, wherein the automatic shifting means includes a movement track selection means being connected to the operating member, and the operating member moves axially along the axial direction of the output shaft to make the tool bit supporting assembly moving cyclically between two positions via the movement track selection means.

25. The power tool according to claim 24, wherein a first sliding groove and a second sliding groove communicating with each other are arranged on the operating member, the automatic shifting means further includes a sliding pin for driving the tool bit supporting assembly to move, the sliding pin is cyclically movable in the first sliding groove and the second sliding groove under the action of the movement track selection means.

26. The power tool according to claim 25, wherein the movement track selection means includes a guide plate arranged between the first sliding groove and the second sliding groove, the sliding pin is capable of contacting the guide plate via the movement of the operating member, and the guide plate is capable of changing the movement direction of the sliding pin.

27. The power tool according to claim 1, wherein the power tool further comprises a travel amplification assembly, and the operating member drives the travel amplification assembly so that the movement travel of the connecting member is greater than that of the operating member.

28. The power tool according to claim 1, wherein during movement of the operating member, there are at least two travels, wherein, the operating member moves relative to the housing together with the connecting member in the first travel; and the connecting member is fixed relative to the housing and the operating member moves relative to the housing in the second travel.

29. The power tool according to claim 1, wherein the automatic shifting means includes a movement conversion assembly connected between the operating member and the tool bit supporting assembly, the operating member moves linearly along the axial direction of the output shaft to drive the automatic shifting means, and the movement conversion assembly is for converting the linear movement of the operating member to a rotary movement or to a linear movement of the tool bit supporting assembly.

30. The power tool according to claim 1, wherein the tool bit supporting assembly is movable along a direction perpendicular to the axial direction of the output shaft or is rotatable around an axis parallel to the axial direction of the output shaft.

31. The power tool according to claim 1, wherein the at least two tool bits includes at least one screwdriver bit and at least one drill bit, the operating member is operable to drive the connecting member to allocate the drill bit in a bit-accommodating position in the tool bit supporting assembly and the screwdriver bit in a working position in the accommodating hole, or allocate the screwdriver bit in the bit-accommodating position and the drill bit in the working position, the connecting member is movable to drive one of the screwdriver bit and the drill bit to the bit-accommodating position, and the tool bit supporting assembly moves via action of the automatic shifting means to a position that the other one of the screwdriver bit and the drill bit has a longitudinal axis that is in axial alignment with the longitudinal axis of the output shaft.

32. An operating method of the power tool according to claim 31, comprising the following steps: 1) operating the operating member to drive the connecting member to allocate one of the screwdriver bit and the drill bit in the bit-accommodating position; 2) operating the operating member to drive the connecting member to allocate the other one of the screwdriver bit and the drill bit to the working position.

* * * * *